US010873772B2

(12) United States Patent
Rossato et al.

(10) Patent No.: US 10,873,772 B2
(45) Date of Patent: Dec. 22, 2020

(54) TRANSMISSION OF RECONSTRUCTION DATA IN A TIERED SIGNAL QUALITY HIERARCHY

(75) Inventors: Luca Rossato, Milan (IT); Guido Meardi, Milan (IT)

(73) Assignee: V-NOVA INTERNATIONAL LIMITED, London (GB)

( * ) Notice: Subject to any disclaimer, the term of this patent is extended or adjusted under 35 U.S.C. 154(b) by 843 days.

(21) Appl. No.: 13/188,237

(22) Filed: Jul. 21, 2011

(65) Prior Publication Data

US 2013/0297466 A1   Nov. 7, 2013

(51) Int. Cl.
*H04N 21/2343* (2011.01)
*H04N 21/6587* (2011.01)
*H04N 21/4402* (2011.01)

(52) U.S. Cl.
CPC ........ *H04N 21/234327* (2013.01); *H04N 21/440281* (2013.01); *H04N 21/6587* (2013.01)

(58) Field of Classification Search
USPC .......... 375/240.01, 240.25, E07.027; 705/30
See application file for complete search history.

(56) References Cited

U.S. PATENT DOCUMENTS 7,379,496 B2 * 5/2008 Holcomb et al. ........ 375/240.03
8,041,128 B2 * 10/2011 Okada .............. G11B 20/00086
  382/100

(Continued)

FOREIGN PATENT DOCUMENTS

CN   101610391 A   12/2009
JP   H08-181966   7/1996

(Continued)

OTHER PUBLICATIONS (Schwarz et al.) Schwarz, H.; Marpe, D.; Wiegand, T., "Overview of the Scalable Video Coding Extension of the H.264/AVC Standard," Circuits and Systems for Video Technology, IEEE Transactions on , vol. 17, No. 9, pp. 1103,1120, Sep. 24, 2007 doi: 10.1109/TCSVT.2007.905532.*

(Continued)

*Primary Examiner* — Christopher S Kelley
*Assistant Examiner* — Ana Picon-Feliciano
(74) *Attorney, Agent, or Firm* — Workman Nydegger; Shane K. Jensen

(57) ABSTRACT

A data processor retrieves reconstruction data and corresponding stream metadata from a repository, the reconstruction data encoded in accordance with a tiered hierarchy including multiple levels of quality. The data processor transmits selected portions of the reconstruction data to one or more decoder resources. The decoder resources reconstruct renditions of portions of a signal such as images/frames based on the transmitted portions of reconstruction data. During the transmission step, the data processor may vary a level of quality of the reconstruction data retrieved and transmitted to the decoder resource to play the signal at different levels of quality. Also, at times, the data processor may transmit the levels of quality of the reconstruction data out of the natural sequence of the portions of the signal that they allow to reconstruct, anticipating or postponing the transmission of certain levels of quality of reconstruction data related to specific portions of the signal.

37 Claims, 71 Drawing Sheets

(56) References Cited

U.S. PATENT DOCUMENTS

| | | | |
|---|---|---|---|
| 2005/0195900 A1* | 9/2005 | Han | H04N 21/234327 375/240.21 |
| 2005/0220323 A1 | 10/2005 | Okada et al. | |
| 2006/0120451 A1* | 6/2006 | Hannuksela | H04N 19/105 375/240.12 |
| 2007/0160134 A1* | 7/2007 | Segall | H04N 19/46 375/240.1 |
| 2007/0223582 A1* | 9/2007 | Borer | H04N 19/619 375/240.12 |
| 2008/0043832 A1* | 2/2008 | Barkley | H04N 21/234327 375/240 |
| 2008/0165848 A1* | 7/2008 | Ye et al. | 375/240.13 |
| 2008/0181298 A1* | 7/2008 | Shi | H04N 21/234327 375/240.03 |
| 2008/0317431 A1 | 12/2008 | Mishima et al. | |
| 2009/0320081 A1* | 12/2009 | Chui | H04N 7/17318 725/93 |
| 2010/0262708 A1* | 10/2010 | Bouazizi | H04N 21/2381 709/231 |
| 2011/0010748 A1* | 1/2011 | Asami | H04N 5/783 725/116 |
| 2012/0183065 A1* | 7/2012 | Rusert | H04N 19/61 375/240.13 |

FOREIGN PATENT DOCUMENTS

| | | |
|---|---|---|
| JP | H11-018087 | 1/1999 |
| JP | 2011-7786 A1 | 1/2001 |
| JP | 2001-069486 | 3/2001 |
| JP | 2003-324700 | 11/2003 |
| JP | 2005-277949 | 10/2005 |
| WO | 03063505 A1 | 7/2003 |
| WO | 2009-104639 | 8/2009 |

OTHER PUBLICATIONS

Shimauchi et al., XP030006679, "An Inter-layer estimation method for SVC", 21st JVT meeting; 78. MPEG meeting; Oct. 20, 2006-Oct. 27, 2006; Hangzhou, CN; (Joint Video Team of ISO/IEC JTC1/SC29/WG11 and ITU-T SG.16), 20061017-ISSN 00000407.*

Schwarz et al.("Overview of the Scalable Video Coding Extension of the H.264/AVC Standard", IEEE Transactions on Circuits and Systems for Video Technology, vol. 17, No. 9, Sep. 24, 2007, IEEE, New York).*

Shimauchi et al. ( Shimauchi et al., XP030006679, "An Inter-layer estimation method for SVC", 21st JVT meeting; 78. MPEG meeting; Oct. 20, 2006-Oct. 27, 2006; Hangzhou, CN; (Joint Video Team of ISO/IEC JTC1/SC29/WG11 and ITU-T SG.16), 20061017-ISSN 00000407).*

Schwarz, Heiko et al., "Overview of the Scalable Video Coding Extension of the H.264/AVC Standard", IEEE Transactions on Circuits and Systems for Video Technology, Sep. 2007, Total pp. 18, IEEE, New York.

Lee, Sung-Ju et al., "An Interactive Video Delivery and Caching System Using Video Summarization", Computer Communications, Mar. 2002, Total pp. 15, vol. 25 No. 4, Elsevier Science, Amsterdam.

Schoeffmann, Klaus et al., "Video Browsing Interfaces and Applications: A Review", SPIE Reviews, 2010, Total pp. 35, vol. 1, SPIE, United States.

International Search Report from corresponding PCT application No. PCT/IB2012/053726, dated Dec. 6, 2012, Total pp. 3.

Intellectual Property Office of Singapore Search Report for corresponding application No. 2014002281, dated May 28, 2015, Total pp. 6.

Schwartz, Heiko, et al. "Overview of the Scalable Video Coding Extension of the H.264/AVC Standard", IEEE Transactions on Circuits and Systems for Video Technology, vol. 17, Issue 9, Sep. 30, 2007, pp. 1103-1120.

Chinese Office Action, Application No. 201280036095.1, dated Sep. 9, 2016, pp. 10.

Office Action, Notice of Reasons for Rejection, Application No. 2014-520784, dated Aug. 2, 2016, pp. 4.

Khiem, N. Q. M. et al., "Supporting Zoomable Video Streams with Dynamic Region of Interest Cropping", Proceedings of the first annual ACM SIGMM conference on Multimedia systems, Feb. 22-23, 2010, Phoenix, Arizona, USA, pp. 259-270. (citied in AU search report dated Aug. 11, 2017).

Mavlankar. A. et al., "An Interactive Region-of-Interest Video Streaming System for Online Lecture Viewing", 18th International Packet Video Workshop, Dec. 13-14, 2010, Hong Kong, China. (citied in AU search report dated Aug. 11, 2017).

Cheung, N.-M. et al., "Video Coding on Multicore Graphics Processors", IEEE Signal Processing Magazine, vol. 27, Issue: 2, Mar. 25, 2010. (citied in AU search report dated Aug. 11, 2017).

Fuldseth, A., "Replacing slices with tiles for high level parallelism", Joint Collaborative Team on Video Coding (JCT-VC) of ITU-T SG16 WP3 and ISO/IEC JTC1/SC29NVG11, 4th Meeting: Daegu, KR, Jan. 20-28, 2011; Document: JCTVC-D227. (citied in AU search report dated Aug. 11, 2017).

Examination report No. 2 for standard patent application, 20122285360, Aug. 11, 2017, pp. 8.

Office Action, JP2014-520784, dated Aug. 16, 2017, pp. 4.

\* cited by examiner

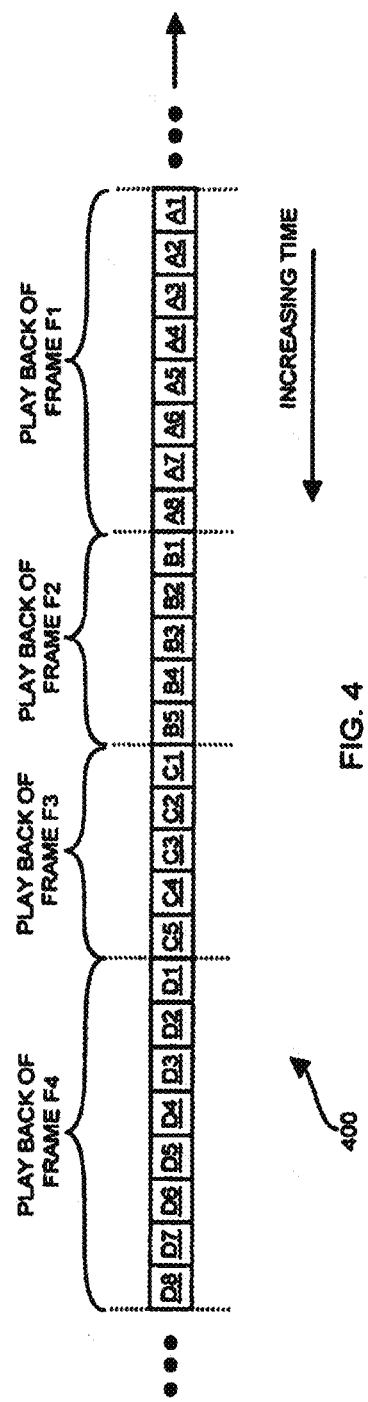

| 915-1 OF | 915-2 -2 | 915-3 | 915-4 |
| --- | --- | --- | --- |
| 915-5 25 | 915-6 6 | 915-7 | 915-8 |
| 915-9 | 915-10 | 915-11 7 | 915-12 OF |
| 915-13 | 915-14 | 915-15 OF | 915-16 OF |

R.D.(150-1) = OF, -2, 25, 6, 7, 0F, 0F, 0F

115-0

| 910-1 10 | 910-2 8F |
| --- | --- |
| 910-3 0F | 910-4 0 |

— # TRANSMISSION OF RECONSTRUCTION DATA IN A TIERED SIGNAL QUALITY HIERARCHY

RELATED APPLICATIONS

This application is related to U.S. patent application Ser. No. 13/188,188 entitled "INHERITANCE IN A TIERED SIGNAL QUALITY HIERARCHY," filed on Jul. 21, 2011, now U.S. Pat. No. 8,977,065, granted on Mar. 10, 2015, the entire teachings of which are incorporated herein by this reference.

This application is related to U.S. patent application Ser. No. 13/188,201 entitled "TIERED SIGNAL DECODING AND SIGNAL RECONSTRUCTION," filed on Jul. 21, 2011, now U.S. Pat. No. 8,948,248, granted on Feb. 3, 2015, the entire teachings of which are incorporated herein by this reference.

This application is related to U.S. patent application Ser. No. 13/188,207 entitled "SIGNAL PROCESSING AND TIERED SIGNAL ENCODING," filed on Jul. 21, 2011, now U.S. Pat. No. 8,711,943, granted on Apr. 29, 2014, the entire teachings of which are incorporated herein by this reference.

This application is related to U.S. patent application Ser. No. 13/188,220 entitled "UPSAMPLING IN A TIERED SIGNAL QUALITY HIERARCHY," filed on Jul. 21, 2011, now U.S. Pat. No. 9,129,411, granted on Sept. 8, 2015, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY," filed on Jul. 21, 2011, now U.S. Pat. No. 8,531,321, granted on Sept. 10, 2013, the entire teachings of which are incorporated herein by this reference.

BACKGROUND

Today the majority of Internet traffic is made of video content, most of which transmitted through video streaming. At the same time, most TV contents are now broadcasted using digital video transmission.

However, conventional video codecs (e.g., MPEG family codecs or other frequency-transform-based/block-based codecs) were not developed with video streaming in mind, since at the time in which they were introduced the Internet was still in its infancy and the available bandwidth did not allow for effective video streaming.

As a consequence, when video streaming functionalities were added, the main algorithms and formats had already been defined, and did not intrinsically support features that are important in the context of video transmission through digital channels that may present variable/unpredictable bitrates and variable/unpredictable noise or packet loss.

For instance, current algorithms and bitstream formats do not allow streaming servers—starting from a single encoded file—to dynamically adapt the level of quality of a video stream to the characteristics of the specific decoder/display device at the receiving end: if a signal is encoded in high quality, it must be transmitted in its full resolution (with notable use of bandwidth and computing resources at the decoding end) even when the receiving end only possesses a low-resolution display device (e.g., mobile phone, tablet, etc.).

In the same way, it is impossible to dynamically adapt the level of quality of the video stream to the available bandwidth (e.g., in case of network congestion or bandwidth limitations), or to the level of service requested by the decoder device (e.g., pay-per-view services where the fees are dependent on the level of quality of the stream).

Another limitation is that in case of errors in transmission due to noisy channels, very visible "blocky" artifacts appear (as a consequence of the fact that information pertaining to entire blocks of the signal may have been corrupted), with no allowance for the more graceful signal degradation that was typical of analog transmissions.

Also, it is impossible to allow the decoder to browse (e.g., fast forward) through a low quality version of the video stream before having finished downloading/buffering the whole stream, with the consequence that the decoder device will have to download segments of the signal that might never be played back (with consequent waste of time and bandwidth).

In addition, current algorithms and transmission formats are not engineered for best utilization of the available bandwidth in the case of constant bit rates (CBR), which implies that they must encode the signal so that the portions having the highest information density do not exceed the constant bit rate (with consequent lower utilization of the CBR channel for all of the other low-complexity portions).

Lastly, traditional MPEG family codecs are structurally non-parallel. This stems from the fact that they are block-based, and each image block must be encoded and decoded sequentially, since to achieve efficient compression all blocks must be made to depend in some way on each other. As a consequence, the bitstream is not organized in a fashion that allows parallel decoding by many independent computing cores/devices.

Such limitations are true for video streaming (2D or multiview), but also carry over to other areas of application that are becoming increasingly important, such as the efficient transmission of 3D or volumetric data in fields such as medical imaging, scientific imaging, etc.

CPU (Central Processing Unit) efficiency matters both during encoding and decoding of a signal. Latest generation processors are becoming more and more parallel, with up to hundreds of simple cores on each single chip. (paragraph incorporated from U.S. Pat. No. 8,977,065).

Unfortunately, by nature, traditional MPEG (Moving Pictures Expert Group) family codecs are structurally non-parallel. That stems from the fact that they are block-based, and each image block must be encoded and decoded sequentially, since to achieve efficient compression all blocks must be made to depend in some way on each other. (paragraph incorporated from U.S. Pat. No. 8,977,065).

Via the introduction of so-called "slices" (basically, pieces of the image that are treated independently of one another, as if they were separate videos put one next to the other) into MPEG coding, the H.264 standard allows for processing of a few threads in parallel (typically 2 or 3 threads). Important algorithm elements such as de-blocking (i.e., a filter that "smoothes" the transitions among blocks to create a more uniform image) are typically global operations full of conditional instructions, which are unsuitable for applications including parallel CPUs. (paragraph incorporatedfrom U.S. 8,977,065).

Today's CPUs and GPUs (Graphics Processing Units) are typically very powerful; a single GPU can include several hundreds of computing cores to perform parallel processing of information. When using current technology, larger portions of an image can be stored in a processor cache for processing. The need to fragment images into a multitude of small blocks, which was a driving factor when MPEG was created, as processors from that era could only deal with very small chunks of video data at a time—and then only sequentially—no longer applies to modern CPUs and GPUs. Thus, a large portion of available processing power may go unused when implementing MPEG-like types of encoding/decoding, with blocking artifacts needlessly introduced into the signal. (paragraph incorporated from U.S. Pat. No. 8,977,065).

Also, compared to what was current when MPEG was developed, modern day applications typically require much higher definition video encoding and much higher overall playback quality. In high-definition (HD), high-quality videos, there is a much larger difference between areas with low detail (potentially even out of focus) and areas with very fine detail. This makes the use of frequency-domain transforms such as those used in MPEG even more unsuitable for image processing and playback, since the range of relevant frequencies is getting much broader. (paragraph incorporated from U.S. Pat. No. 8,977,065).

In addition, higher resolution images include a higher amount of camera noise and/or film grain, i.e., very detailed high-frequency pixel transitions that can be quite irrelevant for viewing and require many bits to encode. (paragraph incorporated from U.S. Pat. No. 8,977,065).

Lastly, traditional codecs are ill-suited to perform efficiently with 3D or volumetric imaging, which is becoming more and more important in fields such as medical imaging, scientific imaging, etc. (paragraph incorporated from U.S. Pat. No. 8,977,065).

Most target devices today support different playback resolutions and quality. So-called SVC (Scalable Video Coding), the current MPEG standard for scalability, has not been received favorably by the industry and shows little to non-existent adoption, because it is considered way too complex and somewhat bandwidth inefficient. Moreover, encoded videos are plentiful; that is, a content provider typically doesn't have the time to customize encoder parameters and experiment with each specific video stream. Currently, content providers dislike that many encoding parameters must be manually tweaked (every time performing an encoding and checking the quality of results) in order to successfully encode a video. (paragraph incorporated from U.S. Pat. No. 8,977,065).

As an alternative to MPEG standards for encoding/decoding, so-called image pyramids have been used for encoding/decoding purposes. For example, using Laplacian pyramids, conventional systems have created lower resolution images using Gaussian filters and then building the pyramid of the differences between the images obtained by upsampling with a rigidly programmed decoder back from the lower resolution levels to the original level. (paragraph incorporated from U.S. Pat. No. 8,977,065).

Use of conventional Laplacian pyramid encoding has been abandoned. One deficiency of such transforms is that the authors were always trying to avoid distortions/artifacts in the downsampled image, so they typically used Gaussian filtering, as it is the only type of filter that doesn't add any information of its own. However, the insurmountable problem with Gaussian filtering is that it introduces a blurring effect, such that when upscaling back to higher resolutions, there is a need for an inordinate amount of image correction information to reproduce the original image. In other words, upsampling with conventional filters results in jagged or blurry edges in a reconstructed image. The jagged or blurry edges need to be corrected using a substantial amount of residual data, making such an encoding technique undesirable for use in higher resolution applications. (paragraph incorporated from U.S. Pat. No. 8,977,065).

One of the important components of any signal encoder is the operation currently referred to as "entropy coding". In practice, once the encoding operations and transforms are performed with either lossless or lossy methods, the residuals (i.e., new information that couldn't be derived from data, such as a previous frame in a video signal, which is already available at the decoder) are essentially strings of numbers that must be transmitted, if possible, without any further loss or approximation and with the least possible amount of bits. The lossless data compression schemes through which strings of numbers can be transmitted with the least possible amount of bits are typically referred to as entropy coding. The concept of entropy in a string of numbers/symbols has to do with the intrinsic amount of information that the string of numbers/symbols contains: since not all of the numbers/symbols in the string are different, the more the string contains few symbols (ideally, just one) that are frequently repeated, the fewer bits are necessary to encode the string. (paragraph incorporated from U.S. Pat. No. 8,531,321).

Several methodologies for entropy encoding exist in the literature. Sophisticated entropy coders (such as CABAC, the context adaptive entropy coder introduced with H.264) can reach excellent results at the expense of great computational complexity, while others, such as the technique known as range encoding, can reach similar results only when used with appropriate parameters. In general entropy coders are only as efficient as their estimate of the symbol frequencies in the strings to encode (i.e. of the probability distribution of the symbols, which the decoder must get from the encoder in some way). (paragraph incorporated from U.S. Pat. No. 8,531,321).

Since MPEG-family codecs are block based (i.e., they divide the signal in a number of blocks and essentially analyze/encode each block separately), ideally they would need a separate probability distribution for the residuals of each single block: this of course wouldn't be practical given the very high number of blocks, so they either use standard distributions of probabilities (not custom made for a specific frame, and consequently less efficient in terms of data compression) or adaptive schemes like CABAC (more efficient, but very complex). (paragraph incorporated from U.S. Pat. No. 8,531,321).

Methods and embodiments herein represent an innovative approach to achieve efficient entropy coding results with low computational complexity. (paragraph incorporated from U.S. Pat. No. 8,531,321).

BRIEF DESCRIPTION

Embodiments herein deviate with respect to conventional systems and methods. For instance, embodiments herein are directed to unique ways of using reconstruction data to reconstruct renditions of a signal at one or more different levels of quality, with multiple advantages that are not feasible with conventional methods, such as the following non-limiting examples:

Encoding the signal only once (i.e., avoiding separate encodings for each desired level of quality), with no need to know in advance the different bit rates and levels of quality that will be necessary.

Gracefully transitioning among different levels of quality (e.g., avoiding abrupt switches from a high quality stream to a lower quality one or vice versa).

Transitioning among different levels of quality at any one time (i.e., not only in predefined synchronization points, and not necessarily starting with an Intra picture).

Completely recovering the quality degradation due to network congestion, as long as the service is restored within the buffering time. More in general, dynamically recovering from quality degradations.

In case of simultaneous transmission to multiple users (e.g., multicast, broadcast) transmitting a single data stream, even though different users might parse and decode only some levels of quality of the signal.

More specifically, one embodiment herein includes a data processor (streaming server) configured to retrieve reconstruction data and stream metadata from a repository. The reconstruction data is encoded in accordance with a tiered hierarchy including multiple levels of quality, as described in the related applications incorporated herein by reference. The stream metadata contains information on the reconstruction data (e.g., location of each set of reconstruction data, characteristics of each set of reconstruction data, importance of each set of reconstruction data, distance from the next Intra-frame, levels of quality to be sent at the beginning of the stream to enable a seek or quick preview function, etc.) that allow the streaming server to efficiently decide (i.e., without analyzing the reconstruction data) whether and when to transmit each set of reconstruction data. The streaming server transmits selected portions of the reconstruction data to one or more decoder resource(s). Each decoder resource reconstructs renditions of a signal based on the transmitted portions of reconstruction data. During the transmission step, the streaming server retrieving the reconstruction data from the repository varies a level of quality of the reconstruction data transmitted to the decoder resource(s). Each decoder resource decodes the received reconstruction data to play back the signal at different levels of quality. Thus, signal can be encoded to include appropriate reconstruction data to reconstruct each element of the signal at a highest level of quality. However, the streaming server can be configured to selectively transmit portions of the reconstruction data to a remote resource such as a decoder.

In one embodiment, varying the level of quality of reconstruction data transmitted to the decoder resource can include: transmitting a first set of reconstruction data to the decoder resource for playback of a first portion of the signal and transmitting a second set of reconstruction data to the decoder resource for playback of a second portion of the signal. The first set of reconstruction data (e.g., X tiers of reconstruction data) indicates how to reconstruct a rendition of the first portion of the signal in accordance with a first level of quality in the tiered hierarchy. The second set of reconstruction data (e.g., Y tiers of reconstruction data) indicates how to reconstruct a rendition of the second portion of the signal in accordance with a second level of quality in the tiered hierarchy. When X>Y, the first level of quality is greater than the second level of quality; when Y>X, the opposite is true.

The tiers of reconstruction data (i.e., a single encoded file) can be transmitted at different levels of quality for a number of different reasons. For example, the second set of reconstruction data may be transmitted from the data processor to a decoder resource at the second level of quality instead of the first level of quality in response to detecting an inability to transmit, due to network congestion, the second set of reconstruction data encoded according to the first level of quality. In accordance with such an embodiment, the reconstruction data to reconstruct the first portion of the signal can include X levels of quality of reconstruction data; the reconstruction data to reconstruct the second portion of the signal can include Y levels of quality of reconstruction data. Reducing an amount of transmitted data (e.g., reconstruction data) enables a decoder to reconstruct at least a lower level of quality version of the signal.

In one embodiment, the streaming server varies the level of quality of the reconstruction data to facilitate real-time or non-delayed playback of the signal by the decoder resource.

In accordance with another embodiment, the streaming server can be configured to transmit the second set of reconstruction data at the second level of quality in response to receiving an explicit request to transmit the second set of reconstruction data at the second level of quality instead of the first level of quality. For example, a source such as the decoder resource can request transmission of the signal in accordance with a higher or lower quality than a previously transmitted element or sets of elements. In response to the request, the streaming server transmits the reconstruction data at the requested level of quality.

In one embodiment, the data processor (e.g., streaming server) varies a highest level of quality of reconstruction data transmitted to the decoder resource(s) for each of multiple images/frames of the signal in order to transmit a substantially constant bit rate of tiered reconstruction data to the decoder resource(s) for each of multiple successive images/frames of the signal (throughout this application we use the terms "image" and "frame" interchangeably to indicate 2D or 3D images that are part of a multi-image signal, such as a 2D video or a volumetric/holographic video). Thus, the level of quality of reconstruction data transmitted to a decoder can be varied in order to produce a substantially constant bit rate data stream.

Reconstruction data for images/frames of the signal can be transmitted according to a different level of quality depending on the level of reconstruction data retrieved from the repository and forwarded from the streaming server to the decoder resource. For example, in one embodiment, varying the level of quality of reconstruction data can include: i) for a first portion of the signal, retrieving reconstruction data from the repository and producing a first set of reconstruction data to include a sequence of reconstruction data from a lowest level of quality in the hierarchy up to a first level of quality; and ii) for a second portion of the signal, retrieving reconstruction data from the repository and producing a second set of reconstruction data to include a sequence of reconstruction data from the lowest level of quality in the hierarchy up to a second level of quality. As mentioned, the second level of quality can be higher or lower than first level of quality. The streaming server transmits the first set of reconstruction data to the decoder resource for playback of the first portion of the signal in accordance with the first level of quality; the streaming server transmits the second set of reconstruction data to the decoder resource for playback of the second portion of the signal in accordance with the second level of quality.

In accordance with further embodiments, the streaming server can be configured to transmit the lower levels of quality of reconstruction data for each of multiple portions of the signal followed by transmission of higher levels of quality of reconstruction data. For example, the streaming server can be configured to transmit a first set of reconstruction data to include reconstruction data to reconstruct multiple portions of the signal in accordance with a first level of quality in the hierarchy. The streaming server transmits the first set of reconstruction data to the decoder resource to enable navigation amongst the signal in accordance with the first level of quality. In one embodiment, transmission of the first set of reconstruction data can be achieved in relatively little time because the first set of reconstruction data enables reconstruction according to a low level of quality. The decoder resource can initiate playback of the first set of reconstruction data enabling a respective user to quickly navigate (e.g., via commands such as fast forward, reverse, etc.) amongst playback of a lower level of quality (e.g., low-resolution) version of the signal. Based on viewing the low-resolution signal, the user can select a pointer value indicating a location in the signal for playback at a higher level of quality.

In response to the selection of a particular location in the low-resolution data stream, the streaming server transmits a second set of reconstruction data (potentially starting from the requested location as by the pointer value) to include reconstruction data to reconstruct the signal in accordance with a second level of quality in the hierarchy. The streaming server transmits the second set of reconstruction data to the decoder resource for playback of the second portion of the signal in accordance with the higher level of quality.

A combination of the first set of reconstruction data (initial transmission) and second set of reconstruction data (subsequent transmission) enable playback of the signal in accordance with the second level of quality. More specifically, based on the navigation example as discussed above, the second set of reconstruction data (e.g., reconstruction data to reconstruct the signal at the higher level of quality) is supplemental reconstruction data with respect to the first set of reconstruction data. The second set of reconstruction data indicates how to modify a rendition of the signal generated based on the first set of reconstruction data in order to reconstruct portions of the signal following the pointer value according to the second level of quality.

In accordance with further embodiments, the reconstruction data can be distributed based on a fee schedule in which a respective user operating the decoder resource is charged a different amount of money or fee depending on a level of quality of the reconstruction data transmitted to the decoder resource. The user can initially receive reconstruction data according to a first level of quality and subsequently request transmission of the additional reconstruction data to play back content according to a second, higher level of quality.

In accordance with further embodiments, note that portions of the reconstruction data can be protected via application of digital rights management with respect to a selected portion of the reconstruction data. For example, as mentioned, each portion (e.g., image, frame, plane, volume, etc.) of the signal can be defined by a respective tiered set of reconstruction data to reconstruct a rendition of the signal. Decoding with higher tiers of the reconstruction data enables playback of the signal at a higher level of quality. Embodiments herein include implementing digital rights management with respect to only lower tiers of the sets of reconstruction data (e.g., the lower level of quality reconstruction data). In accordance with such an embodiment, this prevents unauthorized decoding of the reconstruction data at the lower level of quality. Higher tiers of the reconstruction data are accessible and may be unprotected by digital rights management. However, without the ability to decode the lower level of quality reconstruction data because they are protected via digital rights management, an unauthorized decoder resource is unable to use the higher level of quality reconstruction data to produce a meaningful rendition of the signal. In other words, use of the higher level of quality reconstruction data is dependent on successful decoding of corresponding lower level of quality reconstruction data, which is protected by digital rights management.

In accordance with another embodiment, the encoder can generate the sets of reconstruction data at one or more levels of quality to include redundant encoding to enable playback of the signal. The reconstruction data at the low level of quality can include redundant encoding to enable playback of the lower level of quality reconstruction data in the event of errors. The encoder generates higher level of quality reconstruction data to include non-redundant encoding. Accordingly, a user receiving the reconstruction data will have a high probability of being able to play back the signal at least at the lower level of quality in the event of errors, as only the higher level of quality reconstruction data may be corrupt.

In accordance with yet further embodiments, the encoder can be configured to parse the reconstruction data into groupings. In one embodiment, each of the groupings of reconstruction data represents a space-based portion (e.g., tile of image/frame, sub-volume, piece, etc.) of the signal. Each of the levels of quality of the signal can include multiple groupings of reconstruction data, each indicating settings of a respective tile of contiguous elements associated with the signal. In addition to the sets of reconstruction data and the stream metadata, in such embodiments the encoder also produces appropriate tiling metadata, to be used by the streaming server and by the decoder to identify each specific grouping of reconstruction data.

Transmission of the reconstruction data to the decoder resource can include serially transmitting each of the multiple groupings in sequential order, one after another, in a bitstream to the decoder, and providing marker information (tiling metadata) in the bitstream to indicate a respective beginning and end of each grouping for each sequence of tiered reconstruction data. The decoder resource can include multiple processors, each of which is configured to decode one of the multiple groupings to produce a tile of the reconstruction data. A combination of tiles for each level of quality produces the reconstruction data used to obtain the rendition of the signal at a higher level of quality.

The streaming server can be configured to transmit the reconstruction data for a given portion of the signal over multiple portions of a data stream. For example, in one embodiment, the streaming server partitions a data stream for sending the reconstruction data into multiple segments including at least a first segment and second segment. The first segment of the data stream includes reconstruction data to play back a first image/frame of the signal; the second segment of the data stream includes reconstruction data to play back a second image/frame of the signal.

In one embodiment, the streaming server populates the first segment of the data stream to include multiple levels of quality of reconstruction data to reconstruct the first image/frame of the signal; the streaming server populates the second segment of the data stream (and potentially also additional subsequent segments of the data stream) to include: i) multiple levels of quality of reconstruction data to reconstruct the second (or subsequent) image/frame of the signal, and ii) at least one additional level of quality of reconstruction data to reconstruct the first image/frame of the signal. Thus, instead of transmitting reconstruction data for a respective portion of the signal in a corresponding segment of the data stream dedicated for that portion, the reconstruction data for a portion of the signal can be spread out over multiple segments of the data stream.

The decoder resource can be configured to buffer the data stream transmitted by the streaming server. For example, the decoder reconstructs the first image/frame of the signal based on the multiple levels of quality of reconstruction data in the first segment of the data stream and the reconstruction data in the second segment (and potentially also in additional further segments) of the data stream. The decoder reconstructs the second image/frame of the signal based on the multiple levels of quality of reconstruction data in the second segment. In this manner, the higher levels of quality in the reconstruction data can be spread out in a respective data stream.

In absence of buffering, the decoder resource can still be configured to leverage the additional levels of quality of reconstruction data received for the first segment of the data stream to improve the reconstruction of the second segment (and of the additional further segments) at a higher level of quality.

These and other embodiment variations are discussed in more detail below.

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments.

In addition to the encoding, streaming and decoding as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: retrieve reconstruction data and metadata from a repository, the retrieved reconstruction data encoded in accordance with a tiered hierarchy including multiple levels of quality; transmit the retrieved reconstruction data to a decoder, the decoder configured to reconstruct renditions of a signal based on the transmitted reconstruction data; and during the transmission, vary a level of quality of the reconstruction data retrieved and transmitted to the decoder.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that encode signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Embodiments herein deviate with respect to conventional systems and methods to reduce an amount of reconstruction data needed to reconstruct a signal with desirable accuracy. For example, embodiments herein are directed to unique ways of inheriting information from one level in a hierarchy to the next. (paragraph incorporatedfrom U.S. Pat. No. 8,977,065).

More specifically, one embodiment herein includes a signal processor such as a decoder configured to reconstruct a signal at higher levels of quality in a hierarchy. The signal processor receives a first set of reconstruction data to reconstruct the signal at a first level of quality in the hierarchy. Assume that the first set of reconstruction data includes a symbol specifying an attribute setting of a parent element in the rendition of the signal at the first level of quality. The attribute setting can be a setting for one of multiple planes of attribute settings of the parent element (e.g., attribute settings can include color components in a suitable color space, coordinates of motion vectors, temperature values, radioactivity values, density values, etc.). A combination of attribute settings indicates how to configure the parent element for the rendition of the signal at a first level of quality. The signal processor divides the parent element into multiple sub-elements to reconstruct the signal at a second, higher level of quality. When doing so, the signal processor utilizes the attribute setting of the parent element as specified by the symbol (at the first level of quality) to produce a default attribute setting for one or more respective sub-elements (into which the parent element is divided) unless or until a second set of reconstruction data to reconstruct the signal at the second level of quality specifies a different attribute setting for the respective sub-element. Accordingly, embodiments herein include reuse of parent setting information when reconstructing a signal at one or more higher levels of quality. This technique can reduce an amount of data needed to define the signal because of the inheritance of setting information from one level of quality to the next. (paragraph incorporated from U.S. Pat. No. 8,977,065).

In accordance with further embodiments, a symbol (e.g., setting information) assigned to the parent element can be encoded in a way as to specify that each of its subdivisions or sub-elements (e.g., the multiple sub-elements and all further divisions of the multiple sub-elements into smaller sub-elements at higher levels of quality) are assigned a same attribute setting as indicated by the symbol assigned to the parent element at the first level of quality. In such an instance, because of inheritance, setting information need not be repeated at higher levels of quality. (paragraph incorporated from U.S. Pat. No. 8,977,065).

As will be discussed further herein, a symbol assigned to a parent element can be encoded in a manner so as to specify which of multiple class types the parent element belongs to. For example, the symbol assigned to the parent element can be one of multiple different symbols specifying a class type. (paragraph incorporated from U.S. Pat. No. 8,977, 065).

In one embodiment, assigning a symbol to the parent element can indicate that the parent element belongs to the first class and that one or more strings of reconstruction data to reconstruct the signal at levels of quality higher than the first level of quality do not include a transmission of a duplicate symbol (e.g., the same symbol assigned to the parent element) since the assigned symbol indicates that each of the multiple sub-elements and all further divisions of the multiple sub-elements into smaller sub-elements of the parent element at higher levels of quality are to inherit the attribute setting of the parent. In other words, inheritance information assigned to a parent element at a lower level of quality can indicate that each of one or more sub-elements (as derived from the parent element) can be assigned the same symbol as the parent element. In such an instance, there is no need to retransmit the settings for the sub-elements at the higher levels of quality unless the settings happen to change for the higher levels of quality. In such an instance, the signal can include information indicating the settings for any sub-elements derived from a respective parent element. (paragraph incorporated from U.S. Pat. No. 8,977,065).

As an alternative to being assigned a first symbol, a parent element can be assigned a second symbol. The second symbol also can indicate a class to which a corresponding element belongs. Each of the first symbol and second symbol can indicate that the parent element belongs to the same class. However, unlike the first symbol, which indicates inheritance by the respective sub-elements, assignment of the second symbol to the parent element can indicate that none of the subdivisions of the parent element into smaller elements necessarily inherits the attribute information assigned to the parent element. (paragraph incorporated from U.S. Pat. No. 8,977,065).

Reconstruction data at a higher level of quality can override settings of the parent element associated with the second symbol. Accordingly, when a parent element is assigned a second symbol, the signal processor can identify a class to which the element belongs as well as be informed that reconstruction data at one or more higher levels of quality may include setting information for the subdivisions that is potentially different than that of the parent. (paragraph incorporated from U.S. Pat. No. 8,977,065).

As discussed herein, inheritance of settings up the levels of quality in the hierarchy can efficiently capture coarse setting information of the signal. Finer detailed setting information for the signal can be captured via so-called complementary residual data indicating how to adjust settings of the elements at the different levels of quality. A combination of the coarse setting information and the detailed setting information enables reconstruction of the original signal or a near replica of the original signal. (paragraph incorporated from U.S. Pat. No. 8,977,065).

In one embodiment, the signal processor can receive a second set of reconstruction data to reconstruct the signal at a higher level of quality. The second set of reconstruction data can include a so-called inheritance symbol (e.g., an "inherit" marker) indicating that the given sub-element (to which the reconstruction data pertains) inherits the same attribute setting that was assigned to the parent element. (paragraph incorporated from U.S. Pat. No. 8,977,065).

As mentioned, elements in a rendition of the signal at the first level of quality can be assigned appropriate settings information. The settings information can include use of symbols to indicate, for example, a class to which the respective element belongs as well as whether all of the sub-elements derived from the respective element will inherit that same setting information as the parent. In one embodiment, reconstruction data to reconstruct the signal at each of one or more higher levels of quality can indicate a probability distribution or entropy of the symbols. (paragraph incorporated from U.S. Pat. No. 8,977,065).

In accordance with further embodiments, a first group of symbols can include multiple symbols indicating a range of adjustment values. A second group of symbols can include multiple symbols duplicating the range of adjustment values in the first group. The symbols in either group can be assigned to an element to make an adjustment with respect to a current setting of the element. However, assignment of a symbol in the first group can indicate an adjustment as well as indicate that any subdivisions of a parent element into sub-elements are also assigned the same symbol as the parent element. Accordingly, in this instance, when sub-elements inherit the same adjustment value as a parent element, there is no need to continue to encode reconstruction data at higher levels of quality to include setting information for each sub-element of the parent element. It is known in advance that the sub-elements derived from the parent element inherit the same value assigned to the parent element. (paragraph incorporated from U.S. Pat. No. 8,977, 065).

Note that assignment of a symbol in the second group indicates an adjustment and that any subdivisions of a parent element into sub-elements are not necessarily assigned the same symbol as the parent element and that the reconstruction data at one or more higher levels of quality may indicate a different setting than the parent element. In other words, when assigned a symbol in the second group, the reconstruction data at higher levels for the sub-elements needs to be checked to determine the settings for the respective sub-elements. (paragraph incorporated from U.S. Pat. No. 8,977,065).

Accordingly, a symbol assigned to a parent element can be selected from multiple symbols, each symbol in a first set of the multiple symbols can indicate a different respective adjustment value in a range of adjustment values, each symbol in a second set of adjustment values can be configured to indicate different respective adjustment values in the range. Assignment of a respective symbol in the first set of symbols indicates that each of the multiple sub-elements and all further divisions of the multiple sub-elements derived from the parent element into smaller sub-elements at higher levels of quality are assigned the same value as the respective symbol and that strings of reconstruction data to reconstruct the signal at levels of quality higher than the first level of quality do not include a transmission of a duplication of the respective symbol. Assignment of a respective symbol in the second set of symbols indicates that each of the multiple sub-elements and all further divisions of the multiple sub-elements derived from the parent element into smaller sub-elements at higher levels of quality may be assigned different symbols as specified by symbols in strings of reconstruction data indicating how to reconstruct the signal at levels of quality higher than the first level of quality. (paragraph incorporated from U.S. Pat. No. 8,977,065).

These and other embodiment variations are discussed in more detail below. (paragraph incorporated from U.S. Pat. No. 8,977,065).

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments. (paragraph incorporated from U.S. Pat. No. 8,977,065).

In addition to the signal processing as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. (paragraph incorporated from U.S. Pat. No. 8,977,065).

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: receiving a first set of reconstruction data to reconstruct the signal at a first level of quality, the first set of reconstruction data including a symbol specifying an attribute setting of a parent element in the rendition of the signal at the first level of quality; dividing the parent element into multiple sub-elements to reconstruct the signal at a second level of quality, the second level of quality higher than the first level of quality; and utilizing the attribute setting of the parent element as specified by the symbol as a default attribute setting for a respective sub-element in the multiple sub-elements unless a second set of reconstruction data to reconstruct the signal at the second level of quality specifies a different attribute setting for the respective sub-element. (paragraph incorporated from U.S. Pat. No. 8,977,065).

The ordering of the steps has been added for clarity sake. These steps can be performed in any suitable order. (paragraph incorporated from U.S. Pat. No. 8,977,065).

Embodiments herein deviate with respect to conventional systems and methods. For example, embodiments herein are directed to unique ways of processing and reproducing signals such as image information and other types of encoded information. (paragraph incorporated from U.S. Pat. No. 8,948,248).

More specifically, one embodiment herein includes reconstructing a signal at successively higher levels of quality in a hierarchy. For example, according to one embodiment, a decoder decodes a first set of data and utilizes the first set of decoded data to reconstruct the signal according to a first level of quality. The decoder decodes a second set of data and identifies an upsample operation specified by the second set of decoded data, together with a scale factor also specified by the second set of decoded data. The decoder then applies the upsample operation and the scale factor identified in the second set of decoded data to the reconstructed signal at the first level of quality to reconstruct the signal at a second level of quality. In this example, the second level of quality is higher in quality than the first level of quality. In this manner, a set of decoded data indicates how to perform upsampling from one tier to the next. (paragraph incorporated from U.S. Pat. No. 8,948,248).

In accordance with further embodiments, to enhance the reconstructed signal at a respective level of quality, the decoder also can be configured to retrieve residual data from the second set of decoded data. The residual data can indicate how to modify the reconstructed signal at the second level of quality subsequent to application of the upsampling operation as discussed above. The decoder modifies the reconstructed signal at the second level of quality as specified by the residual data. (paragraph incorporated from U.S. Pat. No. 8,948,248).

The decoder can repeat the above processing for each of multiple levels of quality in the hierarchy. For example, for each of multiple levels of quality above the second level of quality, the decoder repeats steps of: decoding a next higher set of data in the hierarchy above a last processed level of quality; identifying an upsample operation and a scale factor specified by the next higher set of decoded data; applying the upsample operation and the scale factor identified in the next higher set of decoded data to reconstruct the signal at a next higher level of quality; identifying residual information and/or residual characteristics specified by the next higher set of decoded data; applying the residual information to modify the reconstructed signal at the next higher level of quality. (paragraph incorporated from U.S. Pat. No. 8,948,248).

Note that the signal as discussed herein can be of any suitable type, including 2D pictures, video frames, motion vector maps, 3D/volumetric images etc. For this reason, in the document we will refer to the basic elements of the signal at a given resolution as "signal elements" or "plane elements" ("pels"): each pel represents a value on a regular grid in a multidimensional space. For 2D images, pels are also commonly called "pixels" (picture elements), while for 3D images pels are also called "voxels" (volumetric picture elements). The resolution of the signal defines the number of pels that are present for each dimension of the grid. The signal as discussed herein can also represent just one of the planes/components of a more complex signal featuring several planes/components (e.g., luminance and chrominance, RGB, HSV, etc.). In one embodiment, the signal includes image data to reconstruct an image. In accordance with such an embodiment, the decoder reconstructs the signal at yet higher resolutions or higher levels of quality based on the tiered sets of encoded data to eventually reconstruct an original image or a near copy of the original image for playback. In certain cases, a lower level of quality image (e.g., a reconstructed signal at level lower than the highest possible resolution in the hierarchy) can be displayed for viewing, for instance when the output device is unable to display the full original resolution or when bandwidth for transmission is limited. (paragraph incorporated from U.S. Pat. No. 8,948,248).

These and other embodiment variations are discussed in more detail below. (paragraph incorporated from U.S. Pat. No. 8,948,248).

In addition to the decoder and processing as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. (paragraph incorporated from U.S. Pat. No. 8,948,248).

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: decode a first set of data; utilize the first set of decoded data to reconstruct the signal according to a first level of quality; decode a second set of data; identify an upsample operation and a scale factor specified by the second set of decoded data; and apply the up sample operation and scale factor identified in the second set of decoded data to the reconstructed signal at the first level of quality to reconstruct the signal at a second level of quality, the second level of quality being higher than the first level of quality. (paragraph incorporated from U.S. Pat. No. 8,948,248).

The ordering of the steps has been added for clarity sake. These steps can be performed in any suitable order. (paragraph incorporated from U.S. Pat. No. 8,948,248).

Embodiments herein deviate with respect to conventional systems and methods. For example, embodiments herein are directed to unique ways of processing and encoding signal information to reduce an amount of data that is needed to reconstruct a signal when decoding. (paragraph incorporated from U.S. Pat. No. 8,711,943).

More specifically, one embodiment herein includes encoding a received signal at different levels of quality in a hierarchy. For example, an encoder receives a signal to be encoded. Initially, the encoder utilizes one or more downsample operations to produce downsampled renditions of the signal at successively lower levels of quality in the hierarchy. The encoder then applies one or more upsample operations to a downsampled rendition of the signal at a first level of quality to produce an upsampled rendition of the signal at a second (e.g., higher) level of quality in the hierarchy. As discussed herein, the upsample operations and downsample operations are asymmetrical with respect to each other. Each of the upsample and downsample operations each or both can be different non-linear functions. (paragraph incorporated from U.S. Pat. No. 8,711,943).

One embodiment herein includes featuring several different downsampling and upsampling operations in a respective encoding loop to determine which operations are most suitable to reduce an amount of encoded data. In accordance with such an embodiment, the encoder produces and tests sets of residual data indicating a difference between a downsampled rendition of the signal and an upsampled rendition of the signal from a lower level of quality. (paragraph incorporated from U.S. Pat. No. 8,711,943).

In accordance with further embodiments, at each level of quality in the hierarchy, the encoder implements a "lossy" encoding algorithm so as to reduce the entropy of residual data produced at each of the levels of quality. Reducing entropy can be achieved by altering or tweaking elements of the signal at each level of quality and estimating the impact on the entropy of the residuals at the higher levels. (paragraph incorporated from U.S. Pat. No. 8,711,943).

In accordance with a more specific embodiment, the process of tweaking to improve (e.g., reduce) entropy can be repeated until one or more of the following conditions apply: a.) the entropy level achieved for a higher level of quality is below a satisfaction threshold value, b.) no additional alterations seem to improve the entropy of residual data for a given number of attempts, c) the encoder has performed a pre-set number of attempts to reduce the entropy, etc. (paragraph incorporated from U.S. Pat. No. 8,711,943).

As further discussed herein, the entropy can be estimated using a proxy function, which calculates or estimates a number of bits, symbols, etc., required to indicate difference information for a level of quality. (paragraph incorporated from U.S. Pat. No. 8,711,943).

In further embodiments, the encoder estimates the impact on entropy of residuals at higher levels of quality using a proxy function to identify an impact on entropy, without the need to fully encode the residuals at every tweaking. The proxy function can produce a metric such as a value indicating a percentage of residuals that are different from a value of zero or near zero value. (paragraph incorporated from U.S. Pat. No. 8,711,943).

Optimization of downsampling operations and filters is not necessarily an objective of every embodiment discussed herein. In one embodiment, since the encoder already knows what linear or non-linear operations (e.g., bicubic filtering, unsharp masking, deblending, . . . ) will be used to upscale back to higher levels of quality at the decoding site, the encoder can be configured to optimize downsampling not so much to reduce artifacts in lower levels of quality, but so as to reduce the number of residuals (or, even more precisely, to reduce the entropy of residuals) after applying upsampling operations. Both the downsample and upsample functions can be non-linear types of functions. (paragraph incorporated from U.S. Pat. No. 8,711,943).

As further discussed herein, downsampling of the signal during encoding can include implementing a tweaked bilinear filter process. In accordance with such an embodiment, the encoder initially downsamples from level n to level (n-1) using a downsample function such as a bilinear filter. The encoder focuses on each element and alters it in various directions. Every time the encoder alters an element, the encoder upsamples back to a higher level of quality (i.e., every Del/pixel in level n-1 influences a number of pixels in level n) to assess the entropy of residuals based on generating an appropriate entropy metric. (paragraph incorporated from U.S. Pat. No. 8,711,943).

According to a generated entropy metric, for the new value of that specific pel/pixel in level n-1, the encoder finally selects the alteration that generates the lowest entropy of residuals in the next higher level of quality (e.g., level hierarchy). In order to do so, the encoder can leverage use of an iterative or looping algorithm. The iterative algorithm chooses a direction (e.g., up or down) in which to alter an element. If the entropy metric improves, the encoder continues with another alteration in the selected direction. The encoder can be configured to reduce a size of the alterations once it is closer to a minimum entropy value for the iterative tweaking routine. (paragraph incorporated from U.S. Pat. No. 8,711,943).

In one embodiment, tweaking operations are done in parallel to reduce an amount of time needed to encode a received signal into multiple different levels of quality. Parallel processing can include use of all massively multi-core CPUs or GPUs. Each processor can be configured to process a selected portion of the overall signal. (paragraph incorporated from U.S. Pat. No. 8,711,943).

Since different pels/pixels of level (n-1) may influence overlapping areas of level n, for each "parallel step" of the algorithm, the encoder can be configured to perform a global aggregation algorithm (potentially in a hierarchical way, e.g. single pel, then 4×4, then 16×16, etc., with local loops for a certain number of iterations before doing a global pass) to check whether tweaks to a sub-region negatively impact an entropy associated with the global set of residual data. (paragraph incorporated from U.S. Pat. No. 8,711,943).

A specific implementation of the tweaking algorithm can also take into account different possible upsampling options such that at completion of the tweaking algorithm, the encoder knows the optimum level n-1 for each alternative upsampling technique. The encoder can select the upsampling or upscaling option that produces the lowest overall entropy metric for residual data at the next higher level. (paragraph incorporated from U.S. Pat. No. 8,711,943).

Note additionally that, with sufficient encoder computing power, the encoder can be configured to tweak and encode a level of quality (n-2) based on processing of level n, not just based on level (n-1). In other words, the signal data at a lower level of quality can be tweaked to reduce entropy at multiple different higher levels of quality in the hierarchy. Additionally, the same approach can be used also modify (or enrich) the operations and filters that are leveraged to upscale back from lower levels to higher levels. For instance, if the encoder tweaked lower levels based on multiple higher levels of quality, the encoder and decoder can reconstruct the signal at higher levels of quality in the hierarchy based on the information contained in multiple lower levels. (paragraph incorporated from U.S. Pat No. 8,711,943).

Note that the received signal as discussed herein can be of any suitable type. In one embodiment, the signal represents image data. In accordance with such an embodiment, the encoder encodes a signal at lower resolutions or lower levels of quality based on producing tiered sets of encoded data. Utilizing sets of encoded data starting from a given level of quality (e.g., lowest level) in the hierarchy, the tiered sets of encoded data can be decoded and used to reconstruct an original image or a "lossy" replica of the original image for playback. (paragraph incorporated from U.S. Pat. No. 8,711, 943).

These and other embodiment variations are discussed in more detail below. (paragraph incorporated from U.S. Pat. No. 8,711,943).

In addition to the decoder and processing as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. (paragraph incorporated from U.S. Pat. No. 8,711,943).

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: receiving a signal; utilizing at least one downsample operation to produce downsampled renditions of the signal at successively lower levels of quality in the hierarchy; applying at least one upsample operation to a downsampled rendition of the signal at a first level of quality to produce an upsampled rendition of the signal at a second level of quality in the hierarchy, the second level of quality being higher than the first level of quality, the at least one upsample operation and at least one downsample operation possibly being asymmetrical with respect to each other; and producing residual data indicating a difference between the downsampled rendition of the signal at the second level of quality and the upsampled rendition of the signal at the second level of quality. (paragraph incorporated from U.S. Pat. No. 8,711, 943).

The ordering of the steps has been added for clarity sake. These steps can be performed in any suitable order. (paragraph incorporated from U.S. Pat. No. 8,711,943).

Embodiments herein deviate with respect to conventional systems and methods to reduce an amount of residual data needed to reconstruct a signal with sufficient accuracy when upsampling from a lower resolution rendition of the signal. For example, embodiments herein are directed to unique ways of utilizing one or more different upsample operations to sharpen and "deblend" an identified transition region during upsampling. Certain configurations of the proposed upsampling technique reduce an amount of data that is needed to reconstruct a signal when decoding the signal at successively higher levels of quality in a hierarchy because the upsampling operation enables more accurate reconstruction of higher levels of quality. (incorporated from U.S. Pat. No. 9,129,411).

More specifically, one embodiment herein includes a signal processor configured to reconstruct a signal at higher levels of quality in a hierarchy. For example, the signal processor selects an element from a rendition of the signal at a first level of quality to upsample into multiple elements of a rendition of the signal at a second (higher) level of quality. In one embodiment, the signal processor produces for each element of the signal a metric based on settings of elements in a vicinity of the selected element in the rendition of the signal at the first level of quality. The metric defines a boundary between a first set of elements in a vicinity of the selected element and a second set of elements in a vicinity of the selected element. A location and orientation of the boundary with respect to the selected element depends on the settings of elements in the vicinity of the selected element. The signal processor utilizes the generated metric (which defines the boundary) to calculate settings for the multiple elements in the signal at the second level of quality. Accordingly, settings of elements in a vicinity of the selected element indicate how to upsample the selected element into the multiple elements. (incorporated from U.S. Pat. No. 9,129,411).

Depending on the embodiment, the boundary defined by the metric can be a line, planar surface, etc. The signal being upsampled can be a two-dimensional image, three-dimensional volumetric image, etc. The settings assigned to specific signal elements can represent colors of different color planes (e.g., RGB, YUV, HSV, etc.), attributes (e.g., density, radioactivity, tissue type, terrain type, temperature, parameters defining image properties, etc.), motion vectors (e.g., expressed in Cartesian coordinates, polar coordinates, etc.), etc. (incorporated from U.S. Pat. No. 9,129,411).

In one embodiment, the signal processor produces the metric in response to detecting that a setting of the selected element falls within a range defined by elements in a vicinity of the selected element to be upsampled. Falling within the range indicates that the selected element falls on a transition region or edge. In accordance with such an embodiment, and to test whether the selected element falls on a transition region, the signal processor generates a first value based on settings of at least one element in the first set of elements in the vicinity of the selected element. The signal processor generates a second value based on settings of at least two elements in the second set of elements in the vicinity of the selected element. The signal processor then produces a range in which the larger of the two values defines an upper limit of the range and the other value defines a lower limit of the range. As mentioned above, if a setting of the selected element falls within the range, the signal processor assumes that the selected element resides on a transition region or edge. (incorporated from U.S. Pat. No. 9,129,411).

In accordance with further embodiments, the signal processor utilizes the metric as a basis for upsampling the selected element into the multiple elements. For example, the signal processor identifies a first element in the multiple elements (i.e., the upsampled elements at a next higher level of quality) in which the boundary defined by the metric intersects the first element. For the first element, the signal processor utilizes the metric to calculate a setting for the first element. The signal processor sets a value of the first element between a setting assigned to the first set of elements and a setting assigned to the second set of elements. (incorporated from U.S. Pat. No. 9,129,411).

Additionally, the signal processor identifies a second element of the multiple elements in which the boundary defined by the metric does not intersect the second element. For the second element: in response to detecting that all of the second element resides between the boundary defined by the metric and the first set of elements (e.g., elements defining the range limit), the signal processor sets the second element to a value substantially equal to the setting assigned to the first set of elements. (incorporated from U.S. Pat. No. 9,129,411).

In a similar way, the signal processor identifies the remaining elements in the multiple elements (i.e., the upsampled elements at the next higher level of quality), utilizing the metric to calculate settings for each element. (incorporated from U.S. Pat. No. 9,129,411).

In yet further embodiments, the signal processor applies a test to each of multiple respective elements in the rendition of the signal at the first level of quality to determine whether to use a respective metric to upsample an element or use an alternative upsample option to upsample the element. For example, the signal processor can be configured to assign a first type of upsample operation to the respective element (e.g., one that uses a metric as discussed herein) or assign a second type of upsample operation (e.g., one that does not use a generated metric) to the respective element. As mentioned above, the test of determining whether to use a generated metric or alternative upsample operation to upsample can include determining whether a setting of a selected respective element falls within a range defined by settings of a respective first set of elements in a vicinity of the selected respective element and settings of a respective second set of elements in a vicinity of the selected respective element. (incorporated from U.S. Pat. No. 9,129,411).

In one embodiment, the signal processor assigns the first type of upsample operation for upsampling the respective elements in which a respective setting of the selected element under test falls within the range produced for the respective element. The signal processor assigns the second type of upsample operation for upsampling the respective elements in which a respective setting of the selected element under test falls outside the range produced for the respective element. (incorporated from U.S. Pat. No. 9,129, 411).

These and other embodiment variations are discussed in more detail below. (incorporated from U.S. Pat. No. 9,129, 411).

In addition to the upsampling as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. (incorporated from U.S. Pat. No. 9,129, 411).

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: select an element from a rendition of the signal at a first level of quality to upsample into multiple elements of a rendition of the signal at a second, higher level of quality; produce a metric based on settings of elements in a vicinity of the selected element in the rendition of the signal at the first level of quality, the metric defining a boundary between a first set of elements in a vicinity of the selected element and a second set of elements in a vicinity of the selected element and utilize the metric to calculate settings for the multiple elements in the signal at the second level of quality. (incorporated from U.S. Pat. No. 9,129,411).

The ordering of the steps has been added for clarity sake. These steps can be performed in any suitable order. (incorporated from U.S. Pat. No. 9,129,411).

Embodiments herein deviate with respect to conventional systems and methods to produce compressed, encoded data in a tiered signal quality hierarchy. For example, certain embodiments herein are directed to unique ways of generating encoded reconstruction data in a hierarchy based on standard entropy encoding techniques. For simplicity of implementation and efficiency of compression, the present patent application describes embodiments leveraging range encoding techniques, although the approaches covered herein can be applied also with several other types of entropy encoders. (incorporated from U.S. Pat. No. 8,531,321).

More specifically, one embodiment herein includes a signal processor configured to encode a signal in a hierarchy including multiple levels of quality. To this end, the signal processor produces a rendition of the signal for at least a first level of quality. The signal processor generates sets of reconstruction data specifying how to convert the rendition of the signal at the first level of quality into a rendition of the signal at a second (higher) level of quality in the hierarchy. For instance, in accordance with the methods described in related application United States Patent Application entitled "INHERITANCE IN A TIERED SIGNAL QUALITY HIERARCHY", filed on the same day as the present application, the entire teachings of which are incorporated herein by this reference, the sets of reconstruction data specify all the information that is necessary to correct, integrate and complement the data and the rendition of the signal that can be automatically derived ("inherited") from the previous (lower) level of quality. (incorporated from U.S. Pat. No. 8,531,321).

The signal processor then utilizes an entropy encoder such as a range encoder to encode each set of reconstruction data. Encoding of each set of reconstruction data can include producing a range value (bit string) representative of the reconstruction data being encoded. (incorporated from U.S. Pat. No. 8,531,321).

In accordance with further embodiments, note that prior to encoding, the signal processor can be configured to analyze each set of reconstruction data to produce probability distribution information indicating a probability distribution of some or all symbols in the reconstruction data. The probability distribution information indicating a probability of one or more symbols in the reconstruction data enables the chosen entropy encoder (e.g., by way of non-limiting examples, range encoding, Huffman encoding, table-based VLC/Variable Length Coding, run-length encoding, etc.) to encode the reconstruction data into a suitable string of bits (e.g., the range value). Subsequent to creating the range value, the encoder stores the range value and the probability distribution information for subsequent decoding of the range value back into the reconstruction data. The entropy coding can represent any of one or more sets of different types of reconstruction data such as parameters of upsampling operations, quantization thresholds, residual data to apply after upsampling from lower levels of quality, residual data to apply after motion compensation of a known reference signal image, adjustments to motion vectors in the dense motion map used for motion compensation, motion zones, spectral information on noise, meta-data, etc. (incorporated from U.S. Pat. No. 8,531,321).

For each set of reconstruction data, one or more entropy decoder resource(s) such as range decoder(s) decode the encoded values (e.g., the range values) back into the original reconstruction data, based at least in part on the probability distribution information of the one or more symbols in each set of the original reconstruction data. Subsequent to decoding, another resource reconstructs renditions of the signal using the decoded reconstruction data produced by the decoder(s). Reconstruction can be based on the different types of reconstruction data as mentioned above. (incorporated from U.S. Pat. No. 8,531,321).

The reconstruction data can include any of multiple different types of suitable data for reconstructing, based on a rendition of the signal at a lower level of quality and/or a known/available reference signal (e.g., by way of a non-limiting example, a previous frame in a video), a rendition of the signal at a next higher level of quality. In one embodiment, the reconstruction data includes so-called Intra residual data, indicating adjustments to be made after upsampling the rendition of signal at one level of quality into a rendition of signal at a next higher level of quality. In accordance with another embodiment, the reconstruction data includes metadata such as one or more upsample operations to be applied to upsample the signal from a given level of quality to a next higher level of quality. In accordance with yet another embodiment, the reconstruction data includes adjustments to be made to a dense motion map (i.e., a map containing motion vectors for all signal elements) obtained by upsampling with suitable operations the motion map used at a lower level of quality; in such embodiment the reconstruction data may also include Inter residual data, indicating adjustments to be made to the reconstructed signal after motion-compensating the known reference signal by means of the above mentioned dense motion map. In one example embodiment, the amount of information needed for the sets of reconstruction data can be reduced by avoiding to specify information with regards to what can be automatically derived ("inherited") from the previous (lower) levels of quality. (incorporated from U.S. Pat. No. 8,531,321).

As previously mentioned, for each set of reconstruction data the encoder can identify probability distribution information indicating a probability of one or more symbols in the reconstruction data (which can be represented as a string of symbols) to be encoded. The entropy encoder produces at least one decoding parameter to be used by a respective entropy decoder to extrapolate a probability distribution for multiple symbols in the residual data. (incorporated from U.S. Pat. No. 8,531,321).

In further embodiments, the entropy encoder specifies more than two parameters to the entropy decoder for decoding of a bit string into the reconstruction data. In such an embodiment, the entropy decoder assumes that the first parameter specifies the percentage of residual data elements in the reconstruction data that are equal to a most common value such as zero. The entropy decoder receiving the parameters assumes that each of N additional parameters indicates the probability of another or next most frequent symbol in the reconstruction data. Based on the N parameters and potentially on other standard parameters, the decoder also extrapolates the probabilities of all the other symbols after the Nth symbol. The probability distribution information provides a basis for decoding the bit string back into the original reconstruction data. (incorporated from U.S. Pat. No. 8,531,321).

In accordance with another embodiment, the entropy encoder specifies two parameters to the decoder for decoding of a bit string into the reconstruction data. In such an embodiment, the first parameter specifies the percentage of symbols (e.g., residual data elements) in the reconstruction data that are equal to a value known to the decoder (e.g., zero). The second parameter includes information enabling the decoder to extrapolate the probabilities for additional symbols in the reconstruction data. The distribution information provides a basis for decoding the bit string back into the original reconstruction data. (incorporated from U.S. Pat. No. 8,531,321).

In accordance with another embodiment, the encoder specifies one parameter to the decoder for decoding of a bit string into the reconstruction data. In such an embodiment, the one parameter specifies the percentage of residual data elements in the reconstruction data that are equal to a value known to the decoder (such as zero). The decoder then extrapolates the probabilities of all the other symbols based on standard default parameters known to the decoder. (incorporated from U.S. Pat. No. 8,531,321).

In accordance with further embodiments, each of multiple levels of quality in the hierarchy can be configured to include respective reconstruction data to reconstruct a rendition of the signal at a given level of quality. When suitable to reduce an amount of encoded data, some or all of the reconstruction data at the given level of quality can be leveraged ("inherited") at a next higher level of quality in lieu of having to specify reconstruction data at each level of quality. For example, the entropy decoder can be configured to receive a bit string and, in response to detecting a condition such as that the entropy encoder did not generate any probability distribution parameters for the data or that the entropy encoder at a lower level of quality explicitly indicated that it wouldn't specify any probability distribution parameters for the higher levels of quality, the entropy decoder can utilize the probability distribution parameter(s) used at the previous level(s) of quality to decode the reconstruction data. (incorporated from U.S. Pat. No. 8,531, 321).

Embodiments herein further include a signal processor configured to parse one or more sets of reconstruction data for a given level of quality into multiple groupings of reconstruction data ("tiles"). For instance, when applying tiling to reconstruction data representing residual data, a combination of tiles defines residual data for adjusting elements of a rendition of the signal at the given level of quality, e.g. after upsampling from the lower level of quality or motion- compensating a known reference signal. The encoder produces respective probability distribution parameters for symbols in each of the tiles. The encoder then decides, for each of the tiles, whether to use such probability distribution parameters (which would thus have to be transmitted to the decoder) or the probability distribution parameters automatically inherited from the previous (lower) levels of quality (which would be known to the decoder, with no need of transmitting additional information). The encoder then entropy encodes the multiple groupings of reconstruction data (tiles) into respective bit strings based on the chosen respective probability distribution parameters (either inherited or new) for the groupings. A decoder receives the bit strings and probability distribution values into respective tiles and initiates (optionally parallel) execution of multiple entropy decoders to reproduce the multiple groupings of reconstruction data based on the bit strings and the probability distribution values associated with each tile. The technique of tiling as discussed herein can be used one or more levels of quality in the hierarchy to facilitate parallel processing of entropy encoding/decoding and signal reconstruction. (incorporated from U.S. Pat. No. 8,531,321).

These and other embodiment variations are discussed in more detail below. (incorporated from U.S. Pat. No. 8,531, 321).

In addition to the encoding/decoding as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having one or more processors (e.g., CPUs, GPUs, etc.) and corresponding memory, programs and/or causes the processor(s) to perform any of the operations disclosed herein. Such arrangements can be provided as software, code, and/or other data (e.g., data structures) arranged or encoded on a computer readable medium such as an optical medium (e.g., CD-ROM, DVD, BD, etc.), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. (incorporated from U.S. Pat. No. 8,531, 321).

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: produce a rendition of the signal at a first level of quality; generate at least one set of reconstruction data, the at least one set of reconstruction data specifying how to reconstruct, based on the rendition of the signal at the first level of quality and/or on a known reference signal, a rendition of the signal at a second level of quality in the hierarchy, the second level of quality being higher than the first level of quality; and utilize an entropy encoder (e.g., by way of non-limiting examples, a range encoder, Huffman encoder, table-based VLC encoder, run-length encoder) to encode different sets of reconstruction data, the entropy encoder producing for each set an encoded value or bit string representative of symbols contained in the reconstruction data. (incorporated from U.S. Pat. No. 8,531,321).

In another embodiment, representing the decoding side of the embodiment just described, the instructions, when carried out by a processor of a respective computer device, cause the processor to: produce a rendition of the signal at a first level of quality; receive at least one set of encoded values, the at least one set of encoded values—once decoded—specifying how to reconstruct, based on the rendition of the signal at the first level of quality and/or on a known reference signal, a rendition of the signal at a second level of quality in the hierarchy, the second level of quality being higher than the first level of quality; and utilize one or more entropy decoders (e.g., by way of a non-limiting example, a range decoder, Huffman decoder, table-based VLC decoder, run-length decoder) to decode the encoded values and reproduce the different sets of reconstruction data to be used to reconstruct the signal at a second level of quality. (incorporated from U.S. Pat. No. 8,531,321).

The ordering of the steps has been added for clarity sake. These steps can be performed in any suitable order. (incorporated from U.S. Pat. No. 8,531,321).

As discussed above, techniques herein are well suited for use in software, firmware, and/or hardware applications that encode/decode signals. By way of non-limiting examples, the signals encoded/decoded with these techniques can be two dimensional (e.g., pictures, video frames, 2D motion maps, thermal maps, etc.), three-dimensional (e.g., 3D/volumetric images, holographic images, CAT-scans, medical/scientific images, 3D motion maps, etc.), or even feature more than three dimensions. However, it should be noted that embodiments herein are not limited to use in such applications and that the techniques discussed herein are well suited for other applications as well. (incorporated from U.S. Pat. No. 8,531,321).

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways. (incorporated from U.S. Pat. No. 8,531,321).

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below. (incorporated from U.S. Pat. No. 8,531,321).

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 4 is an example diagram illustrating a data stream including different levels of quality of reconstruction data according to embodiments herein.

FIGS. 18 to 23 are example diagrams illustrating inheritance of settings up different levels of quality according to embodiments herein (incorporated from U.S. Pat. No. 8,977,065).

DETAILED DESCRIPTION

Figure 1:
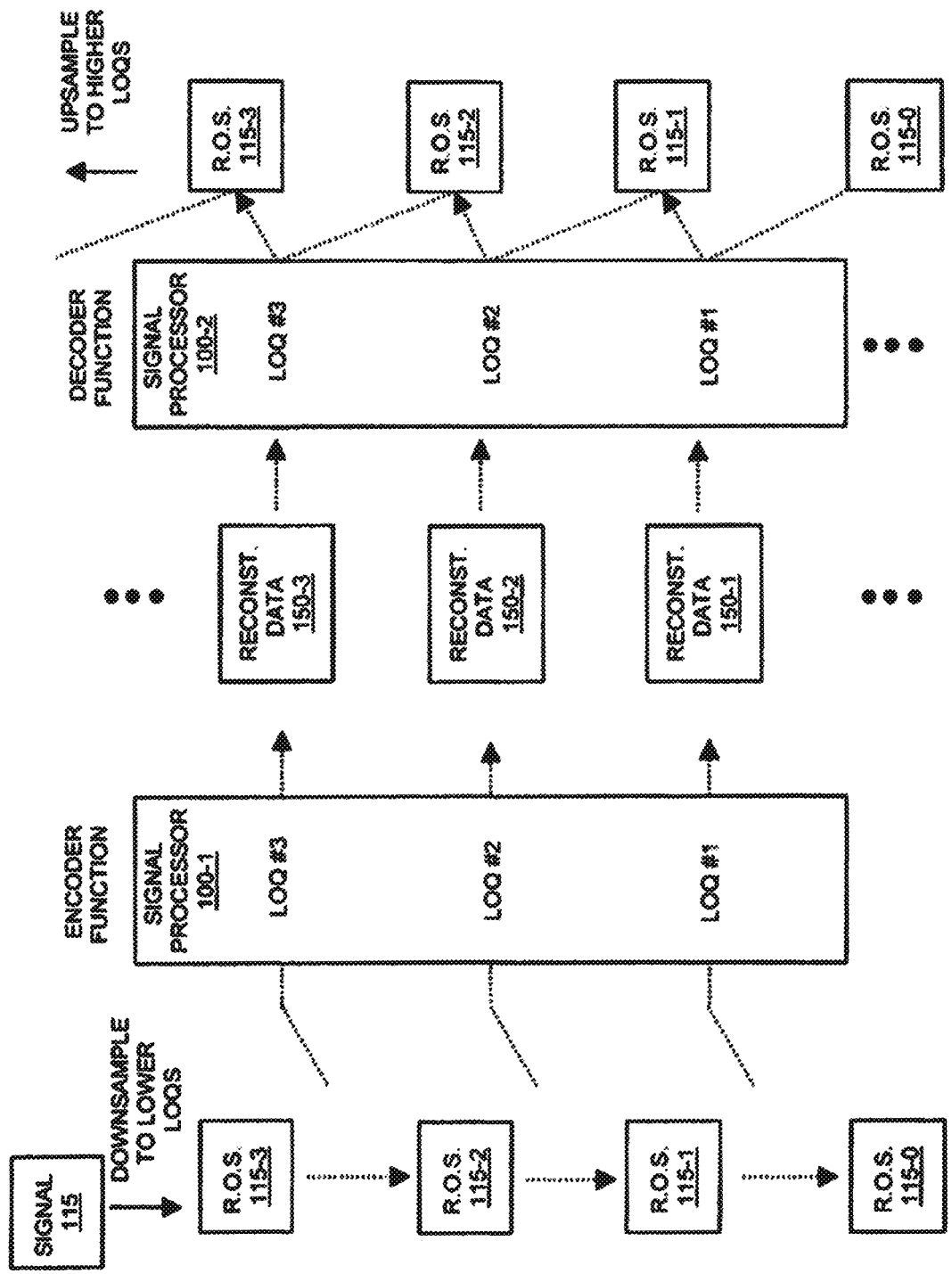

FIG. 1 is an example diagram illustrating generation of reconstruction data according to embodiments herein.

As shown, a signal processor 100-1 (encoder) downsamples signal 115 into different renditions at lower levels of quality in a hierarchy. In general, downsampling the signal 115 can include producing a rendition of the signal at each of different levels of quality and generating reconstruction data specifying how to convert a given rendition of the signal at a first level of quality into a rendition of the signal at a next higher level of quality in the hierarchy.

Signal processor 100-2 utilizes the reconstruction data 150 to reconstruct renditions of the signal at different levels of quality. The signal processor 100-2 can receive the reconstruction data 150 from any suitable source (e.g., communication link, storage device, etc.).

Note that values associated with the rendition of signal 115 and corresponding rendition of signal at lower levels of quality can represent any suitable type of data information. By way of non-limiting example, the signal 115 can be audio data, image data (e.g., still or moving, video, images, frames, motion maps, residual data, etc.), symbols, volumetric data, etc., indicating settings of each of multiple signal elements (e.g., pels/plane elements, pixels/picture elements, voxels/volumetric picture elements, etc.) in a respective image, etc.

In one embodiment, each of one or more components or elements in the signal 115 can define a respective color setting. In accordance with such an embodiment, each color component of an element as specified by the signal data is encoded in accordance with a suitable color space standard such as YUV, RGB, HSV, etc. Reconstruction data 150 specifies how to generate one or more settings for each element in the renditions of signal 115. The reconstruction data 150 can be configured to specify multiple planes of attribute settings.

By way of a non-limiting example, an image represented by signal 115 can be two dimensional (e.g., pictures, video frames, 2D motion maps, etc.), three-dimensional (e.g., 3D/volumetric images, holographic images, CAT-scans, medical/scientific images, 3D motion maps, etc.), or even feature more than three dimensions. When the signal 115 represents a 3-D signal, each element is a volumetric element.

The settings of the signal elements or components indicate how to reconstruct the original signal for playback on a respective playback device. As mentioned, reconstruction data 150 can include multiple planes of reconstruction data 150. Many parameters may be needed to define settings for a given element of signal 115.

In accordance with further embodiments, note that signal 115 can represent an original signal or high-resolution signal including multiple elements. In such an embodiment, each of the renditions of signal (e.g., rendition of signal 115-3, rendition of signal 115-2, rendition of signal 115-1, . . . ) can be akin to a thumbnail representation of an original signal that has been downsampled from signal 115 to a lower level of quality. Renditions of signal 115 at higher levels of quality include more detailed playback information.

In one embodiment, the renditions of signal 115 at the lower levels of quality capture coarser attributes of the original signal, but not the more detailed finer attributes of the original signal. The detailed, finer attributes appear in renditions of the signal at higher levels of quality.

By way of further non-limiting example, in one embodiment, the signal processor 100-1 downsamples original signal 115 into rendition of signal 115-3; signal processor 100-1 downsamples rendition of signal 115-3 into rendition of signal 115-2; signal processor 100-1 downsamples rendition of signal 115-2 into rendition of signal 115-1; and so on to a lowest level of quality. The signal 115 can be downsampled into any number of suitable levels from a highest level of quality.

As mentioned, when downsampling the rendition of signal 115 to each lower level of quality, the signal processor 100-1 generates respective reconstruction data 150. Reconstruction data at each level indicates how to upsample, convert, modify, etc., a rendition of signal at a lower level of quality into a rendition of signal at a next higher level of quality. For example, reconstruction data 150-1 indicates how to convert the rendition of signal 115-0 into the rendition of signal 115-1; reconstruction data 150-2 indicates how to convert the rendition of signal 115-1 into the rendition of signal 115-2; reconstruction data 150-3 indicates how to convert the rendition of signal 115-2 into the rendition of signal 115-3; and so on.

Reconstruction data 150 can include any of multiple different types of data indicating how to reconstruct the signal 115 at higher levels of quality. For example, reconstruction data include any of one or more sets, planes, etc., of different types of reconstruction data such as parameters of upsampling operations, quantization threshold information, residual data, motion zones, motion vectors, spectral information on noise, meta-data, adjustments, class information, etc., to reconstruct signal 115 at different levels.

Additional non-limiting example details of downsampling a respective signal and producing reconstruction data are described in related application U.S. patent application Ser. No. 13/188,207 entitled "SIGNAL PROCESSING AND TIERED SIGNAL ENCODING," filed on Jul. 21, 2011, now U.S. Pat. No. 8,711,943, granted on Apr. 29, 2014, the entire teachings of which are incorporated herein by this reference. In such an embodiment, the signal processor can be configured to test and create different sets of reconstruction data to convert a rendition of the signal from one level of quality to another.

As mentioned, reconstruction data 150 can include any suitable data for signal processing. For example, each set of reconstruction data 150 can include operational data, residual data, etc. Operational data can include data such as a set of one or more upsampling operations with which to convert the rendition of signal from one level of quality to the next; the residual data can indicate information such as adjustments to be made to signal elements at the different levels of quality, and so on. More specifically, in one embodiment, the reconstruction data 150 can specify multi-plane element setting information indicating parameters such as color or elements, intensity, upsample operations, parameters of upsampling operations, quantization thresholds, residual data within an image/frame, motion zones, motion vectors, residual data indicating adjustments to apply after motocompensation of elements coming from a previous image/frame, spectral information on noise, etc.

Note again that the sets of reconstruction data can include residual data indicating adjustments to be made during upsampling the rendition of signal at a first level of quality into the rendition of signal at a next higher level of quality. Additional details of a decoder system (i.e., signal processor) and use of residual data and upsample operations to upsample for use herein are described in related application U.S. patent application Ser. No. 13/188,201 entitled "TIERED SIGNAL DECODING AND SIGNAL RECONSTRUCTION," filed on Jul. 21, 2011, now U.S. Pat. No. 8,948,248, granted on Feb. 3, 2015 the entire teachings of which are incorporated herein by this reference. Additional details can be found in U.S. patent application Ser. No. 13/188,188 entitled "INHERITANCE IN A TIERED SIGNAL QUALITY HIERARCHY," filed on Jul. 21, 2011, now U.S. Pat. No. 8,977,065, granted on Mar. 10, 2015 the entire teachings of which are incorporated herein by this reference.

Embodiments herein include utilizing inheritance to reduce an amount of bits, symbols, etc., that are needed to encode reconstruction data 150. For example, the elements in the renditions of the signal at the lower levels of quality are assigned certain setting information. In certain cases, the setting information assigned to a respective element at a lower level of quality can be reused for subdivisions of the respective element at higher levels of quality. In other words, a parent element at one level of quality can be divided into multiple sub-elements for the next level of quality. Each sub-element (and corresponding sub-elements into which the sub-element is divided at higher levels of quality) can inherit one or more of the attribute settings of the parent element.

In this instance, rather than encode reconstruction data at higher levels of quality to duplicate the settings of the parent for each sub-element, embodiments herein include using appropriate symbols to notify signal processor 100-2 (e.g., a decoder) of which sub-elements inherit attribute settings of the parent element.

In accordance with further embodiments, signal processor 100-2 receives reconstruction data 150 to reconstruct the signal 115 at the first level of quality in the hierarchy. The signal processor 100-2 can receive the reconstruction data 150 over a respective communication link.

Figure 2A:
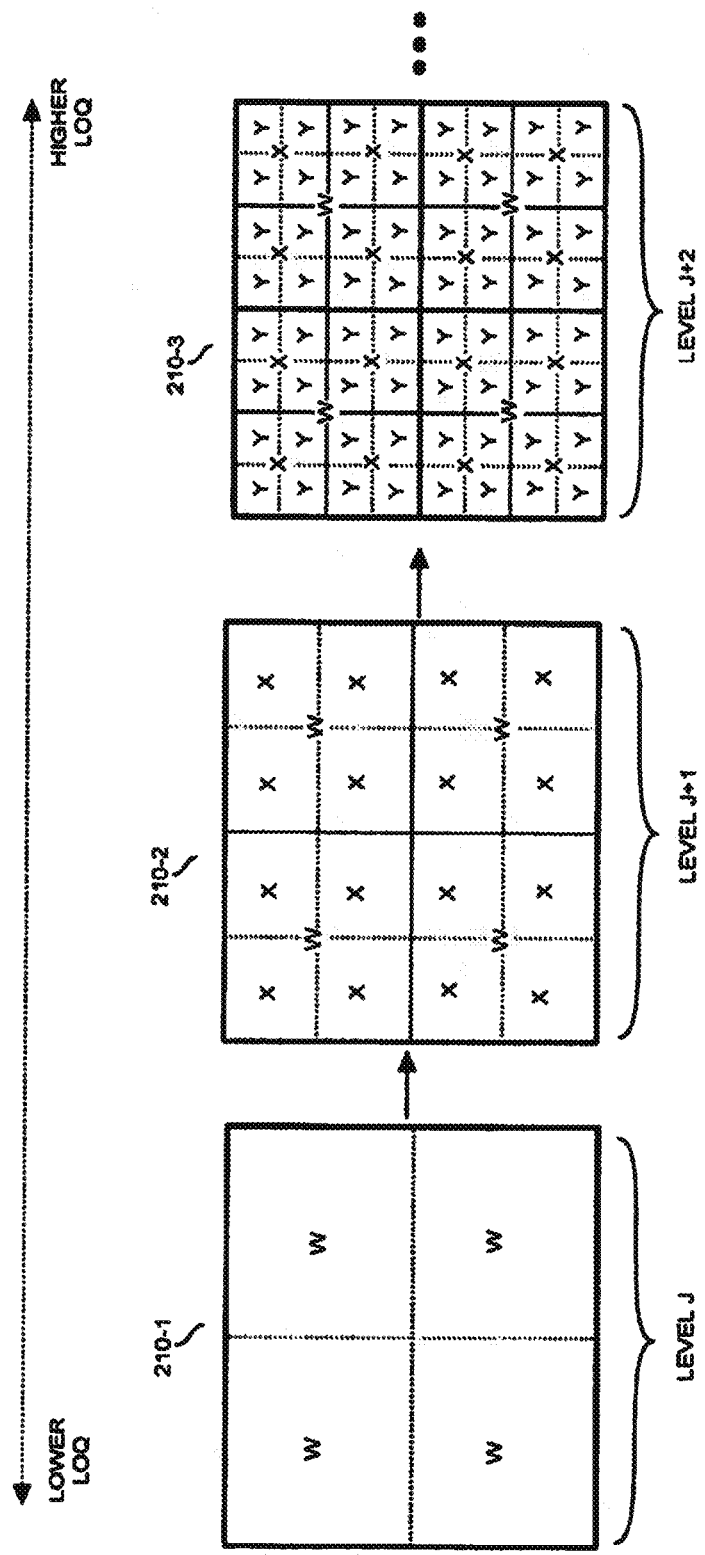
FIG. 2B is an example diagram illustrating generation of reconstruction data and stream metadata according to embodiments herein.
FIG. 2C is an example diagram illustrating storage of reconstruction data and stream metadata according to embodiments herein.

FIG. 2A is an example diagram illustrating dividing respective parent elements at a first level of quality into multiple sub-elements at a next higher level of quality according to embodiments herein.

In one embodiment, the signal 115 represents image information. Assume in this non-limiting example that the signal 115 and corresponding reconstruction data indicates how to convert or expand a lower resolution image into a higher resolution image, with a given scale factor (e.g., in this non-limiting example a scale factor of 2).

Further, assume that the sets of encoded reconstruction data 150, when decoded, indicate how to control settings of image elements at each level of quality. For example, image 210-1 at level of quality J includes a field of image elements W; image 210-2 at level of quality J+1 includes a field of image elements X; image 210-3 includes a field of image elements Y; etc.

The reconstruction data for level of quality J indicates how to control settings of image elements W in image 210-1 (e.g., rendition of signal 115-0); the reconstruction data for level of quality J+1 indicates how to convert and generate setting information for each image element W in image 210-1 that is split into four X elements in image 210-2; the reconstruction data for level of quality J+2 indicates how to convert and generate setting information for each image element X in image 210-2 that is split into four Y elements in image 210-3; and so on. Thus, reconstruction data at the higher levels of quality accordingly are dependent upon the reconstruction data at lower levels of quality.

Figure 2B:
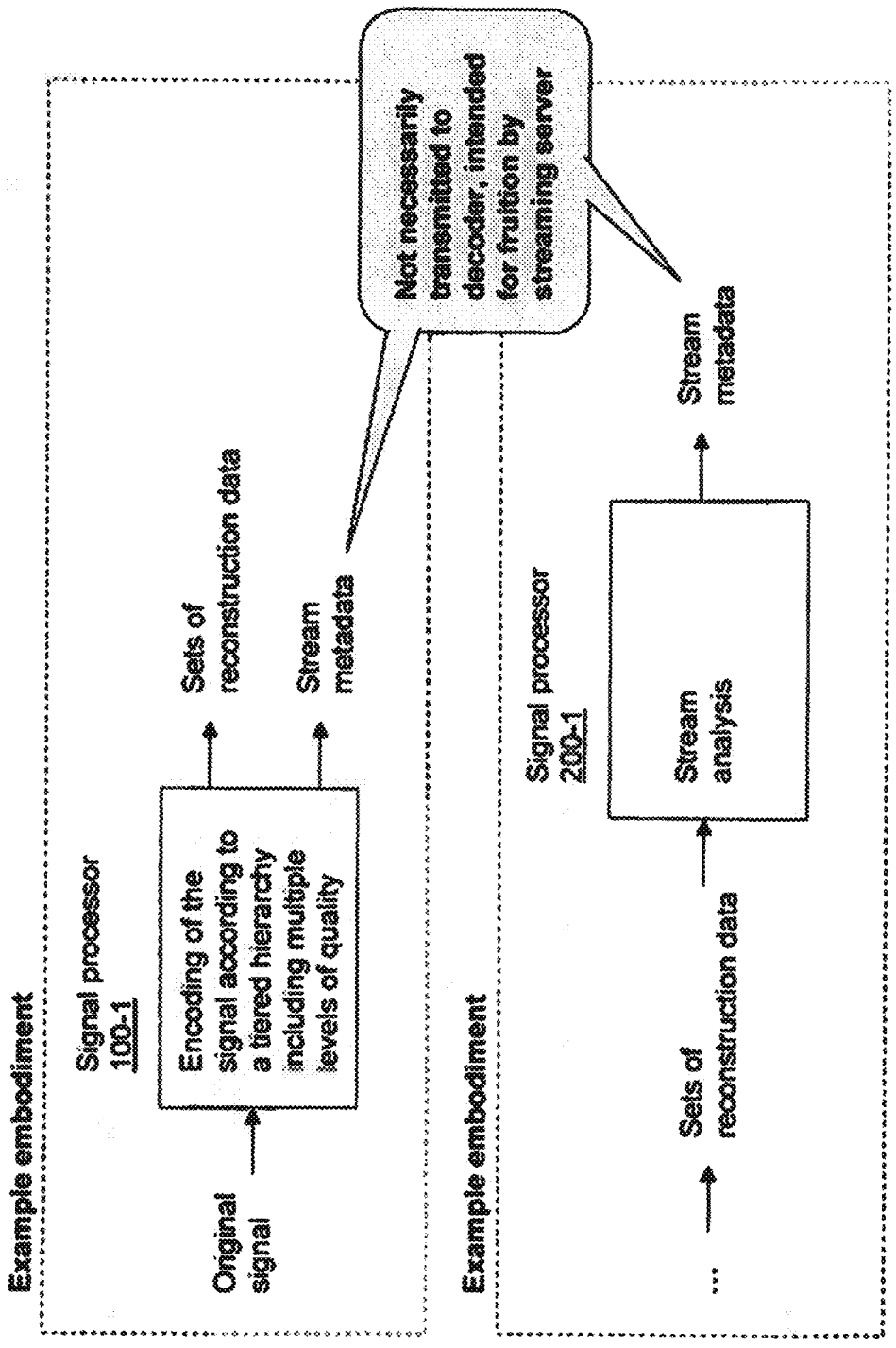

FIG. 2B is an example diagram illustrating generation of stream metadata to embodiments herein.

In one embodiment, during the encoding process the signal processor 100-1 generates—along with reconstruction data—a set of stream metadata, the stream metadata is intended to facilitate the transmission of reconstruction data via a communication link by providing a streaming server with useful support information relative to each set of reconstruction data. Stream metadata (which need not be transmitted to the decoder, or in any case not necessarily with the same format) contains information on reconstruction data (e.g., by ways of a non limiting example, beginning and end of each set of reconstruction data for each level of quality of each image) as well as information that allows the streaming server to efficiently make decisions relative to which sets of reconstruction data to include in a given portion of a data stream (e.g., by way of non-limiting examples, images/frames where higher levels of quality are less critical, level of priority of each set of reconstruction data, distance of the current image/frame from the next Intra-frame, portions of reconstruction data to be transmitted for each image at the beginning of the stream in order to enable seek or quick preview functions with a reduced level of quality, reconstruction data to be transmitted for each image for a given fee level, etc.).

In another embodiment, stream metadata is generated by a signal processor 200-1 by analyzing (using stream analysis) the sets of reconstruction data after the encoding process. Accordingly, stream metadata can be generated at a time of producing sets of reconstruction data or after producing the sets of reconstruction data.

Figure 2C:
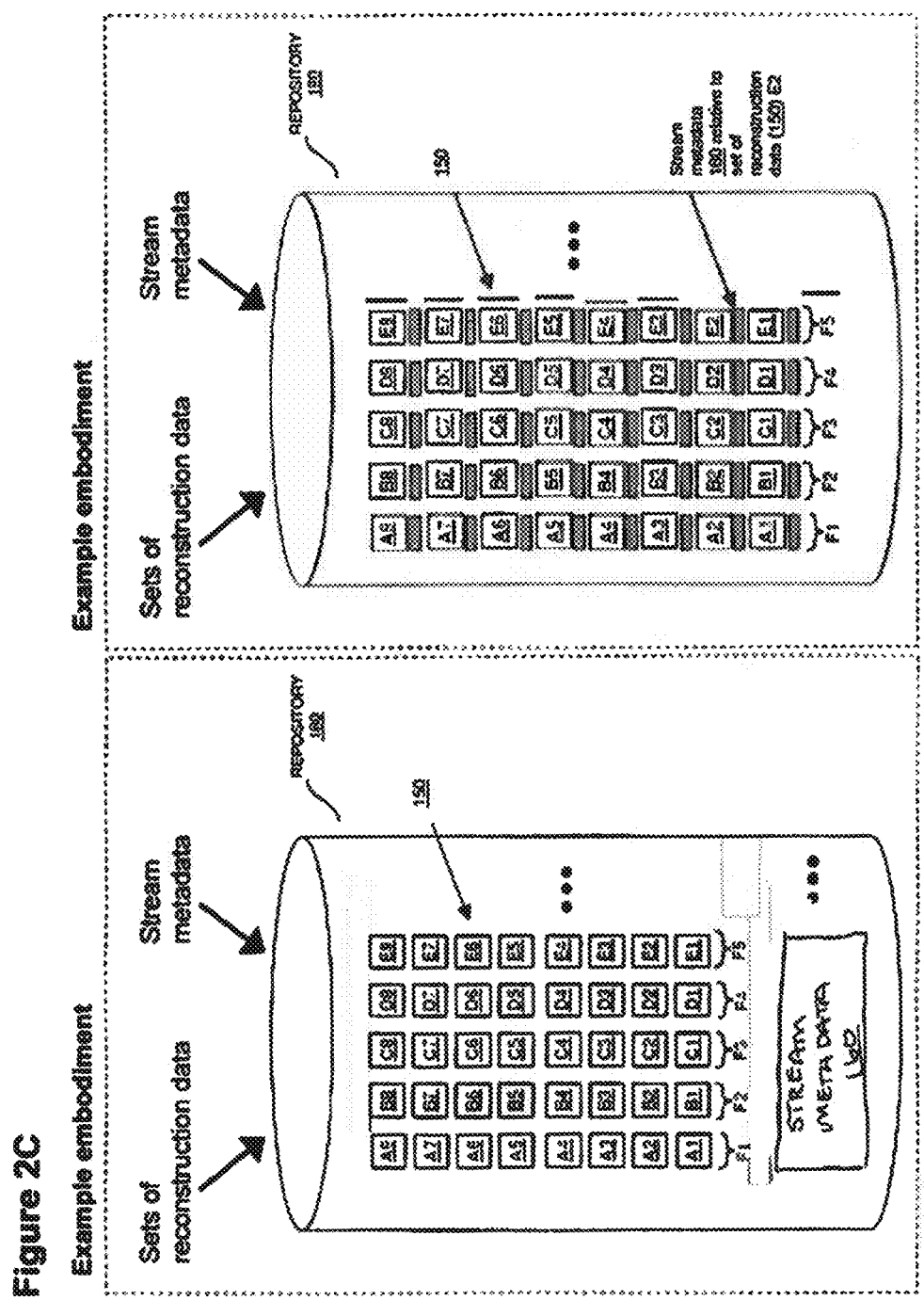

FIG. 2C is an example diagram illustrating how reconstruction data and stream metadata can be stored in a repository 180 according to embodiments herein.

In one embodiment, stream metadata 160 can be stored in a separate portion of the repository 180 (e.g., a file) containing indexing information as well as streaming decision support information for each set of reconstruction data 150 of the encoded stream.

In another embodiment as shown, stream metadata 160 for each set of reconstruction data 150 is interspersed and stored along with marker information that indicates the beginning or the end of each set of reconstruction data. In an embodiment, the stream metadata 160 for each set of reconstruction data 150 also indicates the beginning of the next set of reconstruction data (and of its stream metadata), in order to allow the streaming server to efficiently parse all of the available sets of reconstruction data and decide on how best to assemble the data stream.

Figure 3A:
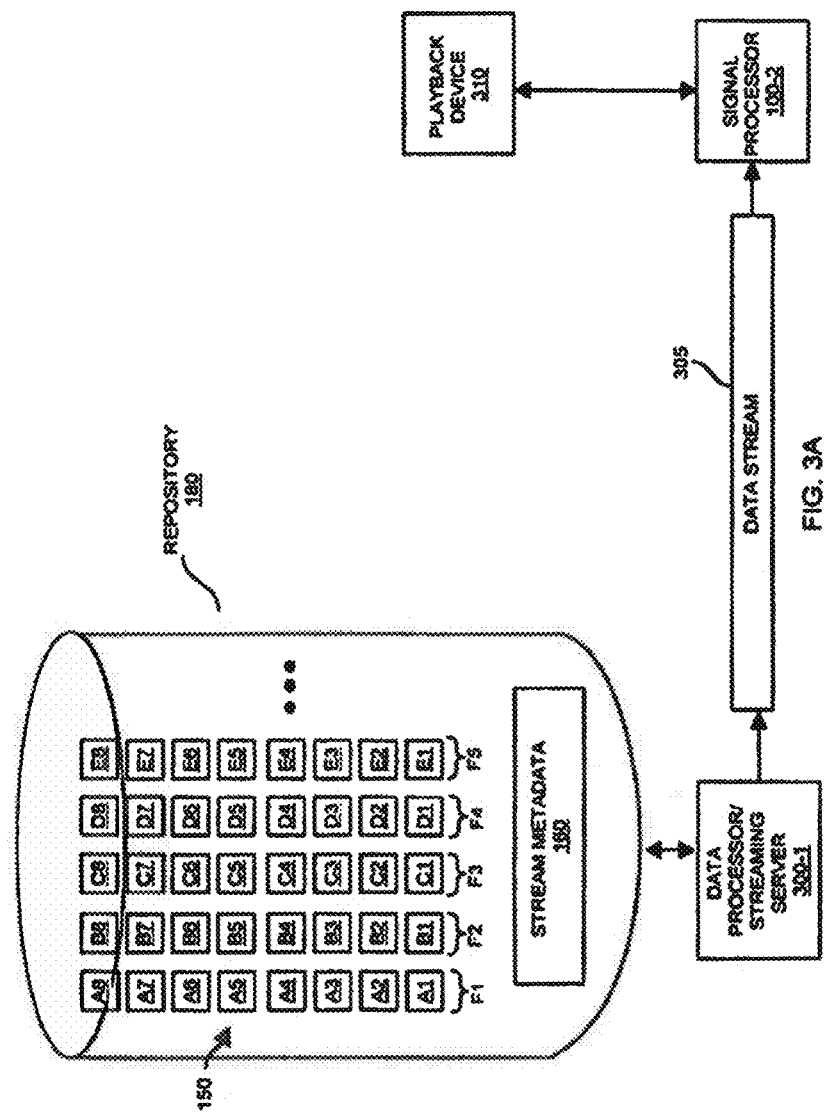
FIG. 3A is an example diagram illustrating processing, forwarding, and decoding of reconstruction data, also leveraging stream metadata, according to embodiments herein.

FIG. 3A is an example diagram illustrating the use of reconstruction data and of stream metadata according to embodiments herein.

In one embodiment, a signal processor 100-2 such as a decoder resource selectively receives reconstruction data 150 from repository 180. As previously discussed, the repository 180 stores groupings of reconstruction data A1 . . . A8, B1 . . . B8, C1 . . . C8, D1 . . . D8, etc. Note that the number of different levels of quality is shown by way of non-limiting example only and that the reconstruction data can include any suitable number of tiers (e.g., levels of quality). Also, as previously discussed, the repository 180 stores stream metadata 160 providing a streaming server 300-1 with information to support decisions relative to how to transmit reconstruction data via a communication link.

Reconstruction data A1 in grouping of reconstruction data A indicates how to reconstruct image/frame F1 of signal 115 at a lowest level of quality; reconstruction data A2 indicates how to reconstruct image/frame F1 of signal 115 at level of quality #2 (e.g., one level of quality higher than level of quality #1) based on a rendition of the image/frame F1 generated for level of quality #1; reconstruction data A3 indicates how to reconstruct image/frame F1 of signal 115 at level of quality #3 (e.g., one level of quality higher than level of quality #2) based on a rendition of the image/frame F1 generated for level of quality #2; reconstruction data A4 indicates how to reconstruct image/frame F1 of signal 115 at level of quality #4 (e.g., one level of quality higher than level of quality #3) based on a rendition of the image/frame F1 generated for level of quality #3; reconstruction data A5 indicates how to reconstruct image/frame F1 of signal 115 at level of quality #5 (e.g., one level of quality higher than level of quality #4) based on a rendition of the image/frame F1 generated for level of quality #4; reconstruction data A6 indicates how to reconstruct image/frame F1 of signal 115 at level of quality #6 (e.g., one level of quality higher than level of quality #5) based on a rendition of the image/frame F1 generated for level of quality #5; reconstruction data A7 indicates how to reconstruct image/frame F1 of signal 115 at level of quality #7 (e.g., one level of quality higher than level of quality #6) based on a rendition of the image/frame F1 generated for level of quality #6; reconstruction data A8 indicates how to reconstruct image/frame F1 of signal 115 at level of quality #8 (e.g., one level of quality higher than level of quality #7) based on a rendition of the image/frame F1 generated for level of quality #7. Thus, creating the rendition of signal 115 at the higher levels of quality depends on proper decoding reconstruction data at the lower levels of quality.

Reconstruction data B1 in grouping of reconstruction data B indicates how to reconstruct image/frame F2 of signal 115 at a lowest level of quality; reconstruction data B2 indicates how to reconstruct image/frame F2 of signal 115 at level of quality #2 (e.g., one level of quality higher than level of quality #1) based on a rendition of the image/frame F2 generated for level of quality #1; reconstruction data B3 indicates how to reconstruct image/frame F2 of signal 115 at level of quality #3 (e.g., one level of quality higher than level of quality #2) based on a rendition of the image/frame F2 generated for level of quality #2; reconstruction data B4 indicates how to reconstruct image/frame F2 of signal 115 at level of quality #4 (e.g., one level of quality higher than level of quality #3) based on a rendition of the image/frame F2 generated for level of quality #3; reconstruction data B5 indicates how to reconstruct image/frame F2 of signal 115 at level of quality #5 (e.g., one level of quality higher than level of quality #4) based on a rendition of the image/frame F2 generated for level of quality #4; reconstruction data B6 indicates how to reconstruct image/frame F2 of signal 115 at level of quality #6 (e.g., one level of quality higher than level of quality #5) based on a rendition of the image/frame F2 generated for level of quality #5; reconstruction data B7 indicates how to reconstruct image/frame F2 of signal 115 at level of quality #7 (e.g., one level of quality higher than level of quality #6) based on a rendition of the image/frame F2 generated for level of quality #6; reconstruction data B8 indicates how to reconstruct image/frame F2 of signal 115 at level of quality #8 (e.g., one level of quality higher than level of quality #7) based on a rendition of the image/frame F2 generated for level of quality #7.

In a similar manner, each of the different groupings of reconstruction data in repository 180 enables reconstruction of a respective image/frame of the signal 115.

Note that additional details and examples for creating tiered sets of reconstruction data can be found in the related applications incorporated herein by reference.

Stream metadata 160 (which can be stored in a separate area of repository 180 or other repository and/or interspersed with the sets of reconstruction data) includes information aimed at supporting the streaming server in selecting which sets of reconstruction data must be transmitted to the decoder resource(s) at any given time. By way of non-limiting examples, such information can include marker/index information to efficiently identify and locate each set of reconstruction data, information on the level of priority of each set of reconstruction data, information that allows to identify which portions of the reconstruction data should be anticipated at the beginning of the stream to allow for a seek function at a given quality level, information that allows to identify which sets of reconstruction data should be streamed in a given fee situation or for a given service level, etc.

In one embodiment, the sequence of images/frames F1, F2, F3, F4, etc., in the signal is a sequence of images that appears as a moving picture or video when played back by a media player 310.

As discussed herein, the data processor 300-1 (e.g., streaming server) transmits all portions or only selected portions of the reconstruction data in data stream 305 to signal processor 100-2 (e.g., a decoder resource). Signal processor 100-2 is configured to reconstruct renditions of the original signal 115 based on the received reconstruction data.

In one embodiment, during transmission of the sets of reconstruction data, the streaming server 300-1 varies a level of quality of the reconstruction data transmitted to the signal processor 100-2. The signal processor 100-2 decodes the received reconstruction data to play back the signal and/or frames at different levels of quality on playback device 310.

Figure 3B:
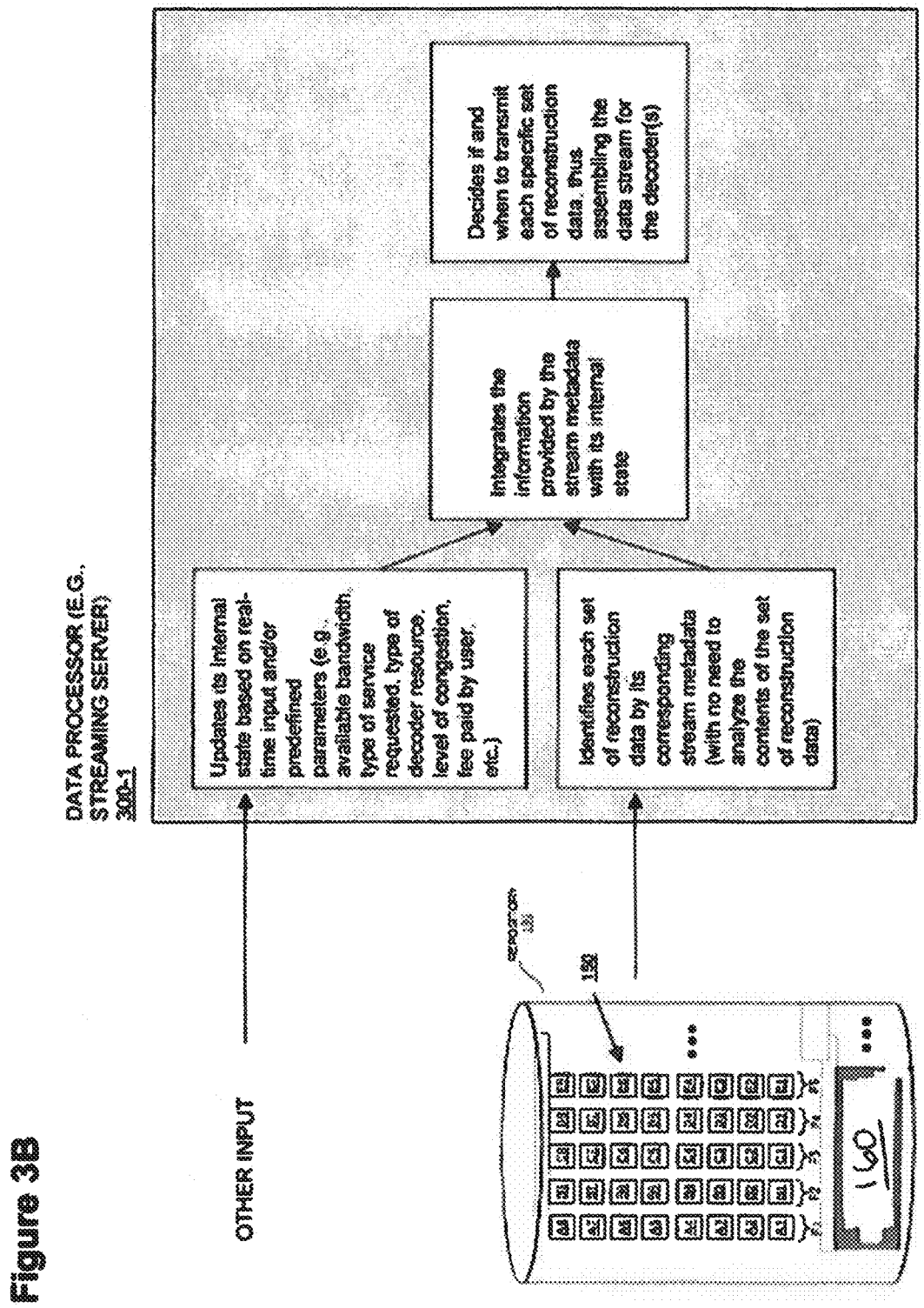
FIG. 3B is an example diagram illustrating processing and transmission of reconstruction data, also leveraging stream metadata, according to embodiments herein.

FIG. 3B is an example diagram illustrating processing and transmission of reconstruction data, also leveraging the stream metadata, according to embodiments herein.

In one embodiment, the streaming server 300-1 regularly updates its internal state based on a set of input parameters (e.g., available bandwidth, type of service requested by the user/decoder, type of decoder resource, level of network congestion, fee paid by user, etc.). This happens for each of one or more connected decoder resources or groups of decoder resources. At the same time, streaming server 300-1 leverages corresponding stream metadata to identify and parse reconstruction data. Based on its internal state and on information contained in the stream metadata, the streaming server 300-1 decides if and when to transmit each specific set of reconstruction data, thus assembling the data stream(s) to be sent to the respective decoder(s).

As further shown, the stream server 300-1 can be configured to update its internal state based on real-time input and/or predefined parameters (e.g., available bandwidth, type of service requested, type of decoder resource, level of congestion, fee paid by user, etc.). The streaming server 330-1 also identifies each set of reconstruction data based on its corresponding stream metadata (there is no need to analyze the reconstruction data as the metadata includes appropriate information). The streaming server 300-1 integrates the information by the stream metadata with its internal state and subsequently decides if and when to transmit each specific set of reconstruction data to assemble the data stream for transmission to the decoder.

FIG. 4 is an example diagram illustrating a data stream including different levels of quality of reconstruction data according to embodiments herein.

As mentioned above, in one embodiment, the data processor/streaming server 300-1 varies the level of quality of reconstruction data transmitted to the signal processor 100-2.

For example, the streaming server 300-1 transmits a first set of reconstruction data (e.g., reconstruction data A1, A2, A3, A4, A5, A6, A7, A8) to the decoder resource in signal processor 100-2 for playback of a first portion (e.g., a frame such as F1) of the signal 115.

The streaming server 300-1 then transmits a second set of reconstruction data (e.g., B1, B2, B3, B4, B5) to the decoder resource for playback of a second portion (e.g., a frame such as frame F2) of the signal 115.

The first set of reconstruction data (e.g., grouping A of reconstruction data including X=8 tiers of reconstruction data) in data stream 400 indicates how to reconstruct a rendition of the first portion of the signal (e.g., frame F1) up to level of quality #8 in the tiered hierarchy.

The second set of reconstruction data (e.g., grouping B of reconstruction data including Y=5 tiers of reconstruction data) in data stream 400 indicates how to reconstruct a rendition of the second portion of the signal (e.g., frame F2) up to level of quality #5 in the tiered hierarchy.

The third set of reconstruction data (e.g., grouping C of reconstruction data including 5 tiers of reconstruction data) in data stream 400 indicates how to reconstruct a rendition of a third portion of the signal (e.g., frame F3) up to level of quality #5 in the tiered hierarchy.

The fourth set of reconstruction data (e.g., grouping D of reconstruction data including 8 tiers of reconstruction data) indicates how to reconstruct a rendition of a fourth portion of the signal (e.g., frame F4) up to level of quality #8 in the tiered hierarchy.

In this manner, the streaming server 300-1 selects and varies a level of quality of reconstruction data to signal processor 100-2 for playback of the signal 115 by media player 310.

Figure 5:
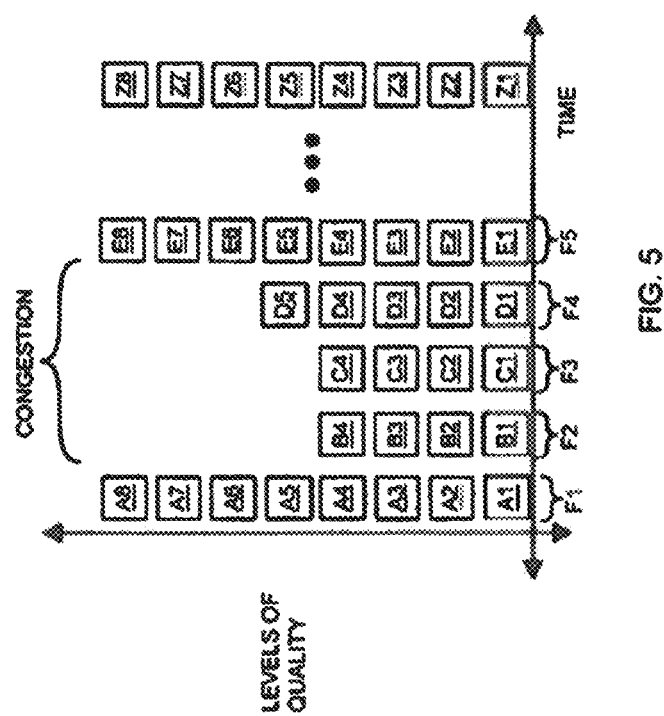
FIG. 5 is an example diagram illustrating variations in the level of quality of reconstruction data forwarded to a decoder according to embodiments herein.

FIG. 5 is another example diagram illustrating variations in the level of quality of reconstruction data transmitted to a decoder according to embodiments herein.

The tiers of reconstruction data to reconstruct rendition of signal 115 can be transmitted at different levels of quality for a number of different reasons.

For example, in one embodiment, the reconstruction data for groupings B, C, and D may be transmitted from the streaming server 300-1 to a decoder resource at selected lower levels of quality (e.g., levels of quality below the highest level of quality) instead of the highest level of quality in response to detecting an inability to transmit, due to network congestion in a respective communication link, the reconstruction data according to the highest level of quality.

As shown in this example, the streaming server 300-1 transmits reconstruction data A1 . . . A8 for reconstruction of image/frame F1; the streaming server 300-1 transmits reconstruction data B1 . . . B4 for reconstruction of image/frame F2; the streaming server 300-1 transmits reconstruction data C1 . . . C4 for reconstruction of image/frame F3; the streaming server 300-1 transmits reconstruction data D1 . . . D5 for reconstruction of image/frame F4; the streaming server 300-1 transmits reconstruction data E1 . . . E8 for reconstruction of image/frame F5; and so on.

Thus, in one embodiment, the data processor varies a highest level of quality of reconstruction data transmitted to a decoder resource for each of multiple images/frames of the signal. The decision on which levels of quality (i.e., which sets of reconstruction data) to transmit at any given time is taken by streaming server 300-1 also leveraging the information contained in the stream metadata.

In accordance with further embodiments, the streaming server 300-1 varies the highest level of quality of reconstruction data transmitted to the decoder in order to transmit a substantially constant bit rate of tiered reconstruction data to the decoder resource for each of multiple successive images/frames of the signal. For example, the reconstruction data at higher levels of quality for a respective image/frame can include a considerable amount of data. Eliminating transmission of the reconstruction data at a higher level of quality ensures that at least the lower level of quality reconstruction data can be received and played back by a media player without delay. Thus, bandwidth limitations can cause playback of the signal at a lower level of quality.

In one embodiment, the streaming server 300-1 varies the level of quality of the reconstruction data transmitted to the decoder to facilitate playback of the signal in substantially real-time by the decoder resource. For example, rather than delay transmission of high resolution, "live" images to the decoder, the streaming server 300-1 may reduce the level of quality of reconstruction data transmitted to a decoder to ensure that the decoder can play back the signal without delay according to at least a low level of quality. Thus, embodiments herein support playback of live or substantially live video feeds on multiple decoding resources with different computing power (and/or display device resolutions), at the same time eliminating the need to transmit information that certain decoders would not be able to leverage.

Note also that the signal 115 and corresponding reconstruction data can be derived from a previous recording. In case of network congestion, for example, reducing the level of quality of reconstruction data transmitted for one or more images/frames during congestion enables the decoder to play back the signal without delay.

Figure 6:
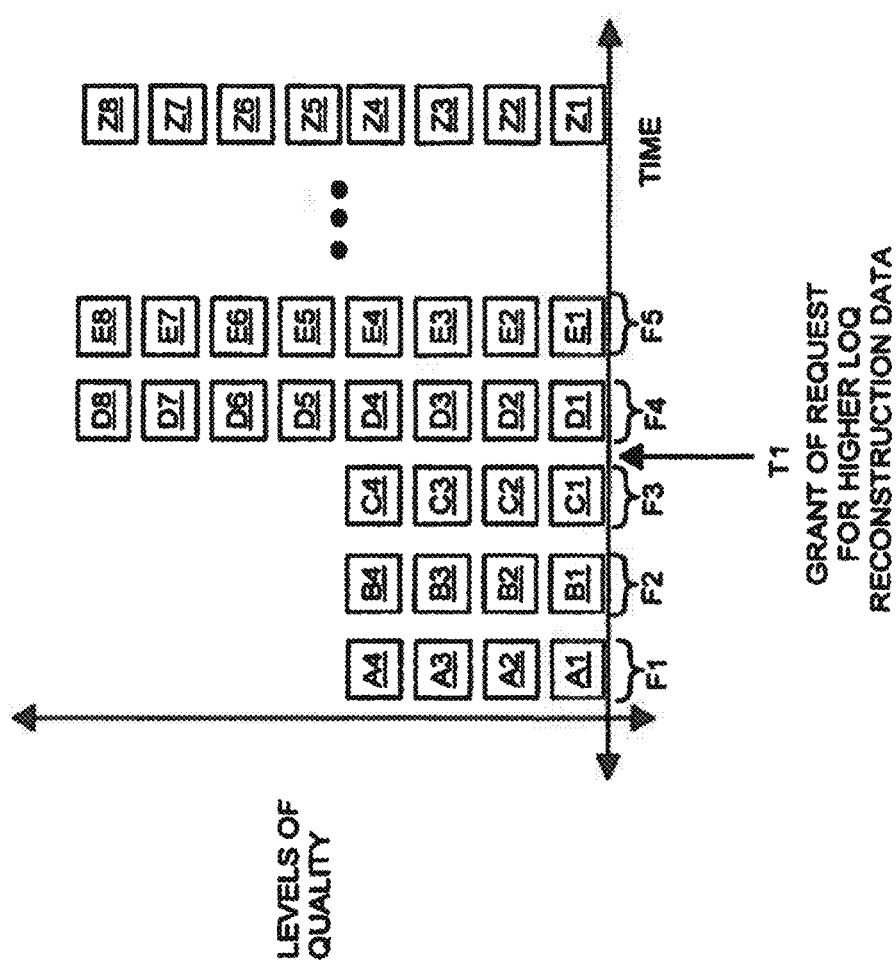
FIG. 6 is an example diagram illustrating variations in the level of quality of reconstruction data forwarded to a decoder according to embodiments herein.

FIG. 6 is an example diagram illustrating variations in the level of quality of reconstruction data forwarded to a decoder according to embodiments herein.

As shown, the data processor 300-1 initially transmits the reconstruction data A, B, and C, up to a first level of quality (e.g., level of quality #4) for images/frames F1, F2, and F3. Level of quality #4 may be a default level of quality in which to transmit the reconstruction data.

The data processor 300-1 can be configured to transmit the reconstruction data following time T1 at a second level of quality (e.g., level of quality #8) in response to receiving an explicit request from a source such as a user to transmit the reconstruction data at a different level of quality. For example, a source such as the decoder resource, user, etc., can request transmission of the signal in accordance with a higher or lower quality than a previously transmitted image/frame. In response to the request to transmit the reconstruction data at a different level of quality, the data processor 300-1 transmits the reconstruction data at the newly requested level of quality. In this example, the data processor 300-1 transmits images/frames F4, F5, and subsequent images/frames of reconstruction data, at the higher level of quality in response to a user requesting to view the signal 115 at a higher level of quality.

The decoder resource receives the reconstruction data for the images/frames as transmitted by the data processor 300-1 and plays back the signal 115 in accordance with the different levels of quality. For example, the signal processor 100-2 decodes the received reconstruction data and plays back images/frames of signal 115 up to image/frame F3 at the first level of quality; the signal processor 100-2 decodes the reconstruction data and plays back subsequent images/frames (e.g., images/frames after F4) of signal 115 at the second level of quality.

Figure 7:
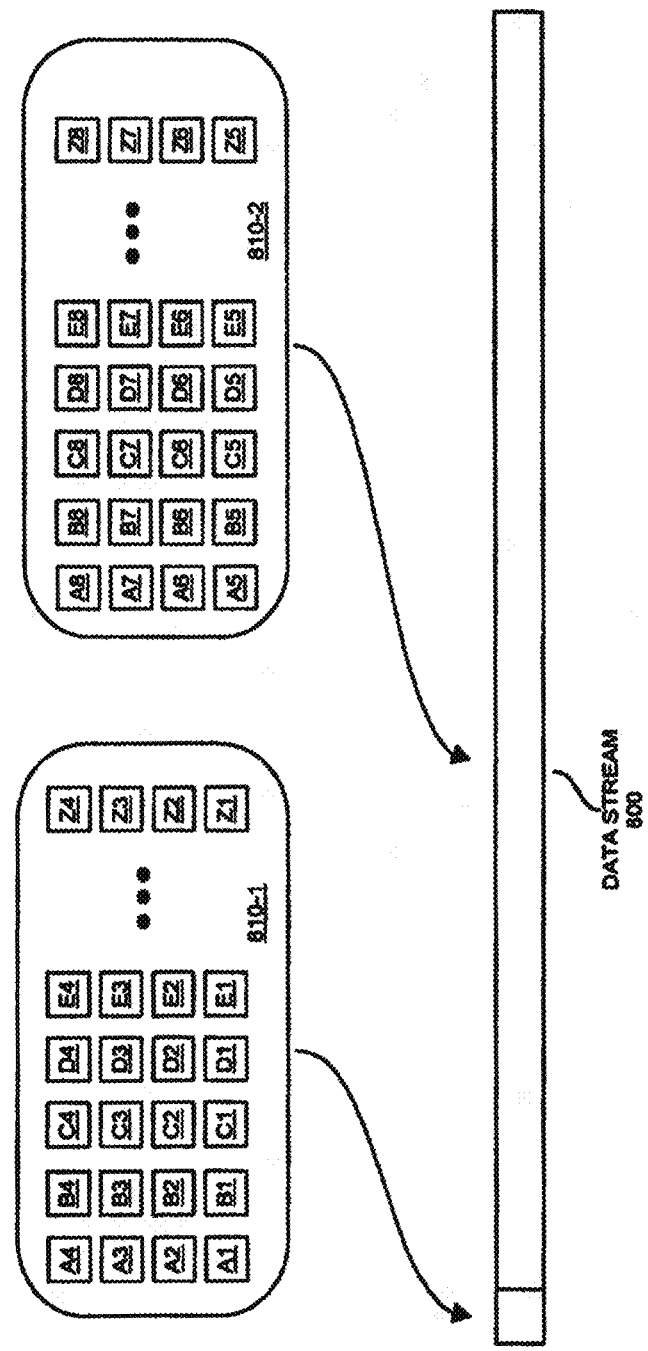
FIG. 7 is an example diagram illustrating transmission of a group of lower level of quality reconstruction data followed by transmission of higher level of quality reconstruction data according to embodiments herein.

FIG. 7 is an example diagram illustrating transmission of a group of lower level of quality reconstruction data followed by transmission of higher level of quality reconstruction data according to embodiments herein.

In accordance with further embodiments, the data processor 300-1 can be configured to transmit the lower levels of quality of reconstruction data for each of multiple portions such as images/frames of the signal 115 followed by transmission of higher levels of quality of reconstruction data.

For example, as shown, the data processor 300-1 retrieves a first set of reconstruction data including reconstruction data A1, ... A4, B1, ... B4, C1, ... C4, etc. and transmits this group of reconstruction data in data stream 800 to a decoder. Based on this initial set of reconstruction data, the decoder is able to play back the signal at a respective lower level of quality.

In one embodiment, the data processor transmits the first set of reconstruction data 810-1 to the decoder resource to enable navigation amongst the signal 115 in accordance with a first level of quality (e.g., by way of non-limiting example, level of quality #4; it should be noted however that in principle the level of quality transmitted to enable the seek function could be different for each image/frame of the signal). Transmission of the first set of reconstruction data in data stream 800 can be achieved in relatively little time because the first set of reconstruction data 810-1 is relatively compact as it enables reconstruction according to a low level of quality.

Based on input from a user, the decoder resource initiates playback of the first set of reconstruction data 810-1 enabling a respective user to quickly navigate (e.g., via commands such as fast forward, reverse, etc.) amongst playback of a low-resolution (e.g., lower level of quality) version of the signal. Based on viewing the low-resolution signal generated via reconstruction data 810-1, the user can select and generate a pointer value indicating a location in the signal for playback at a higher level of quality.

In response to the selection of the location in the low-resolution signal, the streaming server 300-1 retrieves a second set of reconstruction data including the reconstruction data for all images/frames of the signal at the higher levels of quality (e.g., reconstruction data at higher levels of quality not yet sent to the decoder) or a set of reconstruction data including the higher levels of quality (that have not yet been sent) starting at the requested location as by the pointer value. The streaming server 300-1 transmits the second set of reconstruction data 810-2 to the decoder resource for playback of the signal in accordance with the higher level of quality.

Thus, the first set of reconstruction data 810-1 enables playback of the signal according to the first level of quality (e.g., level of quality #4). A combination of the first set of reconstruction data 810-1 and second set of reconstruction data 810-2 enables playback of the signal in accordance with a higher level of quality (e.g., level of quality #8).

As discussed herein, the second set of reconstruction data 810-2 (e.g., including reconstruction data to reconstruct the signal at the higher level of quality) can be supplemental reconstruction data with respect to the first set of reconstruction data. That is, the reconstruction data A5 ... A8 indicates how to modify upper levels of quality of a rendition of the signal produced by reconstruction data A1 ... A4; the reconstruction data B5 ... B8 indicates how to modify a rendition of the signal produced by reconstruction data B1 ... B4; and so on.

In this example, assume that a user receives the first set of reconstruction data 810-1 to scan corresponding content for areas of interest at a lower level of quality. Assume the user views the content at the lower level of quality #4 and generates a request to view a portion of the signal following grouping D at a higher resolution. In one embodiment, in response to receiving the request, the streaming server 300-1 immediately streams the reconstruction data D5 ... D8, E5 ... E8, etc., to the user for playback of the signal starting at the selected location. In such an instance, there is no need for the data processor 300-1 to transmit reconstruction data A5 ... A8, B5 ... B8, C5 ... C8, because the user (in this example) is not interested in viewing this data in higher resolution. Accordingly, a user can view content (e.g., signal 115) at a lower level of quality and decide which portions, if any, to view in a higher resolution.

Figure 8:
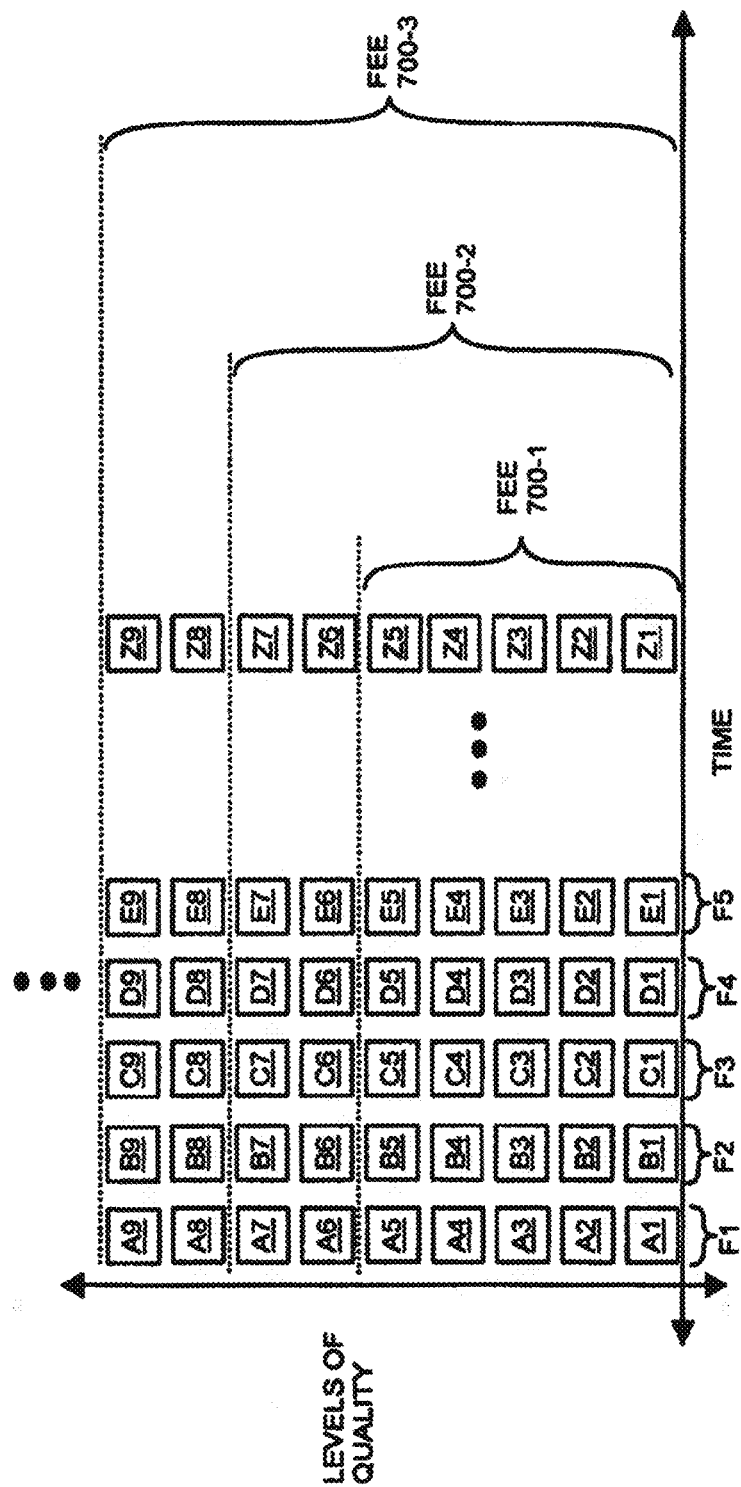
FIG. 8 is an example diagram illustrating a fee structure for distribution of reconstruction data according to embodiments herein.

FIG. 8 is an example diagram illustrating a fee structure for distribution of reconstruction data to play back a rendition of a signal according to embodiments herein.

For example, in accordance with one embodiment, different levels of quality of the reconstruction data can be distributed based on a fee schedule. A user operates the decoder resource and initiates playback of signal 115 based on retrieval of the reconstruction data. The user is charged a different fee (e.g., amount of money) and/or the provider of the service is charged a different fee/royalty depending on a level of quality of the reconstruction data transmitted to the decoder resource and played back by the user.

In this example, the user is charged fee 700-1 based on transmission and receipt of sets of the reconstruction data up to level of quality #5; the user is charged fee 700-2 based on transmission and receipt of the reconstruction data up to level of quality #7; the user is charged fee 700-3 based on transmission and receipt of the reconstruction data up to level of quality #9, and so on. Also the provider of the service (e.g., streaming server 300-1), despite leveraging a same encoded file, could be charged different fees/royalties according to the level of quality transmitted.

Note that, as indicated in the above example, the user operating signal processor 100-2 (e.g., a decoder) can initially receive reconstruction data according to a first level of quality (e.g., level of quality #5) for playback and viewing of signal 115. Transmission of the lower level of quality reconstruction data may be free to the user (and/or to the streaming server), or characterized by a different fee. Based on a request from the user to view the signal at a higher level of quality, the data processor 300-1 retrieves and transmits the reconstruction data up to a second, higher level of quality (e.g., level of quality #7, level of quality #9, etc.) to satisfy the user request. The user may be charged a respective fee as discussed above for receipt of the reconstruction data at the higher level of quality.

In another embodiment, regardless of the fee charged to the user that operates the signal processor 100-2 (e.g., a decoder), a different royalty/fee structure may be applied to the operators of the signal processor 100-1 and of the streaming server 300-1 based on the levels of quality transmitted to signal processor 100-2.

Figure 9:
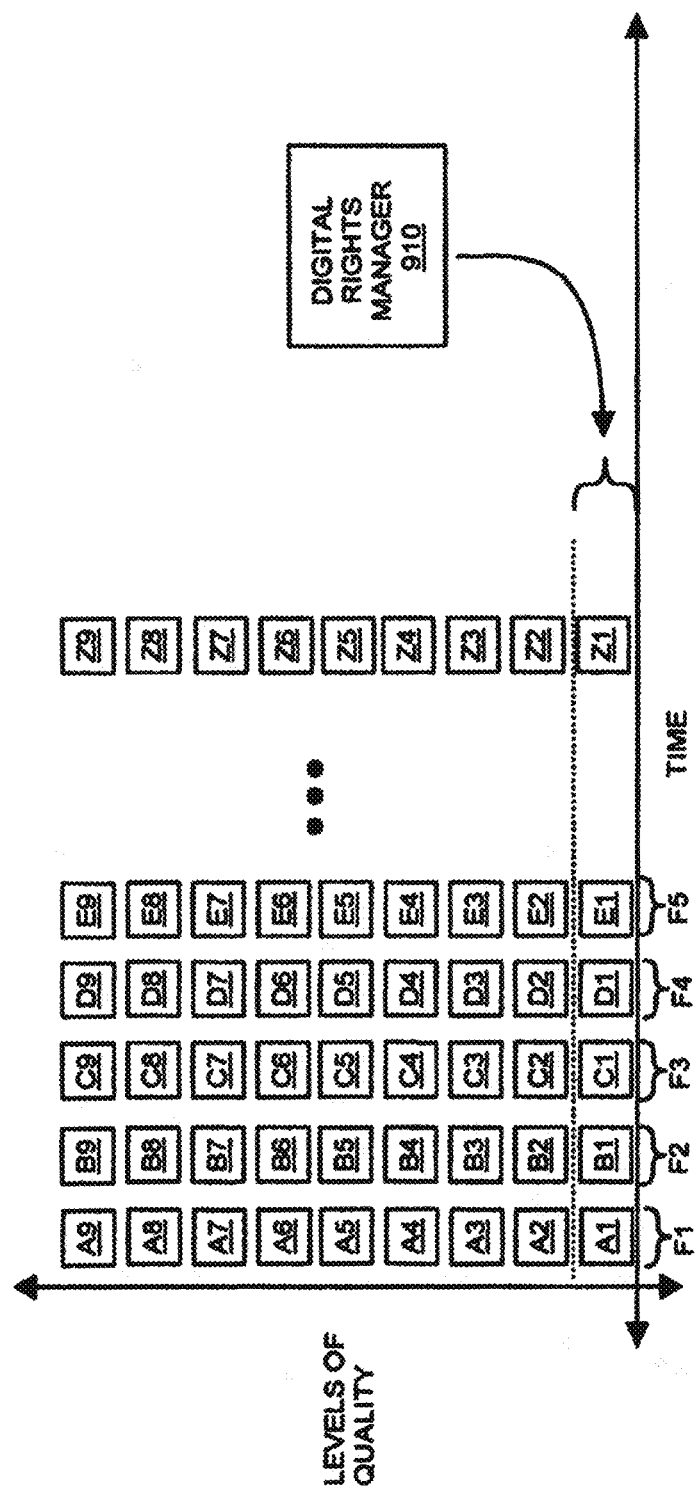
FIG. 9 is an example diagram illustrating the use of digital rights management at one or more lower levels of quality according to embodiments herein.

FIG. 9 is an example diagram illustrating the use of digital rights management algorithms at one or more levels of quality according to embodiments herein.

For example, as mentioned, each portion (e.g., image, frame, etc.) of signal 115 can be defined by a respective tiered set of reconstruction data to reconstruct that portion of the signal. Embodiments herein include implementing digital rights management 910 with respect to selected lower tiers of the sets of reconstruction data (e.g., by way of non-limiting example, the level of quality #1).

In one embodiment, the use of digital rights management 901 prevents unauthorized decoding of the reconstruction data at the lower level of quality. For example, the signal processor 100-2 executes a respective application enabling decoding of the lowest level of quality #1. Higher tiers of the reconstruction data are accessible and may be unprotected by digital rights management. The signal processor 100-2 decodes the lower level of quality #1 of reconstruction data (e.g., reconstruction data A1, B1, C1, D1, E1, etc.) using a respective digital rights management application. The additional reconstruction data (e.g., reconstruction data at level of quality #2, level of quality #3, level of quality #4, etc.) at higher levels of quality can be decoded without placing additional burden on the digital rights management application.

In one embodiment, the reconstruction data at level of quality #1 (e.g., reconstruction data A1, B1, C1, D1, E1, ... ) is encrypted in accordance with an appropriate protocol. The signal processor 100-2 receives a respective decryption key to decrypt the received reconstruction data at level of quality #1. As mentioned, there is no need to encrypt the higher level of quality reconstruction data because the use of reconstruction data at level of quality #2, #3, etc., depends on proper decoding of reconstruction data at level of quality #1. Without the ability to decode the lower level of quality reconstruction data at level of quality #1, a decoder resource that does not have a respective decryption key is unable to use the higher level of quality reconstruction data to produce a meaningful rendition of the signal. In other words, use of the higher level of quality reconstruction data is dependent on successful decoding of corresponding lower level of quality reconstruction data.

Figure 10:
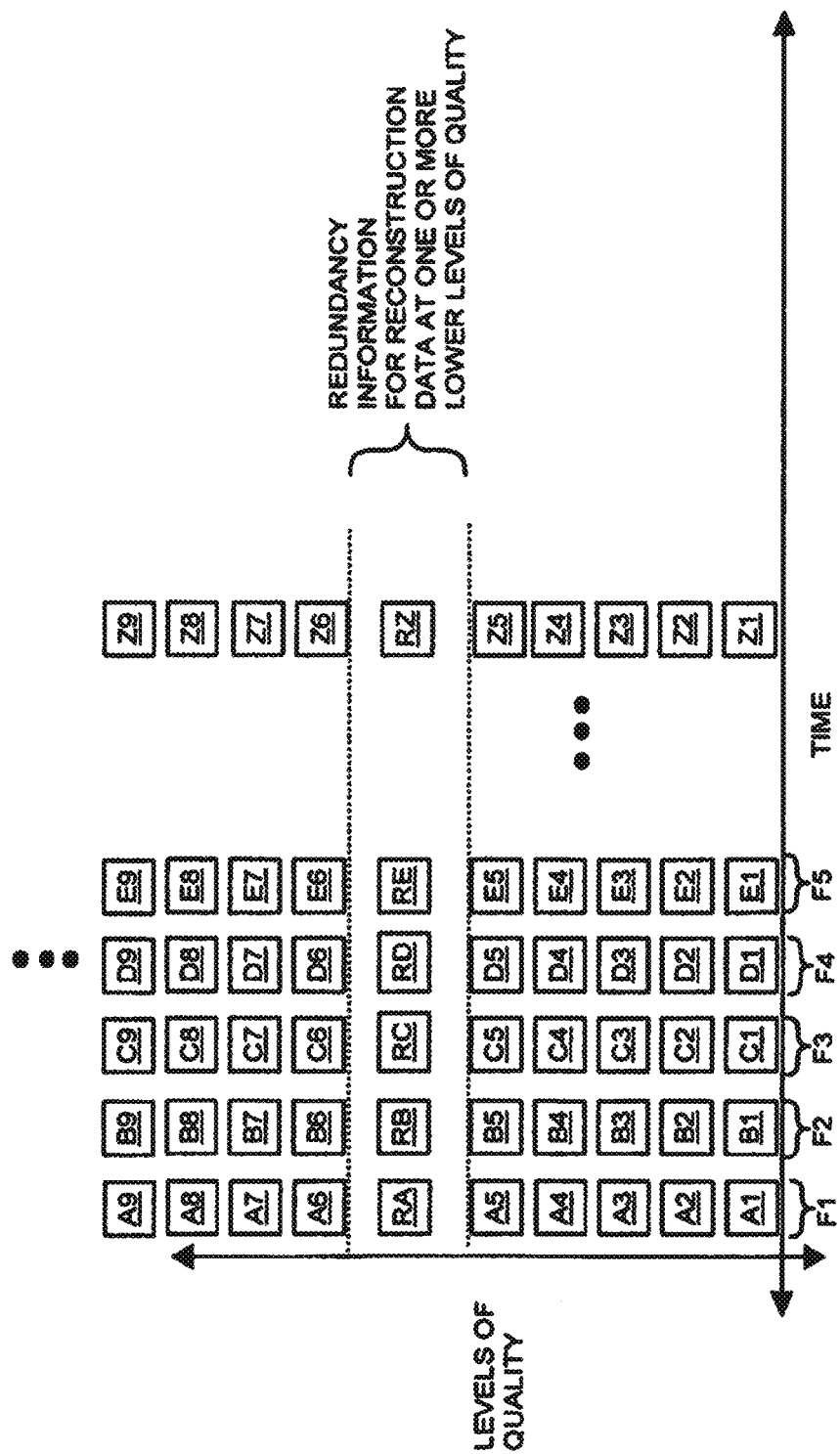
FIG. 10 is an example diagram illustrating redundancy information for reconstruction data at one or more lower levels of quality according to embodiments herein.

FIG. 10 is an example diagram illustrating the addition of redundancy to reconstruction data at one or more lower levels of quality according to embodiments herein.

In accordance with such an embodiment, the signal processor 100-1 (encoder) generates the sets of reconstruction data to include redundant encoding at the lower level of quality to enable playback of the lower level of quality reconstruction data in the event of errors. The signal processor 100-1 generates higher level of quality reconstruction data to include non-redundant encoding. Accordingly, a user receiving the reconstruction data will have a high probability of being able to play back the signal with graceful degradation in the event of errors, as the higher level of quality reconstruction data may be corrupt, but the fundamental information contained in the lower levels of quality of the signal will be intact.

As an example, the redundancy information RA can be based on reconstruction data A1, A2, A3, A4, and A5; the redundancy information RB can be based on reconstruction data B1, B2, B3, B4, and B5; the redundancy information RC can be based on reconstruction data C1, C2, C3, C4, and C5; etc.

In another embodiment, the signal processor 100-1 (encoder) generates for lower levels of quality both sets of reconstruction data including redundant encoding and sets of reconstruction data including non-redundant encoding. Leveraging the stream metadata 160, the streaming server 300-1 can decide on a case-by-case basis whether it is needed that lower levels of quality be transmitted as reconstruction data with redundant encoding and when instead reconstruction data may be transmitted as non-redundant encoding.

Figure 11A:
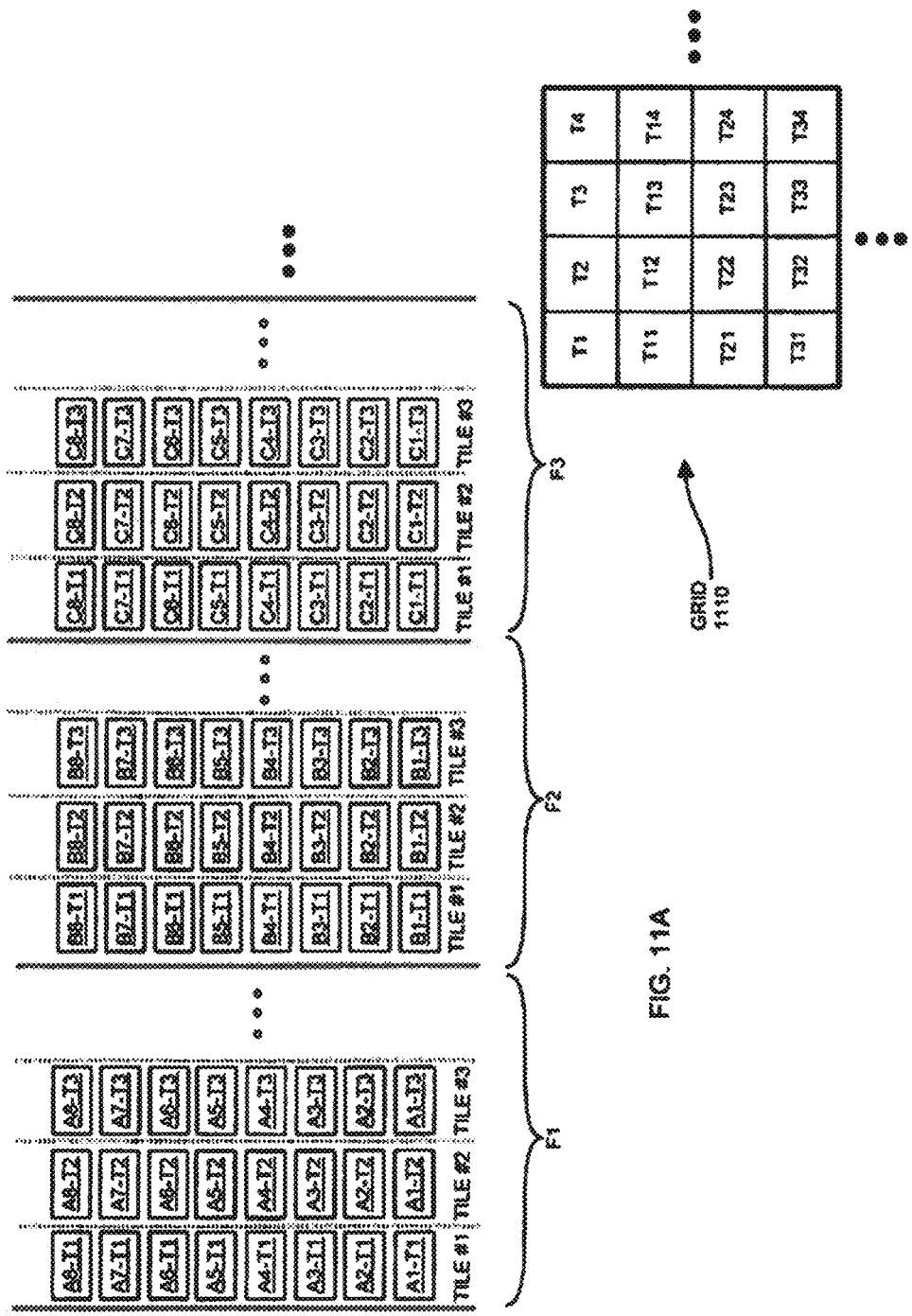
FIGS. 11A, 11B, and 11C are example diagrams illustrating reconstruction data for each of multiple tiles according to embodiments herein.

FIG. 11A is an example diagram illustrating reconstruction data organized as tiles according to embodiments herein.

In one embodiment, the reconstruction data is parsed into groupings (e.g., A, B, C, D, etc.); each of the groupings of reconstruction data includes information to reconstruct a time-based portion (e.g., image/frame) of the signal. For example, as mentioned, reconstruction data A includes information indicating how to reconstruct image/frame F1; reconstruction data B includes information indicating how to reconstruct image/frame F2; reconstruction data C includes information indicating how to reconstruct image/frame F3; etc.

Each of the groupings of reconstruction data can include multiple sequences of hierarchically tiered reconstruction data from a lowest level of quality to a higher level of quality in the hierarchy. For example, the reconstruction data for reconstructing a portion (e.g., tile T1 in grid 1110) of the signal at image/frame F1 includes sequence of reconstruction data A1-T1, A2-T1, A3-T1, A4-T1, A5-T1, A6-T1, A7-T1, and A8-T1; the reconstruction data for reconstructing a portion (e.g., tile T2) of the signal at image/frame F1 includes a sequence of reconstruction data A1-T2, A2-T2, A3-T2, A4-T2, A5-T2, A6-T2, A7-T2, and A8-T2; the reconstruction data for reconstructing a portion (e.g., tile T3) of the signal at image/frame F1 includes sequence of reconstruction data A1-T3, A2-T3, A3-T3, A4-T3, A5-T3, A6-T3, A7-T3, and A8-T3; and so on.

The reconstruction data for reconstructing a portion (e.g., tile T1) of the signal at image/frame F2 includes sequence of reconstruction data B1-T1, B2-T1, B3-T1, B4-T1, B5-T1, B6-T1, B7-T1, and B8-T1; the reconstruction data for reconstructing a portion (e.g., tile T2) of the signal at image/frame F2 includes a sequence of reconstruction data B1-T2, B2-T2, B3-T2, B4-T2, B5-T2, B6-T2, B7-T2, and B8-T2; the reconstruction data for reconstructing a portion (e.g., tile T3) of the signal at image/frame F2 includes sequence of reconstruction data B1-T3, B2-T3, B3-T3, B4-T3, B5-T3, B6-T3, B7-T3, B8-T3; and so on.

Thus, each of the multiple sequences of tiered reconstruction data from a lowest level of quality to the higher level of quality indicates settings of a respective tile of contiguous elements associated with the signal.

As mentioned, grid 1110 illustrates the tiles in the rendition of signal 115 produced by the decoder using the reconstruction data split up according to tiles. Each tile at the lowest level of quality in the hierarchy can include one or more elements. As discussed herein, each element in the tile at a respective level of quality in the hierarchy is divided into multiple sub-elements at a next higher level of quality; the reconstruction data for the tile at each respective level of quality indicates the settings of the elements. Accordingly, each element in the tile at the lowest level of quality is subdivided at each level into sub-elements up to the highest level of quality for the respective tile.

In one embodiment, the signal processor 100-2 includes multiple processors. Each processor can be assigned to produce a respective rendition of the signal for a given tile (e.g., the tile can include a set of elements) based on respective reconstruction data at the multiple levels of quality for the tile. The tiles of elements are then combined to produce an overall rendition of the signal 115 for playback. Processing the tiles in parallel using one or more processors enables a more efficient reconstruction of the signal for playback on a playback device. For example, each processor can be configured to reconstruct a separate tile of the signal 115 for each different image/frame.

Figure 11B:
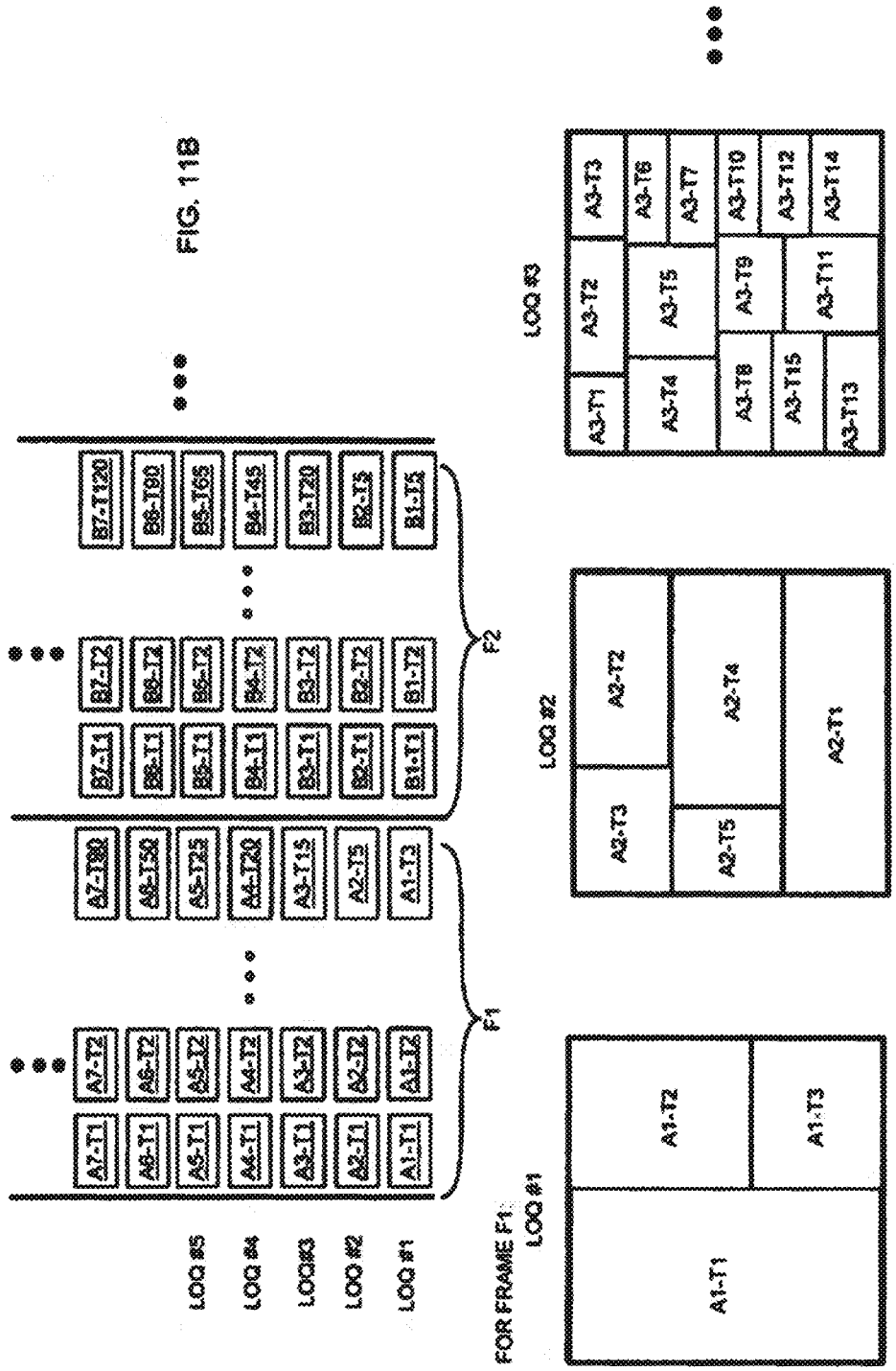

FIG. 11B is another example diagram illustrating reconstruction data organized in tiles according to embodiments herein.

In one embodiment, the reconstruction data is parsed into groupings (e.g., A, B, C, D, etc.); each of the groupings of reconstruction data includes entropy-encoded data. The spatial size of each tile of entropy-encoded data at each different level of quality can vary as shown. For example, tile A1-T1 includes entropy-encoded data for more elements at the level of quality #1 than does tile A1-T2; tile A1-T2 includes entropy-encoded data for more elements at the level of quality #1 than does tile A1-T3. Thus, the size and specific region of spatial coverage of tiles of entropy-encoded reconstruction data at a given level of quality can vary.

Additionally, the number of tiles and respective spatial coverage for each tile of entropy-encoded reconstruction data can vary for different levels of quality. For example, level of quality #1 includes three tiles of entropy-encoded reconstruction data; level of quality #2 includes five tiles of entropy-encoded reconstruction data; level of quality #3 includes fifteen tiles of entropy-encoded reconstruction data; etc.

Thus, each of the multiple sequences of tiered reconstruction data from a lowest level of quality to the higher levels of quality indicates settings of a respective tile of contiguous elements associated with the signal.

Figure 11C:
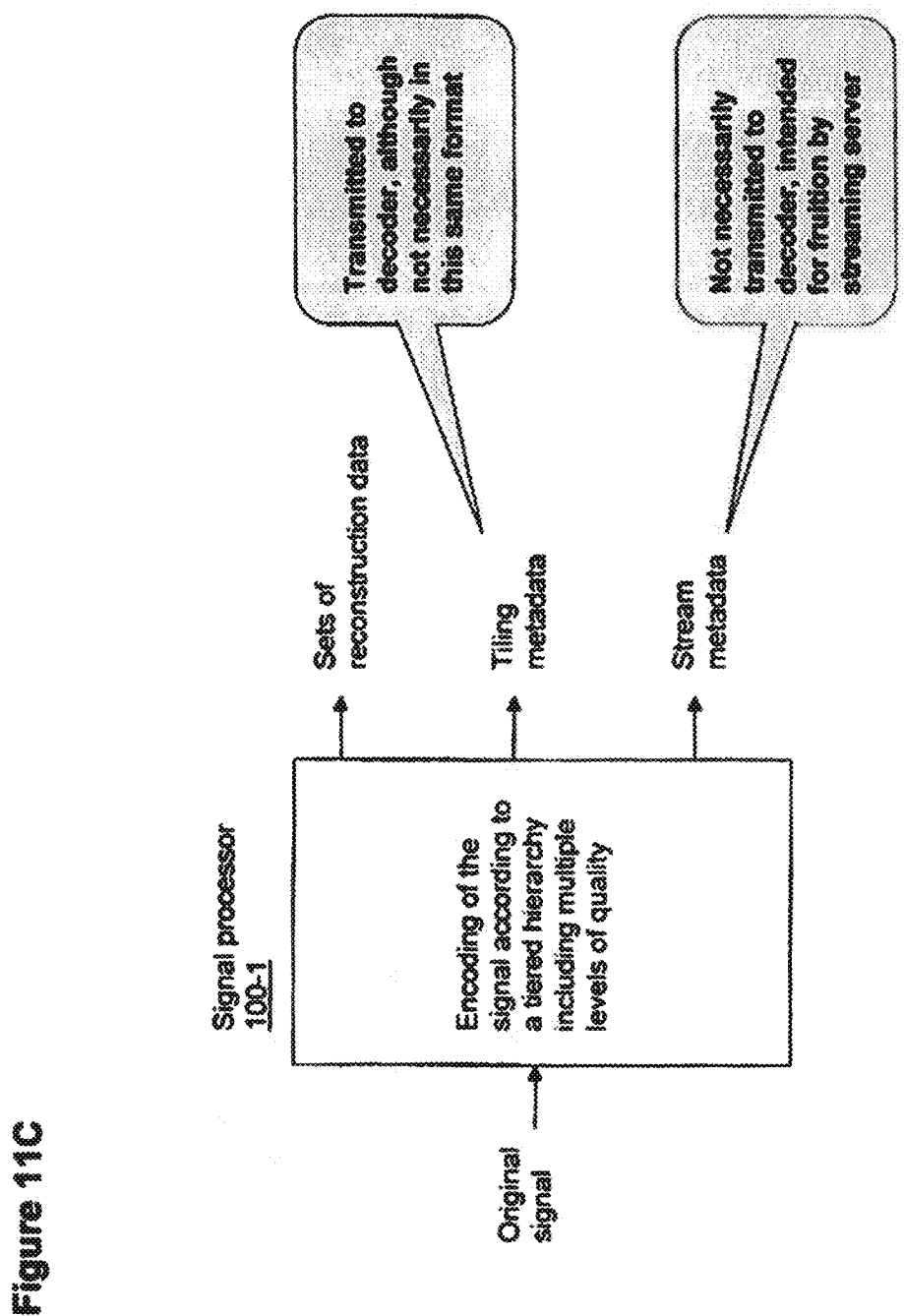

FIG. 11C is another example diagram illustrating organization of reconstruction data in tiles according to embodiments herein.

In an embodiment, encoder or signal processor 100-1 generates, along with sets of reconstruction data 150 and stream metadata 160, also so-called tiling metadata. Tiling metadata allows efficient identification of the tiles of reconstruction data that can be processed by parallel decoders. The tiling metadata can be transmitted to the decoder or signal processor 100-2 (although potentially in a different format than the one generated by encoder 100-1).

Figure 12A:
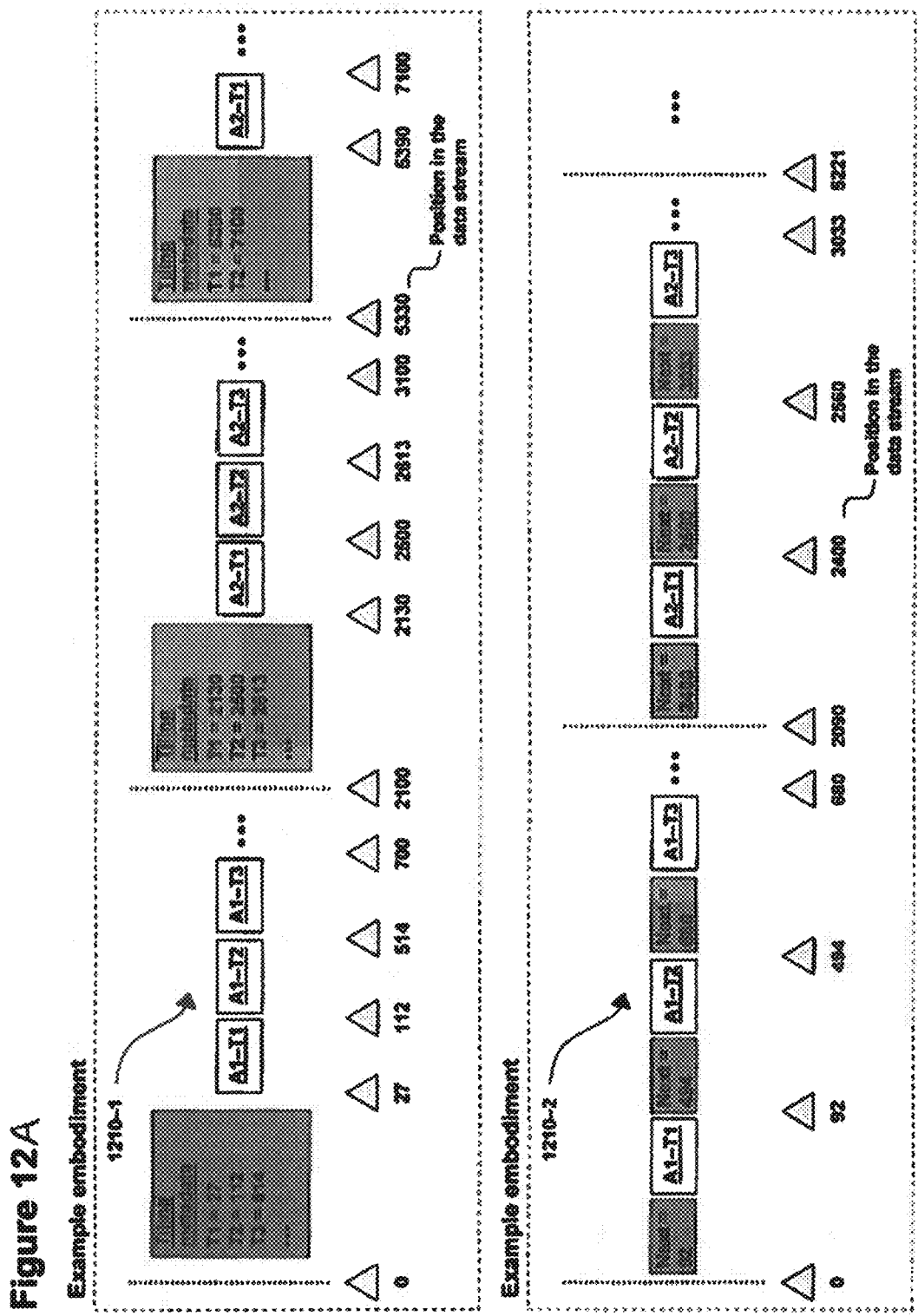
FIG. 12A is an example diagram illustrating different ways of incorporating tiling metadata in a reconstruction data stream according to embodiments herein.

FIG. 12A is an example diagram illustrating different ways of incorporating tiling metadata in a reconstruction data stream according to embodiments herein.

In an embodiment, transmission of the reconstruction data for a respective portion of the signal from the streaming server 300-1 to a respective decoder can include transmitting, for a given image/frame of reconstruction data, the tiered reconstruction data in data stream 1210-1 starting from reconstruction data at the lower levels of quality to reconstruction data for the higher levels of quality for the multiple sequences associated with a portion of the signal.

For example, in accordance with such an embodiment, the data processor 300-1 transmits entropy-encoded reconstruction data for the lowest level of quality including A1-T1, A1-T2, A1-T3, A1-T4, A1-T5, A1-T6, etc., followed by the sequence A2-T1, A2-T2, A2-T3, A2-T4, A2-T5, A2-T6, etc., followed by A3-T1 A3-T2, A3-T3, A3-T4, A3-T5, A5-T6, etc., and so on, as shown in data stream 1210-1.

In accordance with such an embodiment, the streaming server 300-1 can provide marker information (e.g., tiling metadata) in the data stream 1210-1 to indicate a respective beginning and end of each tile of reconstruction data for each level of quality. For example, the data processor 300-1 can provide tiling metadata marking the point where A1-Tu ends and A1-Tv begins (u and v being consecutive tile numbers for the first level of quality) in level of quality 1; the streaming server 300-1 can provide tiling metadata marking the point where A2-Tw ends and A2-Tx begins (w and x being consecutive tile numbers for the second level of quality); and so on.

In another example embodiment, shown in data stream 1210-2, instead of transmitting tiling metadata structured as an index at the beginning of the sequence of tiles referring to each level of quality, streaming server 300-1 can transmit tiling metadata structured as marker information before every tile, indicating the beginning of the subsequent tile (either via absolute position or via relative position in the data stream).

In accordance with another embodiment, whereby every level of quality of the signal is divided in the same number of co-located tiles, transmission of the reconstruction data from the streaming server 300-1 to the decoder resource (i.e., signal processor 100-2) can include serially transmitting tiles in a sequential order (e.g., sequence A1-T1 A2-T1, A3-T1, A4-T1, A5-T1, A6-T1, A7-T1, and A8-T1; sequence A1-T2, A2-T2, A3-T2, A4-T2, A5-T2, A6-T2, A7-T2, and A8-T2; sequence A1-T3, A2-T3, A3-T3, A4-T3, A5-T3, A6-T3, A7-T3, and A8-T3; and so on).

The streaming server 300-1 can be configured to provide marker information (tiling metadata) in the data stream to indicate a respective beginning and end of each set of tiered reconstruction data for each tile. For example, the streaming server 300-1 can insert a marker (e.g., index with beginning/end of each set of reconstruction data) between reconstruction data A8-T1 and A1-T2, between reconstruction data A8-T2 and A1-T3, and so on. Alternatively, the streaming server 300-1 can insert markers between any set of reconstruction data, e.g. indicating the absolute or relative position of the following set of reconstruction data in the bitstream.

Figure 12B:
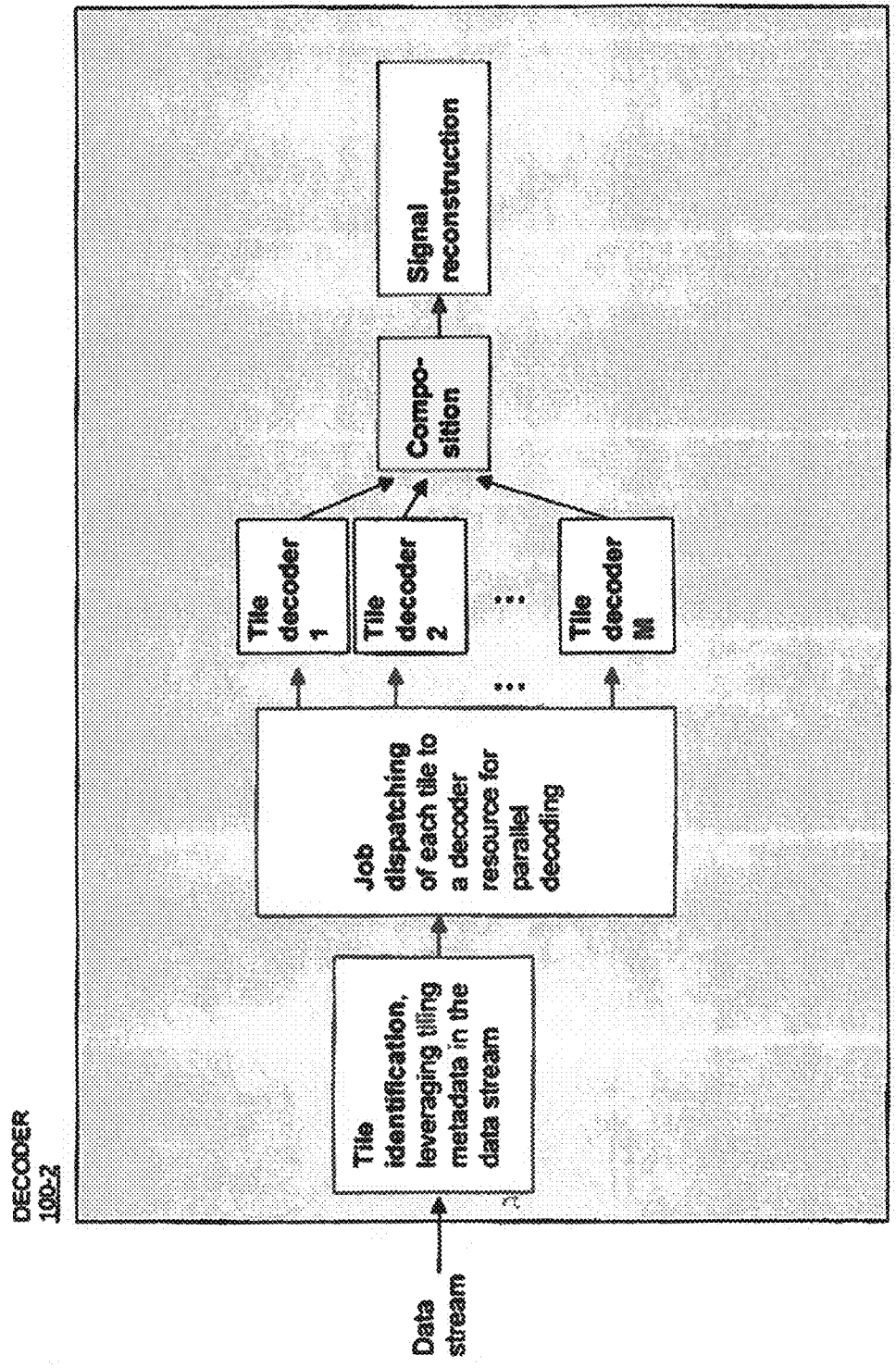
FIG. 12B is an example diagram illustrating parallel decoding of tiled reconstruction data according to embodiments herein.

FIG. 12B is an example diagram illustrating parallel decoding of tiled reconstruction data according to embodiments herein.

As mentioned, the decoder resource can include multiple processors, each of which is configured to decode entropy-encoded data for a respective tile to produce a tile of the reconstruction data. A combination of decoded tiles at a given level of quality produces the reconstruction data for the whole level of quality. For example, each of multiple processors can decode entropy-encoded data for a respective tile at a given level of quality. Based on decoding of all tiles of entropy-encoded data, each respective processor produces reconstruction data to reconstruct the tile of elements at the corresponding level of quality. Using global operations applied to the image as a whole for the given level of quality, the respective reconstruction data for the level of quality is then used to reconstruct a rendition of the signal to a next higher level of quality. This process of decoding different-sized and/or different numbers of tiles at the different levels of quality can be repeated at each level until reproducing the signal at the highest level of quality.

Figure 13:
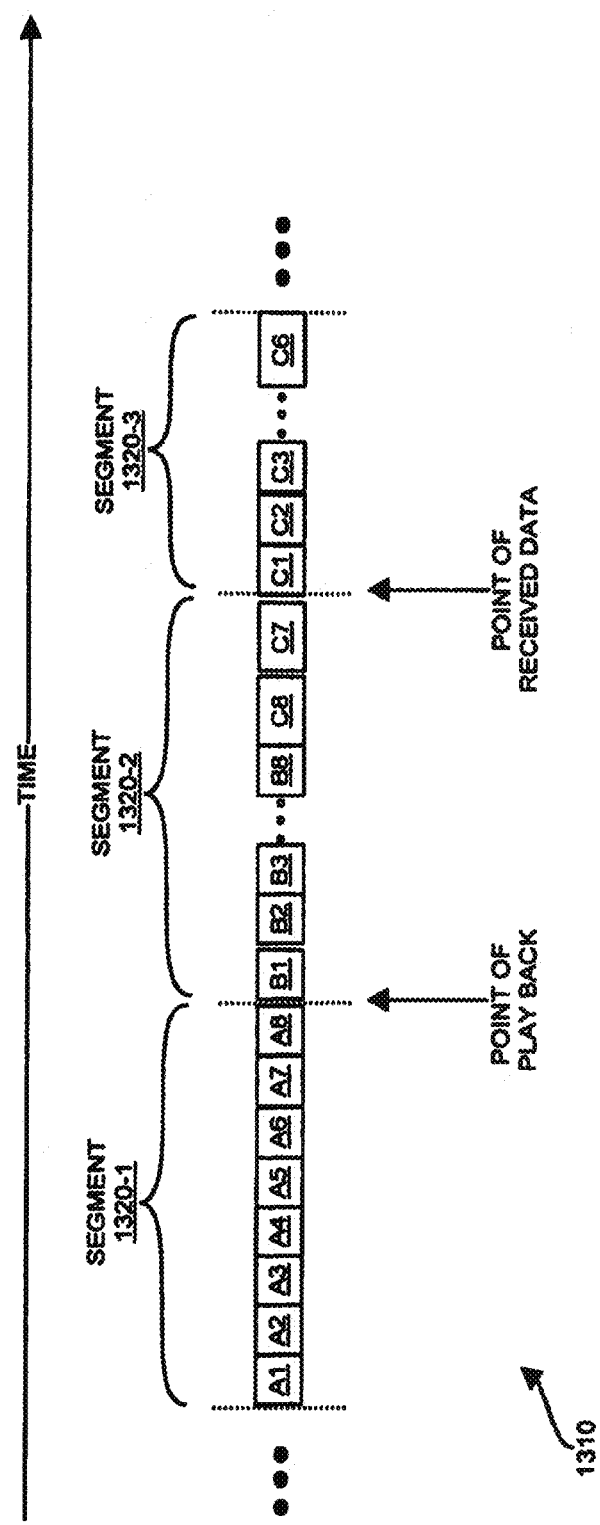
FIG. 13 is an example diagram illustrating buffering of reconstruction data according to embodiments herein.

FIG. 13 is an example diagram illustrating buffering of reconstruction data according to embodiments herein.

As shown in FIG. 13, the streaming server 300-1 can be configured to transmit the reconstruction data for a given portion (such as a respective image/frame) of the signal over multiple segments (e.g., two or more segments) of a data stream 1310.

More specifically, in one embodiment, the streaming server 300-1 partitions the data stream 1310 into segments 1320 (e.g., segment 1320-1, segment 1320-2, segment 1320-3, etc.) for transmission of the reconstruction data to a remote resource such as a decoder. In one embodiment, each segment 1320 of the data stream 1310 supports transmission of a substantially equal number of data bits, and streaming server 300-1 leverages information contained in the stream metadata in order to assemble each segment so as to achieve the correct number of data bits. In general, each segment can include reconstruction data to reconstruct a portion of the signal 115 such as a respective image/frame.

In one embodiment, the streaming server 300-1 populates the first segment 1320-1 of the data stream 1310 to include multiple levels of quality of reconstruction data (e.g., sets of reconstruction data A1, A2, A3 . . . A8) to reconstruct the first image/frame of the signal. The streaming server 300-1 populates the second segment 1320-2 of the data stream 1310 to include multiple levels of quality of reconstruction data to reconstruct the second image/frame of the signal. The streaming server 300-1 populates the third segment 1320-3 of the data stream 1310 to include: i) multiple levels of quality of reconstruction data to reconstruct the third image/frame of the signal, and ii) at least one level of quality of reconstruction data to reconstruct the second image/frame of the signal. The fourth segment 1320-4 includes i) multiple levels of quality of reconstruction data to reconstruct the fourth image/frame of the signal, and ii) additional reconstruction data to reconstruct the second and third images/frames. Thus, instead of transmitting reconstruction data in a corresponding segment of the data stream, the reconstruction data for a portion of the signal can be spread out over multiple segments.

In one embodiment, the decoder resource is configured to buffer the data stream 1310 transmitted by the streaming server 300-1. For example, when the point of received data is past reconstruction data C7, the signal processor 100-2 reconstructs the image/frame associated with segment 1320-2 based on the multiple levels of quality of reconstruction data B1 . . . B5 in segment 1320-2 of the data stream 1310 as well as based on reconstruction data B6 in segment 1320-3 and B7 and B8 in segment 1320-4 of the data stream 1310. In this manner, the higher levels of quality of reconstruction data can be spread out in different segments of data stream 1310. Buffering reconstruction data and delaying playback enables the decoder to receive the appropriate reconstruction data to decode the signal and play back the signal in accordance with level of quality #8. Spreading out reconstruction data can be useful in several contexts, such as, by way of a non-limiting example, Constant Bit Rate transmissions: spreading out reconstruction data can allow for full bandwidth usage even when reconstruction data for different images of a same signal may require very different amounts of bits (e.g., Intra-frames, typically requiring significant bits to encode, vs. Predicted-frames, typically requiring fewer bits than Intra-frame at comparable levels of quality).

Figure 14:
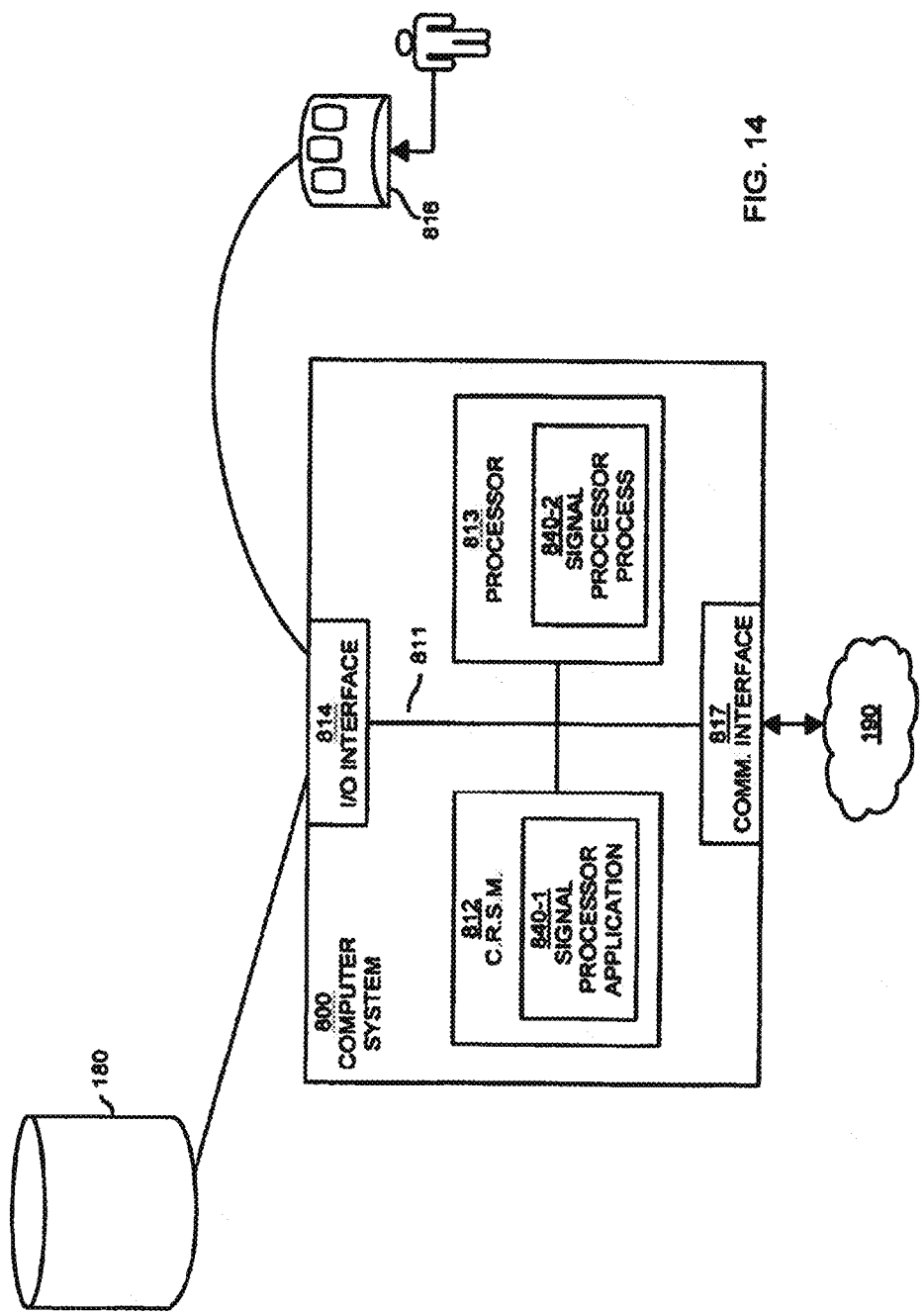

FIG. 14 is an example block diagram of a computer system 800 providing signal processing according to embodiments herein.

Computer system 800 can be or include a computerized device such as a personal computer, processing circuitry, television, playback device, encoding device, workstation, portable computing device, console, network terminal, processing device, network device, operating as a switch, router, server, client, etc.

Note that the following discussion provides a basic embodiment indicating how to carry out functionality associated with any of the resources as discussed herein such as signal processor 100-1, signal processor 100-2, media player, etc. However, it should be noted that the actual configuration of computer system 800 for carrying out the operations can vary depending on a respective application.

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include a processor 813, I/O interface 814, and a communications interface 817.

I/O interface 814 provides connectivity to repository 180, and if present, display screen, peripheral devices 816 such as a keyboard, a computer mouse, etc.

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with signal processor 840. The instructions are executed by a respective resource such as signal processor 840 to perform any of the operations as discussed herein.

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180.

As shown, computer readable storage media 812 can be encoded with signal processor application 840-1 executed by processor 813 as signal processor process 840-2.

Note that the computer system 800 also can be embodied to include a computer readable storage medium 812 (e.g., a hardware storage media, non-transitory storage media, etc.) for storing data and/or logic instructions.

Computer system 800 can include a processor 813 to execute such instructions and carry out operations as discussed herein. Accordingly, when executed, the code associated with signal processor application 840-1 can support processing functionality as discussed herein. As mentioned, the signal processors as discussed herein can be configured to support encoding and/or decoding.

During operation of one embodiment, processor 813 accesses computer readable storage media 812 via the use of interconnect 811 in order to launch, run, execute, interpret or otherwise perform the instructions of signal processor application 840-1 stored in computer readable storage medium 812. Execution of the signal processor application 840-1 produces processing functionality in processor 813. In other words, the signal processor process 840-2 associated with processor 813 represents one or more aspects of executing signal processor application 840-1 within or upon the processor 813 in the computer system 800.

Those skilled in the art will understand that the computer system 800 can include other processes and/or software and hardware components, such as an operating system that controls allocation and use of hardware processing resources to execute signal processor application 840-1 (e.g., encoder, decoder, etc.).

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Figure 15:
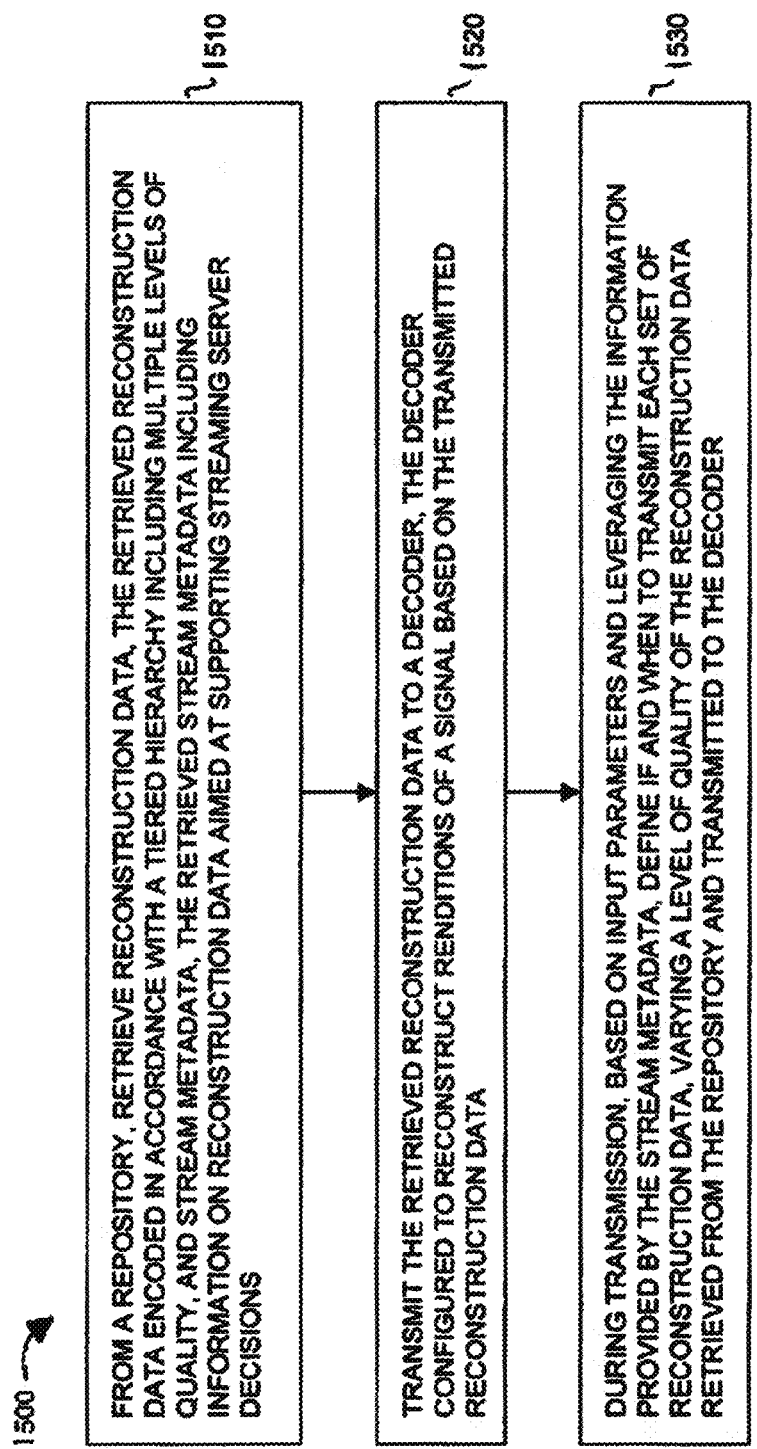
FIG. 15 is an example flowchart illustrating a method of utilizing reconstruction data according to embodiments herein.

FIG. 15 is an example flowchart 1500 illustrating a method of using reconstruction data according to embodiments herein.

In step 1510, the streaming server 300-1 retrieves reconstruction data and stream metadata from a repository 180. The retrieved reconstruction data is encoded in accordance with a tiered hierarchy including multiple levels of quality. The retrieved stream metadata includes information on reconstruction data aimed at supporting streaming server decisions. In other words, in one embodiment, the streaming server can be configured to utilize the metadata to make decisions about transmitting data to a remote decoder or playback device.

In step 1520, the streaming server 300-1 transmits the retrieved reconstruction data to a remote source such as a decoder. The decoder can be configured to reconstruct renditions of the signal based on the transmitted reconstruction data.

In step 1530, during the transmission, the streaming server 300-1 varies a level of quality of the reconstruction data retrieved from the repository and transmitted to the decoder.

Note again that techniques herein are well suited for use in processing and reconstructing signals. However, it should be noted that embodiments herein are not limited to use in such applications and that the techniques discussed herein are well suited for other applications as well.

In accordance with one embodiment, a first set of reconstruction data includes a symbol specifying an attribute setting of a parent element in a rendition of the signal at a first level of quality (e.g., attribute settings can include color components in a suitable color space, coordinates of motion vectors, temperature values, radioactivity values, density values, etc.). The attribute setting can be one of multiple attribute settings of the parent element indicating how to configure the parent element for the rendition of the signal at a first level of quality. A signal processor divides the parent element into multiple sub-elements to reconstruct the signal at a second, higher level of quality. The signal processor utilizes the attribute setting of the parent element as specified by the symbol (at the first level of quality) as a default attribute setting for one or more respective sub-elements (into which the parent element is divided) until reconstruction data to reconstruct the signal at a higher level of quality specifies a different setting for the respective sub-elements. Thus, a sub-element can inherit settings of the parent element. (paragraph incorporated from U.S. Pat. No. 8,977,065).

In one embodiment, the symbol assigned to the parent element can indicate that the setting for each sub-element derived from the parent element will always inherit the setting of the parent element. Another symbol assigned to the parent element can indicate that the sub-elements derived from the parent element may change at higher levels of quality in accordance with settings as specified by the reconstruction data for the higher levels of quality. (paragraph incorporated from U.S. Pat. No. 8,977,065).

FIG. 1 is an example diagram illustrating generation of reconstruction data according to embodiments herein. (paragraph incorporated from U.S. Pat. No. 8,977, 065).

As shown, a signal processor 100-1 downsamples a signal 115 into different renditions at lower levels of quality in a hierarchy. In general, downsampling the signal 115 can include producing a rendition of the signal at each of different levels of quality and generating reconstruction data specifying how to convert a given rendition of the signal at a first level of quality into a rendition of the signal at a next higher level of quality in the hierarchy. (paragraph incorporated from U.S. Pat. No. 8,977,065).

Signal processor 100-2 utilizes the reconstruction data 150 to reconstruct renditions of the signal at different levels of quality. The signal processor 100-2 can receive the reconstruction data 150 from any suitable source (e.g., communication link, storage device, etc.). (paragraph incorporated from U.S. Pat. No. 8,977,065).

Note that values associated with the rendition of signal 115 and corresponding rendition of the signal at lower levels of quality can represent any suitable type of data information. By way of non-limiting example, the signal 115 can be two dimensional (e.g., pictures, video frames, 2D motion maps, thermal maps, etc.), three-dimensional (e.g., 3D/volumetric images, holographic images, CAT-scans, medical/scientific images, 3D motion maps, etc.), or even feature more than three dimensions, indicating settings of each of multiple signal elements (e.g., pels/plane elements for a generic multidimensional signal, pixels/picture elements for a 2D signal, voxels/volumetric picture elements for a 3D signal, etc.) in a respective image. (paragraph incorporated from U.S. Pat. No. 8,977,065).

In one embodiment, each element in the signal 115 can be attributed several settings such as one or more color components (in accordance with such an embodiment, color components of an element in the signal data are encoded in accordance with a suitable color space standard, such as YUV, RGB, HSV, etc.), intensity of a given metric (e.g., temperature, radioactivity, density, etc.), motion vector coordinates, motion zone membership, class membership (e.g., bone, soft tissue, metal, blood, etc.), etc. Reconstruction data 150 specifies how to generate one or more settings for each element in the renditions of signal 115. The reconstruction data 150 can be configured to specify multiple planes of attribute settings. (paragraph incorporated from U.S. Pat. No. 8,977,065).

The settings of the signal elements or components indicate how to represent/display the signal for playback on a device. Reconstruction data 150 can include multiple planes of reconstruction data 150. Many parameters may be needed to define settings for a given element of signal 115. (paragraph incorporated from U.S. Pat. No. 8,977,065).

In accordance with further embodiments, signal 115 can represent an original signal or high-resolution signal including multiple elements. In such an embodiment, each of the renditions of the signal (e.g., rendition of signal 115-3, rendition of signal 115-2, rendition of signal 115-1, . . . ) can be akin to a thumbnail representation of an original signal that has been downsampled from signal 115 to a lower level of quality. Renditions of signal 115 at the higher level of quality include more detailed playback information. (paragraph incorporated from U.S. Pat. No. 8,977,065).

In one embodiment, the renditions of signal 115 at the lower levels of quality capture coarser attributes of the original signal, but not the more detailed finer attributes of the original signal. The detailed, finer attributes appear in the rendition of signal at higher levels of quality. (paragraph incorporated from U.S. Pat. No. 8,977,065).

By way of further non-limiting example, in one embodiment, the signal processor 100-1 downsamples original signal 115 into rendition of signal 115-3; signal processor 100-1 downsamples rendition of signal 115-3 into rendition of signal 115-2; signal processor 100-1 downsamples rendition of signal 115-2 into rendition of signal 115-1; and so on to a lowest level of quality. The signal 115 can be downsampled into any number of suitable levels from a highest level of quality. (paragraph incorporated from U.S. Pat. No. 8,977,065).

As mentioned, when downsampling the rendition of signal 115 to each lower level of quality, the signal processor 110-1 can generate respective reconstruction data 150. Reconstruction data at each level indicates how to upsample, convert, modify, etc., a rendition of signal at a lower level of quality into a rendition of signal at a next higher level of quality. For example, reconstruction data 150-1 indicates how to convert the rendition of signal 115-0 into the rendition of signal 115-1; reconstruction data 150-2 indicates how to convert the rendition of signal 115-1 into the rendition of signal 115-2; reconstruction data 150-3 indicates how to convert the rendition of signal 115-2 into the rendition of signal 115-3; and so on. (paragraph incorporated from U.S. Pat. No. 8,977,065).

Reconstruction data 150 can include any of multiple different types of data indicating how to reconstruct the signal 115 at higher levels of quality. For example, reconstruction data include any of one or more sets, planes, etc., of different types of reconstruction data such as parameters of upsampling operations, quantization threshold information, residual data to apply after upsampling from lower levels of quality, residual data to apply after motion compensation of an available reference signal image, adjustments to motion vectors in a dense motion map used for motocompensation, motion zone membership, spectral information on noise, meta-data, adjustments, class information, etc., to reconstruct signal 115 at different levels. (paragraph incorporated from U.S. Pat. No. 8,977,065).

Additional example details of downsampling a respective signal and producing reconstruction data is described in related application U.S. patent application entitled "SIGNAL PROCESSING AND TIERED SIGNAL ENCODING,", filed on the same day as the present application, the entire teachings of which are incorporated herein by this reference. In such an embodiment, the signal processor can be configured to test and create different sets of reconstruction data to convert a rendition of the signal from one level of quality to another. (paragraph incorporated from U.S. Pat. No. 8,977,065).

As mentioned, reconstruction data 150 can include any suitable data for signal processing. For example, each set of reconstruction data 150 can include metadata, residual data, etc. Metadata can include data such as a set of one or more upsampling operations with which to convert the rendition of signal from one level of quality to the next the residual data can indicate information such as adjustments to be made to signal elements at the different levels of quality, and so on. More specifically, the reconstruction data 150 can specify multi-plane setting information such as color components of elements, intensity, upsample operations, parameters of upsampling operations, quantization thresholds, residual data within an image/frame, motion zones, motion vectors, residual data indicating adjustments to apply after motion compensation of elements coming from a previous frame, spectral information on noise, other meta-data, etc. (paragraph incorporated from U.S. Pat. No. 8,977,065).

Note again that the sets of reconstruction data can include residual data indicating adjustments to be made after upsampling the rendition of signal at a first level of quality into the rendition of signal at a next higher level of quality. Additional details of a decoder system (i.e., signal processor) and use of residual data and upsample operations to upsample for use herein are described in related application U.S. patent application entitled "TIERED SIGNAL DECODING AND SIGNAL RECONSTRUCTION,", filed on the same day as the present application, the entire teachings of which are incorporated herein by this reference. (paragraph incorporated from U.S. Pat. No. 8,977,065).

Embodiments herein include utilizing inheritance to reduce an amount of bits, symbols, etc. that are needed to encode reconstruction data 150. For example, the elements in the renditions of the signal at the lower levels of quality are assigned certain setting information. In certain cases, the setting information assigned to a respective element at a lower level of quality can be reused for subdivisions of the respective element at higher levels of quality. In other words, a parent element at one level of quality can be divided into multiple sub-elements for the next level of quality. Each sub-element (and corresponding sub-elements into which the sub-element is divided at higher levels of quality) can inherit one or more of the attribute settings of the parent element. (paragraph incorporated from U.S. Pat. No. 8,977,065).

In this instance, rather than encoding reconstruction data at higher levels of quality to duplicate the settings of the parent for each sub-element, embodiments herein include using appropriate symbols to notify signal processor 100-2 (e.g., a decoder) of which sub-elements inherit attribute settings of the parent element. (paragraph incorporatedfrom US8,977, 065).

In one embodiment, the inheritance information in the reconstruction data captures coarse signal setting information at the different levels of quality. The residual data in the reconstruction data captures finer detailed element setting information. In one embodiment, a combination of the coarse setting information (e.g., inheritance information) and the detailed setting information (e.g., residual data) enables efficient reconstruction of the original signal or a near replica of the original signal. (paragraph incorporated from U.S. Pat. No. 8,977,065).

In accordance with further embodiments, signal processor 100-2 receives reconstruction data 150 to reconstruct the signal 115 at the first level of quality in the hierarchy. The signal processor 100-2 can receive the reconstruction data 150 over a communication link. (paragraph incorporated from U.S. Pat. No. 8,977,065).

The set of reconstruction data 150-1 can include a symbol specifying an attribute setting of a parent element in the rendition of the signal 115-1 at the first level of quality. The attributes setting for the parent element can be one of multiple attribute settings of the parent element. A combination of multiple attribute settings can indicate how to configure the parent element for the rendition of the signal at a first level of quality. (paragraph incorporated from U.S. Pat. No. 8,977,065).

By way of a non-limiting example, in one embodiment, the signal processor 100-2 divides the parent element into multiple sub-elements to reconstruct the signal 115 at a second, higher level of quality. When doing so, the signal processor 100-2 utilizes the attribute setting of the parent element as specified by the symbol (at the first level of quality) as a default attribute setting for one or more respective sub-elements unless or until a second set of reconstruction data to reconstruct the signal at the higher level of quality specifies a different attribute setting for the respective sub-element derived from the parent element. Accordingly, embodiments herein include reuse of setting information when reconstructing a signal at one or more higher levels of quality. This reduces an amount of data needed to define the signal 115 at one or more higher levels of quality. (paragraph incorporated from U.S. Pat. No. 8,977,065).

In accordance with further embodiments, note that the inheritance symbol assigned to the parent element in a rendition of signal 115-1 can be encoded in a way as to specify that each of its subdivisions (e.g., the multiple sub-elements and all further divisions of the multiple sub-elements into smaller sub-elements at higher levels of quality) are assigned a same attribute setting as indicated by the symbol assigned to the parent element at the first level of quality all the way to the highest level of quality. Thus, attribute setting information need not be repeated in reconstruction data for the higher levels of quality. (paragraph incorporated from U.S. Pat. No. 8,977,065).

FIG. 2A is an example diagram illustrating dividing a respective parent element into multiple sub-elements according to embodiments herein. (paragraph incorporated from U.S. Pat. No. 8,977,065).

As previously discussed, in one embodiment, the signal 115 represents image information. Assume in this non-limiting example that the signal 115 and corresponding reconstruction data indicates how to convert or expand a lower resolution image into a higher resolution image. (paragraph incorporated from U.S. Pat. No. 8,977,065).

Further, assume that the sets of encoded reconstruction data 150, when decoded, indicate how to control settings of image elements at each level of quality. For example, image 210-1 at level of quality J includes a field of image elements W; image 210-2 at level of quality J+1 includes field of image elements X; image 210-3 includes field of image elements Y; etc. (paragraph incorporated from U.S. Pat. No. 8,977,065).

The reconstruction data for level of quality J indicates how to control settings of image elements W in image 210-1 (e.g., rendition of signal 115-0); the reconstruction data for level of quality J+1 indicates how to convert and generate setting information for each image element W in image 210-1 that is split into four X elements in image 210-2; the reconstruction data for level of quality J+2 indicates how to convert and generate setting information for each image element X in image 210-2 that is split into four Y elements in image 210-3; and so on. (paragraph incorporated from U.S. Pat. No. 8,977,065).

Figure 16:
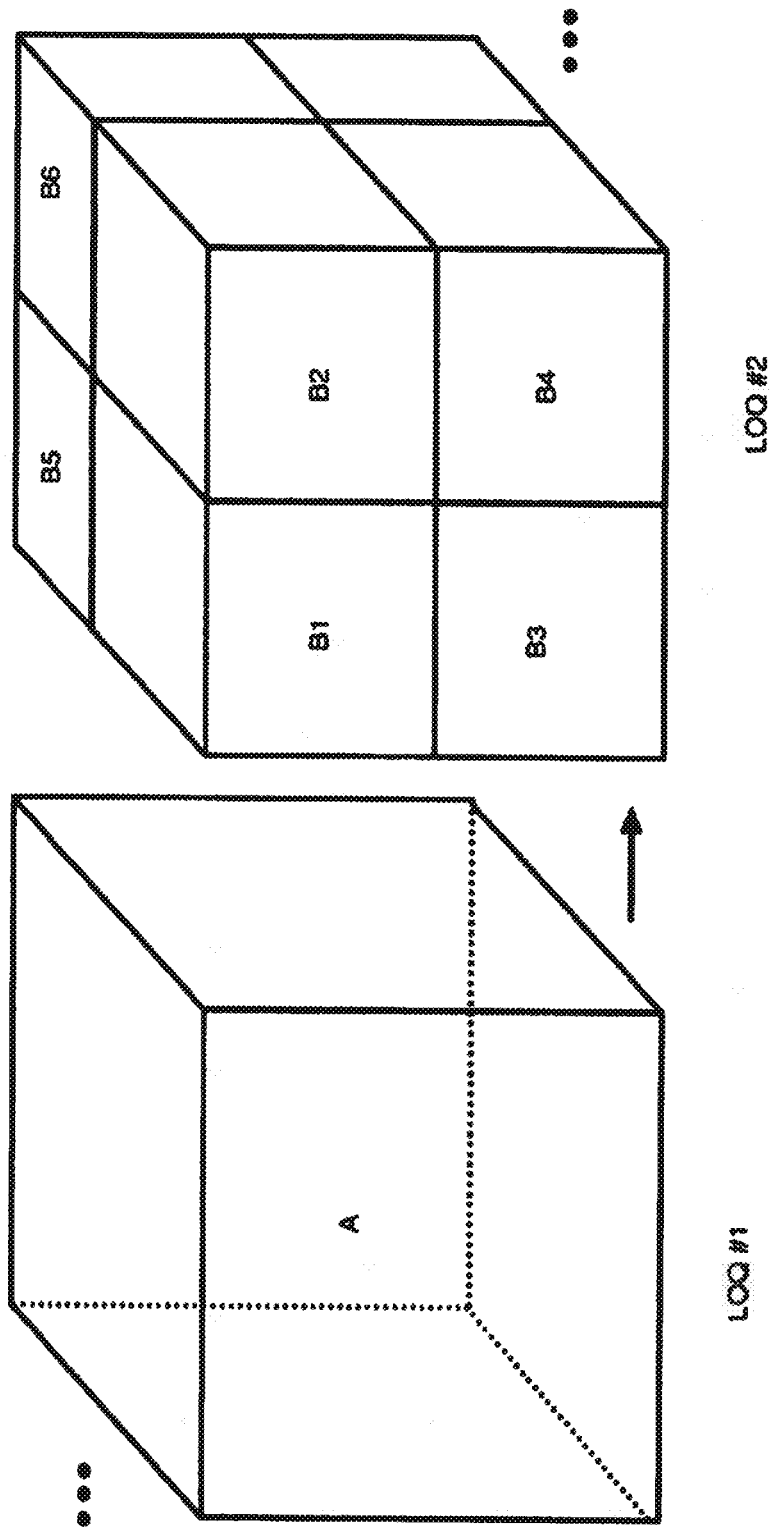
FIGS. 16 and 17 are diagrams illustrating reconstruction of a volumetric signal at different levels of quality via dividing of a parent element into sub-elements according to embodiments herein (incorporated from U.S. Pat. No. 8,977,065).
Figure 17:
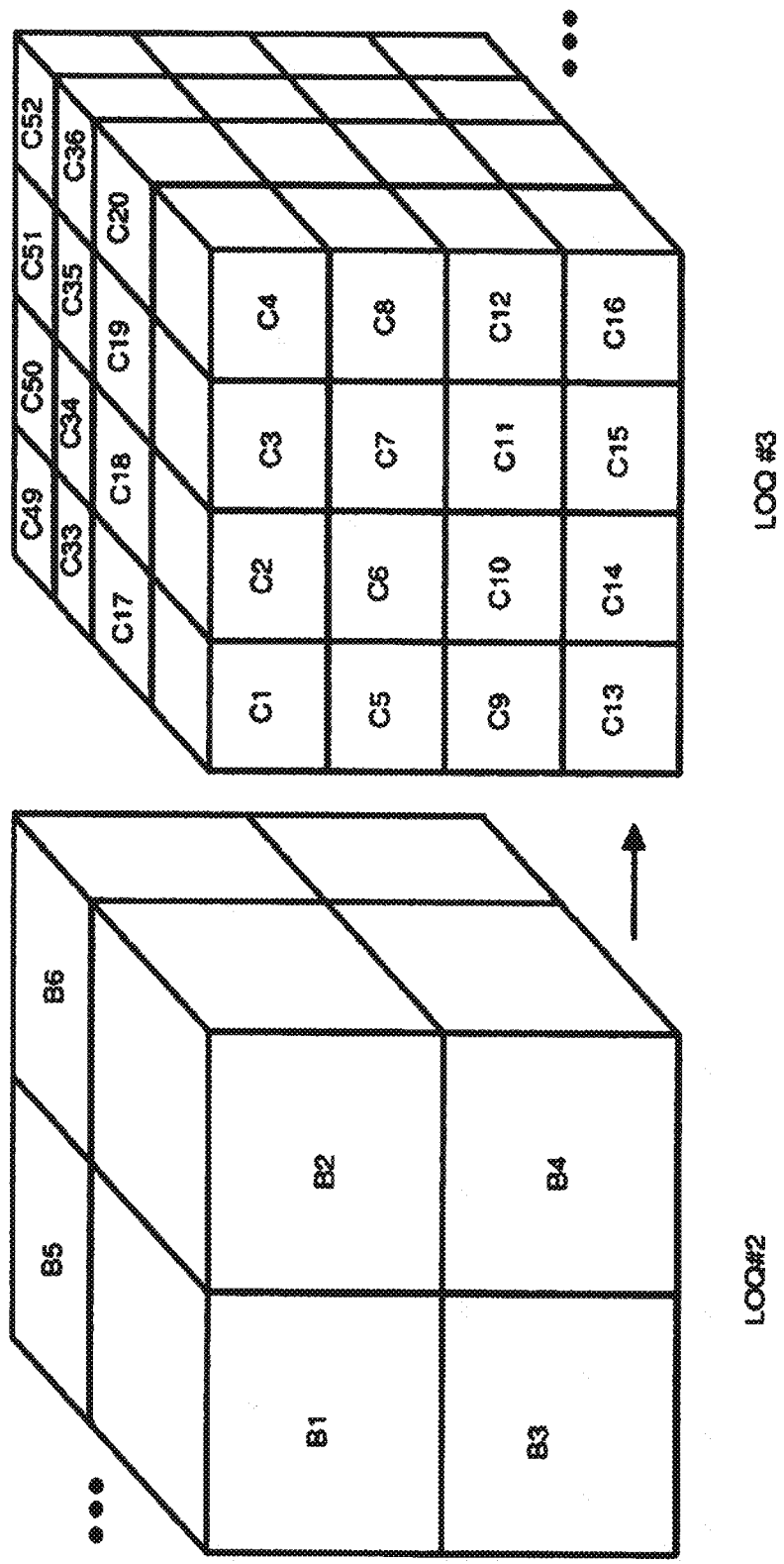

FIGS. 16 and 17 are example diagrams illustrating dividing of a respective element in a rendition of the signal at a lower level of quality into multiple sub-elements at a higher level of quality according to embodiments herein. (paragraph incorporated from U.S. Pat. No. 8,977,065).

For example, in FIG. 16, the signal processor 100-2 uses appropriate reconstruction data 150 to identify settings for volumetric element A. The signal processor 100-2 then subdivides the volumetric element A into multiple volumetric sub-elements including B1, B2, . . . , B8 (e.g., B-elements) as shown to produce a rendition of the signal at a next higher level of quality. The reconstruction data for level of quality #2 includes information enabling the signal processor 100-2 to produce appropriate setting information for each of the B-type volumetric elements into which the A-type volumetric element is subdivided. (paragraph incorporated from U.S. Pat. No. 8,977,065).

In FIG. 17, the signal processor 100-2 uses appropriate reconstruction data to produce settings for the type-C volumetric elements. For example, the signal processor 100-2 subdivides each type-B volumetric element into a corresponding set of multiple (e.g., eight in this example) type-C volumetric elements. The signal processor 100-2 subdivides all of the B-type elements results in C1, C2, . . . , C64 as shown to produce a rendition of the signal at a next higher level of quality. The reconstruction data for level of quality #3 includes information enabling the signal processor 100-2 to produce appropriate setting information for each of the type-C volumetric elements into which the type-B volumetric elements are subdivided. (paragraph incorporated from U.S. Pat. No. 8,977,065).

In this way, the signal processor 100-2 can reconstruct the signal at higher levels of quality. Thus, in one embodiment, every signal element at a lower level of quality is converted into multiple elements at a higher level of quality. As mentioned, reconstruction data indicates settings or adjustments to settings of the parent element A and which sub-elements (e.g., type B, type C elements, etc.) inherit settings of the parent element A. (paragraph incorporated from U.S. Pat. No. 8,977,065).

Figure 18:
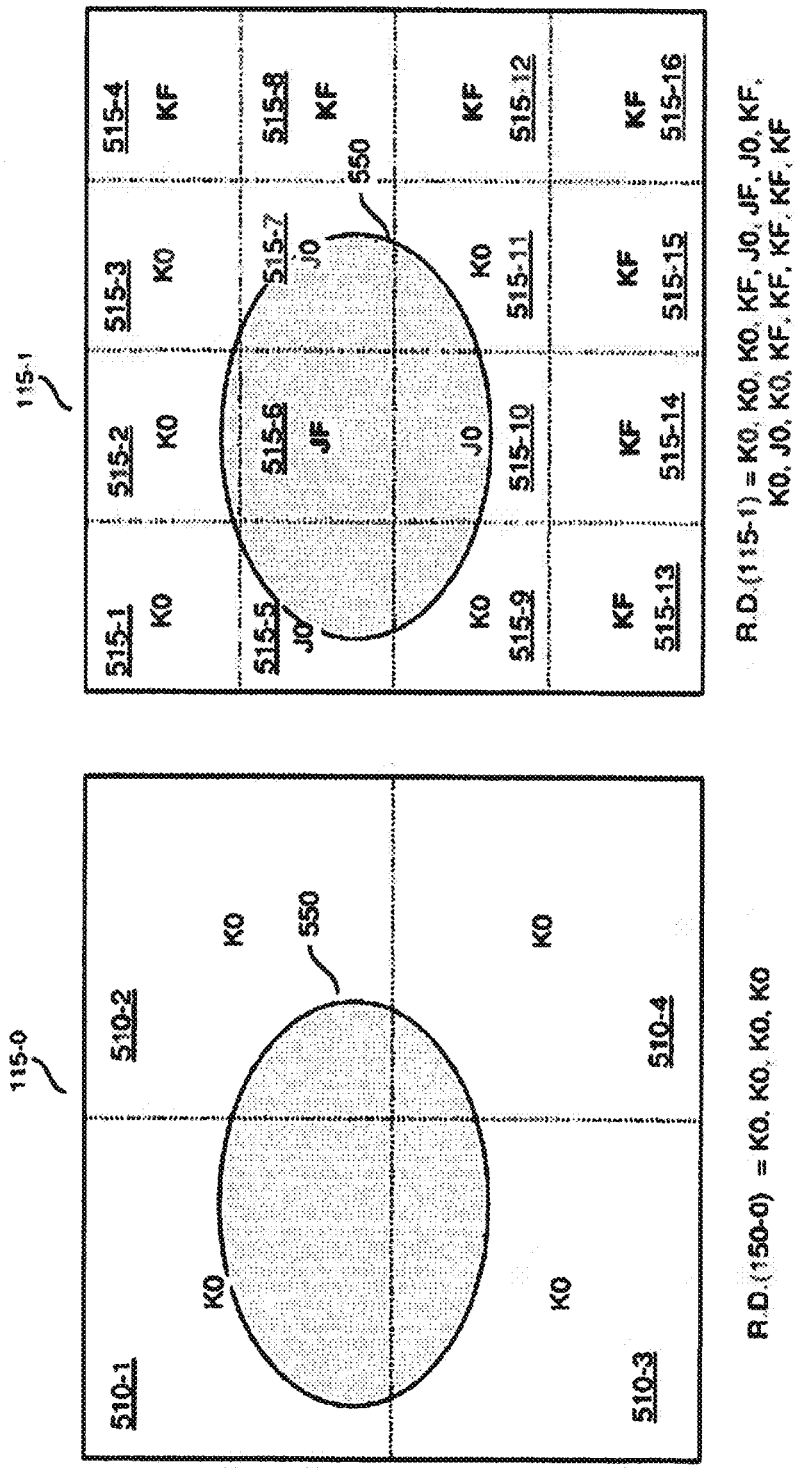
Figure 19:
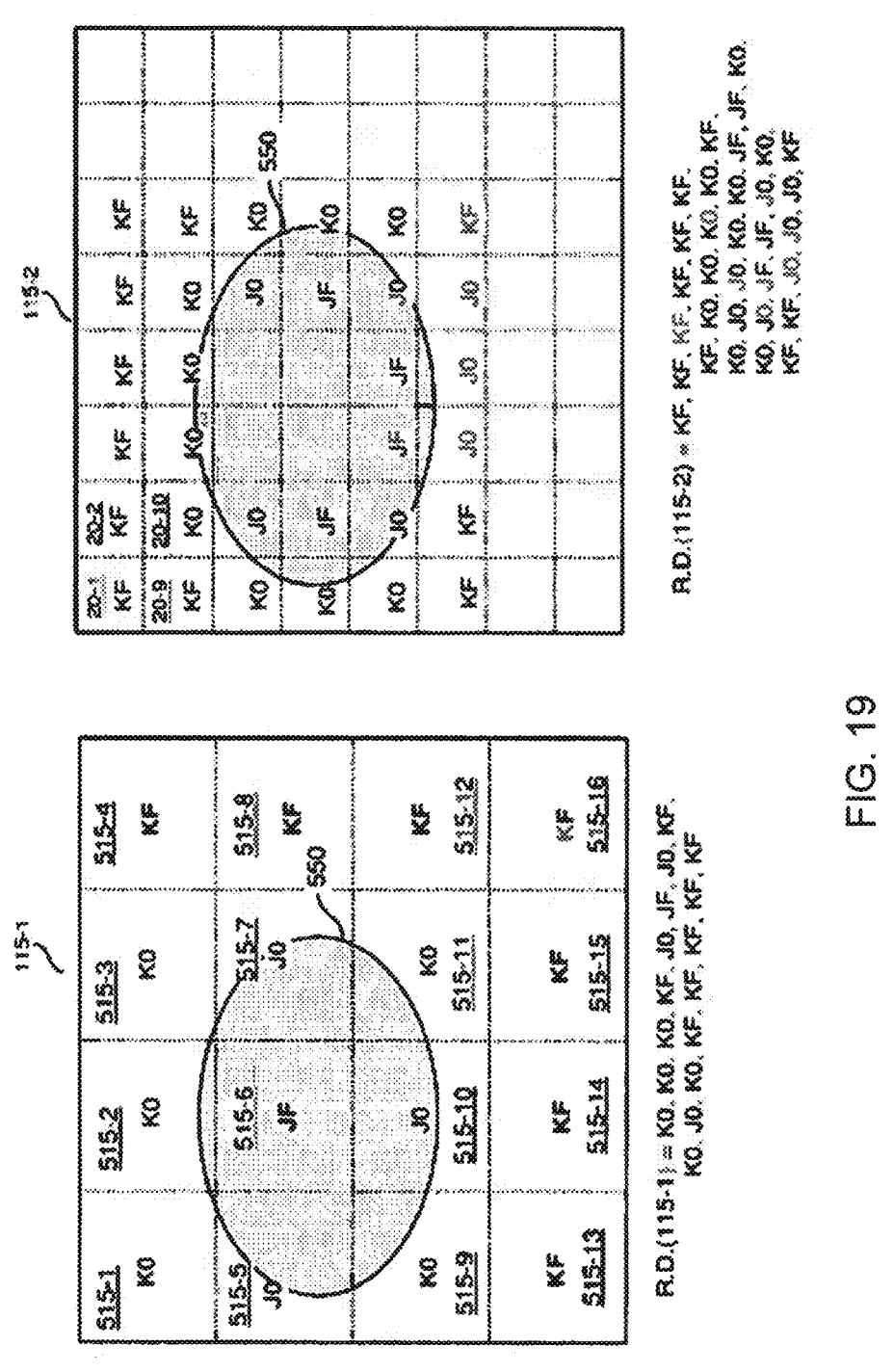

FIGS. 18 and 19 are example diagrams illustrating inheritance and non-inheritance of element settings up a hierarchy according to embodiments herein. (paragraph incorporated from U.S. Pat. No. 8,977,065).

As shown in FIG. 18, rendition of signal 115-0 at level of quality #0 includes element 510-1, element 510-2, element 510-3, and element 510-4. Note that the number of elements is shown by way of non-limiting example only and that the rendition of signal 115-0 can include any suitable number of elements. (paragraph incorporated from U.S. Pat. No. 8,977,065).

In one embodiment, each of the signal elements at a next higher level of quality occupies a portion of space completely included in a respective parent element. For example, each element in rendition of signal 115-0 is divided into multiple elements. (paragraph incorporated from U.S. Pat. No. 8,977,065).

Element 510-1 is a so-called parent element and divided into element 515-1, element 515-2, element 515-5, element 515-6 in rendition of signal 115-1. (paragraph incorporated from U.S. Pat. No. 8,977,065).

The other parent elements 510 are divided in a similar manner. For example, element 510-2 is a parent element divided into element 515-3, element 515-4, element 515-7, element 515-8 in rendition of signal 115-1. (paragraph incorporated from U.S. Pat. No. 8,977,065).

Element 510-3 is a parent element divided into element 515-9, element 515-10, element 515-13, element 515-14. (paragraph incorporated from U.S. Pat. No. 8,977,065).

Element 510-4 is a parent element divided into element 515-11, element 515-12, element 515-15, element 515-16. (paragraph incorporatedfrom U.S. Pat. No. 8,977,065).

In this example, assume that each of the elements fall into one of two classes—class J or class K. Class J indicates that the respective element belongs to region 550. Class K indicates that the respective element falls outside the region 550. Note that any number of suitable classes can be used to define attributes of the elements. Whether an element falls within class K or class J is merely one aspect defining attributes of a respective element. (paragraph incorporated from U.S. Pat. No. 8,977,065).

In one embodiment, a first set of one or more symbols indicate that a respective element resides within class J. A second set of one or more symbols indicate that a respective element resides within class K. (paragraph incorporated from U.S. Pat. No. 8,977,065).

Each symbol within a respective set of symbols for a given class can further define attributes of a respective element. For example, in one embodiment, assume that symbol JO indicates that the element associated with the symbol is part of class J but that any sub-elements into which the element is sub-divided at higher levels of quality may or may not belong to class J. That is, one or more sub-elements derived from a respective element associated with the symbol JO may be part of class K at a higher level of quality. Reconstruction data at a higher level can indicate which class each respective sub-element belongs. (paragraph incorporated from U.S. Pat. No. 8,977,065).

In one embodiment, symbol KO indicates that the element associated with the symbol is part of class K but that any sub-elements into which the element is sub-divided at higher levels of quality may or may not belong to class K. That is, one or more sub-elements derived from a respective element associated with the symbol KO may be part of class J at a higher level of quality. (paragraph incorporated from U.S. Pat. No. 8,977,065).

Thus, reconstruction data 150 can indicate that a parent element is part of a particular class and that sub-elements can be assigned to the same of different class than the parent element. (paragraph incorporated from U.S. Pat. No. 8,977, 065).

Another symbol in each set of symbols for a respective class can be reserved to indicate that the element and any sub-elements into which the respective element is divided will always inherit the same class as its parent element. (paragraph incorporated from US8,977, 065).

For example, the symbol JF can indicate that the respective element is assigned to class J as well as indicate that any sub-element (at any of one or more higher levels of quality) into which the element is divided at higher levels of quality will also belong to class J and that the value will not change. When assigned a value of JF, because it is known in which class each of the sub-elements will reside, it is no longer necessary to encode the reconstruction data for high levels of quality to indicate in which class each respective element resides as it is known that all the sub-elements are assigned to class J. (paragraph incorporated from U.S. Pat. No. 8,977,065).

The symbol KF can indicate that the respective element is assigned to class K as well as indicate that any sub-element (at any of one or more higher levels of quality) into which the element is divided at higher levels of quality will also belong to class K and that the value will not change. When assigned a value of KF, because it is known in which class each of the sub- elements will reside, it is no longer necessary to encode the reconstruction data for high levels of quality to indicate in which class each respective element resides as it is known that the sub-elements are assigned to class K. (paragraph incorporated from U.S. Pat. No. 8,977, 065).

Thus, the set of class J symbols can include symbol JO and symbol JF. Symbol JF indicates that all sub-elements inherit the class quality J from a respective parent element. (paragraph incorporated from U.S. Pat. No. 8,977,065).

The set of class K symbols can include symbol KO and symbol KF. Symbol KF indicates that all sub-elements inherit the class quality K from a respective parent element. (paragraph incorporated from U.S. Pat. No. 8,977,065).

Accordingly, a respective parent element can be called a "controlling" signal element to the extent that a setting of the parent element controls settings of one or more sub-elements at a higher level of quality. In other words, a respective symbol can specify that each of the multiple sub-elements and all further divisions of the multiple sub-elements into smaller sub-elements at higher levels of quality have been assigned a same attribute setting as indicated by the symbol assigned to the parent element at the first level of quality. (paragraph incorporated from U.S. Pat. No. 8,977,065).

Referring again to FIG. 18, assume that each element in the renditions of signal 115 defines whether the respective element falls within the region 550. The region 550 can be a specific portion of an image. (paragraph incorporated from U.S. Pat. No. 8,977,065).

As shown, the larger part of element 510-1 resides outside the boundary of region 550. The area within region 550 belongs to class J while the area outside region 550 belongs to class K. (paragraph incorporated from U.S. Pat. No. 8,977,065).

As shown, initially, in rendition of signal 115-0, each of the parent elements 510 falls for the larger part outside region 550, and all are thus assigned a symbol of KO since it is known that at least some sub-elements of any of these elements may change to class J at a higher level of quality. (paragraph incorporated from U.S. Pat. No. 8,977,065).

Reconstruction data used to produce rendition of signal 115-0 includes the string of symbols K0, K0, K0, and K0 to indicate that sub-elements into which the elements 510 may be divided may be assigned to class J or class K at a higher level of quality. Note again that the setting information for a sub-element derived from a parent element associated with symbol K0 can be the same or different from its parent element. (paragraph incorporated from U.S. Pat. No. 8,977, 065).

Reconstruction data 150-1 can include information indicating attributes of each element 515 in rendition of signal 115-1. The settings for sub-elements may be the same or different from the settings of the parent element. In this example, some of the elements 515 inherit the setting of respective parent elements 510. (paragraph incorporated from U.S. Pat. No. 8,977,065).

Certain settings of elements 515 in rendition of signal 115-1 indicate inheritance of signal information at a next higher level of quality. For example, based on a given element setting, it is possible that the decoder receives indication that its inherited value will not/cannot be modified any longer for the higher levels of the hierarchy. That is, a setting will be inherited by all the controlled signal elements in higher levels. Leveraging the respective inheritance operation defined for a chain of settings (e.g., in the non-limiting example described above, "carbon copy" of the value of the parent element), the decoder will be able to determine settings for each controlled signal elements (i.e., sub-elements derived from the parent element) up to the highest level of quality, without the need to send any additional information/adjustment. (paragraph incorporated from U.S. Pat. No. 8,977,065).

More specifically, it is known that element 515-6 in rendition of signal 115-1 and any sub-elements into which it can be divided at one or more higher levels of quality will always fall within class J because the entire element 515-6 resides within region 550. Thus, element 551-6 is assigned symbol JF. (paragraph incorporated from U.S. Pat. No. 8,977,065).

Additionally, it is known that each of elements 515-4, 515-8, 515-12, 515-13, 515-14, 515-15, and 515-16 in rendition of signal 115-1 and any sub-elements into which each of these elements can be divided at one or more higher levels of quality will always fall within class K because the entire portion of each respective parent element resides outside of region 550. Thus, reconstruction data 150-1 indicates that each of elements 515-4, 515-8, 515-12, 515-13, 515-14, 515-15, and 515-16 is assigned symbol KF. (paragraph incorporated from U.S. Pat. No. 8,977,065).

For any element assigned a value of JF or KF, the respective reconstruction data at higher levels of quality need not include redundant information to describe a setting of their respective controlled sub-elements. (paragraph incorporated from U.S. Pat. No. 8,977,065).

Note that each of elements 515-1, 515-2, 515-3, 515-5, 515-7, 515-9, 515-10, 515-11 reside on a boundary of region 550. In one embodiment, each of these respective elements is assigned a class value depending on whether the larger part of the respective element falls inside region 550 or not. Thus, each of elements 515-5, 515-7, and 515-10 are assigned symbol J0; each of elements 515-1, 515-2, 515-3, 515-9, and 515-11 are assigned symbol K0. (paragraph incorporated from U.S. Pat. No. 8,977,065).

Referring now to FIG. 19, each of the elements 515 in rendition of signal 115-1 is divided into multiple sub-elements (e.g., four sub-elements) to create rendition of signal 115-2. As mentioned, the settings for each sub-element can be inherited from the parent element or can be assigned a different value as indicated by the respective reconstruction data for the level of quality. (paragraph incorporated from U.S. Pat. No. 8,977,065).

As an example, element 515-1 is divided into sub-elements 20-1, 20-2, 20-9, and 20-10. Each of the other elements 515 is subdivided in similar manner as shown to produce sub-elements in rendition of signal 115-2. (paragraph incorporated from U.S. Pat. No. 8,977,065).

Sub-elements in rendition of signal 115-2 as derived from element 515-4 inherit symbol settings of the parent element 515-4 because the element 515-4 is assigned a value of KF. For example, these sub-elements derived from element 515-4 are known to belong to class K because of assignment of the symbol KF to element 515-4. The reconstruction data for rendition of signal 115-2 does not include setting information (e.g., the element is left blank, no information bits are wasted) because the sub-elements derived from element 515-4 inherit the settings of the parent element 515-4. In a similar manner, there is no class setting information in reconstruction data 150-2 for sub-elements derived from elements 515-6, 515-8, 515-12, 515-13, 515-14, 515-15 and 515-16 since the class setting information for each derived sub-element is inherited from the respective class of the parent element. (paragraph incorporated from U.S. Pat. No. 8,977,065).

Reconstruction data 150-2 includes class setting information for sub-elements 20-1, 20-2, 20-9, and 20-10 derived from element 515-1. For example, each of elements 20-1, 20-2, and 20-9 is assigned a symbol KF to indicate that these elements and any sub-elements derived from these elements at higher levels of quality are to be assigned a value of class K. Because element 20-10 includes a portion of region 550 but is predominantly outside of region 550, the element 20-10 is assigned a symbol K0. (paragraph incorporated from U.S. Pat. No. 8,977,065).

In a similar manner, each of the other elements 515 is subdivided and assigned symbols as shown. Inheritance (or non-inheritance) of settings from one level in the hierarchy to the next one or more higher levels can help to define coarse versus fine attributes of the signal through the levels of quality. (paragraph incorporated from U.S. Pat. No. 8,977,065).

In one embodiment, an entropy encoder (with different appropriate settings that indicate the probability distribution of the different symbols) is used in order to encode and transmit the string of different symbols to a decoder. The distribution of probabilities (also subject to inheritance from lower levels) can be modified/updated for specific levels of quality by transmitting appropriate information. In other words, reconstruction data to reconstruct the signal at each of multiple higher levels of quality can indicate a probability distribution of the multiple symbols (e.g., as selected from a first set of symbols, a second set of symbols, etc.) in each set of reconstruction data 150. (paragraph incorporated from U.S. Pat. No. 8,977,065).

Figure 20:
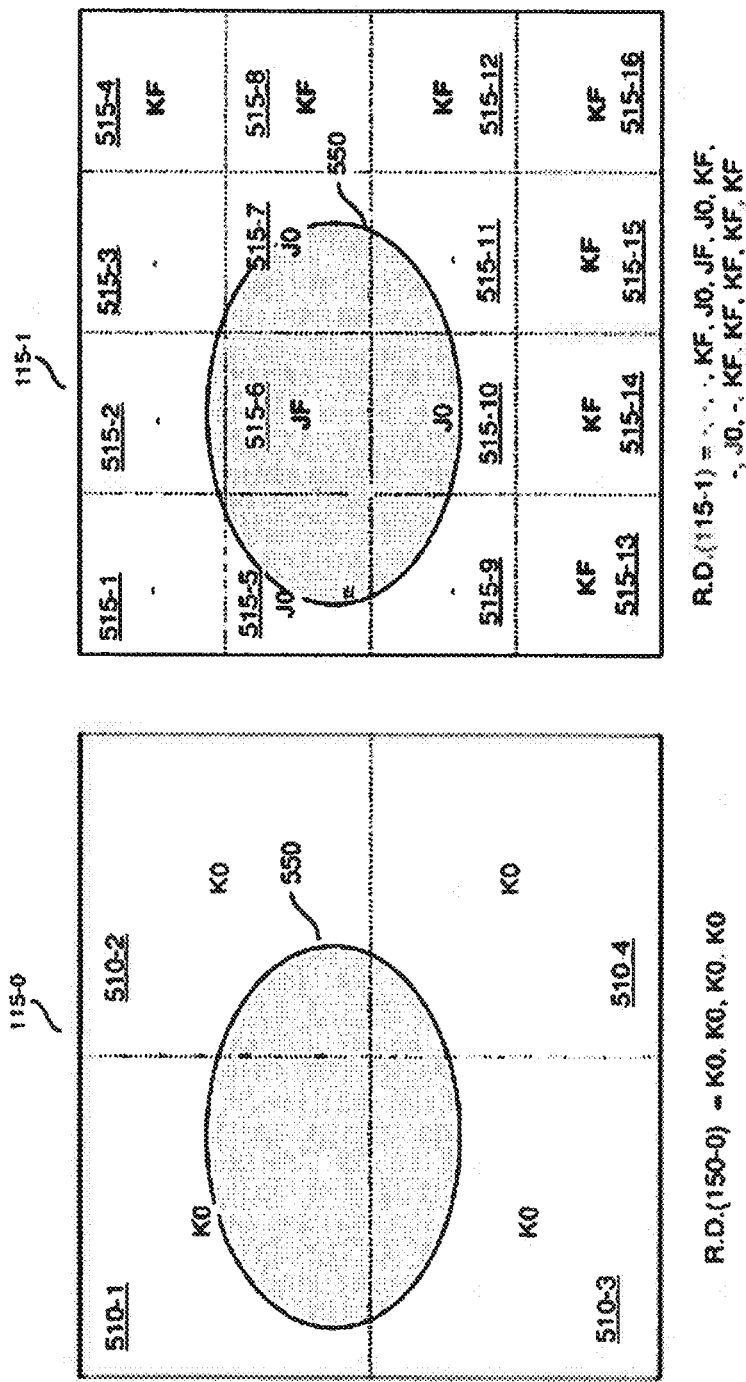
Figure 21:
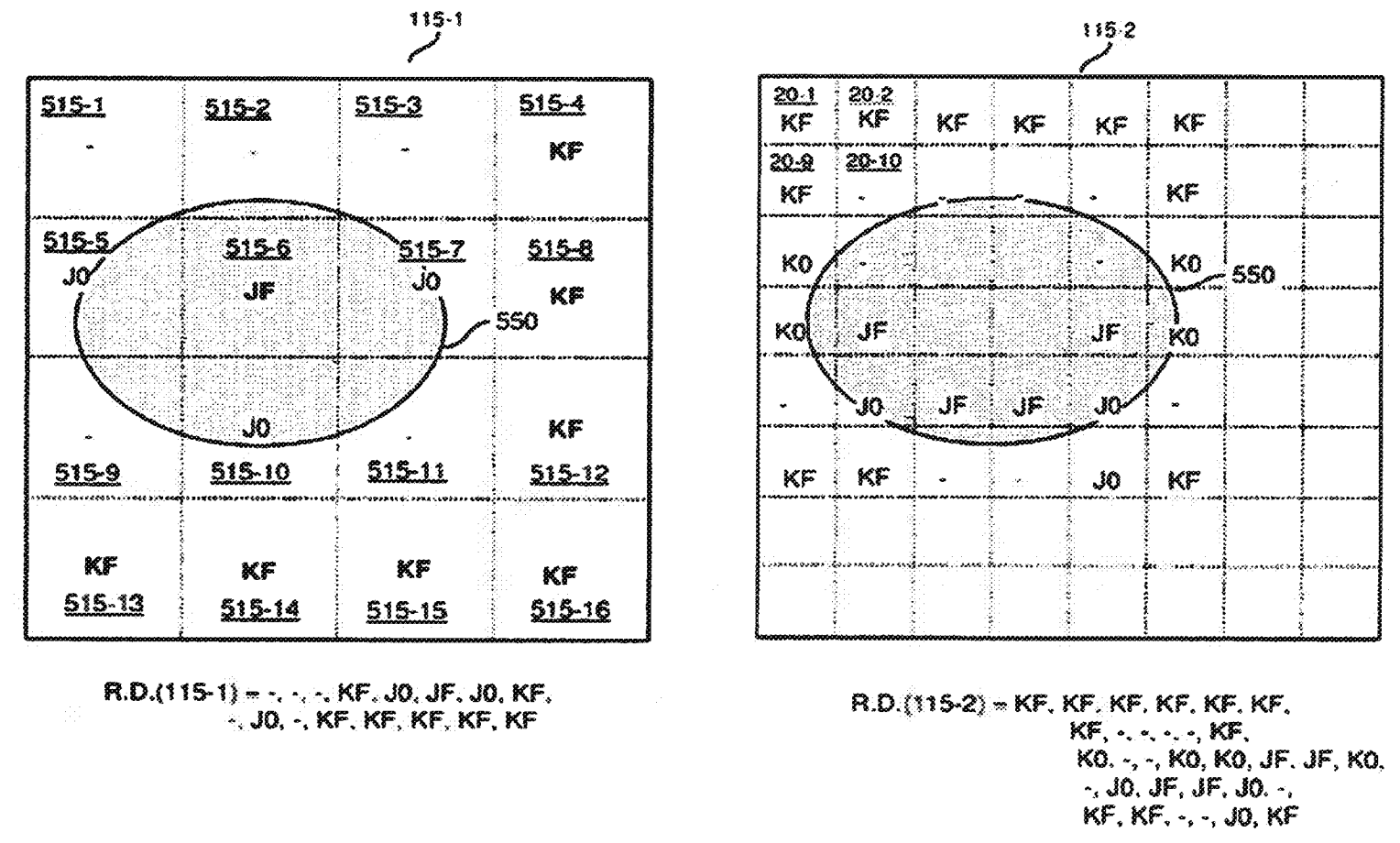

FIGS. 20 and 21 illustrate inheritance of settings according to different embodiments herein. In accordance with this example embodiment, a "-" symbol indicates that a respective element (e.g., parent element, sub-element, etc.) inherits the same setting as its corresponding parent element for a given parameter. (paragraph incorporated from U.S. Pat. No. 8,977,065).

For example, element 510-1 is subdivided into sub-elements 515-1, 515-2, 515-5, and 515-6 in a similar manner as previously discussed. Instead of assigning a value of K0 to each of element 515-1 and 515-2 as in the last example, an encoder assigns the value "-" or no symbol to each of these elements to produce the string of reconstruction data as shown. As mentioned, the "-" or no symbol in the string of reconstruction data indicates to the decoder that the respective sub-element inherits the same setting as its parent element or the last known setting in the lineage back to the parent element. That is, each of elements 515-1 and 515-2 inherits the symbol K0 from the parent element 510-1. As shown, and as previously discussed, certain sub-elements (e.g., sub-element 515-5 and 515-6) are assigned a different class from the respective parent element. FIG. 21 further illustrates use of the inheritance marker in lieu of using the same symbol as the parent. (paragraph incorporated from U.S. Pat. No. 8,977,065).

FIG. 22 is an example diagram illustrating another example of reconstruction data and dividing a parent element into multiple sub-elements according to further embodiments herein. (paragraph incorporated from U.S. Pat. No. 8,977,065).

In accordance such an embodiment, instead of indicating a class type in the above example, the settings assigned to a respective element can indicate an adjustment value selected from a range of possible values such as a value between −255 and +255, step=1. Each adjustment value in the range can be assigned a corresponding symbol to represent the adjustment value. Each symbol therefore represents a different adjustment value. (paragraph incorporated from U.S. Pat. No. 8,977,065).

Embodiments herein can include assigning a symbol for each of the adjustment values −255, −254, −253, . . . −1, 0, 1, 2, 3, . . . 255. Assignment of an adjustment value in this range indicates that the adjustment value for respective sub-elements may be the same or different from a respective parent element associated with one of these symbols. (paragraph incorporated from U.S. Pat. No. 8,977,065).

In other words, the symbol indicates an adjustment value and any sub-elements derived from the parent element do not necessarily inherit the same setting as the parent element. (paragraph incorporated from U.S. Pat. No. 8,977,065).

One embodiment herein includes generating a duplicate or second set of adjustment values for the given range. For example, each adjustment value in the second set can be assigned a respective unique symbol. Similar to the symbols as discussed above, each symbol in the second set indicates a magnitude of the adjustment value as well as polarity. However, symbols in the second set also indicate that all respective sub-elements derived at one or more higher levels of quality from the parent element inherit the same adjustment setting (or final value) as the parent. More specifically, each of elements 910 in rendition of signal 115-0 have been assigned a respective adjustment as indicated by reconstruction data 150-0 (e.g., a string of symbols). Any adjustment value that has an "F" following the integer value indicates that all sub-elements derived from the respective parent element have been assigned the same adjustment as their respective parent element. In such cases, the reconstruction data at higher levels of quality does not include redundant information indicating the setting. (paragraph incorporated from U.S. Pat. No. 8,977,065).

Alternatively, when assigned an adjustment value from the first set of symbols, the reconstruction data at higher levels of quality can indicate specific settings for the sub-elements derived from a respective parent element, without a definitive inheritance by all sub-elements derived from the respective parent element. As mentioned above, note that embodiments herein can include use of particular symbol such as a "-" symbol to indicate that a respective sub-element inherits the same value as the parent element in a similar manner as discussed above. (paragraph incorporated from U.S. Pat. No. 8,977,065).

In this example, parent element 910-1 has been assigned an adjustment value of 10; parent element 910-2 has been assigned an adjustment value of 8F; parent element 910-3 has been assigned an adjustment value of 0F; parent element 910-4 has been assigned an adjustment value of 0. (paragraph incorporated from U.S. Pat. No. 8,977,065).

Because the element 910-2 includes an adjustment value 8F from the second set of symbols, each of sub-elements 915-3, 915-4, 915-7, and 915-8 (and sub-elements and further subdivisions within element 910-2 at higher levels of quality) inherit the adjustment value 8. As shown, reconstruction data at higher levels of quality do not need to include information (e.g., symbols) for the settings of sub-elements 915-3, 915-4, 915-7, and 915-8 into which the parent element is derived because it is known to the decoder that the sub-elements inherit the same value as the parent. In a similar manner, each of elements 915-9, 915-10, 915-13, and 915-14 inherit the same adjustment value (i.e., 0) as their respective parent element 910-3 because the parent element has been assigned a value of 0F. (paragraph incorporated from U.S. Pat. No. 8,977,065).

Conversely, parent element 910-1 is assigned an adjustment value of 10; parent element 910-4 is assigned an adjustment value of 0. Each of the sub-elements derived from these parent elements can be assigned a same or different adjustment value than a symbol assigned to the parent. (paragraph incorporated from U.S. Pat. No. 8,977,065).

In this example, sub-element 915-1 is assigned an adjustment value 0F since it is known that every sub-element derived from or contained within the element 915-1 will be assigned a value of 0. Each of elements 915-2, 915-5, and 915-6 are symbols selected from the first set to indicate that the values for respective sub-elements at higher levels of quality may be different than a setting of the sub-element (which becomes a parent element to other sub-elements at a higher level of quality). (paragraph incorporated from U.S. Pat. No. 8,977,065).

Thus, in accordance with further embodiments, a first group of symbols can include multiple symbols indicating a range of adjustment values. A second group of symbols can include multiple symbols duplicating the range of adjustment values in the first group. The symbols in either group can be assigned to an element to indicate an adjustment with respect to a current setting of the element. However, assignment of a symbol in the first group can indicate an adjustment as well as indicate that any subdivisions of a parent element into sub-elements inherit the same symbol as the parent element unless setting information in reconstruction data at a higher level of quality indicates differently. (paragraph incorporated from U.S. Pat. No. 8,977,065).

Assignment of a symbol in the second group indicates an adjustment and that any subdivisions of a parent element into sub-elements are necessarily assigned the same symbol as the parent element, so that the reconstruction data at one or more higher levels of quality will never indicate a different setting than the parent element. Accordingly, in this instance, there is no need to encode reconstruction data to include setting information for each sub-element. (paragraph incorporated from U.S. Pat. No. 8,977,065).

Thus, a symbol assigned to a parent element can be selected from multiple symbols, each symbol in a first set of the multiple symbols configured to indicate a different respective adjustment value in a range of adjustment values, each symbol in a second set of adjustment values configured to indicate different respective adjustment values in the range. As mentioned, assignment of a respective symbol in the first set of symbols can indicate that each of the multiple sub-elements and all further divisions of the multiple sub-elements derived from the parent element into smaller sub-elements at higher levels of quality may be assigned different symbols, as specified by symbols in strings of reconstruction data indicating how to reconstruct the signal at levels of quality higher than the first level of quality. (paragraph incorporated from U.S. Pat. No. 8,977,065).

Assignment of a respective symbol in the second set of symbols indicates that each of the multiple sub-elements and all further divisions of the multiple sub-elements derived from the parent element into smaller sub-elements at higher levels of quality are assigned the same value as the respective symbol, and that strings of reconstruction data to reconstruct the signal at levels of quality higher than the first level of quality do not include a transmission or duplication of the respective symbol. (paragraph incorporated from U.S. Pat. No. 8,977,065).

In addition to specifying an attribute such as class type, adjustment value, etc., a symbol indicating inheritance can indicate to the signal processor 100-2 which elements, sub-elements, etc., will no longer include respective reconstruction data for a given parameter. For example, in one embodiment, assignment of a symbol (indicating inheritance) indicates that reconstruction data to reconstruct the signal at higher levels of quality will not include information indicating a class type to which any sub-elements derived from the parent belong and that the sub-elements are assigned to a type as indicated by the symbol. The decoder keeps track of such locations when decoding a respective string of reconstruction data to identify settings for sub-elements that do not inherit the same value as the parent element. (paragraph incorporated from U.S. Pat. No. 8,977,065).

As mentioned, use of inheritance symbols significantly reduces an amount of data needed to reconstruct a signal at one or more levels of quality. (paragraph incorporated from U.S. Pat. No. 8,977,065).

FIG. 14 is an example block diagram of a computer system 800 that provides computer processing according to embodiments herein. (paragraph incorporated from U.S. Pat. No. 8,977,065).

Computer system 800 can be or include a computerized device such as a personal computer, processing circuitry, television, playback device, encoding device, workstation, portable computing device, console, network terminal, processing device, network device, operating as a switch, router, server, client, etc. (paragraph incorporated from U.S. Pat. No. 8,977,065).

Note that the following discussion provides a basic embodiment indicating how to carry out functionality associated with signal processor 100-1 and/or signal processor 100-2 as previously discussed. However, it should be noted that the actual configuration for carrying out the operations as described herein can vary depending on a respective application. (paragraph incorporated from U.S. Pat. No. 8,977,065).

As shown, computer system 800 of the present example includes an interconnect 811 providing communication with computer readable storage media 812 such as a non-transitory type of media, computer readable, hardware storage medium, etc., in which digital information can be stored and retrieved. (paragraph incorporated from U.S. Pat. No. 8,977,065).

Computer system 800 can further include a processor 813, I/O interface 814, and a communications interface 817. (paragraph incorporated from U.S. Pat. No. 8,977,065).

In one embodiment, I/O interface 814 provides connectivity to repository 180, and if present, display screen, peripheral devices 816 such as a keyboard, a computer mouse, etc. (paragraph incorporated from U.S. Pat. No. 8,977,065).

As briefly mentioned above, computer readable storage medium 812 (e.g., a computer readable hardware storage media) can be any suitable device and/or hardware such as memory, optical storage, hard drive, floppy disk, etc. In one embodiment, the computer readable storage medium is a non-transitory storage media (i.e., non-carrier wave media) configured to store instructions associated with signal processor application 840-1. The instructions are executed by a respective resource such as signal processor 840-1 to perform any of the operations as discussed herein. (paragraph incorporated from U.S. Pat. No. 8,977,065).

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180. (paragraph incorporatedfrom US8,977,065).

As shown, computer readable storage media 812 can be encoded with signal processor application 840-1 executed by processor 813 as process 840-2. (paragraph incorporated from U.S. Pat. No. 8,977,065).

Note that the computer system 800 can be embodied to include a computer readable storage medium 812 (e.g., a hardware storage media, non-transitory storage media, etc.) for storing data and/or logic instructions. (paragraph incorporated from U.S. Pat. No. 8,977,065).

Computer system 800 can include a processor 813 to execute such instructions and carry out operations as discussed herein. Accordingly, when executed, the code associated with signal processor application 840-1 can support processing functionality associated with signal processors 100 and/or other resources as discussed herein. (paragraph incorporated from U.S. Pat. No. 8,977,065).

During operation of one embodiment, processor 813 accesses computer readable storage media 812 via the use of interconnect 811 in order to launch, run, execute, interpret or otherwise perform the instructions of signal processor application 840-1 stored in computer readable storage medium 812. Execution of the signal processor application 840-1 produces processing functionality in processor 813. In other words, the signal processor process 840-2 associated with processor 813 represents one or more aspects of executing signal processor application 840-1 within or upon the processor 813 in the computer system 800. (paragraph incorporated from U.S. Pat. No. 8,977,065).

Those skilled in the art will understand that the computer system 800 can include other processes and/or software and hardware components, such as an operating system or other software that controls allocation and use of hardware processing resources to execute signal processor application 840-1. (paragraph incorporated from U.S. Pat. No. 8,977,065).

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device. (paragraph incorporated from U.S. Pat. No. 8,977,065).

Figure 24:
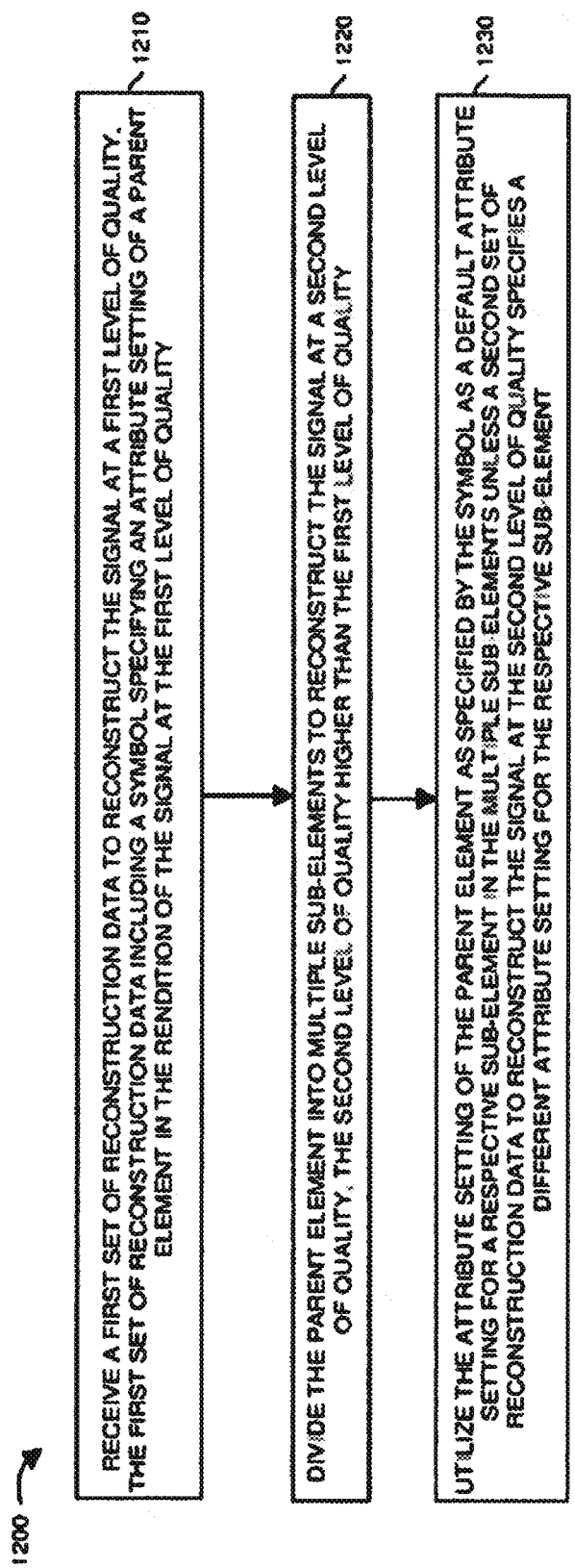
FIG. 24 is an example flowchart illustrating a method of generating and utilizing inheritance techniques according to embodiments herein (incorporated from U.S. Pat. No. 8,977,065).

FIG. 24 is an example flowchart 1200 illustrating a method of generating and utilizing a metric upsample according to embodiments herein. (paragraph incorporated from U.S. Pat. No. 8,977,065).

In step 1210, the signal processor 100-2 receives a first set of reconstruction data to reconstruct the signal at a first level of quality. The first set of reconstruction data includes a symbol specifying an attribute setting of a parent element in the rendition of the signal at the first level of quality. (paragraph incorporated from U.S. Pat. No. 8,977,065).

In step 1220, the signal processor 100-2 divides the parent element into multiple sub-elements to reconstruct the signal 115 at a second level of quality, the second level of quality higher than the first level of quality. (paragraph incorporated from U.S. Pat. No. 8,977,065).

In step 1230, the signal processor 100-2 utilizes the attribute setting of the parent element as specified by the symbol as a default attribute setting for at least one respective sub-element of the multiple sub-elements (into which the parent element was subdivided) unless or until a second set of reconstruction data (e.g., reconstruct data at any higher level of quality) to reconstruct the signal at the second level of quality specifies a different attribute setting for the respective sub-element. (paragraph incorporated from U.S. Pat. No. 8,977,065).

Figure 25:
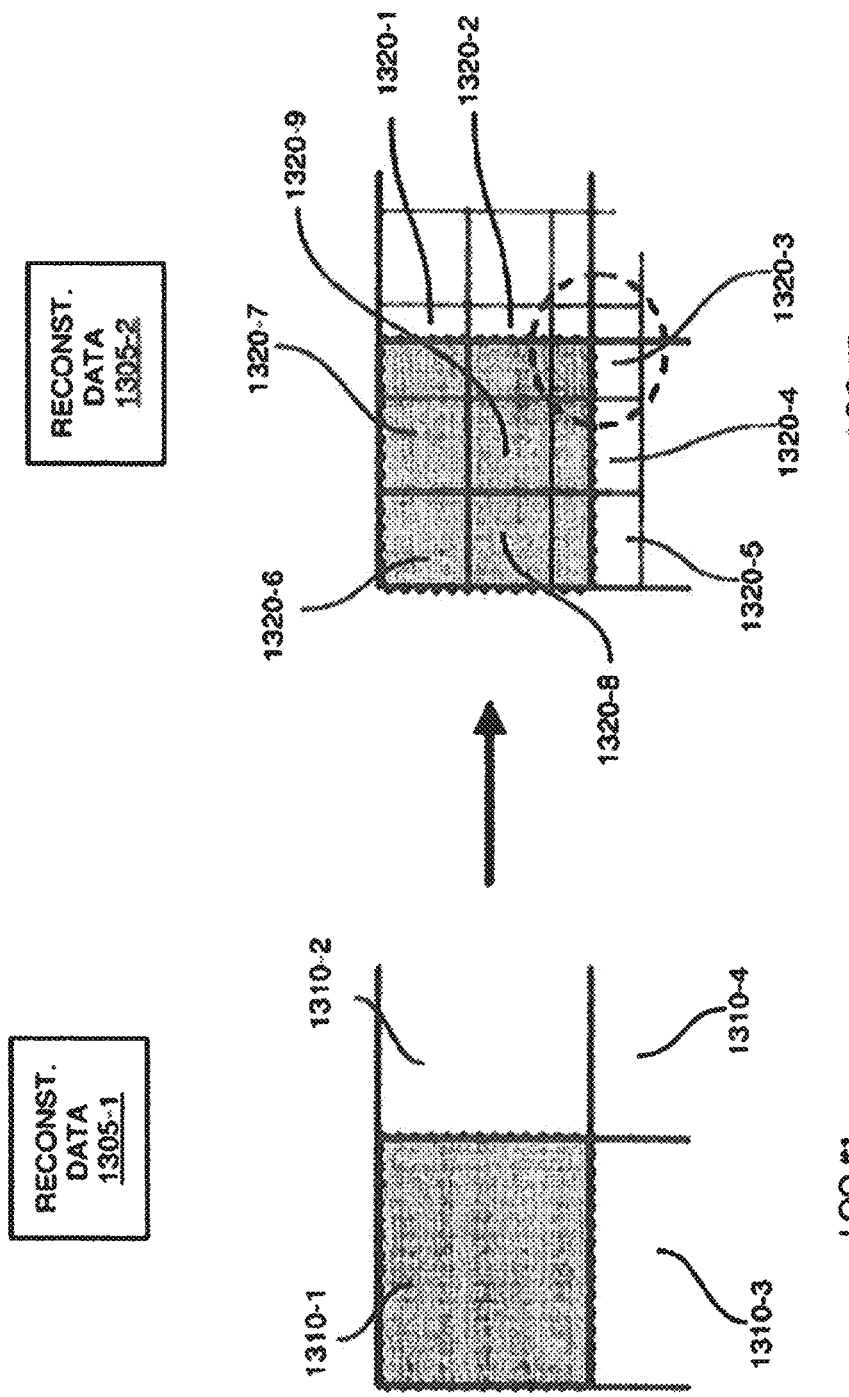
FIG. 25 is an example diagram illustrating upsampling according to embodiments herein (incorporated from U.S. Pat. No. 8,977,065).

FIG. 25 is an example diagram illustrating upsampling of an element into multiple elements using a non-integer scale factor according to embodiments herein. (paragraph incorporated from U.S. Pat. No. 8,977,065).

As shown, elements 1310 are upsampled from one level of quality to the next level of quality. In this example, the elements 1310 are divided up into multiple sub-elements 1320. Four of the sub-elements 1320 are full sized and conditionally inherit properties of the parent element 1310-1 in a manner as discussed above. For example, sub-elements 1320-6, 1320-7, 1320-8, and 1320-9 can inherit setting information from the respective parent element 1310-1. (paragraph incorporated from U.S. Pat. No. 8,977,065).

Note that element 1320-3 resides at an intersection of parent element 1310-1, parent element 1310-2, parent element 1310-3, and parent element 1310-4. Note that sub-elements 1320-1 and 1320-2 reside at an intersection of parent elements 1310-1 and 1310-2. Sub-elements 1320-4 and 1320-5 reside at an intersection of parent elements 1310-1 and 1310-3. (paragraph incorporated from U.S. Pat. No. 8,977,065).

In this example embodiment, reconstruction data for level of quality #1 indicates attribute settings for each parent element 1310. For example, reconstruction data 1305-1 includes one or more symbols specifying settings of parent element 1310-1 in a rendition of the signal at a first level of quality; reconstruction data 1305-1 includes one or more symbol specifying settings of parent element 1310-2; reconstruction data 1305-1 includes one or more symbols specifying settings of parent element 1310-3; reconstruction data 1305-1 includes one or more symbols specifying settings of parent element 1310-4; and so on. (paragraph incorporated from U.S. Pat. No. 8,977,065).

During reconstruction of the signal at the level of quality #2, the signal processor 100-2 divides the parent elements 1310 into multiple sub-elements 1320 as shown. The sub-element 1320-3 of the multiple sub-elements 1320 includes a portion of parent element 1310-1, 1310-2, 1310-3, and 1310-4. In one embodiment, because the sub-element 1320-3 does not fully reside in any one parent element, the signal processor 100-2 derives an attribute setting for the sub-element 1320-3 based on one or more settings (e.g., symbols) associated with parent element 1310-1, one or more settings (e.g., symbols) associated with parent element 1310-2, one or more settings (e.g., symbols) associated with parent element 1310-3, and one or more settings (e.g., symbols) associated with 1310-4. (paragraph incorporated from U.S. Pat. No. 8,977,065).

In one embodiment, inheritance of settings for element 1320-3 are calculated as an average of the settings derived for a set of parent elements including parent element 1310-1, parent element 1310-2, parent element 1310-3, and parent element 1310-4. (paragraph incorporated from U.S. Pat. No. 8,977,065).

In accordance with another embodiment, the sub-element 1320-3 inherits the attribute settings of one of the parent elements depending on which parent element has more area or volume in common with the sub-element 1320-3. In this example, the sub-element 1320-3 inherits settings of parent element 1310-3. (paragraph incorporated from U.S. Pat. No. 8,977,065).

Joint inheritance of settings can vary depending on the embodiment. (paragraph incorporated from U.S. Pat. No. 8,977,065).

For example, in accordance with one embodiment, a decoder can be configured to apply, to each signal element in the higher level, a blending of inherited setting information (e.g., weighted average) from the different parent elements that influence control over it. That is, each of sub-element 1320-5 and sub-element 1320-4 can be configured to inherit settings information derived from a combination of settings associated with parent element 1310-3 and parent element 1310-1; each of sub-element 1320-1 and sub-element 1320-2 can be configured to inherit settings information derived from a combination of settings associated with parent element 1310-2 and parent element 1310-1; sub-element 1320-3 can be configured to inherit settings information derived from a combination of settings associated with parent element 1310-1, 1310-2, 1310-3, and 1310-4. (paragraph incorporated from U.S. Pat. No. 8,977,065).

Figure 26:
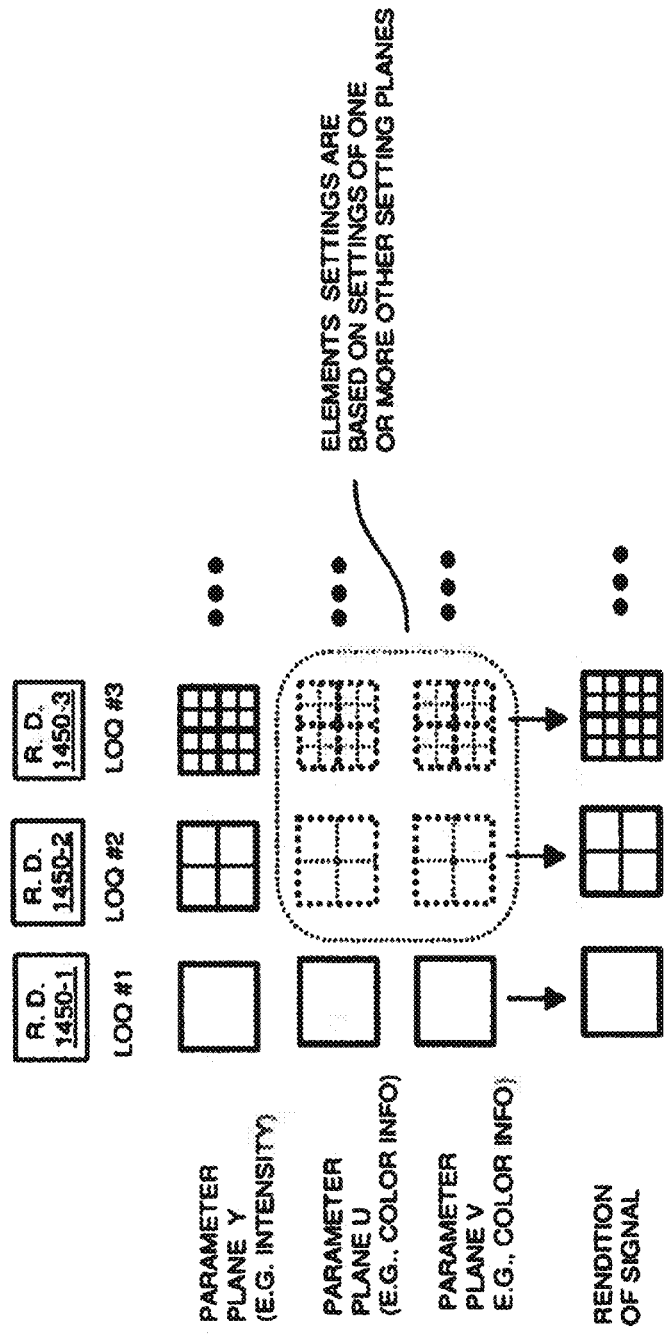
FIG. 26 is an example diagram illustrating inheritance from other planes according to embodiments herein (incorporatedfrom U.S. Pat. No. 8,977,065).

FIG. 26 is an example diagram illustrating cross inheritance among different setting planes according to embodiments herein. (paragraph incorporated from U.S. Pat. No. 8,977,065).

For example, the signal processor 100-2 can be configured to look at other planes of setting information for the signal element and produce setting information for a given plane based on one or more other planes of setting information (e.g., for tissue type properties in a volumetric medical image it might take the value of the signal element with the most similar color), so that the encoder eliminates the need to sending residuals for all of the different planes. (paragraph incorporated from U.S. Pat. No. 8,977,065).

More specifically, reconstruction data 1450-1 can specify inheritance and settings information associated with level of quality #1; reconstruction data 1450-2 can specify inheritance and settings information associated with level of quality #2; reconstruction data 1450-3 can specify inheritance and settings information associated with level of quality #3; and so on. (paragraph incorporated from U.S. Pat. No. 8,977,065).

In this example embodiment, the rendition of signal for each level of quality is based on separate YUV color plane information (e.g., parameter plane Y, parameter plane U, and parameter plane V). (paragraph incorporated from U.S. Pat. No. 8,977,065).

Assume in this example that there is a correlation between the Y plane (typically the most important for the human eye) and the other two planes U and V. In this instance, many borders and transitions are common. As a consequence, when reconstructing the signal at higher levels of quality of the settings for plane U and plane V (i.e., when inheriting the settings of the lower levels), it is useful to "follow the transitions" defined in the Y plane. In this way, it is possible to define the U and V plane with coarser level of detail (i.e., avoiding to send residual data for the highest levels of quality), but still reconstruct the color transitions in the right image elements even for higher levels of quality. (paragraph incorporated from U.S. Pat. No. 8,977,065).

Accordingly, settings for sub-elements for a given one or more plane (e.g., plane U and plane V) can be derived from settings associated with another controlling plane of information. For example, reconstruction data 1450 can encoded to include parameter plane Y information as discussed herein using inheritance. Because it is known that the settings associated with the sub-elements in the parameter plane U and the parameter plane V are similar to or follow the changes to parameter plane Y, the decoder can be configured to derive a setting value for sub-elements in parameter plane U and/or parameter plane V based on settings for parameter plane Y in lieu of directly receiving attribute setting information for these planes from the reconstruction data. The reconstruction data can include symbols that indicate to the decoder to derive setting information for the parameter plane U and/or parameter plane V based on the settings for parameter plane Y. (paragraph incorporated from U.S. Pat. No. 8,977,065).

Thus, inheritance of information can occur within a respective plane from a parent element to one or more sub-elements. That is, the sub-elements in level of quality #2 can inherit from the parent element in plane Y. Each further sub-element can inherit settings as discussed herein. Inheritance of information also can be across planes as opposed to merely within a given plane. That is, settings for sub-elements at level of quality #2 for plane U can be derived from setting information of the sub-element in level of quality #2 inherited from plane Y; settings for sub-elements at level of quality #2 for plane V can be derived from setting information of the sub-element in level of quality #2 inherited from plane Y, and so on. (paragraph incorporated from U.S. Pat. No. 8,977,065).

Thus, according to embodiments herein, the attribute setting of a parent element as specified by a symbol can be a first setting plane amongst multiple types of setting planes associated with each of the parent element. The signal processor 100-2 can be configured to derive one or more first plane setting values for sub-elements derived from the parent element. The signal processor can be configured to derive setting values for a second setting plane for the respective sub-element based on the setting value of the first setting plane in lieu of directly receiving setting information for the second setting plane from the second set of reconstruction data. (paragraph incorporated from U.S. Pat. No. 8,977,065).

Note again that techniques herein are well suited for use in processing and reconstructing signals. However, it should be noted that embodiments herein are not limited to use in such applications and that the techniques discussed herein are well suited for other applications as well. (paragraph incorporated from U.S. Pat. No. 8,977,065).

Based on the description given herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform. (paragraph incorporated from U.S. Pat. No. 8,977,065).

As discussed above, by way of a non-limiting example, a decoder decodes a first set of data and utilizes the first set of decoded data to reconstruct the signal according to a first level of quality. The decoder further decodes a second set of data and identifies an upsample operation, together with a scale factor, specified by the second set of decoded data. The decoder then applies the upsample operation and scale factor identified in the second set of decoded data to the reconstructed signal at the first level of quality to reconstruct the signal at a second, higher level of quality. To enhance the reconstructed signal, the decoder retrieves residual data from the second set of decoded data. The residual data indicates how to modify the reconstructed signal at the second level of quality subsequent to application of the upsampling operation and scale factor as discussed above. The decoder then modifies the reconstructed signal at the second level of quality as specified by the residual data. The decoder can be configured to repeat this process of reconstructing a signal at yet higher levels of quality. (paragraph incorporated from U.S. Pat. No. 8,948,248).

Figure 27:
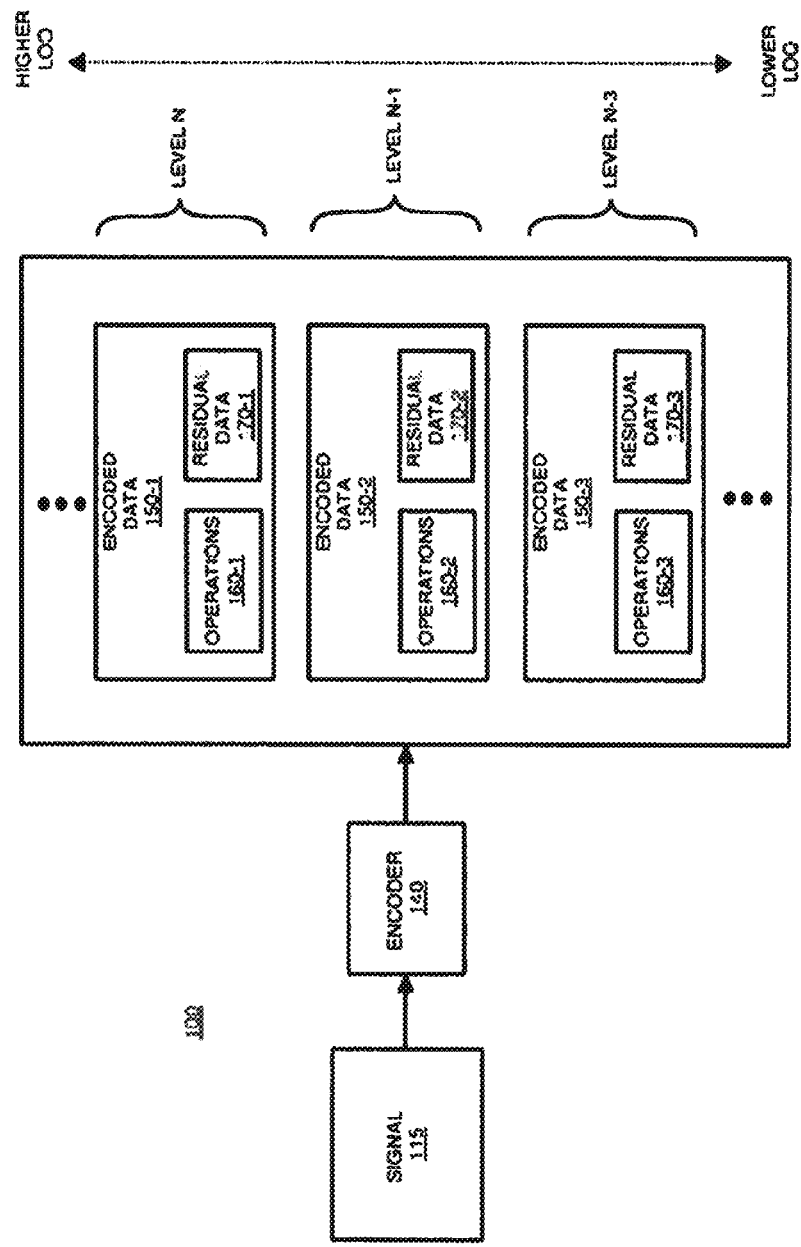
FIG. 27 is an example diagram of an encoder and corresponding encoded data according to embodiments herein (incorporated from U.S. Pat. No. 8,948,248).

FIG. 27 is an example diagram illustrating an encoder and generation of corresponding sets of encoded data according to embodiments herein. (paragraph incorporated from U.S. Pat. No. 8,948,248).

During operation, the encoder 140 in encoding environment 100 processes signal 115 to produce encoded data 150. Note that the signal 115 encoded by the encoder 140 can be any suitable type of data information. (paragraph incorporated from U.S. Pat. No. 8,948,248).

By way of a non-limiting example, the signal 115 can be image data, symbols, etc., indicating settings of each of multiple signal elements (e.g., pels/plane elements, pixels/picture elements, voxels/volumetric picture elements, etc.) in a respective image. (paragraph incorporated from U.S. Pat. No. 8,948,248).

As already mentioned, the image can be two dimensional (e.g., pictures, video frames, 2D motion maps, etc.), three dimensional (e.g., 3D/volumetric images, holographic images, CAT-scans, medical/scientific images, 3D motion maps, etc.) or even featuring more than three dimensions. In accordance with such an embodiment, the settings of the signal elements (as specified by the signal 115) indicate how to reconstruct the respective image for playback on a device. (paragraph incorporated from U.S. Pat. No. 8,948,248).

Encoded data 150 produced by encoder 140 includes a hierarchy of encoded data including set of encoded data 150-1, set of encoded data 150-2, set of encoded data 150-3, and so on. (paragraph incorporated from U.S. Pat. No. 8,948,248).

In general, each set of encoded data at a respective level of quality in the hierarchy defines how to reconstruct a signal for the respective level of quality, and is also the basis for reconstructing the signal at higher levels of quality. As discussed below, reconstruction of the signal 115 at a respective level of quality using a set of encoded data can depend on reconstruction of the signal at a next lower level of quality. (paragraph incorporated from U.S. Pat. No. 8,948,248).

More specifically, in accordance with one embodiment, each set of encoded data 150 includes a respective set of one or more operations and/or respective residual data for reconstructing at a particular level of quality. For example, set of encoded data 150-1 can include one or more operations 160-1 and residual data 170-1; set of encoded data 150-2 can include one or more operations 160-2 and residual data 170-2; set of encoded data 150-3 can include one or more operations 160-3 and residual data 170-3, and so on. (paragraph incorporated from U.S. Pat. No. 8,948,248).

To produce the sets of encoded data 150, the encoder 140 applies downsampling operations to reduce a received signal 115 into lower levels of quality. For example, the encoder reduces original image information into a lower resolution image information in the hierarchy. The encoded data 150 produced by the encoder 140 indicates how to reconstruct the signal 115 at a lower level of quality into a signal at a next higher level of quality. The encoder 140 repeats the process at each successive lower resolution or level of quality in the hierarchy. Additional details associated with encoding of data with encoder 140 can be found in related U.S. patent application Ser. No. 13/188,207, and entitled "SIGNAL PROCESSING AND TIERED SIGNAL ENCODING," filed on the same day as the present application, the entire teachings of which are incorporated herein by this reference. (paragraph incorporated from U.S. Pat. No. 8,948,248).

As previously mentioned, in addition to specifying one or more operations, the encoded data 150 can include residual data 170. In one embodiment, the residual data for a given level specifies how to modify the reconstructed signal at a respective level of quality. Modification of the reconstructed signal at a given level of quality can be performed to enhance the accuracy of the reconstructed signal, place the reconstructed signal in a better form for subsequent upsampling at higher levels of quality, etc. Note that a set of encoded data may optionally not include any residual data, or any operations. In such cases, the decoder executes the upsample operations and the reconstruction of the signal at a higher level of quality based on default parameters established when reconstructing the previous levels of quality. (paragraph incorporated from U.S. Pat. No. 8,948,248).

In one embodiment, as will be discussed later in this specification, a lowest level of encoded data in the hierarchy can be used to produce a starting point for reconstructing a respective higher level of quality of the signal 115. The next level of encoded data (just above the lowest level of quality) can be applied to the reconstructed signal at the lowest level of quality to produce a higher signal quality. Applying each set of data at a successively higher level in the hierarchy can produce a yet higher and higher resolution image. (paragraph incorporated from U.S. Pat. No. 8,948,248).

Note that inclusion of a respective set of one or more image operations 160 and/or residual data 170 is shown by way of non-limiting example only and that a respective set of encoded data 150 at a particular level in the hierarchy may not specify any operations 160 or include any residual data 170. (paragraph incorporated from U.S. Pat. No. 8,948,248).

Figure 28:
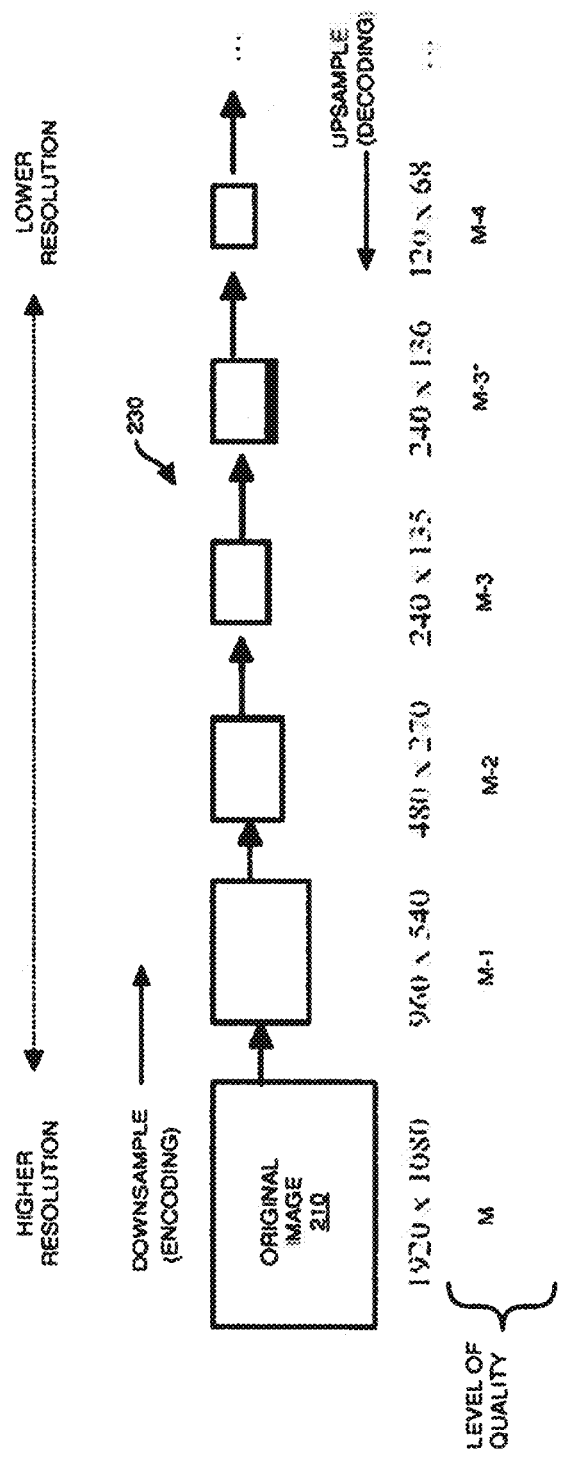
FIG. 28 is an example diagram illustrating a process of encoding and decoding a signal according to embodiments herein (incorporated from U.S. Pat. No. 8,948,248).

FIG. 28 is an example diagram illustrating a process of encoding according to embodiments herein. In this example, assume that the original image 210 in FIG. 2 is defined by signal 115. That is, the signal 115 indicates how to set each image element in a group of multiple image elements (e.g., 1920×1080 image elements). (paragraph incorporated from U.S. Pat. No. 8,948,248).

During encoding of the original image 210, the encoder 140 performs a downsampling operation at level M to produce the next lower resolution image in the hierarchy at level M-1 as shown; based on the image at level M-1, the encoder 140 performs another downsampling operation at level M-1 to produce the next lower resolution image in the hierarchy at level M-2; and so on. (paragraph incorporated from U.S. Pat. No. 8,948,248).

As previously discussed, at each respective level of quality, the encoder 140 produces a respective set of encoded data to convert a lower resolution or lower level of quality signal to a next higher resolution or quality signal. (paragraph incorporated from U.S. Pat. No. 8,948,248).

In accordance with one embodiment, the encoder 140 downsamples from one level of quality to the next based on a desired scale factor. For example, by way of a non-limiting example, FIG. 28 illustrates a technique of implementing a scale factor of 2:1 to obtain the next lower level resolution from level M to Level M-1; from level M-1 to level M-2; etc.

In this example, based on a 2:1 scale factor, each dimension of the signal from one level of quality to the next lower level of quality is undersampled by a factor of 2. At each successively lower level, the encoder 140 reduces a resolution of A×B to a resolution of A/2×B/2, to a resolution of A/4×B/4, etc. (paragraph incorporated from U.S. Pat. No. 8,948,248).

Note that the encoder 140 can be configured to dynamically change the scale factor from one level of quality to the next in order to make encoding and/or decoding more efficient. The scale factor information for each of the levels of quality can be stored in respective sets of encoded data. (paragraph incorporated from U.S. Pat. No. 8,948,248).

In one embodiment, each color component of image elements is codified separately based on a color space standard such as YUV, RGB or HSV, although the attributes of the signal 115, when defining an image, can be encoded according to any suitable format. (paragraph incorporated from U.S. Pat. No. 8,948,248).

In order to allow for the necessary downsampling to successively lower levels of quality, new image elements can be added or removed at a respective level of quality as needed. For example, addition of image elements can include replicating or mirroring borders of an image to adjust the image to an appropriate sized field of viewable elements. In the case of a video signal, and a 2:1 scale factor, for instance, downsampling tends to work well with images that have respective horizontal and vertical sizes that scale easily based on the power of 2. (paragraph incorporated from U.S. Pat. No. 8,948,248).

To facilitate downsampling, as shown at level of quality M-3 and M-3*, the encoder 140 can adjust the resolution dimensions at each level by adding or deleting rows or columns of image elements as needed such that the image can be scaled easily from one level to the next. (paragraph incorporated from U.S. Pat. No. 8,948,248).

More specifically, in one embodiment, to adjust the resolution of the donwsampled image, the encoder 140 adds rows and/or columns (depending on which dimension needs to be adjusted) by duplicating or mirroring a row or column and copying the row or column at or around a perimeter location of the image as shown. In one embodiment, during downsampling, a border row (such as a bottommost row) of image elements at level M-3 can be copied or mirrored and added to the bottom row of level M-3 to produce the image for level M-3 * to change its dimensions. The image at level M-3* can then be downsampled further to level M-4 based on a power of 2. That is, an image at level M-3* can be downsampled from 240 image elements×136 image elements to level M-4 having dimensions of 120 image elements×68 image elements. (paragraph incorporated from U.S. Pat. No. 8,948,248).

Figure 29:
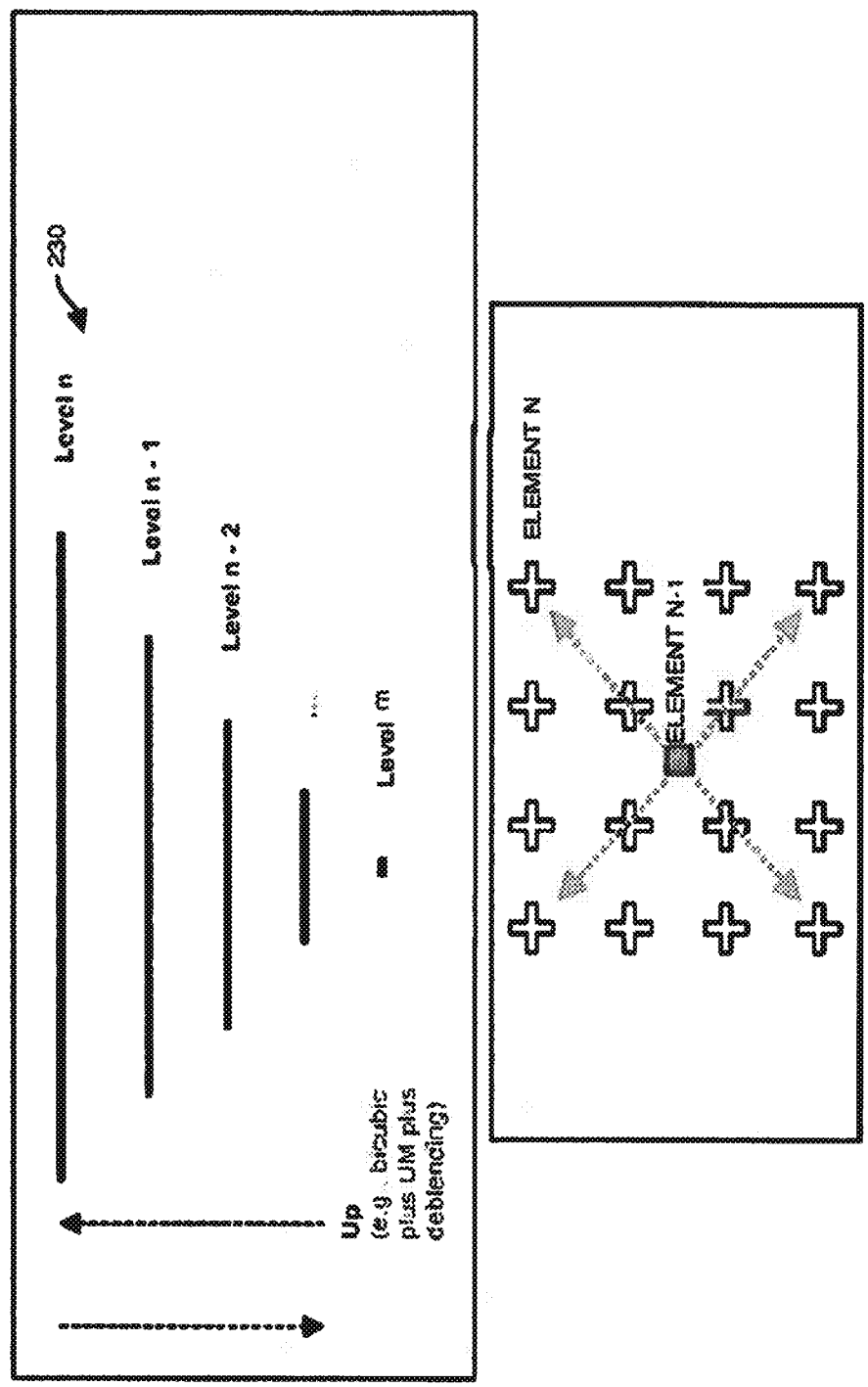
FIG. 29 is an example diagram illustrating expansion of a signal including image information at different levels of quality in a hierarchy according to embodiments herein (incorporated from U.S. Pat. No. 8,948,248).

FIG. 29 is an example diagram illustrating expansion of image elements at different levels according to embodiments herein. (paragraph incorporated from U.S. Pat. No. 8,948,248).

Higher levels of quality in the hierarchy 230 are reconstructed by upsampling lower levels fusing specific operations, described later) and by decoding the necessary residuals (encoded and transmitted with operations described later). In one embodiment, it is not necessary that the kernel/operation used to upsample (e.g., on the decoding side) is of the same kind of the kernel/operation used to downsample (e.g., on the encoding side). Also, it is not necessary that the operation used to obtain the lower levels is even a filter (linear or non-linear): it may actually be a combination of techniques. In other words, the encoding and respective decoding process as discussed herein may be asymmetrical. In one embodiment, the signal 115 is encoded with one or more operations at each level of quality so as to reduce an entropy of respective residual data that are applied after upsampling as will be discussed later in this specification. This may reduce an amount of data that is needed to reconstruct the original signal 115. In accordance with one embodiment, lower levels of quality are obtained from higher levels (downward path) using a tweaked bilinear filter (which from experiments seems to be one of the kernels/operations that best preserve the information, even if the resulting signal is not "the best to look at"). In other words, a reconstructed signal 115 may not be a perfect reproduction of an original image at a lower resolution. The encoded signal 115 at lower levels of quality in the hierarchy can include artifacts. (paragraph incorporated from U.S. Pat. No. 8,948,248).

In one embodiment, results of applying a bilinear filter during encoding are tweaked so as to minimize the entropy of residuals when we upsample back to higher levels. Reducing the entropy of residual data for one or more of the levels of quality can reduce an overall amount of data that is needed to reconstruct the signal at a high level of quality. In one embodiment, the encoding/decoding is lossy to some extent. However, reconstruction of the signal using the encoded data can be a near perfect replica of an original version of the signal 115. Additional details associated with encoding of data with encoder 140 can be found in related U.S. patent application Ser. No. 13/188,207, and entitled "SIGNAL PROCESSING AND TIERED SIGNAL ENCODING," filed on the same day as the present application, the entire teachings of which are incorporated herein by this reference. (paragraph incorporated from U.S. Pat. No. 8,948,248).

In one embodiment, the reconstruction of the signal 115 at higher levels from lower levels includes leveraging a combination of one or more upsample methods such as bicubic filter operations, unsharp masking filter operations, deblending filter operations, etc. For example, during encoding, the encoder 140 can specify one or more operations that are to be included in a respective set of encoded data that are to be used for upsampling a reconstructed signal from one level of quality to the next during the decode process. For a respective level, and if necessary for each signal element, the encoder 140 can select none, one or more upsample operations (e.g., a bicubic filter operation, a deblending filter, an unsharp masking filter, etc.) to be applied by the decoder to the reconstructed signal at each of the levels of quality in the hierarchy. (paragraph incorporated from U.S. Pat. No. 8,948,248).

Figure 30:
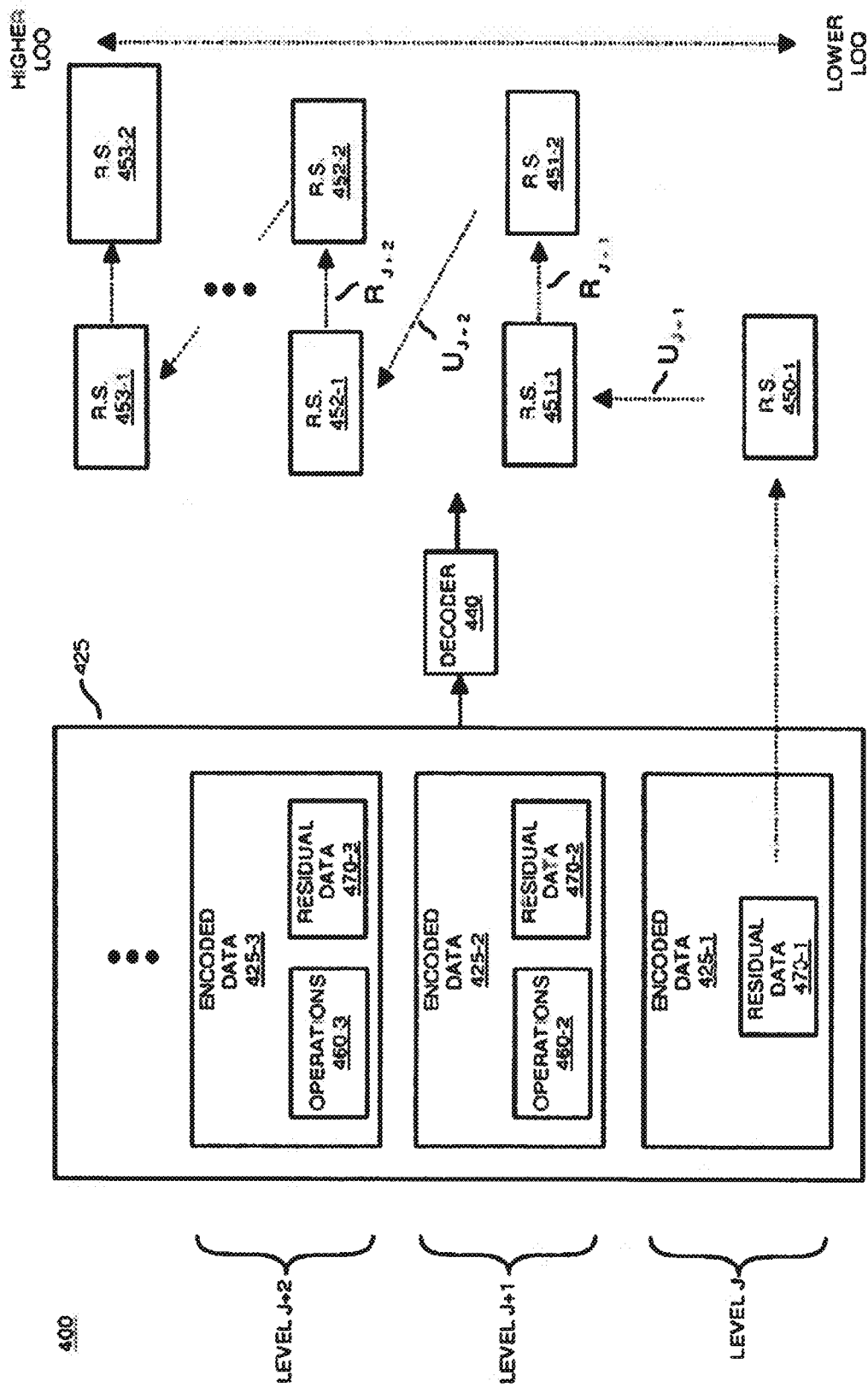
FIG. 30 is an example diagram illustrating decoding and reconstructing a signal according to embodiments herein (incorporated from U.S. Pat. No. 8,948,248).

FIG. 30 is an example diagram illustrating decoding of encoded data to reconstruct a signal at different levels of quality according to embodiments herein. (paragraph incorporated from U.S. Pat. No. 8,948,248).

In a manner as previously discussed, the encoder 140 produces the set of encoded data 425 to reconstruct a respective signal 115. As shown, set of encoded data 425-1 includes a set of residual data 470-1; set of encoded data 425-2 includes operations 460-2 and residual data 470-2; set of encoded data 425-3 includes operations 460-3 and residual data 470-3; and so on up the hierarchy. (paragraph incorporated from U.S. Pat. No. 8,948,248).

As shown, the decoder 440 in decoding environment 400 utilizes the hierarchical sets of encoded data 425 to reconstruct a respective signal 115 at different levels of quality. As previously discussed, one embodiment herein includes reconstructing a signal 115 at successively higher levels of quality in a hierarchy based on decoding sets of encoded data 425. The decoded data indicates how to perform upsampling and subsequent residual modifications from one tier to the next. (paragraph incorporated from U.S. Pat. No. 8,948,248).

In accordance with such an embodiment, the decoder 440 decodes a first set of encoded data 425-1 and utilizes the first set of decoded data to produce reconstructed signal 450-1 according to a first level of quality (e.g., level J). Assume in this example that level J is the lowest level of quality and that the set of encoded data 425-1 includes appropriate data such as residual data 470-1 to produce reconstructed signal 450-1, which is the lowest level of quality in the hierarchy. This reconstructed signal 450-1 (e.g., low level of quality) provides a basis for upsampling to yet higher levels of quality in the hierarchy. (paragraph incorporated from U.S. Pat. No. 8,948,248).

The decoder 440 then decodes second set of encoded data 425-2 for processing at level of quality J+1 in the hierarchy. Based on the decoded data from set of encoded data 425-2, the decoder 440 applies one or more operations 460-2 (e.g., upsample operations UJ+1) to the reconstructed signal 450-1 to produce reconstructed signal 451-1 at the J+1 level of quality. In this example, the reconstructed signal 451-1 (e.g., at the J+1 level of quality) is higher in quality than the reconstructed signal 450-1 at the J level of quality. (paragraph incorporated from U.S. Pat. No. 8,948,248).

In accordance with further embodiments, to enhance the reconstructed signal at a respective level of quality, the decoder 440 can be configured to retrieve and apply residual data 470-2 from encoded data 425-2. (paragraph incorporated from U.S. Pat. No. 8,948,248).

In an example embodiment, the decoder 440 implements multi-scale entropy decoding to enhance a reconstructed signal. For example, in such an embodiment, the decoder identifies residual data 470-2 as specified by decoded set of encoded data 425-2. By way of a non-limiting example, the decoder 440 can utilize a multi-scale entropy decoder to decode the residual data 470-2. The decoded residual data specifies how to modify specific elements of the reconstructed signal at the second level of quality. For example, the decoder 440 modifies the elements of the reconstructed signal 451-1 at the level of quality J+1 in a manner as specified by the residual data 470-2. Additional details associated with the entropy decoding and processing are discussed in related U.S. patent application Ser. No. entitled "SIGNAL PROCESSING AND INHERITANCE IN A TIERED SIGNAL QUALITY HIERARCHY," filed on the same day as the present application, the entire teachings of which are incorporated herein by this reference. (paragraph incorporated from U.S. Pat. No. 8,948,248).

More specifically, the residual data 470-2 associated with level of quality J+1 indicates how to modify the reconstructed signal 451-1 subsequent to application of the one or more upsampling operations 460-2 (e.g., upsample operations UJ+1) as discussed above. That is, the residual data 470-2 indicates how to modify specific portions of the reconstructed signal 451-1 to produce reconstructed signal 451-2. Via further processing, the decoder 440 modifies the reconstructed signal 451-1 in a manner as specified by the residual data 470-2 to produce reconstructed signal 451-2 at level of quality J+1. (paragraph incorporated from U.S. Pat. No. 8,948,248).

Subsequent to the processing at level of quality J+1 as discussed above, the decoder 440 then decodes set of encoded data 425-3 for processing at level of quality J+2 in the hierarchy. Based on the information in set of encoded data 425-3, the decoder 440 applies one or more operations 460-3 (e.g., upsample operations UJ+2) identified in the set of encoded data 425-3 to the reconstructed signal 451-2 at the J+1 level of quality to produce reconstructed signal 452-1 at the J+2 level of quality. In this example, the J+2 level of quality of reconstructed signal 452-1 is higher in quality than the reconstructed signal 451-2 at the J+1 level of quality. (paragraph incorporated from U.S. Pat. No. 8,948,248).

After applying operations 460-3, the decoder 440 retrieves residual data 470-3 from encoded data 425-3. The residual data 470-3 associated with level of quality J+2 indicates how to modify the reconstructed signal 452-1 subsequent to application of the one or more upsampling operations 460-3 (e.g., upsample operations UJ+2) as discussed above. That is, the residual data 470-3 indicates how to modify specific portions of the reconstructed signal 452-1 to produce reconstructed signal 452-2. Via further processing via operation RJ+2, the decoder 440 modifies the reconstructed signal 452-1 in a manner as specified by the residual data 470-3 to produce reconstructed signal 452-2. (paragraph incorporated from U.S. Pat. No. 8,948,248).

The decoder 440 can be configured to repeat the above processing for each of multiple levels of quality in the hierarchy. For example, for each of multiple levels of quality above the J+2 level of quality, the decoder 440 repeats steps of: decoding a next higher set of encoded data in the hierarchy above a last processed level of quality; identifying one or more upsample operations based on the contents of the next higher set of decoded data; applying the one or more upsample operations (if any) identified based on the contents of the next higher set of decoded data to reconstruct the signal at a next higher level of quality; identifying residual information and/or residual characteristics (if any) specified by the next higher set of decoded data; applying the residual information to modify the reconstructed signal at the next higher level of quality. This process can be repeated until the decoder reconstructs a replica or near replica of the signal 115. (paragraph incorporated from U.S. Pat. No. 8,948,248).

The decoder 440 can be configured to use default upsample operations and/or residual data to reconstruct the signal at the different levels of quality if no operations and/or residual data is specified for the level of quality in the hierarchy. In one embodiment, such default values are obtained based on the operations and/or residual data that were used to reconstruct lower levels of quality of the same portions of the signal. (paragraph incorporated from U.S. Pat. No. 8,948,248).

Note that the signal 115 can be of any suitable type of data. However, in one embodiment as mentioned, the signal 115 includes image data. In accordance with such an embodiment, the decoder 440 reconstructs the original signal 115 at yet higher resolution or higher levels of quality based on the tiered sets of encoded data to eventually reconstruct an image for playback (or to be used for other purposes). In certain cases, a lower level of quality image (e.g., a reconstructed signal at level lower than the highest possible resolution in the hierarchy) can be displayed for viewing (or used for other purposes) if it is not necessary or possible to reconstruct a version with the same resolution as the original signal 115. (paragraph incorporated from U.S. Pat. No. 8,948,248).

In one embodiment, the decoder 440 or other suitable resource initiates display of image information on a display screen device in accordance with the reconstructed signal at the higher possible level or a selected level of quality. (paragraph incorporated from U.S. Pat. No. 8,948,248).

FIG. 2A is an example diagram illustrating upsampling of a lower resolution image into a higher resolution image according to embodiments herein. Assume in this non-limiting example that the signal 115 and corresponding encoded data 425 indicates how to convert or expand a lower resolution image into a higher resolution image. (paragraph incorporated from U.S. Pat. No. 8,948,248).

By way of a non-limiting example, assume that the sets of encoded data indicate how to control settings of image elements at each level of quality. For example, image 510-1 at level of quality J includes a field of image elements W; image 510-2 at level of quality J+1 includes field of image elements X; image 510-3 includes field of image elements Y; etc. Assume that reconstructed signal 450-1 specifies how to control settings of image elements W in image 510-1; reconstructed signal 451-2 specifies how to control settings of image elements X in image 510-2; reconstructed signal 452-2 specifies how to control settings of image elements Y; and so on. Thus, the decoding in FIG. 4 can be used to decode image information and produce different renditions of an original signal 115 according to different levels of quality. (paragraph incorporated from U.S. Pat. No. 8,948, 248).

Figure 31:
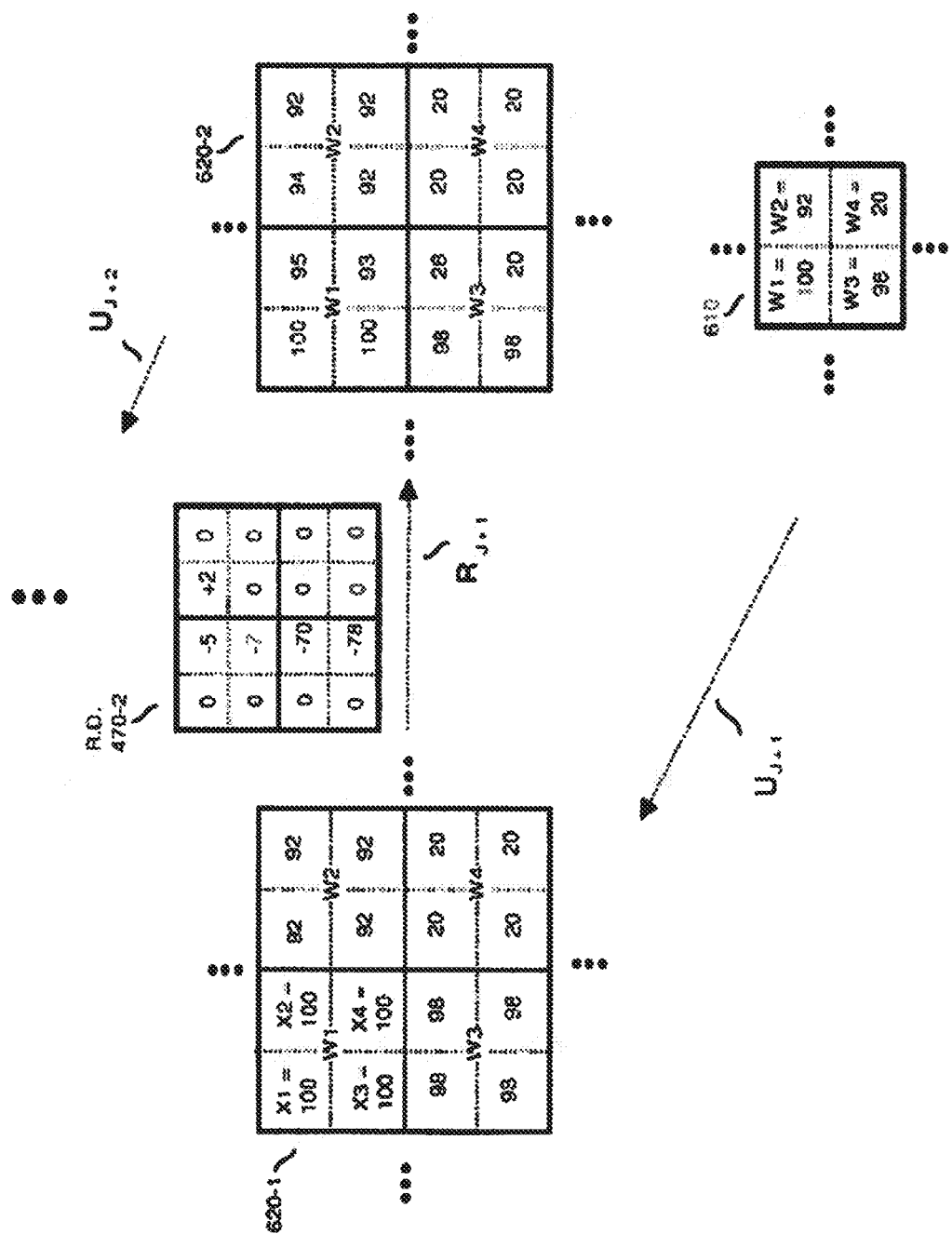
FIG. 31 is an example diagram illustrating upsampling a lower resolution image into a higher resolution image according to embodiments herein (incorporated from U.S. Pat. No. 8,948,248).
Figure 32:
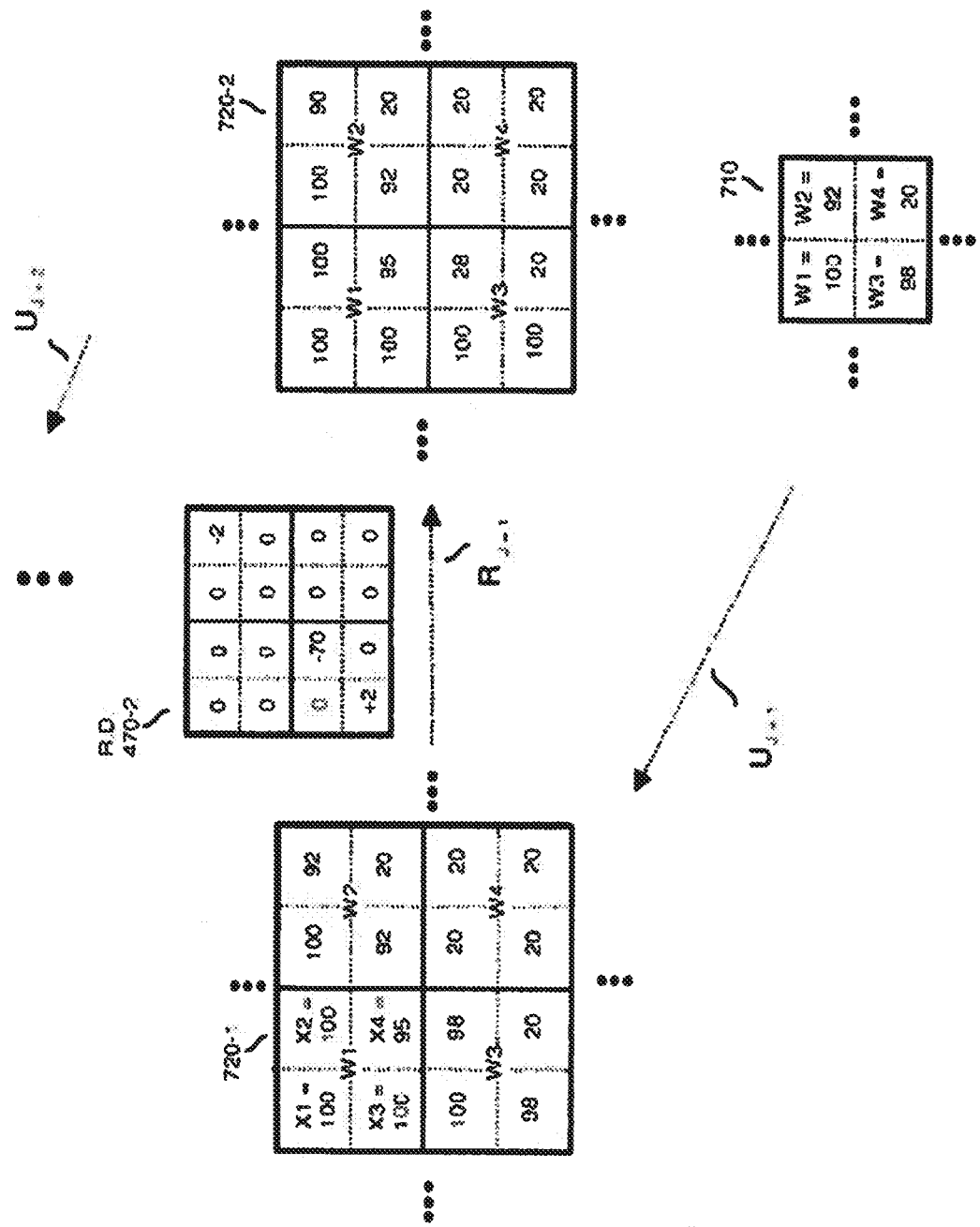
FIG. 32 is an example diagram illustrating upsampling a lower resolution image into a higher resolution image according to embodiments herein (incorporated from U.S. Pat. No. 8,948,248).

Following FIGS. 31 and 32 more particularly indicate how to perform upsample and apply residual data. (paragraph incorporated from US8,948,248).

For example, FIG. 31 is a diagram illustrating a simple example of upsampling a lower resolution image into a higher resolution image according to embodiments herein. (paragraph incorporated from U.S. Pat. No. 8,948,248).

In this example, assume that the set of encoded data 425-1 indicates how to produce reconstructed signal 450-1. Reconstructed signal 450-1 indicates display settings of image elements as follows: image element W1=100, image element W2=92, image element W3=98, image element W4=20. In a similar manner, reconstructed signal 451-1 derived from set of encoded data 425-2 in FIG. 30 indicates display settings of image elements in image 620-1 as shown in FIG. 31; reconstructed signal 451-2 in FIG. 30 indicates display settings of image elements in image 620-2 as shown in FIG. 31. (paragraph incorporated from U.S. Pat. No. 8,948,248).

Thus, in this non-limiting example, image 610 is a representation of reconstructed signal 450-1; image 620-1 is a representation of reconstructed signal 451-1; image 620-2 is a representation of reconstructed signal 451-2; and so on. (paragraph incorporated from U.S. Pat. No. 8,948,248).

As previously discussed, the operations 460-2 for level of quality J+1 indicate how to upsample at step UJ+1 in FIG. 30. In this example, assume that the upsample operations 460-2 indicate to convert image element W1 of image 610 into four image elements having the same value of 100. Thus, via application of upsampling operation by decoder 440 results in expansion of image element W1 into four image elements X1, X2, X3, and X4 of the same value. In a similar manner, each of the other image elements W2, W3, and W4 are expanded into four corresponding image elements of the same value as shown. (paragraph incorporated from U.S. Pat. No. 8,948,248).

Note that expansion of a single image element into four image elements is shown by way of non-limiting example only and that the amount of expansion of an image element from one level of quality to the next can vary depending on the embodiment. For example, a single image element can be expanded into any number of suitable image elements (e.g., not just four image elements) when upsampling from one level of quality to the next, and a suitable filtering kernel/operation can be applied to smooth out the image instead of simply replicating the element values. Also, note that image 610, image 620-1, image 620-2, may represent only a portion of an overall set of image elements at a respective level of quality. (paragraph incorporated from U.S. Pat. No. 8,948,248).

Via application of residual data 470-2 (e.g., matrix of difference data) in modification operation RJ+1, the decoder 440 applies the set of residual data 470-2 to modify the settings associated with image elements 620-1. For example, the decoder 440 adjusts the value of image elements in image 620-1 by adding the offset or difference values in the matrix of residual data 470-2 to the image element values in the image 620-1 to produce image 620-2 as shown. (paragraph incorporated from U.S. Pat. No. 8,948,248).

FIG. 32 is an example diagram illustrating upsampling of a lower resolution image into a higher resolution image according to embodiments herein. However, unlike the example in FIG.

31, this example in FIG. 32 includes expanding a single image element into multiple image elements of different values depending on an applied upsample operation. (paragraph incorporated from U.S. Pat. No. 8,948,248).

In this example, assume that the set of encoded data 425-1 indicates how to produce reconstructed signal 450-1. Reconstructed signal 450-1 indicates display settings of image elements in image 710 as follows: image element W1=100, image element W2=92, image element W3=98, image element W4=20. In a similar manner, in this example, reconstructed signal 451-1 in FIG. 30 indicates display settings of image elements in image 720-1 as shown in FIG. 32. Reconstructed signal 451-2 in FIG. 30 indicates display settings of image elements in image 720-2 as shown in FIG. 32. (paragraph incorporated from U.S. Pat. No. 8,948,248).

Thus, in this non-limiting example, image 710 is a representation of reconstructed signal 450-1; image 720-1 is a representation of reconstructed signal 451-1; image 720-2 is a representation of reconstructed signal 451-2; and so on. (paragraph incorporated from U.S. Pat. No. 8,948,248).

As previously discussed, the operations 460-2 for level of quality J+1 indicate how to upsample at step UJ+1 in FIG. 30. Assume that the upsample operations 460-2 in this example indicate how to convert image element W1 of image 610 into four image elements having different values. For example, execution of the operations 460-2 by decoder 440 converts the image element W1 into four different valued image elements in image 720-1: X1=100, X2=100, X3=100, and X4=95. Thus, in this example, instead of expanding the image element W1=100 into four image elements (e.g., Xl, X2, X3, and X4) set to 100, the decoder 440 sets Xl, X2, X3, and X4 to different values than the value of W1. (paragraph incorporated from U.S. Pat. No. 8,948,248).

In one embodiment, the decoder 440 applies one or more operations such as a bicubic filter operation, a deblending filter, an unsharp masking filter, etc., to expand a single signal element into multiple signal elements having different display setting values. The values assigned to the expanded elements can be selected based at least in part on settings of neighboring signal elements. (paragraph incorporated from U.S. Pat. No. 8,948,248).

As mentioned above, the values of the signal elements indicate any information such as color, hue, luminance, etc., such that a respective display device can display the image to a user. (paragraph incorporated from U.S. Pat. No. 8,948, 248).

In a similar manner, each of the other image elements W2, W3, and W4 are expanded into four corresponding image elements of the same or different value as shown in FIG. 32. (paragraph incorporated from U.S. Pat. No. 8,948,248).

Note again that expansion of a single image element into four image elements is shown by way of non-limiting example only and that the amount of expansion of an image element from one level of quality to the next can vary depending on the embodiment. For example, a single image element can be expanded into any number of suitable image elements (e.g., not just four image elements) when upsampling from one level of quality to the next. Also, image 710, image 720-1, image 720-2, may represent only a portion of an overall set of image elements at a respective level of quality. (paragraph incorporated from U.S. Pat. No. 8,948, 248).

Subsequent to applying the one or more upsampling operation as discussed above to expand image elements, the decoder applies residual data 470-2 to image 720-1 to produce image 720-2. Using residual data 470-2 (e.g., matrix of difference data) in modification operation RJ+1, the decoder 440 applies the set of residual data 470-2 to modify the settings associated with image elements 720-1. For example, the decoder 440 adjusts the value of image elements in image 720-1 by adding the offset or difference values in the matrix of residual data 470-2 to the image element values in the image 720-1 to produce image 720-2 as shown. As mentioned above, the decoder repeats these steps at different levels of quality in the hierarchy to reconstruct signal 115. (paragraph incorporated from U.S. Pat. No. 8,948,248).

Use of Different Upsample Operations at Different Levels of Quality (caption incorporated from U.S. Pat. No. 8,948, 248).

In accordance with one embodiment, the sets of encoded data can specify different upsample operations to apply at different levels to reconstruct a respective signal 115. For example, set of encoded data 425-2 may specify a first upsample such as a bicubic filter operation in which to upsample (e.g., UJ+2) from level of quality J+1 to level of quality J+2. Set of encoded data 425-3 may specify a second upsample such as a deblending filter operation in which to upsample (e.g., UJ+3) from level of quality J+2 to level of quality J+3, and so on. The ability to specify and apply different upsample operations (or combinations thereof) at each level of quality provides flexibility as the decoder 440 is not required to reconstruct a signal using only a default upsample operation. (paragraph incorporated from U.S. Pat. No. 8,948,248).

Use of a Same One or More Upsample Operation at Multiple Levels of Quality (caption incorporated from U.S. Pat. No. 8,948,248).

In accordance with another embodiment, an upsample operation specified for use at one level of quality can be used at successively higher levels of quality to reconstruct a respective signal 115. For example, the decoder 440 can be configured to apply the one or more upsample operations as specified by the set of encoded data 425-2 to reconstruct the signal 115 at level of quality J+2 as previously discussed. (paragraph incorporated from U.S. Pat. No. 8,948,248).

The set of encoded data 425-3 (e.g., a higher level of quality) may not specify any upsample operations. In accordance with such an embodiment, the decoder 440 can be configured to reconstruct the signal 115 at higher levels of quality until a respective set of decoded data for a higher level of quality indicates to either discontinue application of the upsampling operation and/or until a set of encoded data at a higher level of quality indicates to apply a different set of one or more upsample operations. (paragraph incorporated from U.S. Pat. No. 8,948,248).

Thus, embodiments herein can include decoding a set of encoded data at a higher level of quality. In response to identifying that the set of encoded data at the higher level of quality does not specify a particular upsample operation, the decoder 440 applies the upsample operations used at a lower level of quality to reconstruct the signal at a higher level of quality. (paragraph incorporated from U.S. Pat. No. 8,948, 248).

Use of Residual Data at Multiple Levels of Quality. (caption incorporated from U.S. Pat. No. 8,948,248).

In accordance with yet further embodiments, residual data specified for use at one level of quality can be used at successively higher levels of quality to reconstruct a respective signal 115 until a higher level of quality indicates to use different residual data or the higher level of quality indicates to discontinue application of the residual data. For example, the decoder 440 can retrieve residual data from a set of decoded data at a particular level of quality. As previously discussed, the residual data indicates how to modify the reconstructed signal at the particular level of quality subsequent to application of a specified upsampling operation. The decoder 440 modifies the reconstructed signal at the particular level of quality as specified by the set of encoded data. Additionally, the decoder 440 modifies a reconstructed signal at a level of quality higher than the particular level of quality. (paragraph incorporated from U.S. Pat. No. 8,948, 248).

As an example, assume that the decoder 440 identifies residual data 470-2 as specified by set of encoded data 425-2. The residual data 470-2 specifies a location of elements in the reconstructed signal at level of quality J+1 and how to modify the elements of the reconstructed signal 451-1 at the level of quality J+1. The decoder 440 modifies the elements or portions of the reconstructed signal 451-1 at the level of quality J+1 in a manner as specified by the residual data 470-2. The decoder 440 uses the residual data 470-2 also for the reconstruction of the signal 115 at higher levels of quality (e.g., J+2 and higher) until a respective set of decoded data for a higher level of quality indicates to use different residual data at the higher levels of quality. (paragraph incorporated from U.S. Pat. No. 8,948,248).

Applying Upsample Operations to Specified Portions of a Reconstructed Signal (caption incorporated from U.S. Pat. No. 8,948,248).

In accordance with yet further embodiments, each set of encoded data can specify different upsample operations that should be applied by the decoder to specific portions of the reconstructed signal. A portion of the signal is characterized by a different number of signal elements (greater than or equal to one) depending on the particular level of quality. As an example, assume that the decoder 440 processes the set of decoded data at level of quality X to identify a specific portion (e.g., as indicated by location) of the reconstructed signal at the level of quality X-1 in which to apply the upsample operation specified by the set of decoded data. The decoder 440 then applies the upsample operation to the specific portion (e.g., a portion such as less than all of the image elements if it is a reconstructed image) of the reconstructed signal at the X-1 level of quality (e.g., level of quality just below X level of quality) to reconstruct the signal at the X level of quality. (paragraph incorporated from U.S. Pat. No. 8,948,248).

As an example, a set of encoded data for a given level of quality can specify a first operation to apply to a first portion (e.g., first region, a first type of data, etc., in the reconstructed signal) of a reconstructed signal to perform upsampling; the set of encoded data for the given level of quality also can specify a second operation to apply to a second (different) portion (e.g., a second region, a second type of data, etc., in the reconstructed signal) of the reconstructed signal; and so on. (paragraph incorporated from U.S. Pat. No. 8,948,248).

The set of encoded data may not specify any upsample operations for specific portions of the signal. In accordance with an embodiment, for each portion of the signal, the decoder 440 can be configured to reconstruct the signal 115 at higher levels of quality until a respective set of decoded data for a higher level of quality indicates to either discontinue application of the upsampling operation and/or until a set of encoded data at a higher level of quality indicates to apply a different set of one or more upsample operations. (paragraph incorporated from U.S. Pat. No. 8,948,248).

In accordance with further embodiments, the decoder 440 can process the sets of data at each level of quality to identify an attribute type (e.g., in-focus region, out-of-focus region, human face, text, other objects, in fast motion, still, in slow motion, etc.) of a specifically identified portion of the reconstructed signal in which to apply the upsample processing. The decoder applies specified operations to any data in the reconstructed signal of the specified attribute type. The decoder 440 may need to analyze a reconstructed signal to identify appropriate portions of the reconstructed signal in which to apply the specified one or more operations. (paragraph incorporated from U.S. Pat. No. 8,948,248).

In one embodiment, the decoder 440 can map the attribute type specified in a set of encoded data to a set of one or more upsample operations that will be carried out on a portion of the reconstructed signal having the specified attribute type. For example, for each portion of the signal of the specific attribute type for the specified level of quality, the decoder 440 utilizes the set of one or more upsample operations defined by its attribute type as default upsample operations for the reconstruction of the immediate level of quality and subsequently higher levels of quality of that portion of the signal. The same operations can be used until a respective set of decoded data for a higher level of quality than the first level of quality specifies to use for the signal or for portions of the signal different attribute types. (paragraph incorporated from U.S. Pat. No. 8,948,248).

Thus, as specified by set of encoded data for a given level of quality, specified operations can be applied to a specific attribute type of data for the given level of quality as well as for data at higher levels of quality having the same specified attribute type. (paragraph incorporated from U.S. Pat. No. 8,948,248).

Use of Different Scale Factors at Different Levels of Quality (caption incorporated from U.S. Pat. No. 8,948, 248).

In accordance with further embodiments, the decoder 440 can be configured to decode each of the set of encoded data to identify a scale factor value (e.g., dimensions or resolution of a signal) for upsampling a respective level of quality. As its name suggests, the scale factor value can specify a resolution in which to upsample the reconstructed signal at level of quality J+1 into the reconstructed signal at the level of quality J+2. As specified by the scale factor, the decoder 440 can be configured to upsample the reconstructed signal at the level of quality J+1 into the reconstructed signal at the level of quality J+2 in lieu of performing the upsampling in accordance with a default scale factor value known to the decoder 440. (paragraph incorporated from U.S. Pat. No. 8,948,248).

If there is no scale factor specified for a specific upsampling of the reconstructed signal from one level of quality to another, the decoder uses a predetermined default scale factor or a scale factor specified at a previous lower level of quality. In one embodiment, the decoder 440 utilizes scale factor values as specified by sets of decoded data at different levels of the hierarchy to reconstruct the signal 115 in lieu of performing upsampling in accordance with default scale factor values for the different levels of quality in the hierarchy. (paragraph incorporated from U.S. Pat. No. 8,948,248).

The sets of encoded data can specify different scale factors for different levels of quality. For example, in one embodiment, the scale factor values for different levels of quality (either specified in the sets of encoded data at each level of quality or known by the decoder 440 as default scale factor value if no scale factor is specified in the set of encoded data) include a first scale factor value and a second scale factor value. Assume in this example that the first scale factor value specified by a set of decoded data level of quality J+1 indicates a scale factor for upsampling from level of quality J to level of quality J+1. The set of encoded data can indicate to upsample from level of quality J+1 to level of quality J+2 in a manner as previously discussed using the second scale factor. The first scale factor value is different than the second scale factor value. Thus, the decoder 440 can upsample according to different scale factors from one level to the next. (paragraph incorporated from U.S. Pat. No. 8,948,248).

In yet a further embodiment, the decoder 440 first upsamples the signal to the resolution obtained by multiplying the resolution of the first level of quality by the first scale factor. At that point, as previously discussed, based on the second scale factor value at a higher level of quality, the decoder 440 eliminates outmost planes of the reconstructed signal (e.g., removes one or more rows or columns at the border of the image for a 2D signal) in order to reconstruct a signal at the resolution specified with the second scale factor. (paragraph incorporatedfrom U.S. Pat. No. 8,948,248).

Simulating Artifacts in a Reconstructed Signal (caption incorporated from U.S. Pat. No. 8,948,248).

In accordance with another embodiment, the decoder 440 can be configured to decode one or more sets of encoded data to identify characteristics of effects that are to be simulated upon signal reconstruction. For example, the signal characteristics specified in a respective set of encoded data can indicate to the decoder 440 how to simulate certain effects that are to be added to a reconstructed version of the signal at a particular level of quality (e.g., such as at the highest or selected level of quality). In accordance with such an embodiment, the set of encoded data does not need to indicate the specific elements of the reconstructed signal that should be modified and the specific modifications to apply. Instead, the set of encoded data indicates an effect or enhancement to be applied to or distributed in the reconstructed signal. (paragraph incorporated from U.S. Pat. No. 8,948,248).

As an example, the decoder 440 can be configured to decode a set of data to identify spectral characteristics associated with effects found in an original version of the residuals that represent lower priority information. Such effects can be attributes such as film grain, camera sensor noise, lower priority details of the signal, etc. The spectral characteristics in the encoded data can indicate to the decoder 440 how to simulate the effects by adding such effects to a reconstructed signal at one or more levels of quality in the hierarchy. The spectral information about adding the effects may indicate the occurrence of the effects to be simulated and a respective distribution of the effects. However, the spectral information need not indicate an actual location or the specific values of the residuals which would be needed to closely reconstruct the artifacts that are present in the original version of the signal. (paragraph incorporated from U.S. Pat. No. 8,948,248).

In accordance with further embodiments, for each signal element, the decoder 440 utilizes the spectral characteristics as specified by the set of decoded data also to characterize simulated effects for higher levels of quality than the level of quality at which the spectral information was identified. That is, in a manner as previously discussed, for each portion of the reconstructed signal, the decoder 440 can use the characteristics of simulated residuals specified at previous levels for multiple levels of quality in the hierarchy until a respective set of decoded data for a higher level of quality specifies to use, for the reconstructed signal or for specific portions of the reconstructed signal, different spectral characteristics of simulated effects. Thus, the decoder 440 can be configured to utilize the set of spectral characteristics to modify the elements of the reconstructed signal for display at a respective higher level of quality in a manner as specified by the spectral information. In one embodiment, the decoder applies the spectral characteristics information at the level of quality in which the reconstructed signal is displayed on a display device. (paragraph incorporated from U.S. Pat. No. 8,948,248).

Signal Reconstruction based on Multiple Reconstructed Planes of Information (caption incorporated from U.S. Pat. No. 8,948,248).

In accordance with one embodiment, the decoder 440 receives separate signal hierarchies for the different color planes of the signal (e.g., Red Green Blue, YUV, HSV or other types of color spaces). The separate signal hierarchies can feature independent (and potentially different) scale factors, operations and highest levels of quality. When the different reconstructed color planes feature different levels of quality, the decoder upsamples the lower-resolution color planes in order for them to match the resolution of the color plane with the highest level of quality, and subsequently joins all the reconstructed color planes into a reconstructed color signal to send to the display device. (paragraph incorporated from U.S. Pat. No. 8,948,248).

Upsampling can therefore include reconstructing 3 or more planes of information for each level of quality in the hierarchy. A combination of the plane information at a respective level of quality defines an image or reconstructed signal for the respective level of quality. (paragraph incorporated from U.S. Pat. No. 8,948,248).

In an example embodiment, the decoder 440 can reconstruct three planes at each level of quality. One plane can represent luminance (e.g., Y in the YUV standard) associated with image elements; another plane can represent blue chrominance (e.g., U in the YUV standard) associated with image elements; and another plane can represent red chrominance (e.g., V in the YUV standard) associated with image elements. Each plane can be encoded according to different levels of quality. For example, the luminance plane, which is the most important one when viewing a respective image, can be encoded with the highest level of detail; the chrominance planes can be encoded with a lower level of detail because they are less important when viewing a respective image. (paragraph incorporated from U.S. Pat. No. 8,948, 248).

FIG. 14 is an example block diagram of a computer system 800 that provides computer processing according to embodiments herein. (paragraph incorporated from U.S. Pat. No. 8,948,248).

Computer system 800 can be or include a computerized device such as a personal computer, processing circuitry, workstation, portable computing device, console, network terminal, processing device, network device, operating as a switch, router, server, client, etc. (paragraph incorporated from U.S. Pat. No. 8,948,248).

Note that the following discussion provides a basic embodiment indicating how to carry out functionality associated with decoder 440 as previously discussed. However, it should be noted that the actual configuration for carrying out the operations as described herein can vary depending on a respective application. (paragraph incorporated from U.S. Pat. No. 8,948,248).

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include a processor 813, I/O interface 814, and a communications interface 817. (paragraph incorporated from U.S. Pat. No. 8,948,248).

I/O interface 814 provides connectivity to repository 180, and if present, display screen, peripheral devices 816 such as a keyboard, a computer mouse, etc. (paragraph incorporatedfrom U.S. Pat. No. 8,948,248).

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with decoder application 440-1. The instructions are executed by a respective resource such as decoder 440 to perform any of the operations as discussed herein. (paragraph incorporated from U.S. Pat. No. 8,948,248).

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180. (paragraph incorporated from U.S. Pat. No. 8,948,248).

As shown, computer readable storage media 812 can be encoded with decoder application 840-1 executed by processor 813 as switch resource process 840-2. (paragraph incorporated from U.S. Pat. No. 8,948,248).

Note that the computer system 800 or decoder 440 also can be embodied to include a computer readable storage medium 812 (e.g., a hardware storage media, non-transitory storage media, etc.) for storing data and/or logic instructions. (paragraph incorporated from U.S. Pat. No. 8,948, 248).

Computer system 800 can include a processor 813 to execute such instructions and carry out operations as discussed herein. Accordingly, when executed, the code associated with decoder application 440-1 can support processing functionality as discussed herein. (paragraph incorporated from U.S. Pat. No. 8,948,248).

During operation of one embodiment, processor 813 accesses computer readable storage media 812 via the use of interconnect 811 in order to launch, run, execute, interpret or otherwise perform the instructions of decoder application 440-1 stored in computer readable storage) medium 812. Execution of the decoder application 440-1 produces processing functionality in processor 813. In other words, the decoder process 440-2 associated with processor 813 represents one or more aspects of executing decoder application 440-1 within or upon the processor 813 in the computer system 800. (paragraph incorporated from U.S. Pat. No. 8,948,248).

Those skilled in the art will understand that the computer system 800 can include other processes and/or software and hardware components, such as an operating system that controls allocation and use of hardware processing resources to execute decoder application 440-1. (paragraph incorporated from U.S. Pat. No. 8,948,248).

In accordance with different embodiments, note that computer system may be any of various types of devices, including, but not limited to, a personal computer system, desktop) computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device. (paragraph incorporated from U.S. Pat. No. 8,948,248).

Functionality supported by components in decoder 440 will now be discussed via flowcharts in FIGS. 33 to 35. As discussed above, the decoder application 440-1 executed by a respective switch and/or other hardware can be configured to execute the steps in the flowcharts as discussed below. (paragraph incorporated from U.S. Pat. No. 8,948,248).

Note that there will be some overlap with respect to concepts discussed above for FIGS.) 2A, 14 and 27 through 32. Also, note that the steps in the flowcharts need not always be executed in the order shown. The steps can be executed in any suitable order. (paragraph incorporated from U.S. Pat. No. 8,948,248).

Figure 33:
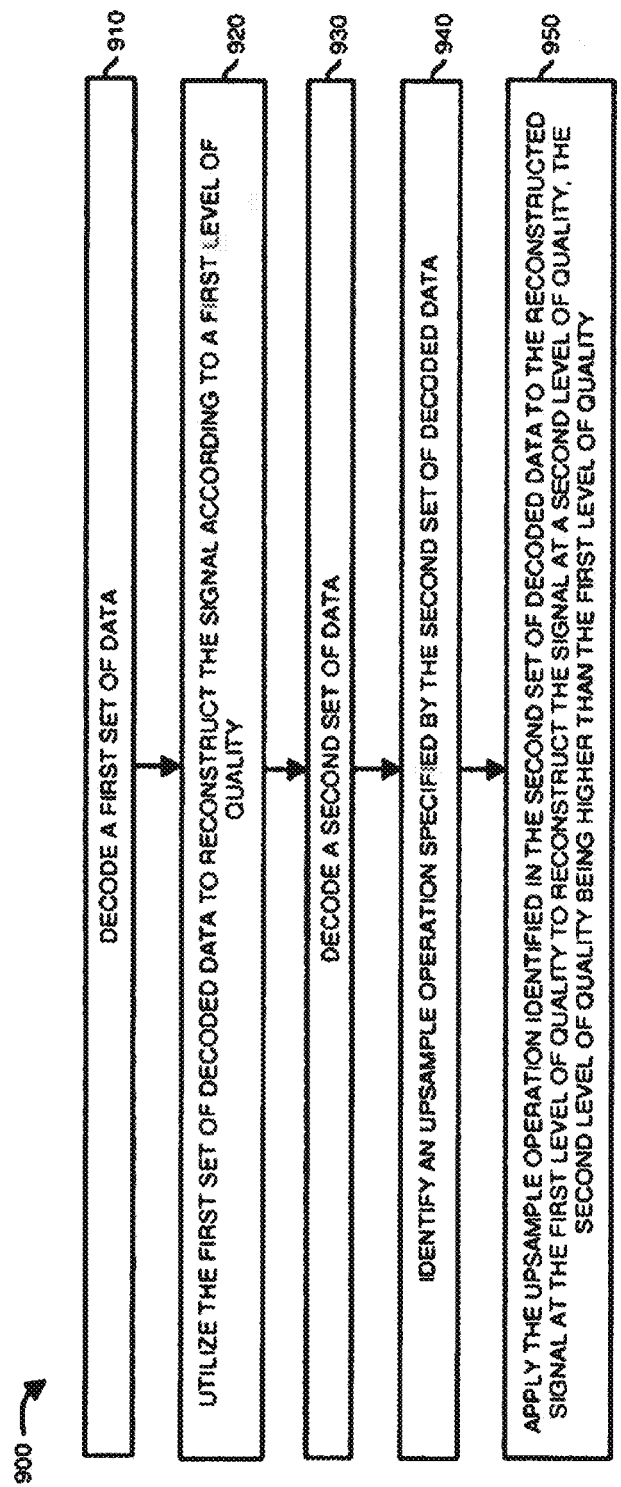
FIG. 33 is a flowchart illustrating an example method of reconstructing a signal according to embodiments herein (incorporated from U.S. Pat. No. 8,948,248).

FIG. 33 is a flowchart 900 illustrating a method of reconstructing a signal at different levels of quality according to embodiments herein. (paragraph incorporated from U.S. Pat. No. 8,948,248).

In step 910, the decoder 440 decodes a first set of data. (paragraph incorporated from U.S. Pat. No. 8,948,248).

In step 920, the decoder 440 utilizes the first set of decoded data to reconstruct the signal 115 according to a first level of quality. (paragraph incorporated from U.S. Pat. No. 8,948,248).

In step 930, the decoder 440 decodes a second set of data. (paragraph incorporated from U.S. Pat. No. 8,948,248).

In step 940, the decoder 440 identifies an upsample operation specified by the second set of decoded data. (paragraph incorporated from U.S. Pat. No. 8,948,248).

In step 950, the decoder 440 applies the upsample operation identified in the second set of decoded data to the reconstructed signal at the first level of quality to reconstruct the signal at a second level of quality. (paragraph incorporated from U.S. Pat. No. 8,948,248).

Figure 34:
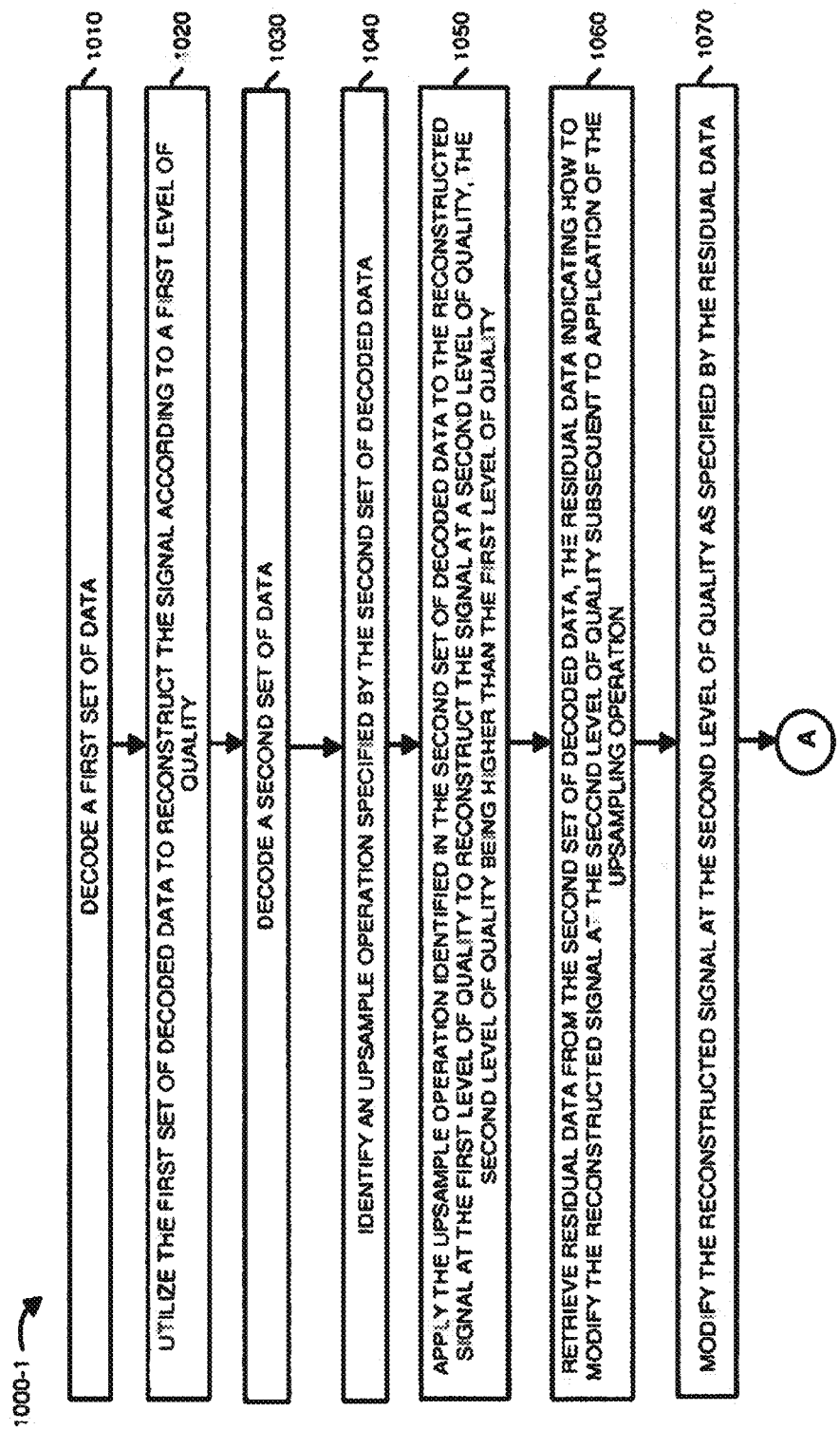
FIGS. 34 and 35 combine to form a flowchart illustrating a more specific example method of reconstructing a signal according to embodiments herein (incorporated from U.S. Pat. No. 8,948,248).
Figure 35:
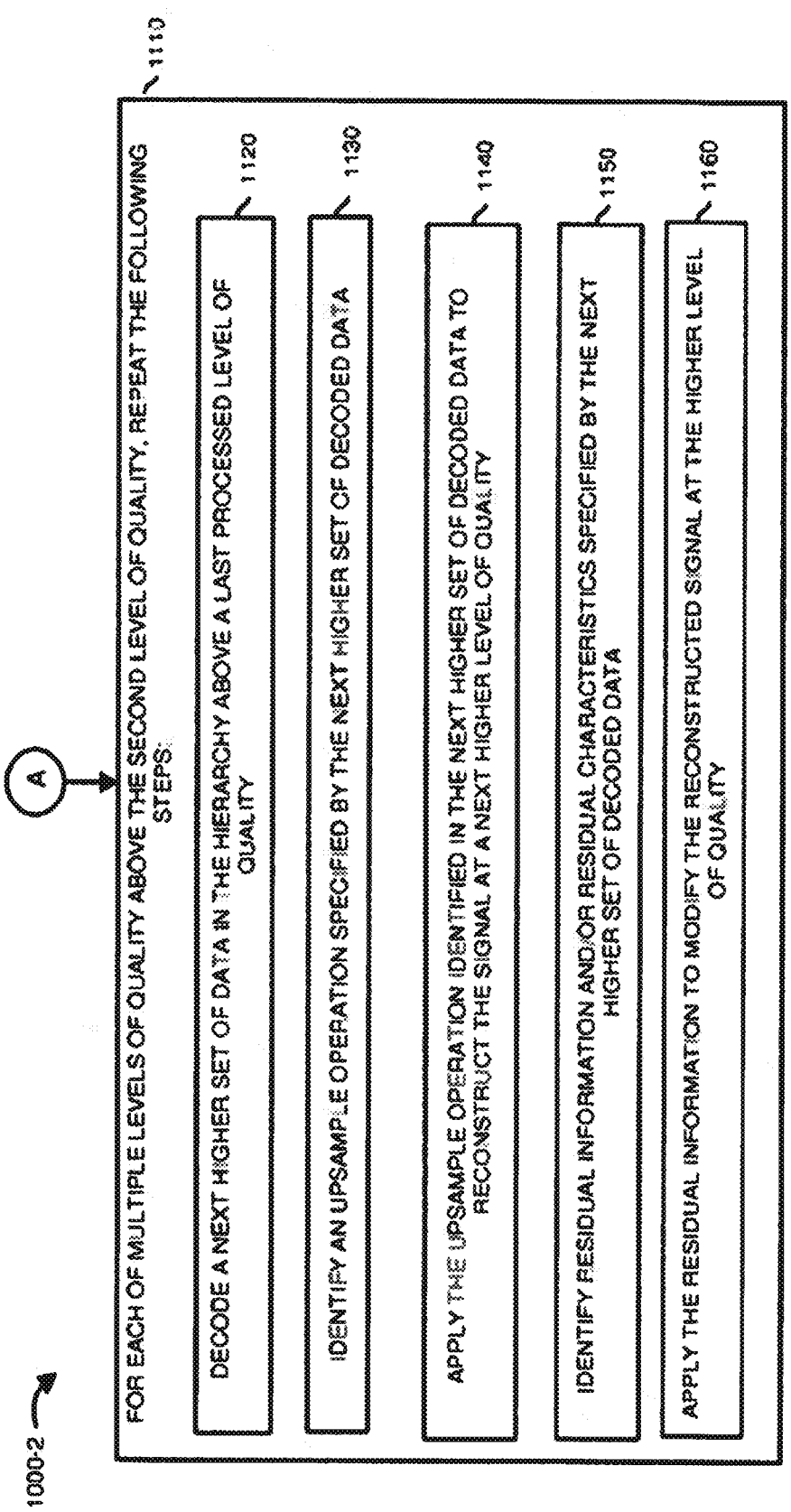

FIGS. 34 and 35 combine to form a flowchart 1000 (e.g., flowchart 1000-1 and flowchart 1000-2) illustrating decoding according to embodiments herein. (paragraph incorporated from U.S. Pat. No. 8,948,248).

In step 1010, the decoder 440 decodes a first set of data. (paragraph incorporated from U.S. Pat. No. 8,948,248).

In step 1020, the decoder 440 utilizes the first set of decoded data to reconstruct the signal 115 according to a first level of quality. (paragraph incorporated from U.S. Pat. No. 8,948,248).

In step 1030, the decoder 440 decodes a second set of data. (paragraph incorporated from U.S. Pat. No. 8,948,248).

In step 1040, the decoder 440 identifies an upsample operation and scale factor specified by the second set of decoded data. (paragraph incorporated from U.S. Pat. No. 8,948,248).

In step 1050, the decoder 440 applies the upsample operation and scale factor identified in the second set of decoded data to the reconstructed signal at the first level of quality to reconstruct the signal 115 at a second level of quality. (paragraph incorporated from U.S. Pat. No. 8,948,248).

In step 1060, the decoder 440 retrieves residual data from the second set of decoded data. The residual data indicates how to modify the reconstructed signal at the second level of quality subsequent to application of the upsampling operation. (paragraph incorporated from U.S. Pat. No. 8,948,248).

In step 1070, the decoder 440 modifies the reconstructed signal at the second level of quality as specified by the residual data. (paragraph incorporated from U.S. Pat. No. 8,948,248).

In step 1110, for each of multiple levels of quality above the second level of quality in the hierarchy, the decoder 440 repeats the following steps: (paragraph incorporated from U.S. Pat. No. 8,948,248).

In sub-step 1120, the decoder 440 decodes a next higher set of data in the hierarchy above a last processed level of quality. (paragraph incorporated from U.S. Pat. No. 8,948,248).

In sub-step 1130, the decoder 440 identifies an upsample operation and scale factor specified by the next higher set of decoded data. (paragraph incorporated from U.S. Pat. No. 8,948,248).

In sub-step 1140, the decoder 440 applies the upsample operation and scale factor identified in the next higher set of decoded data to reconstruct the signal 115 at a next higher level of quality. (paragraph incorporated from U.S. Pat. No. 8,948,248).

In sub-step 1150, the decoder 440 identifies residual information and/or residual characteristics specified by the next higher set of decoded data. (paragraph incorporated from U.S. Pat. No. 8,948,248).

In sub-step 1160, the decoder 440 applies the residual information to modify the reconstructed signal at the higher level of quality. (paragraph incorporated from U.S. Pat. No. 8,948,248).

Note again that techniques herein are well suited for use in processing and reconstructing signals using a decoder. However, it should be noted that embodiments herein are not limited to use in such applications and that the techniques discussed herein are well suited for other applications as well. (paragraph incorporated from U.S. Pat. No. 8,948,248).

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform. (paragraph incorporated from U.S. Pat. No. 8,948,248).

According to one embodiment, an encoder receives a signal. The encoder utilizes one or more downsample operations to produce downsampled renditions of the signal (i.e., signal data) at successively lower levels of quality in the hierarchy. In a reverse direction, the encoder applies the one or more upsample operations to a downsampled rendition of the signal at a first level of quality to produce an upsampled rendition of the signal at a second level of quality in the hierarchy. The second level of quality is higher than the first level of quality. The one or more upsample operations and one or more downsample operations can be asymmetrical with respect to each other. That is, the function applied during downsampling can be different from the function applied when upsampling. The encoder produces residual data indicating a difference between the downsampled rendition of the signal at the second level of quality and the upsampled rendition of the signal at the second level of quality. (paragraph incorporated from U.S. Pat. No. 8,711,943).

Figure 36:
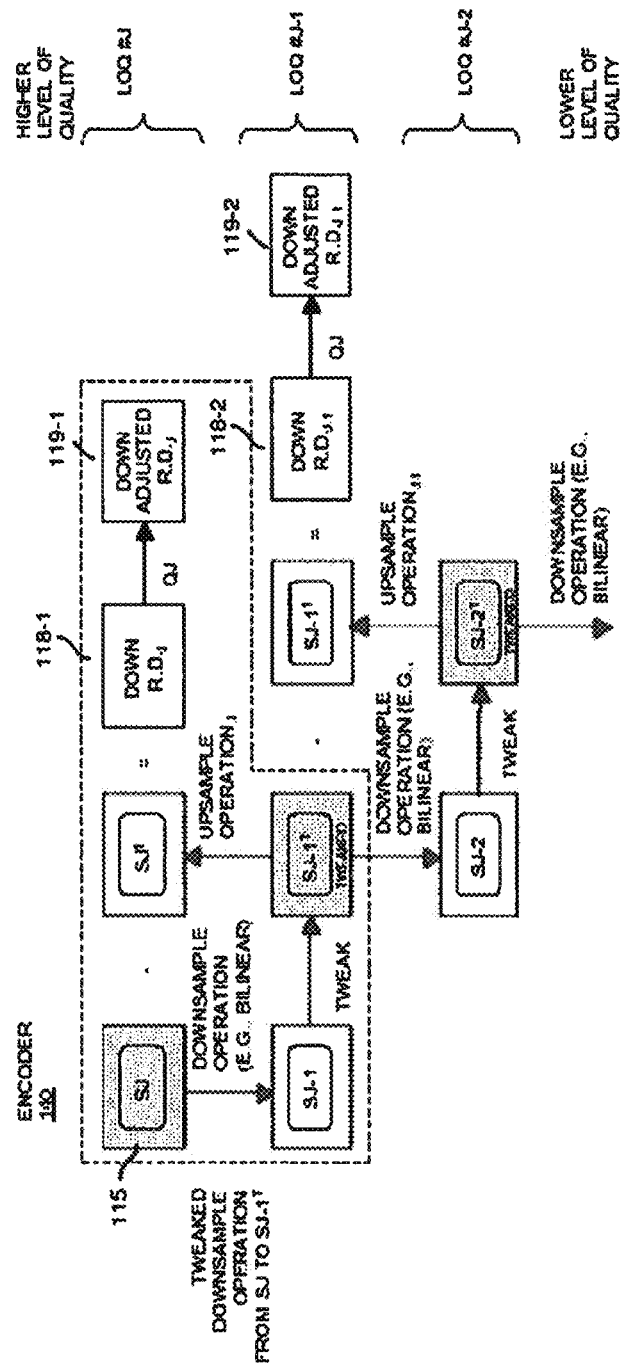
FIG. 36 is an example diagram of an encoder and downsampling of a signal according to embodiments herein (incorporated by reference from U.S. Pat. No. 8,711,943).

FIG. 36 is an example diagram of an encoder and respective downsampling of a signal according to embodiments herein. (paragraph incorporated from U.S. Pat. No. 8,711,943).

Encoder 140 receives signal 115. Signal 115 encoded by the encoder 140 can be any suitable type of data information. (paragraph incorporated from U.S. Pat. No. 8,711,943).

By way of a non-limiting example, the signal 115 can be image data, symbols, etc., indicating settings of each of multiple signal elements (e.g., pels/plane elements, pixels/picture elements, voxels/volumetric picture elements, etc.) in a respective image. The image can be two dimensional (e.g., pictures, video frames, 2D motion maps, etc.), three-dimensional (e.g., 3D/volumetric images, holographic images, CAT-scans, medical/scientific images, 3D motion maps, etc.) or even featuring more than three dimensions. In accordance with such an embodiment, the settings of the signal elements (as specified by the signal 115) indicate how to reconstruct the respective image for playback on a device. (paragraph incorporated from U.S. Pat. No. 8,711,943).

During encoding of signal 115, the encoder 140 uses one or more downsample operations and one or more upsample operations to produce sets of encoded signal data that are used by a decoder to reconstruct an original signal 115. One example of a decoder that uses the encoded data as discussed herein is described in related U.S. patent application Ser. No. 13/188,201 entitled "TIERED SIGNAL DECODING AND SIGNAL RECONSTRUCTION," filed on the same day as the present application, the entire teachings of which are incorporated herein by this reference. (paragraph incorporated from U.S. Pat. No. 8,711,943).

The signal data as discussed below represents renditions of the signal 115 at the different levels of quality in the encoding hierarchy. Note that level of quality J may represent a highest level of quality or an intermediate level of quality in the hierarchy. In one embodiment, the encoder 140 processes signal data at pairs of levels in the hierarchy to perform downsampling of the signal into lower levels of quality. (paragraph incorporated from U.S. Pat. No. 8,711,943).

Downsampling of the signal 115 can include applying a selected downsampling operation to signal data SJ at level of quality J to create signal data SJ-1 at level of quality J-1. For instance, the downsample operation can be a simple bilinear filter, or a more complex operation such as the application of a non-linear function, as previously discussed. (paragraph incorporated from U.S. Pat. No. 8,711,943).

Note that signal data SJ-1 represents a lower resolution or lower level of quality than original signal 115; signal data SJ-2 represents a lower resolution or lower level of quality of signal 115 than signal data SJ-1, and so on. (paragraph incorporated from U.S. Pat. No. 8,711,943).

Thus, the signal data at each respective level in the hierarchy represents the original signal, but at a lower level of quality. Typically, less and less data (e.g., bit information, symbols, etc.) is needed to define the signal at each successively lower level in the hierarchy. (paragraph incorporated from U.S. Pat. No. 8,711,943).

In accordance with one embodiment, the encoder 140 downsamples the signal 115 into signal data SJ-1. Subsequent to initial downsampling of the signal data SJ to level of quality J-1, the encoder 140 tweaks or adjusts settings of individual elements in the signal data SJ-1 to identify which tweaked settings to signal data SJ-1 reduces an entropy associated with residual data produced for level of quality J. (paragraph incorporated from U.S. Pat. No. 8,711,943).

More specifically, in one embodiment, the encoder 140 applies an upsample operation J to a first version of signal data SJ-1 <T >to produce signal data SJ <1>. The encoder 140 then calculates a difference between the signal data SJ and SJ <1 >to produce residual data 118-1. Residual data 118-1 indicates modifications that need to be made to signal data SJ <1 >to reproduce, with a desired accuracy, signal data SJ (e.g., signal 115). (paragraph incorporated from U.S. Pat. No. 8,711,943).

In one embodiment, the encoder 140 applies quantization process QJ to produce residual data 119-1. Step QJ represents application of a function that adjusts the setting of individual values in the residual data 118-1 to be the same value or symbol if the respective magnitudes of such elements fall within a range or are above/below a threshold value. As an example, via quantization, the encoder 140 can identify settings of individual elements in the residual data 118-1 having a value falling in a range between −1.5 and +1.5. For those values that fall within this range, the encoder 140 sets such values in the adjusted residual data 119-1 to a predetermined value such as zero; the encoder 140 can identify settings of individual elements in the residual data 118-1 falling in a range between +7.5 and +6.5 and set such values in the adjusted residual data 119-1 to a setting of +7.0, and so on. Accordingly, the quantization QJ reduces an entropy of the residual data 118-1. That is, the values of residual data are modified so that they are more similar to each other. (paragraph incorporated from U.S. Pat. No. 8,711,943).

In this example, note that if the signal data SJ is equal to the signal data SJ <1>, then the produced residual data will be all zero values (e.g., minimum entropy). In such an instance, there would be no need to tweak signal data SJ-1 as there would be a lowest possible entropy associated with the residual data 118-1. (paragraph incorporated from U.S. Pat. No. 8,711,943).

A more likely case is that the signal data SJ and SJ <1 >will not be equal. Entropy of the residual data 118-1 and adjusted residual data 119-1 will likely be non-zero values. In this instance, assume that the residual data 118-1 and adjusted residual data 119-1 include non-zero values. High entropy of residual data is undesirable because it means that extra data must be used to reconstruct the original signal 115. It is typically desirable to reduce the overall amount of data needed to reconstruct the signal 115. (paragraph incorporated from U.S. Pat. No. 8,711,943).

In one embodiment, to reduce an entropy of the residual data 119-1, the encoder 140 repeatedly tweaks the signal data SJ-1 and upsamples different versions of the tweaked signal data SJ-1 <T >into signal data SJ <1 >until the respective tweaks to individual elements of signal data SJ-1 result in a substantially lower or the lowest entropy of residual data 119-1. (paragraph incorporated from U.S. Pat. No. 8,711,943).

Tweaking can be performed on a per element basis. That is, the encoder 140 can select an element in the signal data SJ-1 and repeatedly tweak a value of the element to identify a respective setting that reduces an entropy associated with residual data 119-1. The encoder can reduce a magnitude of the tweak to the selected element as the tweaked value becomes closer to producing a substantially lower entropy metric for the next level's residual data. (paragraph incorporated from U.S. Pat. No. 8,711,943).

Upon identifying the appropriate best tweak to the selected element, the encoder 140 then saves the tweaked signal data for the element and stores it in signal data SJ-1 <T>. (paragraph incorporated from U.S. Pat. No. 8,711,943).

Using each of the substantially best tweaks for previously tested elements, the encoder 140 then selects a next element in the signal data SJ-1 to tweak and repeats the above process to identify a best setting for the selected element, and so on. (paragraph incorporated from U.S. Pat. No. 8,711,943).

Subsequent to completing a process of producing tweaked signal data SJ-1 <T >for level of quality J-1 that reduces an entropy of residual data 119-1, the encoder 140 then repeats the same process for each next lower level of quality. (paragraph incorporated from U.S. Pat. No. 8,711,943).

For example, at a next lower level of quality, the encoder 140 downsamples the signal data SJ-1 <T >into signal data SJ-2. Subsequent to this downsampling, the encoder 140 tweaks or adjusts settings of individual elements in the signal data SJ-2 to identify which tweaked settings to signal data SJ-2 reduces an entropy associated with residual data 119-2 produced for level of quality J-1. (paragraph incorporated from U.S. Pat. No. 8,711,943).

More specifically, in one embodiment, the encoder 140 applies an upsample operation J-1 to the signal data SJ-2 <T>to produce signal data SJ-1 <1>. The encoder 140 then calculates a difference between the signal data SJ-1 <T>and SJ-1 <1> to produce residual data 118-2. The encoder 140 then applies quantization process to produce residual data 119-2. (paragraph incorporated from U.S. Pat. No. 8,711,943).

As previously discussed, quantization can include application of a function that adjusts the setting of individual values in the signal data to be the same value or symbol if the respective magnitudes of such values fall within a range or are above/below a threshold value. (paragraph incorporated from U.S. Pat. No. 8,711,943).

To reduce an entropy of the residual data 119-2, the encoder 140 repeatedly tweaks the signal data SJ-2 and upsamples the tweaked signal data SJ-2 <T>into signal data SJ-1 <1>until the respective tweaks to individual elements of signal data SJ-2 result in a substantially lower or the lowest entropy of residual data 119-2. (paragraph incorporated from U.S. Pat. No. 8,711,943).

As previously mentioned, tweaking can be performed on a per element basis. That is, the encoder can select an element in the signal data SJ-2 and repeatedly tweak a value of the selected element to identify a setting that reduces an entropy associated with residual data 119-2. Upon identifying appropriate tweaks to the selected element, the encoder 140 then saves the tweaked signal data for the element and stores it in signal data SJ-2 <T>. (paragraph incorporated from U.S. Pat. No. 8,711,943).

The encoder 140 then selects a next element in the signal data SJ-1 to tweak and repeats the above process to identify a best setting for each selected element, and so on. (paragraph incorporated from U.S. Pat. No. 8,711,943).

Subsequent to completing a process of producing tweaked signal data SJ-2 <T>for level of quality J-2 that reduces an entropy of residual data 119-2, the encoder 140 then repeats the same process for each next lower level of quality. Accordingly, the encoder 140 produces tweaked sets of signal data at lower levels of quality in the hierarchy. (paragraph incorporated from U.S. Pat. No. 8,711,943).

Note that the encoder 140 can be configured to test multiple different upsample options (e.g., one or more upsample operations) to identify which of multiple upsample options produces the lowest entropy of residual data. In other words, the encoder 140 can repeat the process of downsampling and tweaking for each of multiple upsample operations to identify which upsample operation (s) best reduce the entropy of residual data at the next higher level of quality. (paragraph incorporated from U.S. Pat. No. 8,711,943).

Figure 37:
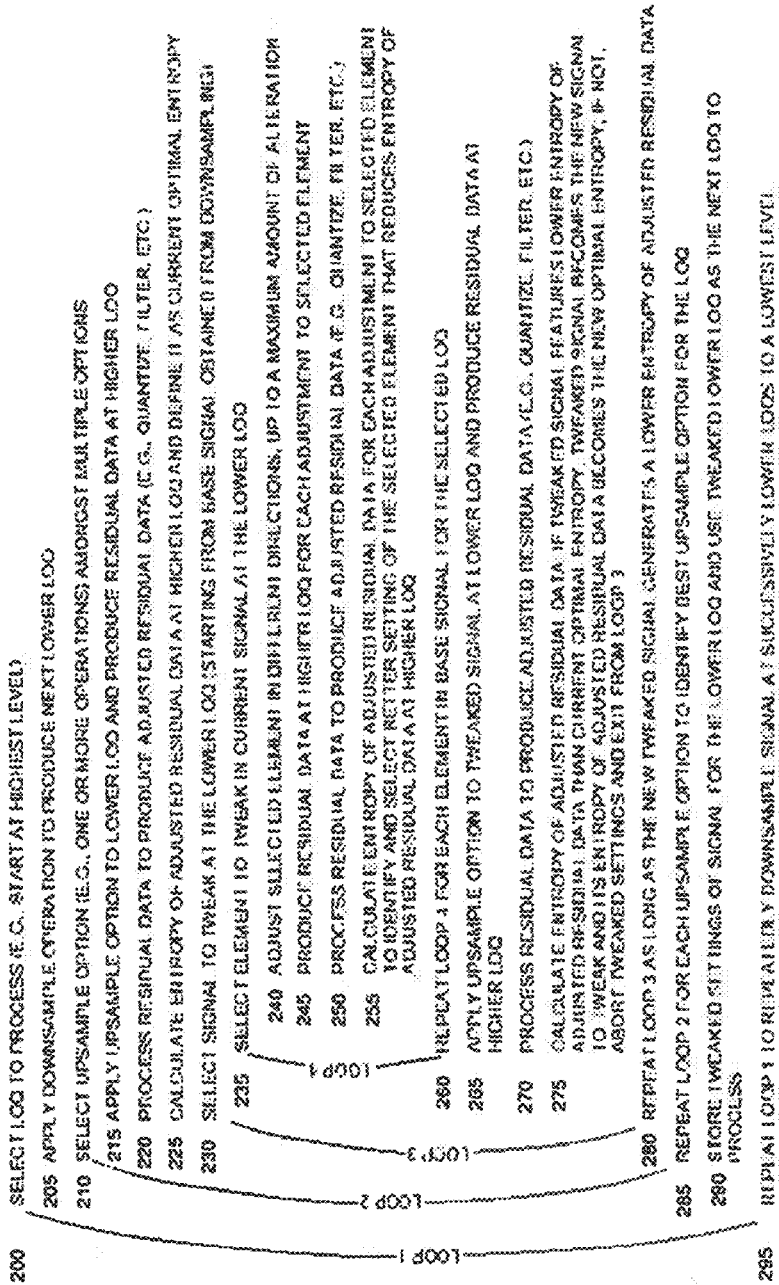
FIG. 37 is an example diagram illustrating steps of performing a downsampling algorithm according to embodiments herein (incorporated by reference from U.S. Pat. No. 8,711,943).

FIG. 37 is an example diagram illustrating a downsampling method according to embodiments herein. Note that the discussion of the multi-loop algorithm in FIG. 37 will include references to the processing discussed in FIG. 36. (paragraph incorporated from U.S. Pat. No. 8,711,943).

In step 200, the encoder 140 selects a level of quality to process. Assume in that this example that the encoder 140 selects and starts at level of quality J. (paragraph incorporated from U.S. Pat. No. 8,711,943).

In step 205, the encoder 140 applies a selected downsample operation to produce signal data SJ-1. (paragraph incorporated from U.S. Pat. No. 8,711,943).

In step 210, the encoder 140 selects an upsample option amongst multiple possible upsample options. Each upsample option may include upsampling via one or more upsample operations. (paragraph incorporated from U.S. Pat. No. 8,711,943).

In step 215, the encoder 140 applies the selected upsample option to signal data SJ-1 to produce residual data 118-1. (paragraph incorporated from U.S. Pat. No. 8,711,943).

In step 220, the encoder 140 applies a process (e.g., quantization or simulated quantization) to the residual data 118-1 to produce adjusted residual data 119-1. (paragraph incorporated from U.S. Pat. No. 8,711,943).

In step 225, the encoder 140 calculates an entropy (or simulation/approximation thereof) of the adjusted residual data 119-1 and defines it as a current entropy value. (paragraph incorporated from U.S. Pat. No. 8,711,943).

In step 230, the encoder 140 selects a signal (e.g., signal data SJ-1) to tweak at level of quality J-1. (paragraph incorporated from U.S. Pat. No. 8,711,943).

In step 235, the encoder 140 selects an element to tweak in the selected signal data SJ-1 to produce signal data SJ-1 <T>. (paragraph incorporated from U.S. Pat. No. 8,711,943).

In step 240, the encoder 140 adjusts the selected element in signal data SJ-1 <T>in different directions and with potentially different amounts up to a maximum number of iterations. (paragraph incorporated from U.S. Pat. No. 8,711,943).

In step 245, the encoder 140 produces residual data 118-1 (or at least a portion of it which is more directly influenced by the selected element) for each adjustment to the selected element. (paragraph incorporated from U.S. Pat. No. 8,711,943).

In step 250, the encoder 140 processes the residual data 118-1 (or a portion thereof) to produce adjusted residual data 119-1 (or a portion thereof) for each tweak to the selected element as previously discussed. (paragraph incorporated from U.S. Pat. No. 8,711,943).

In step 255, the encoder 140 calculates an entropy of the adjusted (portion of) residual data 119-1 for each tweak to the selected element to identify and select a substantially better or best setting of the selected element that reduces an entropy of the adjusted (portion of) residual data 119-1. (paragraph incorporated from U.S. Pat. No. 8,711,943).

In step 260, the encoder 140 repeats loop 4 processing back to step 235 for each element in the selected signal data SJ-1 to identify a substantially best setting for each element in signal data SJ-1. The encoder 140 continues processing at step 260 subsequent to testing all elements. (paragraph incorporated from U.S. Pat. No. 8,711,943).

In step 265, the encoder 140 applies an upsample operation to tweaked signal data SJ-1 <T>and produces residual data 118-1 and adjusted residual data 119-1. (paragraph incorporated from U.S. Pat. No. 8,711,943).

In step 270, the encoder 140 processes the residual data 118-1 to produce adjusted residual data 119-1. (paragraph incorporated from U.S. Pat. No. 8,711,943).

In step 275, the encoder 140 calculates the entropy (or a simulation/approximation thereof) of the adjusted residual data 119-1. If the tweaked signal features lower entropy of adjusted residual data than current optimal entropy, the tweaked signal becomes the new signal to tweak and its entropy of adjusted residual data becomes the new optimal entropy. If not, the encoder 140 aborts tweaked settings and exits from loop 3 to step 285. Otherwise, the encoder 140 continues processing at step 280 to repeat loop 3. (paragraph incorporated from U.S. Pat. No. 8,711,943).

In step 280, the encoder 140 continues execution at step 230 as long the new tweaked signal generates a lower entropy of adjusted residual data. (paragraph incorporated from U.S. Pat. No. 8,711,943).

In step 285, the encoder 140 continues execution at step 210 for a next selected upsample option of multiple possible upsample options. When all upsample options have been tested, the encoder 140 continues processing at step 290. (paragraph incorporated from U.S. Pat. No. 8,711,943).

In step 290, the encoder 140 stores tweaked settings for signal data SJ- 1 <T>. (paragraph incorporated from U.S. Pat. No. 8,711,943).

In step 295, the encoder 140 repeats processing at step 200 to downsample the signal data SJ- 1 <T >to a next lower level of quality J- 2. The encoder 140 repeats this process until the signal 115 has been downsampled to a lowest desired level of quality. (paragraph incorporated from U.S. Pat. No. 8,711,943).

Figure 38:
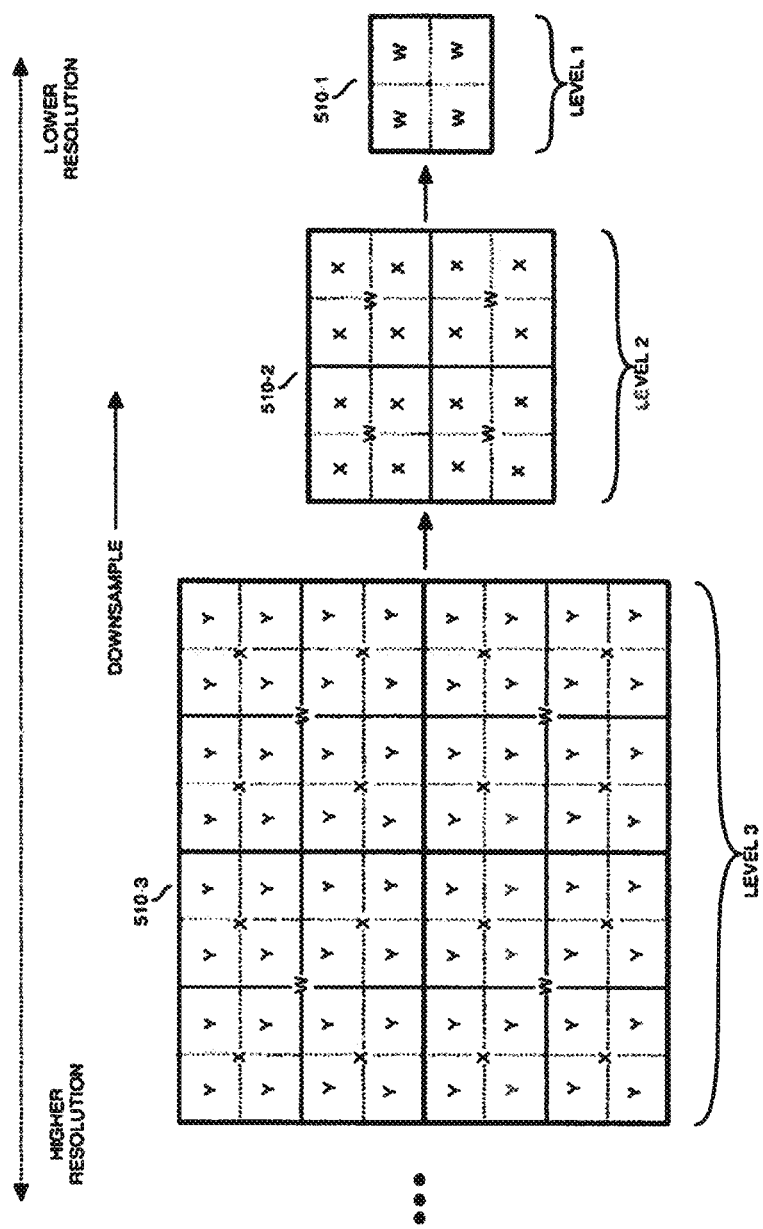
FIG. 38 is an example diagram illustrating downsampling of image information according to embodiments herein (incorporated by reference from U.S. Pat. No. 8,711,943).

FIG. 38 is an example diagram illustrating downsampling of image information according to embodiments herein. As previously discussed, the signal 115 can represent image data. In accordance with such an embodiment, the signal data at each level of quality indicates settings of elements (e.g., pels/plane elements) in a respective image. (paragraph incorporated from U.S. Pat. No. 8,711,943).

In one embodiment, each color component of an element in the signal data is encoded in accordance with a color space standard such as YUV, RGB or HSV, although the attributes of signal 115, when defining an image, can be encoded according to any suitable format. (paragraph incorporated from U.S. Pat. No. 8,711,943).

Downsampling results in reducing a resolution and corresponding level of quality of respective signal data. For example, signal data for level of quality 3 indicates settings of elements in respective image 510- 3; signal data for level of quality 2 indicates settings of elements in respective image 510- 2; signal data for level of quality 1 indicates settings of elements in respective image 510- 1, and so on. (paragraph incorporated from U.S. Pat. No. 8,711,943).

When downsampling in a manner as previously discussed, the encoder 140 produces signal data for a next lower level of quality (e.g., level 2) to define, for example, image 510- 2; the encoder 140 produces signal data for a next lower level of quality (e.g., level 1) to define, for example, image 510- 1; and so on. (paragraph incorporated from U.S. Pat. No. 8,711,943).

As previously discussed, the amount of data to define the downsampled image can be reduced for each lower level of quality to a desired lowest level of quality. That is, when executing a 2:1 scaled downsampling from level 3 to level 2, the encoder 140 reduces multiple elements Y in image 510- 3 to a single element X in respective image 510- 2 as shown. When downsampling from level 2 to level 1, the encoder 140 reduces multiple elements X in image 510- 3 to a single element W in respective image 510- 1, and so on. (paragraph incorporated from U.S. Pat. No. 8,711,943).

Figure 39:
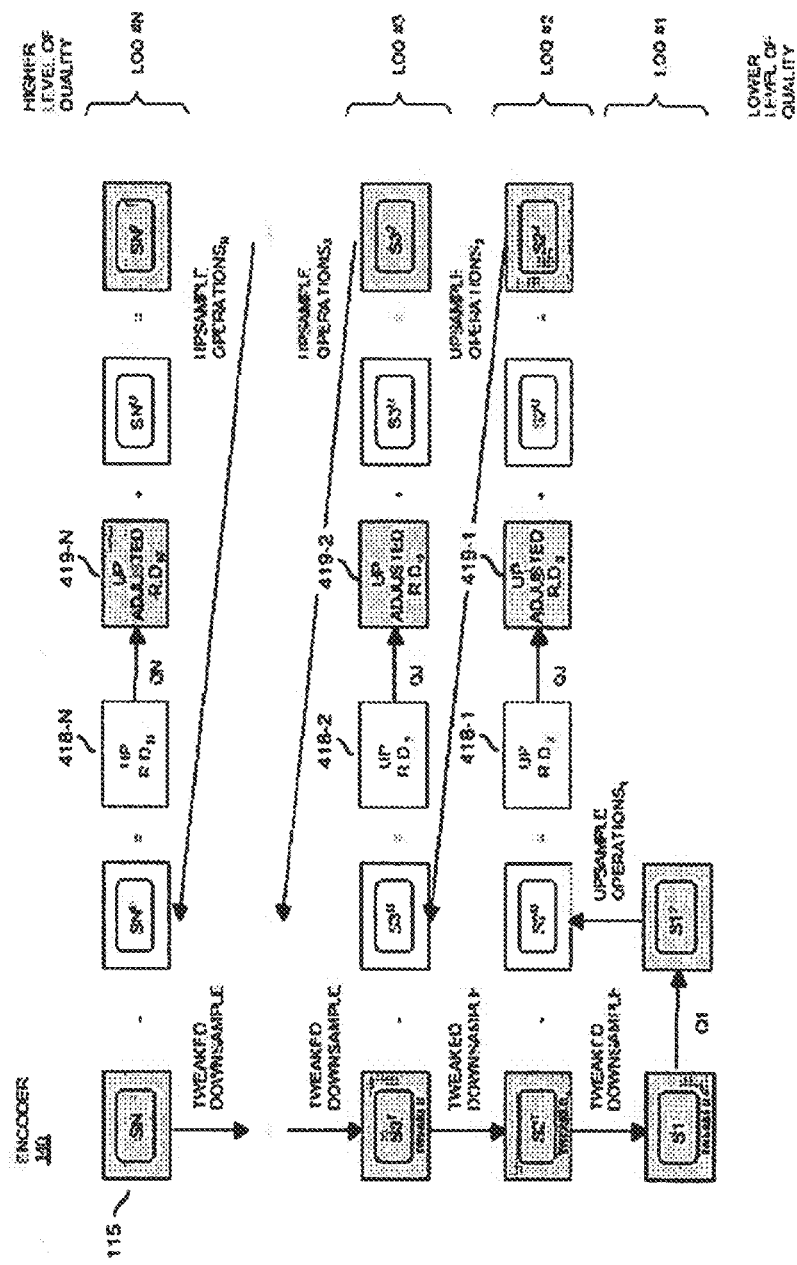
FIG. 39 is an example diagram illustrating encoding of a signal according to embodiments herein (incorporated by reference from U.S. Pat. No. 8,711,943).

FIG. 39 is an example diagram illustrating further encoding of a signal according to embodiments herein. (paragraph incorporated from U.S. Pat. No. 8,711,943).

In a manner as previously discussed, the encoder 140 downsamples signal 115 into different sets of signal data including signal data S 3 <T>, signal data S 2 <T>, signal data S 1 <T>. (paragraph incorporated from U.S. Pat. No. 8,711,943).

Note that that the process of tweaking during downsampling is optional. In accordance with other embodiments, any suitable downsample operation(s) can be applied by the encoder 140 to produce base sets of data in lieu of tweaked signal data such as signal data S 3 <T>, signal data S 2 <T>, S 1 <T>. (paragraph incorporated from U.S. Pat. No. 8,711, 943).

At a lowest level of quality such as level of quality 1, the encoder 140 can be configured to apply quantization function Q 1 to the signal data S 1 <T >to produce signal data S 1 <2>. As previously discussed, quantization reduces an entropy of respective signal data. (paragraph incorporated from U.S. Pat. No. 8,711,943).

Note that signal data S 1 <2 >is reduced information representing the signal 115 at the lowest level of quality (e.g., level of quality # 1) in the hierarchy. (paragraph incorporated from U.S. Pat. No. 8,711,943).

The encoder 140 selects an upsample operation in which to upsample signal data S 1 <2 >into signal data S 2 <U >(e.g., an intermediate rendition of the signal at the given level of quality). For the selected upsample operation, at level of quality 2, the encoder 140 produces residual data 418- 1 based on a difference between signal data S 2 <T >and signal data S 2 <U>. Because the encoding process may be lossy, the upsampled signal data S 2 <U >is likely similar to but not identical to signal data S 2 <T>. (paragraph incorporated from U.S. Pat. No. 8,711,943).

The encoder 140 then applies quantization function QJ to residual data 418- 1 to produce adjusted residual data 419- 1 in a manner as previously discussed. The encoder 140 can repeat this process for each of multiple different operations to determine which upsample operation or operations are best for reducing an entropy associated with adjusted residual data 419- 1. (paragraph incorporated from U.S. Pat. No. 8,711,943).

The encoder 140 then stores the signal data S 1 <2>, substantially best identified upsample operation, and corresponding adjusted residual data 419- 1 for level of quality # 1. For this stored information, the encoder 140 adds the adjusted residual data 419- 2 and signal data S 2 <U >to produce signal data S 2 <2>. (paragraph incorporated from U.S. Pat. No. 8,711,943).

Signal data S 2 <2 >is a set of reduced information representing the signal at level of quality 2 in the hierarchy. Accordingly, embodiments herein include tweaking elements in the intermediate rendition of the signal (i.e., signal data S 2 <U>) at the second level of quality to produce a tweaked rendition of the signal (e.g., signal data S 2 <2>) at the second level of quality. (paragraph incorporated from U.S. Pat. No. 8,711,943).

As will be discussed in FIG. 41, the encoder 140 generates residual data 470- 2 based on a difference between an upsampled rendition of the signal 115 (e.g., signal data S 2 <U>) at the second level of quality and the tweaked rendition of the signal (e.g., signal data S 2 <3>) at the second level of quality; the encoder 140 generates residual data 470- 3 based on a difference between an upsampled rendition of the signal 115 (e.g., signal data S 3 <U>) at the second level of quality and the tweaked rendition of the signal (e.g., signal data S 3 <3>) at the second level of quality; and so on. (paragraph incorporated from U.S. Pat. No. 8,711,943).

Referring again to FIG. 39, the encoder 140 performs upsampling from level of quality 2 to level of quality 3 in a similar manner as discussed above for upsampling from level of quality 1 to level of quality 2. As an example, at level of quality 2, the encoder 140 selects an upsample operation (amongst multiple possible upsample operations) in which to upsample signal data S 2 <2 >into signal data S 3 <U>. For the selected upsample operation, at level of quality 3, the encoder 140 produces residual data 418- 2 based on a difference between signal data S 3 <T >and signal data S 3 <U>. Because the encoding process may be lossy, the upsampled signal data S 3 <U >is likely similar to but not identical to signal data S 3 <T>. (paragraph incorporated from U.S. Pat. No. 8,711,943).

The encoder 140 then applies quantization function QJ to residual data 418-2 to produce adjusted residual data 419-2 in a manner as previously discussed. (paragraph incorporated from U.S. Pat. No. 8,711,943).

The encoder 140 can repeat this process for testing each of multiple different operations to determine which upsample operation or operations are best for reducing an entropy associated with adjusted residual data 419-2. (paragraph incorporated from U.S. Pat. No. 8,711,943).

The encoder 140 then stores the signal data S 2 <2>, respective best upsample operation, and corresponding adjusted residual data 419-2 for level of quality # 2. The encoder 140 adds the adjusted residual data 419-2 and signal data S 3 <U >to produce signal data S 3 <2>. Signal data S 3 <3 >is a set of reduced information representing the signal at level of quality 3 in the hierarchy. (paragraph incorporated from U.S. Pat. No. 8,711,943).

The encoder 140 repeats this process as shown up to level of quality N in the hierarchy. (paragraph incorporated from U.S. Pat. No. 8,711,943).

Figure 40:
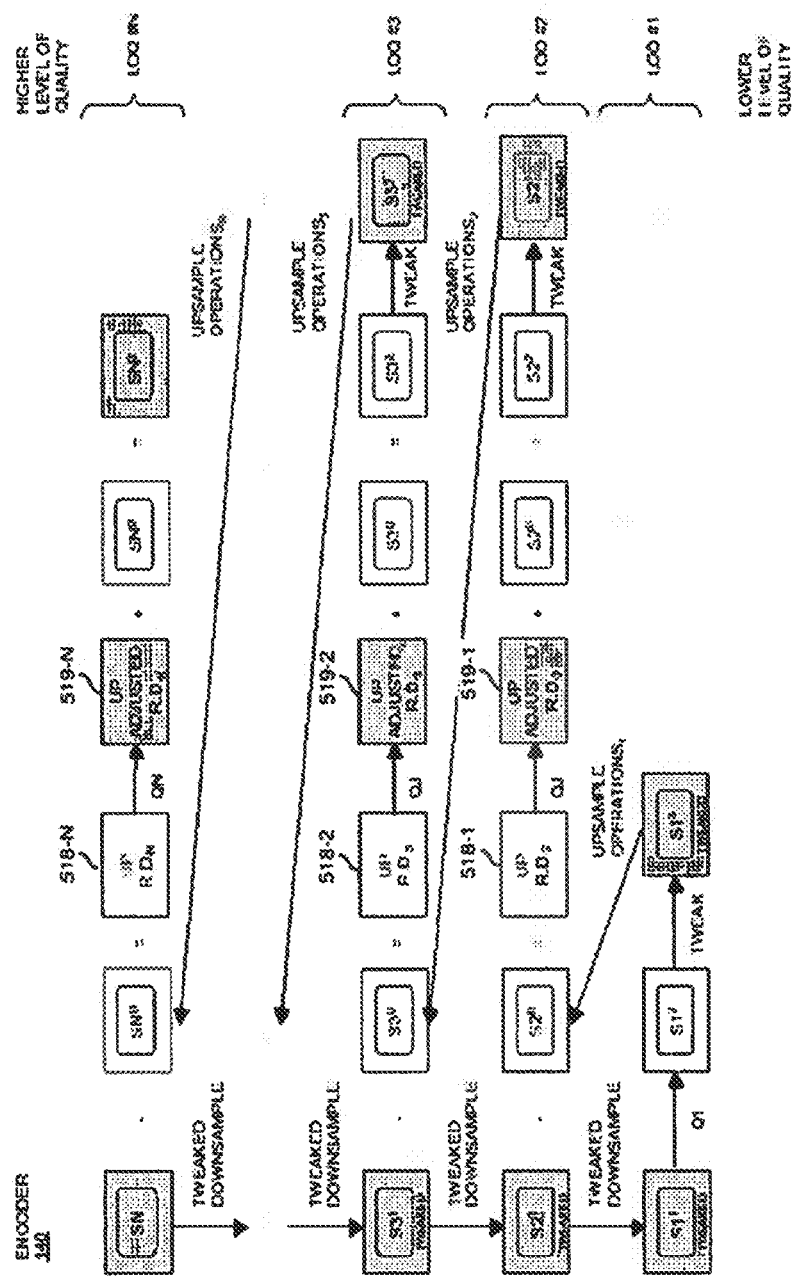
FIG. 40 is an example diagram illustrating encoding of a signal including tweaking of elements during upsampling to reduce an entropy of residual data according to embodiments herein (incorporated by reference from U.S. Pat. No. 8,711,943).

FIG. 40 is an example diagram illustrating encoding of a signal including tweaking of elements during upsampling to reduce an entropy of residual data according to embodiments herein. In this example embodiment, unlike the example in FIG. 39, the encoder 140 performs tweaking of elements while upsampling to produce tweaked data for each level of quality. (paragraph incorporated from U.S. Pat. No. 8,711,943).

In a manner as previously discussed, the encoder 140 downsamples signal 115 into any suitable sets of signal data representative of the signal 115 at lower levels of quality. Thus, downsampled signal data at lower levels may or may not be derived from tweaking during downsampling. (paragraph incorporated from U.S. Pat. No. 8,711,943).

At a lowest level of quality such as level of quality 1, the encoder 140 applies quantization function Q 1 to the downsampled signal data S 1 <T >to produce signal data S 1 <2>. Signal data S 1 <2 >is compressed or reduced information representing the signal at the lowest level of quality in the hierarchy. Application of quantization step Q 1 to produce signal data S 1 <2 >can be part of the downsampling process. (paragraph incorporated from U.S. Pat. No. 8,711,943).

The encoder 140 then selects an upsample operation in which to upsample a tweaked version of signal data S 1 <2 >(e.g., signal data S 1 <3>) into signal data S 2 <U>. (paragraph incorporated from U.S. Pat. No. 8,711,943).

In this embodiment, the encoder 140 tweaks settings of signal data S 1 <2 >to produce a set of signal data S 1 <3 >that reduces an entropy associated with adjusted residual data 519-1. For example, in one embodiment, the encoder 140 selects an element in signal data S 1 <2 >and repeatedly tweaks the selected element to identify which setting of the selected element produces a lowest entropy of adjusted residual data 519-1. The encoder 140 repeats the tweaking for each element in the signal data S 1 <2 >to produce signal data S 1 <3>. (paragraph incorporated from U.S. Pat. No. 8,711,943).

Note that in addition to identifying a best setting for each element for the selected upsample operation, the encoder 140 can test each of multiple possible upsample operations to identify which operations and corresponding tweaks (for the different upsample operations) are best for producing the substantially lowest entropy associated with adjusted residual data 519-1. (paragraph incorporatedfrom U.S. Pat. No. 8,711,943).

Subsequent to identifying substantially best tweaked settings for signal data S 1 <2 >and substantially best upsample operation, the encoder 140 then stores the tweaked signal data S 1 <3>, best identified upsample operation, and corresponding adjusted residual data 519-1 for level of quality # 1. For this stored information, the encoder 140 adds the adjusted residual data 519-1 and signal data S 2 <U >to produce signal data S 2 <2>. Signal data S 2 <2 >is a set of reduced information representing the signal at level of quality 2 in the hierarchy. (paragraph incorporated from U.S. Pat. No. 8,711,943).

The encoder 140 then performs upsampling from level of quality 2 to level of quality 3 in a similar manner as discussed above for upsampling from level of quality 1 to level of quality 2. The encoder 140 repeats this process for each next higher level of quality until reaching the highest level of quality. (paragraph incorporated from U.S. Pat. No. 8,711,943).

In one embodiment, the encoder 140 parses the downsampled rendition of the signal (e.g., signal data S 3 <T>, signal data S 2 <T>, signal data S 1 <T>) at the first level of quality into multiple contiguous regions of image elements. The encoder then employs parallel processing units to simultaneously process the multiple regions to identify adjustments to elements in the multiple regions to reduce an entropy associated with the residual data. (paragraph incorporated from U.S. Pat. No. 8,711,943).

In accordance with further embodiments, the encoder 140 can at least occasionally perform a so-called global check that selected adjustments to the elements in the individual contiguous regions that are processed in parallel do not substantially cause increased entropy of residual data for the overall signal data being processed. (paragraph incorporated from U.S. Pat. No. 8,711,943).

Figure 41:
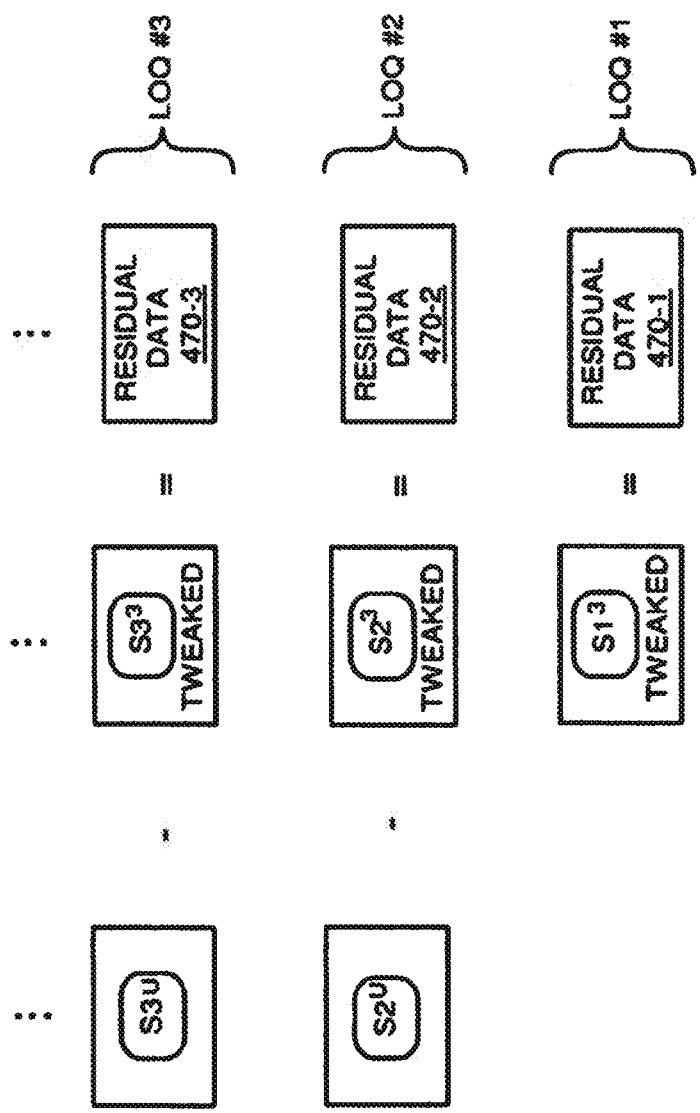
FIG. 41 is an example diagram illustrating generation of residual data for use by a decoder according to embodiments herein (incorporated by reference from U.S. Pat. No. 8,711,943).

FIG. 41 is an example diagram illustrating generation of residual data for use by a decoder according to embodiments herein. (paragraph incorporated from U.S. Pat. No. 8,711, 943).

As shown, the encoder 140 stores signal data S 1 <3 >as residual data 470-1. The encoder 140 sets residual data 470-2 equal to a difference between signal data S 2 <U >and signal data S 2 <3>, the encoder 140 sets residual data 470-3 equal to a difference between signal data S 3 <U >and signal data S 3 <3>, and so on. In general, residual data 470-2 indicates the adjustments that need to be made to signal data S 2 <U >in order to produce signal data S 2 <3>, residual data 470-3 indicates the adjustments that need to be made to signal data S 3 <U >in order to produce signal data S 3 <3>, and so on. (paragraph incorporated from U.S. Pat. No. 8,711,943).

In one embodiment, a decoder uses residual data 470-1 to reconstruct S 1 <3 >at lowest level of quality 1. At a next higher level (e.g., from level of quality 2 to level of quality 3), the decoder applies the selected upsample operation for the level of quality to convert signal data S 1 <3 >into signal data S 2 <U>, the decoder sums residual data 470-2 and signal data S 2 <U >to produce S 2 <3>. At a next higher level (e.g., from level of quality 3 to level of quality 4), the decoder applies the selected upsample operation for the level of quality to convert signal data S 2 <3 >into signal data S 3 <U>, the decoder sums residual data 470-3 and signal data S 3 <U >to produce S 3 <3>. The decoder repeats this process until it reconstructs the original 115 into a desired level of quality. (paragraph incorporated from U.S. Pat. No. 8,711,943).

Figure 42:
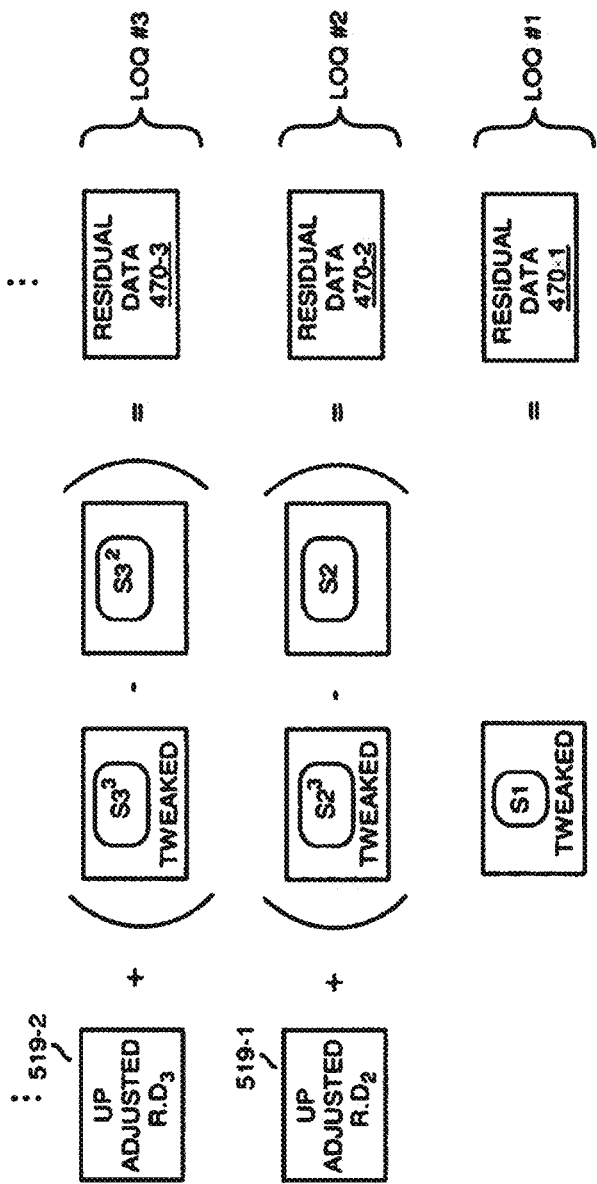
FIG. 42 is an example diagram illustrating generation of residual data according to embodiments herein (incorporated by reference from U.S. Pat. No. 8,711,943).

FIG. 42 is an example diagram illustrating generation of residual data for use by a decoder according to embodiments herein. In this example embodiment, the encoder uses sets of adjusted residual data 519 to produce sets of residual data 470. (paragraph incorporated from U.S. Pat. No. 8,711,943).

For example, the encoder 140 sets residual data 470-1 equal to signal data S 1. The encoder 140 identifies a difference between signal data S 2 <3> and signal data S 2 <2> and adds the result to adjusted residual data 519-1 to produce residual data 470-2; the encoder 140 identifies a difference between signal data S 3 <3> and signal data S 3 <2> and adds the result to adjusted residual data 519-2 to produce residual data 470-3; and so on. (paragraph incorporated from U.S. Pat. No. 8,711,943).

Note that the decoder uses the residual data 470 in a manner as discussed above to reconstruct the original 115 to a desired level of quality. (paragraph incorporated from U.S. Pat. No. 8,711,943).

Figure 43:
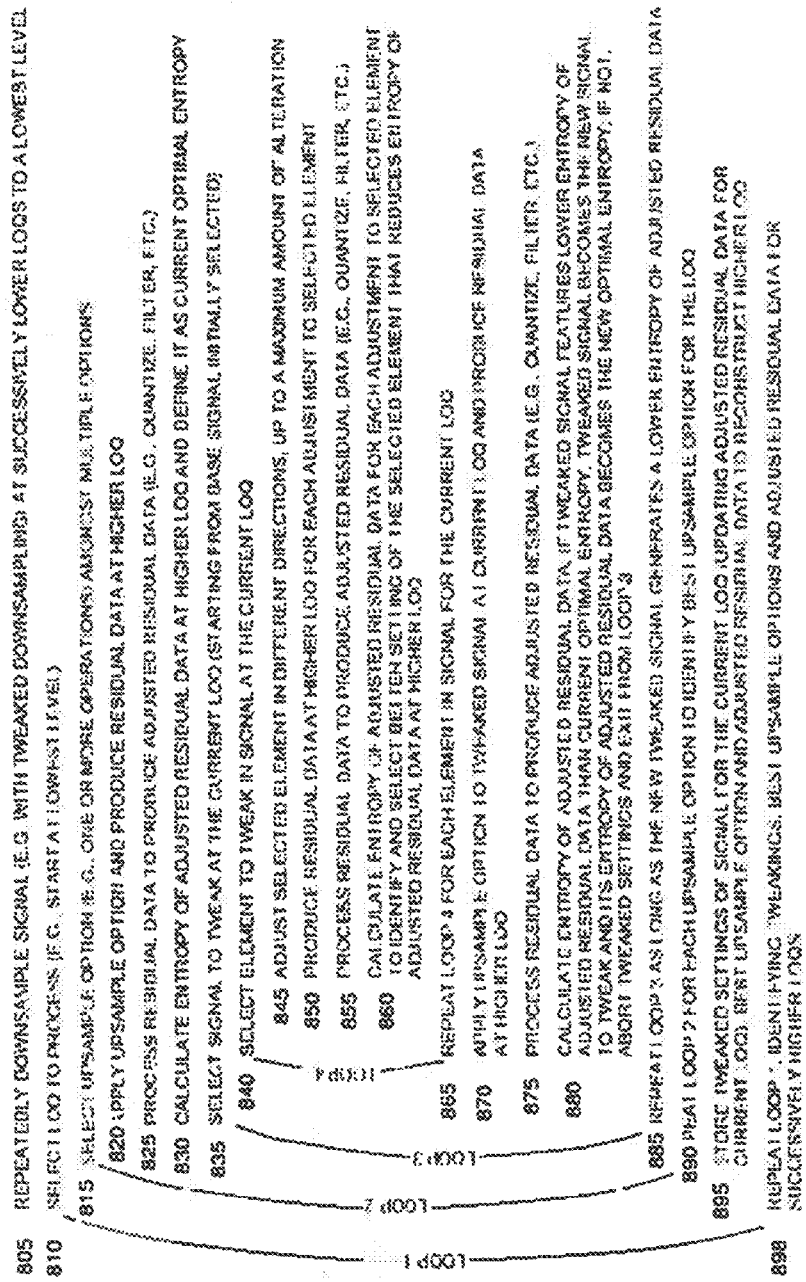
FIG. 43 is an example diagram illustrating generation of tweaking downsampled data according to embodiments herein (incorporated by reference from U.S. Pat. No. 8,711,943).

FIG. 43 is an example diagram illustrating generation of tweaking downsampled data according to embodiments herein. (paragraph incorporated from U.S. Pat. No. 8,711, 943).

In step 805, the encoder 140 repeatedly downsamples the signal 115 at successively lower levels to a lowest level of quality. As previously discussed, the process can include application of any suitable downsampling function, which may or may not include tweaking each element as previously discussed. (paragraph incorporated from U.S. Pat. No. 8,711,943).

In step 810, the encoder 140 selects a level of quality to process starting at the lowest level of quality. (paragraph incorporated from U.S. Pat. No. 8,711,943).

In step 815, the encoder 140 selects an upsample option amongst multiple possible upsample options. (paragraph incorporated from U.S. Pat. No. 8,711,943).

In step 820, the encoder 140 applies the selected upsample option to signal data at the selected level of quality to produce residual data at a next higher level of quality (e.g., a level above the selected level of quality). (paragraph incorporated from U.S. Pat. No. 8,711,943).

In step 825, the encoder 140 applies a process (e.g., quantization function, filter function, etc.) to the residual data to produce adjusted residual data. (paragraph incorporated from U.S. Pat. No. 8,711,943).

In step 830, the encoder 140 calculates and entropy of the adjusted residual data at the next higher level of quality and defines it as a current optimal entropy value. (paragraph incorporatedfrom U.S. Pat. No. 8,711,943).

In step 835, the encoder 140 selects a signal (e.g., signal S 1 <2>) to tweak at the selected level of quality. (paragraph incorporated from U.S. Pat. No. 8,711,943).

In step 840, the encoder 140 selects an element to tweak in the selected signal. (paragraph incorporated from U.S. Pat. No. 8,711,943).

In step 845, the encoder 140 adjusts the selected element in different directions and amounts up to a maximum iteration value. (paragraph incorporated from U.S. Pat. No. 8,711,943).

In step 850, the encoder 140 produces residual data and adjusted residual data for each adjustment to the selected element for the next higher level of quality. (paragraph incorporated from U.S. Pat. No. 8,711,943).

In step 855, the encoder 140 processes the residual data to produce adjusted residual data 119-1 using a quantization function (or simulation/approximation thereof) as previously discussed. (paragraph incorporated from U.S. Pat. No. 8,711,943).

In step 860, the encoder 140 calculates an entropy of the adjusted residual data at the next higher level of quality for each tweak to the selected element to identify and select a better or substantially best setting of the selected element that reduces an entropy of the adjusted residual data. (paragraph incorporated from U.S. Pat. No. 8,711,943).

In step 865, the encoder 140 repeats loop 4 (e.g., continues execution back to step 840) for each element in the selected signal data. The encoder 140 continues processing at step 870 subsequent to testing and tweaking all elements. (paragraph incorporated from U.S. Pat. No. 8,711,943).

In step 870, the encoder 140 applies an upsample operation to tweaked signal data at the selected level of quality and produces residual data at the next higher level of quality. (paragraph incorporated from U.S. Pat. No. 8,711,943).

In step 875, the encoder 140 processes (e.g., by quantization or a suitable simulation/approximation thereof) the residual data at the next higher level of quality to produce respective adjusted residual data. (paragraph incorporated from U.S. Pat. No. 8,711,943).

In step 880, the encoder 140 calculates the entropy of the adjusted residual data. If the tweaked signal features lower entropy of adjusted residual data than current optimal entropy for the selected signal, the tweaked signal becomes the new signal to tweak and its entropy of adjusted residual data becomes the new optimal entropy. If not, the encoder 140 aborts tweaked settings and exits from loop 3 to step 890. Otherwise, the encoder 140 continues processing at step 885. (paragraph incorporated from U.S. Pat. No. 8,711, 943).

In step 885, the encoder 140 continues execution at step 835 for the newly selected signal as long the new tweaked signal generates a lower entropy of adjusted residual data. (paragraph incorporated from U.S. Pat. No. 8,711,943).

In step 890, the encoder 140 continues execution at step 210 for a next selected upsample option of multiple possible upsample options. When all upsample options have been tested, the encoder 140 continues processing at step 895. (paragraph incorporated from U.S. Pat. No. 8,711,943).

In step 895, the encoder 140 stores tweaked settings for the selected level of quality by updating the adjusted residual data for the current level of quality, storing the best upsample option, and corresponding adjusted residual data. (paragraph incorporated from U.S. Pat. No. 8,711,943).

In step 898, the encoder 140 repeats processing at step 810 to identify best tweakings, best upsample operation and adjusted residual data for each successively higher level of quality in the hierarchy. (paragraph incorporated from U.S. Pat. No. 8,711,943).

Figure 44:
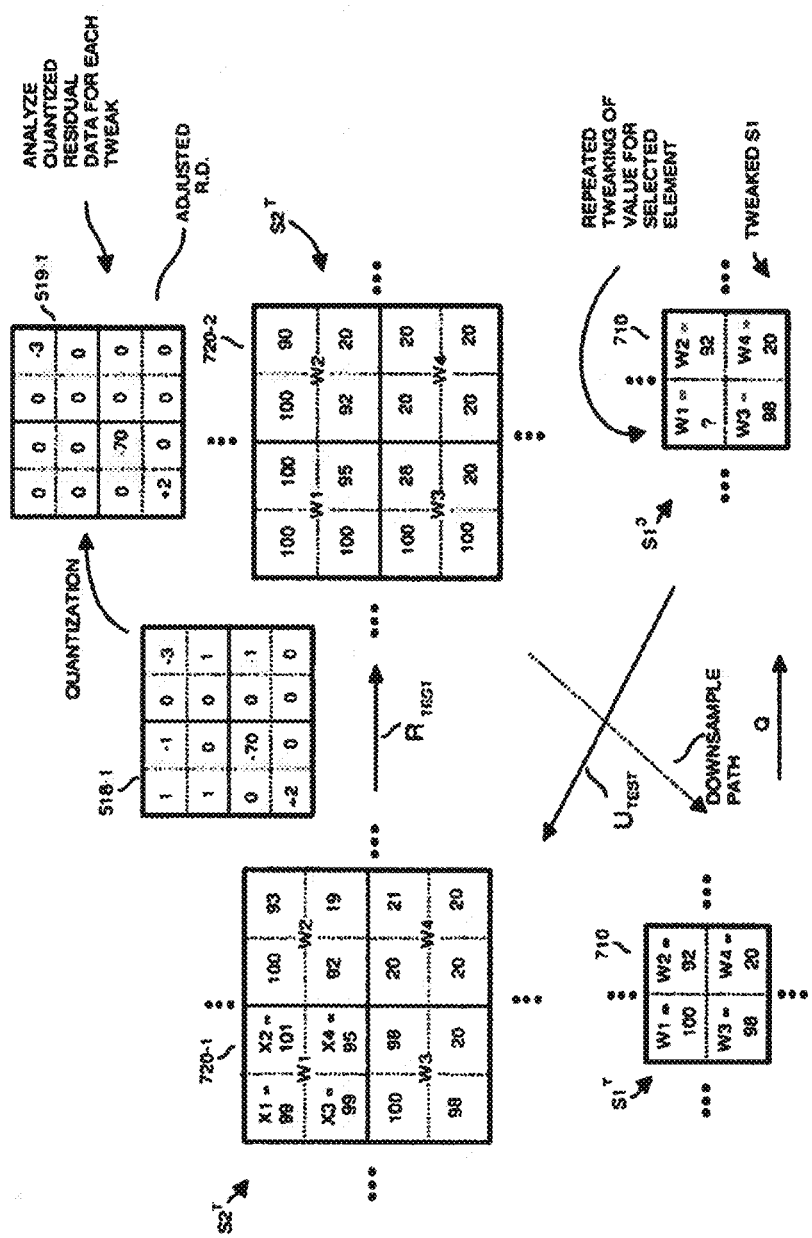
FIG. 44 is a diagram illustrating an example method of downsampling, tweaking, upsampling, and quantizing residual data according to embodiments herein (incorporated by reference from U.S. Pat. No. 8,711,943).

FIG. 44 is a diagram illustrating an example method of processing a received signal according to embodiments herein. (paragraph incorporated from U.S. Pat. No. 8,711, 943).

During a downsampling process as shown, the encoder 140 initiates downsampling of signal data S 2 <T> into signal data S 1 <T> at a next lower level of quality in the hierarchy. (paragraph incorporated from U.S. Pat. No. 8,711, 943).

Subsequent to completion of downsampling, the encoder 140 performs upsampling at a lowest level. In accordance with such an embodiment, the encoder 140 selects an element (e.g., W 1) to tweak. For each tweak to the selected element W 1, the encoder 140 upsamples the tweaked signal data S 1 <3 >to produce signal data S 2 <U>. (paragraph incorporated from U.S. Pat. No. 8,711,943).

In this example, upsampling using U TEST causes the element W 1 to be expanded into element and respective values X 1=99, X 2=101, X 3=99, and X 4=95. The encoder 140 then produces residual data 518-1 and adjusted residual data 519-1 in a manner as previously discussed. The quantization of residual data 518-1 can include setting near zero values in the residual data 518-1 to zero values in the adjusted residual data 519-1. (paragraph incorporated from U.S. Pat. No. 8,711,943).

That is, element set to values +1 or −1 in residual data 518-1 are set to a value of 0 to produce the adjusted residual data 519-1. (paragraph incorporated from U.S. Pat. No. 8,711,943).

Note that a range or threshold value for implementing quantization can vary at different levels in the hierarchy. For example, a smaller range or lower threshold value may be used at the lower levels of quality to preserve a quality of the image at the higher levels of quality. In other words, it may be desired to generate more residual data at the lower levels to prevent a need for generating much more residual data at a higher level. (paragraph incorporated from U.S. Pat. No. 8,711,943).

Figure 45:
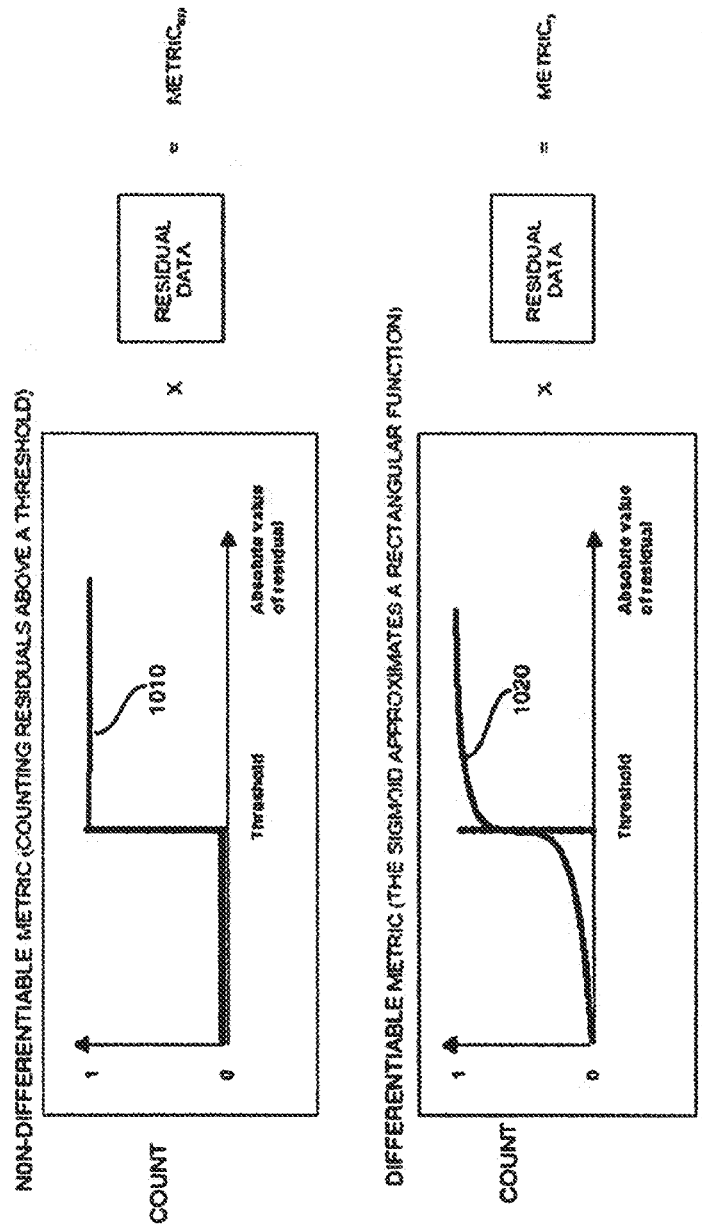
FIG. 45 is a diagram illustrating an example of function for determining entropy according to embodiments herein (incorporated by reference from U.S. Pat. No. 8,711,943).

FIG. 45 is a diagram illustrating an example of producing entropy values according to embodiments herein. (paragraph incorporated from U.S. Pat. No. 8,711,943).

One embodiment herein includes utilizing a suitable metric that can quickly determine whether an alteration (e.g., tweak) improves or worsens the entropy of respective residuals. As previously discussed, entropy of residual data can be a measure of how much information is necessary to transmit residuals, where residual data includes symbols or numbers. (paragraph incorporated from U.S. Pat. No. 8,711,943).

Entropy at a basic level depends on how many different symbols are encoded in the residual data. The higher the number of different symbols in the residual data, the higher the entropy. Large drops of entropy can be achieved when there is mainly only one symbol that is much more likely than all the others. When that is the case, it is almost irrelevant whether all of the other symbols are just one symbol or many other symbols. (paragraph incorporated from U.S. Pat. No. 8,711,943).

One method of calculating an entropy value for residual data is to count a number of values in the residual data that are greater than a threshold value or fall within a particular range. The entropy value produced in this manner (e.g., using a rectangular step function) is mathematically non-differentiable. That is, as specified in FIG. 45, the step function 1010 is a rectangular function having an infinite slope at the threshold value. (paragraph incorporated from U.S. Pat. No. 8,711,943).

In accordance with another embodiment, the encoder 140 can be configured to implement a continuous function 1020 (e.g., a differentiable function) that simulates a substantially rectangular function (e.g., step function 1010). The continuous function 1010 facilitates quantification of entropy associated with the residual data based on use of derivatives. (paragraph incorporated from U.S. Pat. No. 8,711,943).

For example, one embodiment herein includes utilizing a sigmoid function to simulate the rectangular function. In accordance with such an embodiment, the encoder 140 maps each element value in the residual data to a respective count value (e.g., decimal value) based on the function 1020 instead of step function 1010. In the previous example, the encoder 140 maps each to a value of one or zero depending on whether the element value was above or below the threshold. In contrast, when using the function 1020, the encoder 140 maps a respective element to a non-integer value (e.g., decimal value) greater than zero and less than one. (paragraph incorporated from U.S. Pat. No. 8,711,943).

For a given tweaking, when using the function 1020, the encoder 140 produces an entropy value by summing the respective decimal count values produced for each of the elements. The encoder 140 repeats this process using the function 1020 for each tweaking. Based on the entropy values for the tweakings of a given element, the encoder 140 produces the function in FIG. 46 indicating how entropy of the residual data changes based on tweaking of a respective element. (paragraph incorporated from U.S. Pat. No. 8,711,943).

Figure 46:
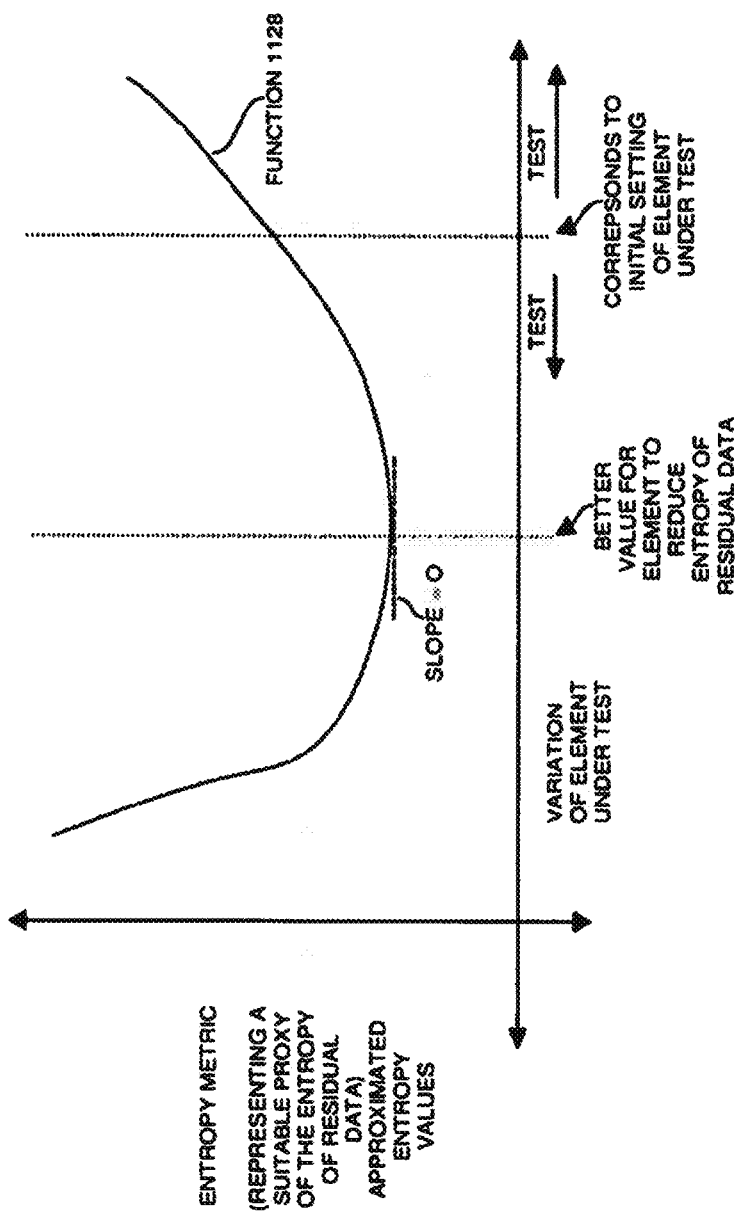
FIG. 46 is a diagram illustrating an example of quantizing residual data according to embodiments herein (incorporated by reference from U.S. Pat. No. 8,711,943).

The function 1128 in FIG. 46 is a differentiable function. That is, producing a derivative of the function 1128 enables the encoder 140 to identify where the slope of the function 1128 is approximately zero. This point (where slope is substantially equal to zero) in the function 1128 indicates a setting of the respective element that produces the lowest entropy for residual data. (paragraph incorporated from U.S. Pat. No. 8,711,943).

Accordingly, embodiments herein include generating an entropy function 1128 in which a magnitude of the entropy function varies depending on different possible adjustments to the selected element under test in the downsampled signal and then utilizing the entropy function 1128 to identify an adjustment to the element in the downsampled signal in which a respective entropy of the residual data for the adjustment is substantially minimal amongst different possible variations of the element under test. The horizontal axis of the graph in FIG. 46 indicates the different possible variations of the element under test while the vertical axis indicates the relative entropy of respective residual data for the settings. (paragraph incorporated from U.S. Pat. No. 8,711,943).

FIG. 14 is an example block diagram of a computer system 800 that provides computer processing according to embodiments herein. (paragraph incorporated from U.S. Pat. No. 8,711,943).

Computer system 800 can be or include a computerized device such as a personal computer, processing circuitry, workstation, portable computing device, console, network terminal, processing device, network device, operating as a switch, router, server, client, etc. (paragraph incorporated from U.S. Pat. No. 8,711,943).

Note that the following discussion provides a basic embodiment indicating how to carry out functionality associated with encoder 140 as previously discussed. However, it should be noted that the actual configuration for carrying out the operations as described herein can vary depending on a respective application. (paragraph incorporated from U.S. Pat. No. 8,711,943).

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include a processor 813, I/O interface 814, and a communications interface 817. (paragraph incorporated from U.S. Pat. No. 8,711,943).

I/O interface 814 provides connectivity to repository 180, and if present, display screen, peripheral devices 816 such as a keyboard, a computer mouse, etc. (paragraph incorporated from U.S. Pat. No. 8,711,943).

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with encoder 140-1. The instructions are executed by a respective resource such as encoder 140 to perform any of the operations as discussed herein. (paragraph incorporated from U.S. Pat. No. 8,711,943).

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180. (paragraph incorporated from U.S. Pat. No. 8,711,943).

As shown, computer readable storage media 812 can be encoded with encoder application 140-1 executed by processor 813 as encoder process 140-2. (paragraph incorporated from U.S. Pat. No. 8,711,943).

Note that the computer system 800 or encoder 140 also can be embodied to include a computer readable storage medium 812 (e.g., a hardware storage media, non-transitory storage media, etc.) for storing data and/or logic instructions. (paragraph incorporated from U.S. Pat. No. 8,711,943).

Computer system 800 can include a processor 813 to execute such instructions and carry out operations as discussed herein. Accordingly, when executed, the code associated with encoder application 140-1 can support processing functionality as discussed herein. (paragraph incorporated from U.S. Pat. No. 8,711,943).

During operation of one embodiment, processor 813 accesses computer readable storage media 812 via the use of interconnect 811 in order to launch, run, execute, interpret or otherwise perform the instructions of encoder application 140-1 stored in computer readable storage medium 812. Execution of the encoder application 140-1 produces processing functionality in processor 813. In other words, the encoder process 140-2 associated with processor 813 represents one or more aspects of executing encoder application 140-1 within or upon the processor 813 in the computer system 800. (paragraph incorporated from U.S. Pat. No. 8,711,943).

Those skilled in the art will understand that the computer system 800 can include other processes and/or software and hardware components, such as an operating system that controls allocation and use of hardware processing resources to execute encoder application 140-1. (paragraph incorporated from U.S. Pat. No. 8,711,943).

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device. (paragraph incorporated from U.S. Pat. No. 8,711,943).

Note again that techniques herein are well suited for use in processing and reconstructing signals using a decoder. However, it should be noted that embodiments herein are not limited to use in such applications and that the techniques discussed herein are well suited for other applications as well. (paragraph incorporated from U.S. Pat. No. 8,711,943).

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform. (paragraph incorporated from U.S. Pat. No. 8,711,943).

Figure 47:
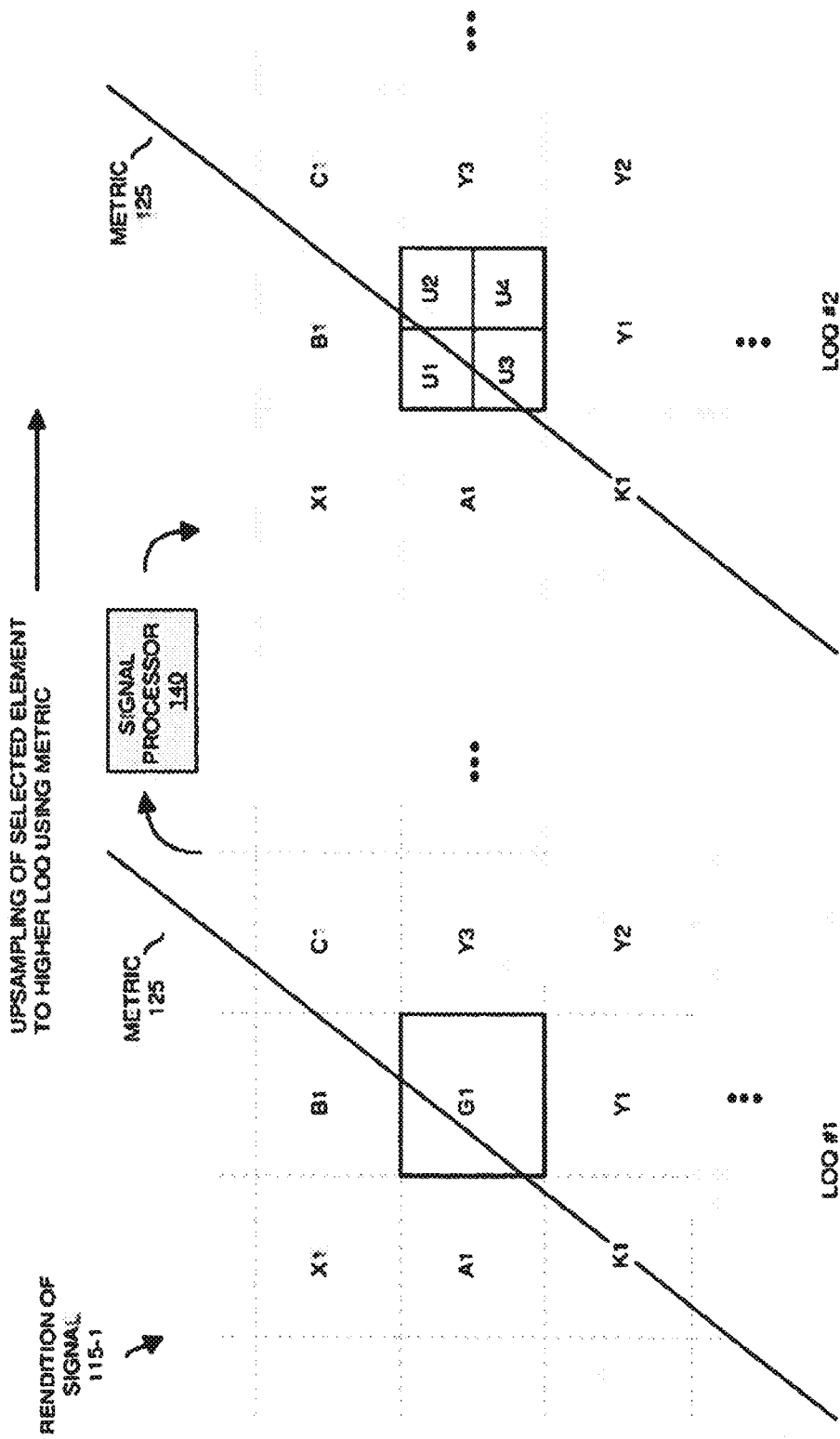
FIG. 47 is an example diagram illustrating upsampling of a selected element into multiple elements using a metric according to embodiments herein (incorporated by reference from U.S. Pat. No. 9,129,411).

FIG. 47 is an example diagram illustrating upsampling of a selected element into multiple elements using a metric according to embodiments herein. (paragraph incorporated from U.S. Pat. No. 9,129,411).

As shown, rendition of signal 115-1 at level of quality #1 includes multiple elements including elements X1, B1, C1, A1, G1, Y3, K1, Y1, Y2, etc. Each of the elements in the rendition of signal 115-1 is assigned a value indicating a setting for the respective element. (paragraph incorporated from U.S. Pat. No. 9,129,411).

In this example, rendition of signal 115-1 represents a lower level quality rendition of an original signal. Signal processor 140 upsamples a selected element such as G1 at level of quality #1 into multiple elements such as elements U1, U2, U3, and U4 in the rendition of signal at level of quality #2 (e.g., a higher level of quality). Each of the elements in the rendition of signal 115-1 can be upsampled into a respective set of multiple elements. (paragraph incorporated from U.S. Pat. No. 9,129,411).

In one embodiment, the rendition of signal 115-1 is akin to a thumbnail representation of an original signal that has been downsampled to a lower level of quality. The rendition of signal 115-1 at the lower level of quality captures coarse attributes of the original signal, but not the more detailed finer attributes of the original signal. The detailed, finer attributes appear in the rendition of signal at higher levels of quality. (paragraph incorporated from U.S. Pat. No. 9,129, 411).

Note that values associated with the rendition of signal 115-1 can represent any suitable type of data information. By way of a non-limiting example, the signal 115 can be image data, symbols, etc., indicating settings of each of multiple signal elements (e.g., pels/plane elements, pixels/picture elements, voxels/volumetric picture elements, etc.) in a respective image. The image can be two dimensional (e.g., pictures, video frames, 2D motion maps, etc.), three-dimensional (e.g., 3D/volumetric images, holographic images, CAT-scans, medical/scientific images, 3D motion maps, etc.), or even feature more than three dimensions. In accordance with such an embodiment, the settings of the signal elements indicate how to reconstruct the original signal for playback on a device. (paragraph incorporated from U.S. Pat. No. 9,129,411).

Each element in the signal can define a setting such as color. In accordance with such an embodiment, color component of an element in the signal data is encoded in accordance with a suitable color space standard such as YUV, RGB, HSV, etc. (paragraph incorporated from U.S. Pat. No. 9,129,411).

In further embodiments, a combination of settings associated with X1, B1, C1, A1, G1, Y3, K1, Y1, Y2, etc. defines a portion of an image (e.g., a multiple-dimensional image) at the first level of quality. The signal processor 140 is configured to upsample the rendition of signal 115-1 at level of quality #1 (e.g., a lower level of quality) into a respective rendition of the signal at level of quality #2 (e.g., higher level of quality). (paragraph incorporated from U.S. Pat. No. 9,129,411).

Assume in this example that the signal processor 140 selects element G1 for upsampling into multiple elements at a higher level of quality. As mentioned, in accordance with such an embodiment, the signal processor 140 upsamples the selected element G1 in the rendition of signal 115-1 into multiple elements U1, U2, U3, and U4 at a second level of quality. As will be discussed below, if suitable, upsampling can be achieved using a generated metric 125. The signal processor 140 can be configured to upsample the selected element using an alternative upsampling option if use of a metric 125 is deemed not to be suitable for upsampling the selected element. (paragraph incorporated from U.S. Pat. No. 9,129,411).

As shown, to facilitate upsampling to a next higher level of quality (e.g., a higher resolution image), one embodiment herein includes generating metric 125 for the selected element G1 into multiple elements U1, U2, U3, and U4. Depending on the embodiment and the dimensionality of the signal, the metric 125 can be a line, surface, etc., defining a boundary between image elements in a vicinity of a selected element under test. (paragraph incorporated from U.S. Pat. No. 9,129,411).

When the rendition of signal 115-1 is a two-dimensional image, the boundary defined by the metric 125 is substantially a line overlaid on the portion of the signal. As will be discussed further herein, the signal processor 140 uses the line (e.g., boundary) as a basis to calculate the settings (e.g., magnitudes) for multiple image elements such as elements U1, U2, U3, and U4 in the rendition of signal at a next higher level of quality. (paragraph incorporated from U.S. Pat. No. 9,129,411).

As mentioned above, generation and use of the metric 125 to upsample the selected element can be conditional. For example, the method of generating and using metric 125 as discussed herein can be used in circumstances in which is known with reasonable certainty that the selected element being upsampled resides at or near a transition region within the rendition of signal being upsampled. (paragraph incorporated from U.S. Pat. No. 9,129,411).

Settings of the selected element and/or elements residing in a vicinity of the selected element under test can provide an indication of whether the respective element resides on or near a boundary region. That is, if the settings of elements in a nearby vicinity of selected element under test indicate that the selected element resides on or near a transition region, then the signal processor 140 uses a generated metric 125 to calculate settings of the upsampled rendition of the signal. The signal processor 140 may use an alternative upsampling technique (e.g., other than use of a generated metric 125) to upsample from one level of quality to the next if the settings of nearby elements indicate that the selected element to be upsampled does not reside or near a transition region. (paragraph incorporated from U.S. Pat. No. 9,129, 411).

The test for determining whether a metric 125 can be generated and used to advantageously upsample the selected element into multiple elements at a next higher level of quality can be based on a magnitude of settings associated with the selected element with respect to magnitudes of settings associated with other elements in a vicinity of the selected element. (paragraph incorporated from U.S. Pat. No. 9,129,411).

According to one embodiment, the signal processor 140 produces a respective metric 125 in response to detecting that a selected element under test has a setting within a range. A lower limit of the range can be defined by settings of a first set of elements in a vicinity of the selected element. An upper limit of the range can be defined by settings of a second set of elements in a vicinity of the selected element. (paragraph incorporated from U.S. Pat. No. 9,129,411).

Thus, in general, the signal processor 140 can be configured to generate and use the metric 125 to upsample the selected element if the setting associated with the selected element falls within a range defined by settings of other elements in a vicinity of the selected element. (paragraph incorporated from U.S. Pat. No. 9,129,411).

In accordance with one embodiment, to produce the range for testing and identifying an edge, the signal processor 140 initially analyzes settings of the elements in a vicinity of a selected element to identify at least a first set of elements and a second set of elements. The first set of elements and second set of elements in a vicinity of the selected element can be disposed opposite, diagonal, etc., each other with respect to the selected element disposed in between the first set and the second set. Each of the sets can include one or more elements. (paragraph incorporated from U.S. Pat. No. 9,129, 411).

The signal processor 140 generates a first value based on settings of at least one element in the first set of elements in the vicinity of the selected element. The signal processor 140 generates a second value based on settings of at least two elements in the second set of elements in the vicinity of the selected element. The signal processor 140 produces a range in which the larger of the two values defines an upper limit of the range and the other value defines a lower limit of the range. If the setting of the selected element falls within the range of nearby elements, the selected element likely falls on an edge or transition region. (paragraph incorporated from U.S. Pat. No. 9,129,411).

Note that signal processor 140 can test different groupings of one or more nearby elements in a vicinity of the selected element (also comparing them with a set of possible configurations of nearby elements) to determine whether or not the selected element disposed between the tested groupings resides within a transition region. Certain selections of element groupings may provide an indication that the selected element does not reside in a transition region as mentioned above. In such an embodiment, a metric may not be used to upsample. As mentioned above, the signal processor 140 can be configured to presume that the selected element falls within a transition region if the settings of the nearby elements satisfy a test (within appropriate thresholds of confidence) with at least one of a set of possible configurations and the setting of the selected element falls in a range defined by settings of the nearby elements. (paragraph incorporated from U.S. Pat. No. 9,129,411).

As a more specific example, in response to detecting that a magnitude (e.g., setting, value, etc.) of the selected element G1 falls within a range defined by a candidate set of multiple groupings of neighbor elements, the signal processor 140 assumes that the selected element resides near a transition region and thus produces the metric 125 based on respective settings of nearby elements as a basis to define the transition. As mentioned and as discussed in more detail below, the metric can serve as a basis for identifying settings to assign to elements U1, U2, U3, and U4. (paragraph incorporated from U.S. Pat. No. 9,129,411).

Assume in this example that each element in a first set of one or more elements (e.g., element X1) in a vicinity of the selected element is set to a value of approximately 100 (e.g., assume element X1=100) and that each element in a second set of one or more elements (e.g., element Y1, Y2, and Y3) in a vicinity of the selected element is set to a value of approximately 0 (e.g., assume that element Y1=0.1, Y2=0, and Y3=0.3). In such an instance, the signal processor 140 sets the lower limit of the range to 0 and the upper limit of the range to 100. Further assume in this example that the selected element G1 has an assigned value of 37. Since the value of selected element G1 falls between the range limits 0 and 100, the signal processor 140 assumes that the selected element G1 resides on or near a transition region and the selected element can be upsampled via use of a respective metric 125. In such an instance, the respective metric 125 can be beneficially used to upsample the element G1 into the elements U1, U2, U3, and U4 at the second level of quality. (paragraph incorporated from U.S. Pat. No. 9,129,411).

The signal processor 140 produces metric 125 based on settings of nearby elements. The metric 125 defines a boundary. As will be discussed in more detail later in this specification, the location and orientation of the boundary with respect to the selected element depends on magnitudes of the settings of elements in the vicinity of the selected element. In one embodiment, linear interpolation techniques (or any other suitable measurement technique) can be used to identify the location and orientation of the metric 125 defining the respective boundary. Additional details of using linear interpolation will be discussed in more detail later in this specification. (paragraph incorporated from U.S. Pat. No. 9,129,411).

As previously discussed, note again that embodiments herein can be extended to processing of a signal representing a volume. In accordance with such an embodiment, a combination of settings of the selected element, a first set of elements in a vicinity of the selected element, and a second set of elements in vicinity of the selected define a portion of a volumetric image at a first level of quality. In this instance, the metric 125 defines a surface boundary in the portion of the volumetric image at the first level of quality. The signal processor 140 uses the metric 125 (in a similar manner as discussed above) to calculate settings for multiple volumetric image elements in the signal at the second level of quality. The signal processor 140 can produce the metric 125 (e.g., a surface boundary) in response to detecting that a magnitude of the selected element falls within a range, a lower limit of the range defined by settings of a first set of elements in a vicinity of the selected element, an upper limit of the range defined by settings of a second set of elements in a vicinity of the selected element in the volume. (paragraph incorporated from U.S. Pat. No. 9,129,411).

In a similar manner as discussed above for the two-dimensional case, the signal processor 140 can be configured to test different groupings of nearby elements (in the volume) to identify whether the selected element falls within a transition region in the volume. (paragraph incorporated from U.S. Pat. No. 9,129,411).

Regardless of the number of dimensions, note further that the signal processor 140 can repeatedly generate metrics for elements in renditions of a signal at each of multiple higher levels of quality to upsample and reproduce rendition of the signal at yet higher levels of quality. For example, where appropriate, the signal processor 140 can utilize a metric generated for a selected element at level of quality #2 to upsample the selected element into multiple elements at level of quality #3, the signal processor 140 can utilize a metric generated for a selected element at level of quality #3 to upsample the selected element into multiple elements at level of quality #4, and so on. (paragraph incorporated from U.S. Pat. No. 9,129,411).

In one embodiment, the signal processor 140 repeats upsampling at successively higher levels of quality to reconstruct a rendition of the original signal at a highest level of quality. The produced rendition of the signal may be a same resolution and identical or near identical to the original signal. (paragraph incorporated from U.S. Pat. No. 9,129,411).

An example of an encoder system in which the techniques as discussed herein can be used is described in related application United States Patent Application entitled "SIGNAL PROCESSING AND TIERED SIGNAL ENCODING," filed on the same day as the present application, the entire teachings of which are incorporated herein by this reference. In such an embodiment, the signal processor 140 can be configured to test and determine which upsample option (e.g., use of metric/deblending filter or use of alternative upsample options) is suitable for each element at each level of quality. (paragraph incorporated from U.S. Pat. No. 9,129,411).

In a multi-scale inheritance-based encoding loop, the signal is successively downsampled in the hierarchy to the rendition of the signal at the first level of quality as described in. Implementation of the metric 125 ("deblending filter") among the available upsampling operations in the multi-scale encoding loop can reduce an amount of residual data needed to reconstruct, based on a rendition of the signal at a lower level of quality, a rendition of the signal at a higher level of quality in the hierarchy. (paragraph incorporated from U.S. Pat. No. 9,129,411).

One example of a decoder system in which the techniques of upsampling using a metric or alternative upsample options as discussed herein can be used is described in related application United States Patent Application entitled "TIERED SIGNAL DECODING AND SIGNAL RECONSTRUCTION," , filed on the same day as the present application, the entire teachings of which are incorporated herein by this reference. In such an embodiment, the signal processor 140 can be configured to test and determine the appropriate upsample operation (e.g., use of metric/deblending filter or alternative upsample options) that will be used to upsample each element at each level of quality. In yet another embodiment, the decision made at the encoding site can be sent to and replicated by the decoder, trading a slightly higher transmission bandwidth for reduced decoding complexity. (paragraph incorporated from U.S. Pat. No. 9,129,411).

A decoder can be configured to implement the steps of selecting an element in the rendition of signal 115-1, producing (if applicable) a metric 125, and utilizing in a multi-scale decoder loop to reconstruct, based on a rendition of the signal at a lower level of quality, a rendition of the signal at a higher level of quality. Generation and use of a metric in lieu of an alternative upsampling operation can reduce or alter an amount of residual data needed after the upsampling in order to reconstruct the rendition of the signal at the second level of quality. (paragraph incorporated from U.S. Pat. No. 9,129,411).

Figure 48:
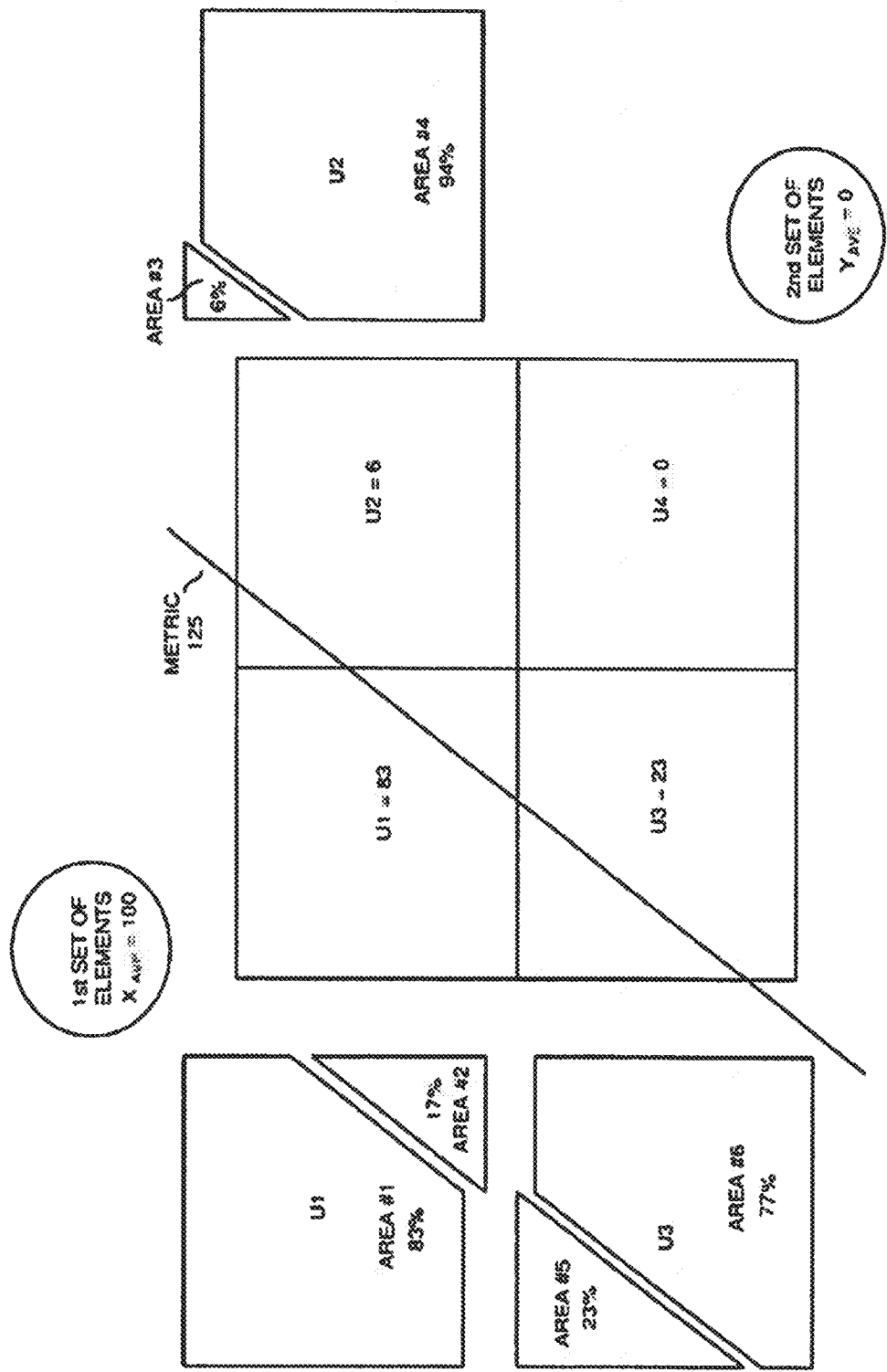
FIG. 48 is an example diagram illustrating use of a metric generated for a selected element at a first level of quality to calculate settings for upsampling of the selected element to multiple elements at a next higher level of quality according to embodiments herein (incorporated by reference from U.S. Pat. No. 9,129,411).

FIG. 48 is an example diagram illustrating use of a metric generated for a selected element at a first level of quality to calculate settings for upsampling of the selected element to multiple elements at a next higher level of quality according to embodiments herein. (paragraph incorporated from U.S. Pat. No. 9,129,411).

In accordance with one embodiment as previously discussed, the signal processor 140 uses the metric to upsample the element G1 into elements U1, U2, U3, and U4. Note that upsampling of the element G1 into four elements (e.g., based on a scale factor of 2×2) at a next higher level of quality is shown by way of non-limiting example only and that upsampling can include any suitable scaling up from one level of quality to a next higher level of quality. (paragraph incorporated from U.S. Pat. No. 9,129,411).

Assume in this example that the signal processor 140 set range limits for the first set (e.g., assume element X1=100) and second set (e.g., assume element Y1=0.1, Y2=0, and Y3=0.3) of nearby elements are 0 and 100, respectively. In such an instance, the lower limit of the range is 0 and the upper limit of the range to 100. Assume in this example that the selected element G1 has an assigned value of 37. (paragraph incorporated from U.S. Pat. No. 9,129,411).

The signal processor 140 generates values for the elements U1, U2, U3, and U4 based on the metric 125. For example, to produce settings for each of U1, U2, U3, and U4 based on the metric 125, the signal processor 140 first identifies which of the elements U1, U2, U3, and U4 are intersected by the metric 125. (paragraph incorporated from U.S. Pat. No. 9,129,411).

In this example, the signal processor 140 identifies that metric 125 intersects elements U1, U2, and U3 (amongst elements U1, U2, U3, and U4). For each of the elements U1, U2, and U3, in response to detecting the intersection, the signal processor 140 utilizes the metric 125 to calculate a respective setting. The signal processor 140 sets the values for each of these elements U1, U2, and U3 between a setting (e.g., 100) assigned to the first set of elements (e.g., X) and a setting (e.g., 0) assigned to the second set of elements (e.g., Y). (paragraph incorporated from U.S. Pat. No. 9,129,411).

In this example, the signal processor 140 identifies that metric 125 does not intersect element U4 (amongst elements U1, U2, U3, and U4). In response to detecting that all of the element U4 resides between the boundary defined by the metric 125 and the first set of elements (e.g., Y elements), the signal processor 140 sets the element U4 to a value substantially equal to 0. This is the setting assigned to the second set of elements. (paragraph incorporated from U.S. Pat. No. 9,129,411).

Note that if the signal processor 140 detected that another particular element resided between the boundary defined by the metric 125 and the first set of elements (e.g., X elements), then the signal processor 140 would set the particular element to a value (e.g., 100) substantially equal to the setting assigned to the first set of elements. Note however that this did not happen in this example case but may happen for other elements under test. (paragraph incorporated from U.S. Pat. No. 9,129,411).

Recall that the signal processor 140 detects that the boundary defined by the metric 125 intersects each of elements U1, U2, and U3 the signal at the second level of quality. In accordance with further embodiments as shown in FIG. 2, for each element, the signal processor calculates i) a first value indicating how much of a respective element resides between the boundary defined by metric 125 and the first set of elements (e.g., X element) and ii) a second value indicating how much of a respective element resides between the boundary defined by the metric 125 and the second set of elements (e.g., Y elements). The signal processor calculates a setting for each respective intersected element based on the range (e.g., 0 to 100) and a proportion or weighting of the first value to the second value. (paragraph incorporated from U.S. Pat. No. 9,129,411).

Recall that the lower limit of the range (e.g., 0 to 100) is defined by settings of the second set of elements and that the upper limit of the range (e.g., 0 to 100) is defined by settings of the first set of elements. In this example, assume that 83% of the area associated with element U1 resides between the boundary defined by metric 125 and the second set of elements Y. Further assume that 17% of the area associated with element U1 resides between the boundary defined by metric 125 and the first set of elements X. Based on these values, the signal processor 140 sets the element U1 to a value of 83. For example, the signal processor 140 utilizes the following equation to produce this value:

$$U(i) - \text{UPPER RANGE LIMIT} - PV1(i)*(\text{UPPER RANGE LIMIT} - \text{LOWER RANGE LIMIT}),$$

where PV1(i)=percentage of upsample element i (e.g., one of elements U1, U2, and U3) falling between the boundary and the lower limit; or $$U(i) - \text{LOWER RANGE LIMIT} - PV2(i)*(\text{UPPER RANGE LIMIT} - \text{LOWER RANGE LIMIT}),$$

where PV2(i)=percentage of upsample element i falling between the boundary and the upper limit. (paragraph incorporated from U.S. Pat. No. 9,129,411).

Using the equations above, and weighting as discussed above, the signal processor 140 sets the element U2=6. For example, assume that 6% of the area associated with element U2 resides between the boundary defined by metric 125 and the first set of elements X. Further assume that 94% of the area associated with element U2 resides between the boundary defined by metric 125 and the second set of elements Y. Based on these values and the above equation, the signal processor 140 sets the element U2 to a value of 6. (paragraph incorporated from U.S. Pat. No. 9,129,411).

Using the equations above, the signal processor 140 sets the element U3=23. For example, assume that 23% of the area associated with element U3 resides between the boundary defined by metric 125 and the first set of elements X. Further assume that 77% of the area associated with element U3 resides between the boundary defined by metric 125 and the second set of elements Y. Based on these values and the above equation, the signal processor 140 sets the element U3 to a value of 23. (paragraph incorporated from U.S. Pat. No. 9,129,411).

All of the area associated with element U4 resides between the boundary defined by metric 125 and second set of elements. In such an instance, the signal processor assigns element U4 a value substantially equivalent to the settings associated with Y elements (e.g., second set of elements). That is, the signal processor 140 sets U4=0. (paragraph incorporated from U.S. Pat. No. 9,129,411).

As previously mentioned, the rendition of signal can represent a volume of elements. In accordance with such an embodiment, the signal processor 140 executes the same steps as discussed above for the volumetric elements. (paragraph incorporated from U.S. Pat. No. 9,129,411).

For example, the signal processor 140 can be configured to detect that a surface boundary defined by the metric 125 intersects a particular volumetric element of the multiple image elements in the volumetric image at the second level of quality. For the particular volumetric element, the signal processor 140 calculates i) a first value indicating how much of the particular volumetric element resides between the surface boundary and the first set of elements and ii) a second value indicating how much of the particular volumetric element resides between the surface boundary and the second set of elements. The signal processor 140 then calculates a setting for the particular volumetric element within a range based on magnitudes of the first value and the second value. (paragraph incorporated from U.S. Pat. No. 9,129,411).

Figure 49:
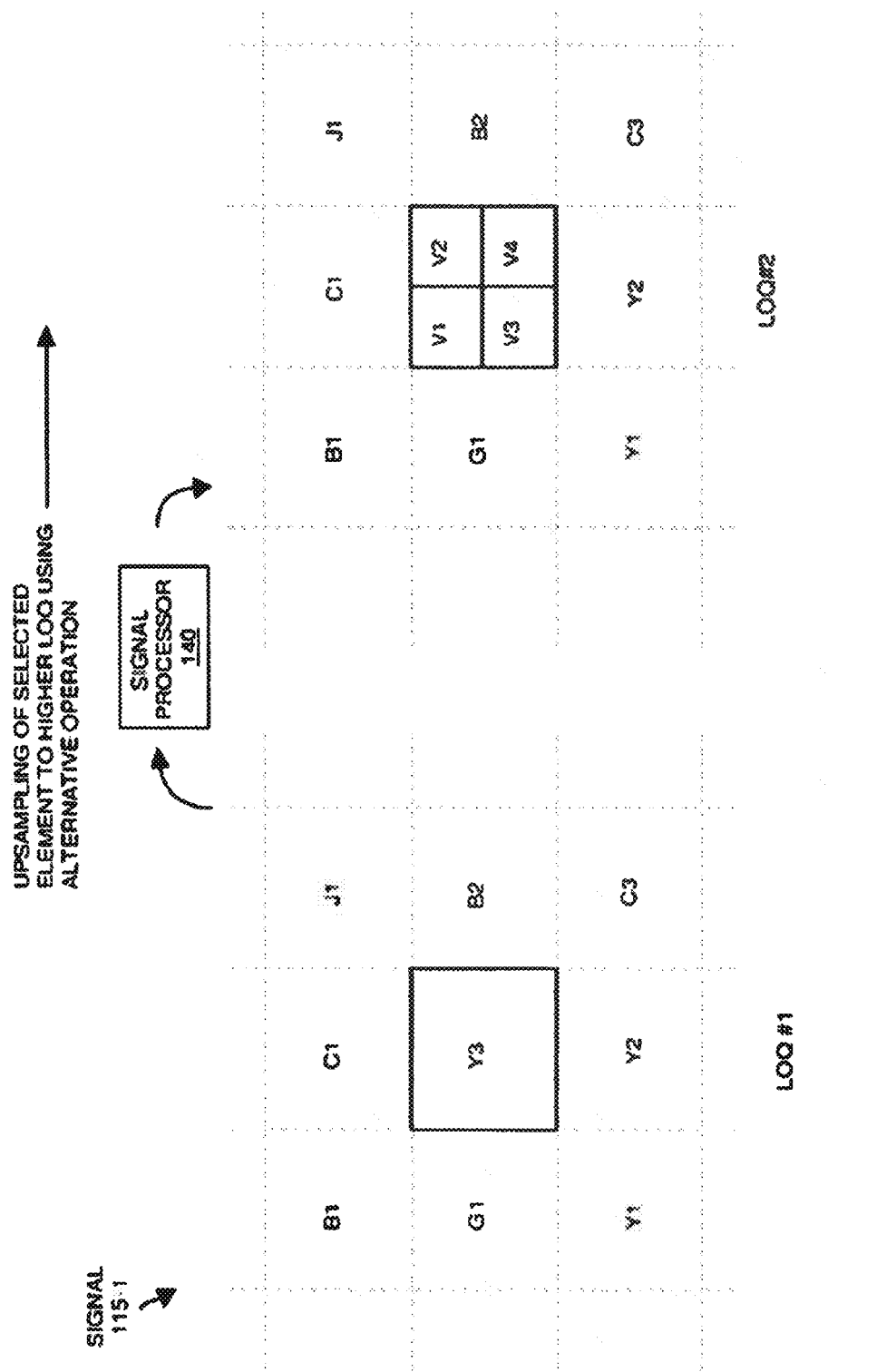
FIG. 49 is an example diagram illustrating upsampling of a selected element into multiple elements using an alternative upsample option according to embodiments herein (incorporated by reference from U.S. Pat. No. 9,129,411).

FIG. 49 is an example diagram illustrating upsampling of a selected element into multiple elements using an alternative upsample option according to embodiments herein. Assume in this example, that the signal processor 140 is unable to generate a respective metric to upsample the selected element Y3 to multiple elements at a higher level of quality. (paragraph incorporated from U.S. Pat. No. 9,129,411).

More specifically, assume that the selected element Y3 is not assigned a setting that falls within a range defined by two or more sets of nearby elements in a vicinity of the selected element. The signal processor 140 identifies this condition after testing and exhausting different possible axially opposing sets of nearby element groupings. In response to detecting this condition, the signal processor 140 presumes that the selected element does not fall near a well-defined boundary or transition region and thus uses an alternative upsample option to upsample the element Y3 to multiple elements V1, V2, V3, and V4. (paragraph incorporated from U.S. Pat. No. 9,129,411).

Figure 50:
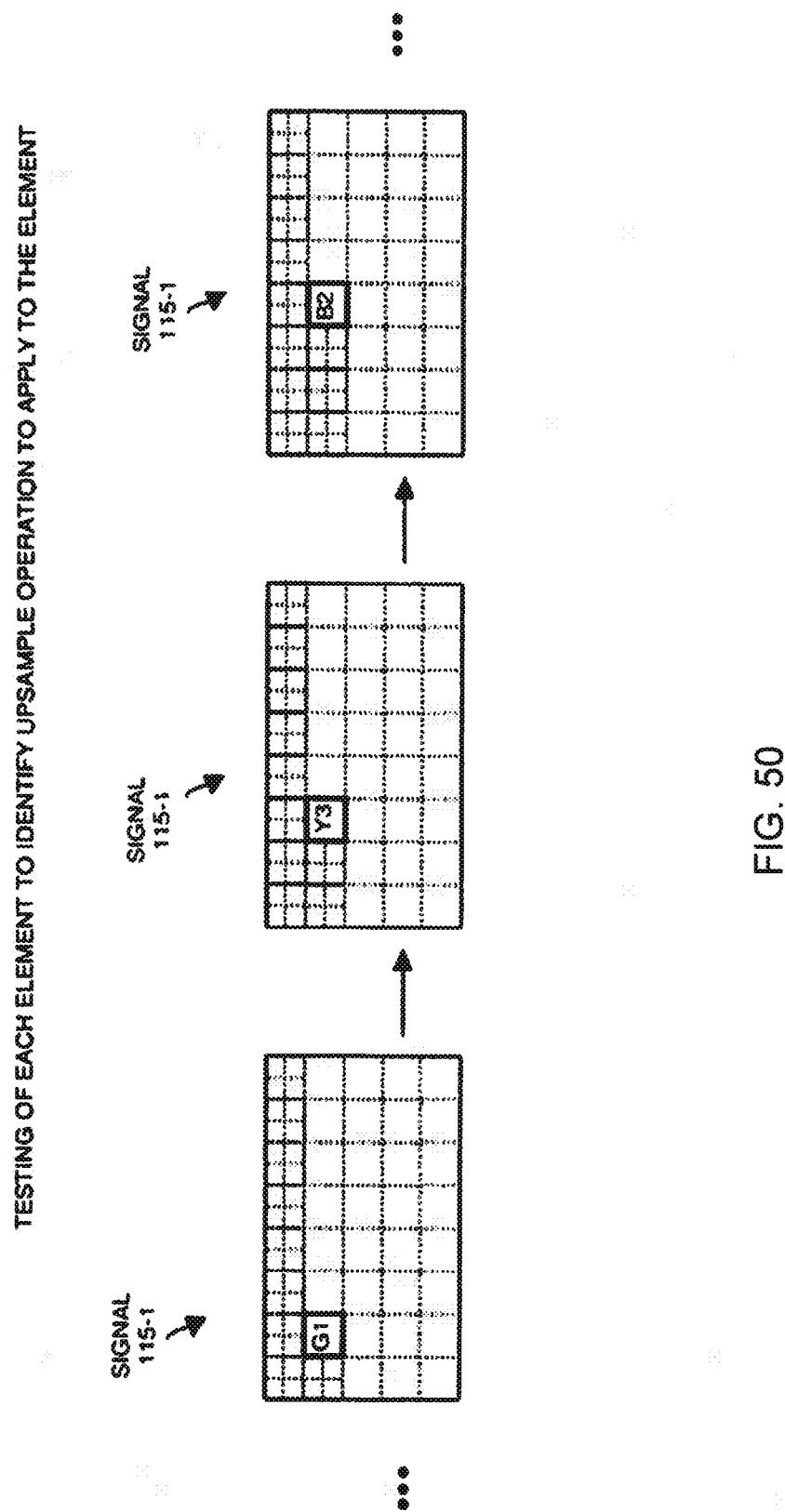
FIG. 50 is an example diagram illustrating an operation of selecting and upsampling each of multiple elements of a signal at a first level of quality into multiple elements of the signal at a second level of quality according to embodiments herein. The operation can be executed either iteratively or in parallel processing (incorporated by reference from U.S. Pat. No. 9,129,411).

FIG. 50 is an example diagram illustrating an operation of upsampling each of multiple elements of a signal at a first level of quality into elements of the signal at a second level of quality according to embodiments herein. As shown, the signal processor 140 tests each of multiple elements in the rendition of signal 115-1 at level of quality #1 to identify whether use of a generated metric would be appropriate to perform upsampling for the respective element. The signal processor 140 conditionally produces a respective metric based on settings of elements in a vicinity of the next selected element in the rendition of the signal at the first level of quality. (paragraph incorporated from U.S. Pat. No. 9,129,411).

As an example, the signal processor 140 applies a test to each of multiple respective elements in the rendition of the signal at the first level of quality to determine whether to assign a first type of upsample operation (e.g., one which uses a generated metric) to the respective element or assign an alternative second type of upsample operation (e.g., one which does not utilize a metric) to the respective element for decoding. (paragraph incorporated from U.S. Pat. No. 9,129,411).

The test of each element can include determining whether a setting of a selected respective element falls within a range as discussed above. The signal processor 140 assigns the first type of upsample operation for upsampling the respective elements in which a respective setting of the respective element falls within the range produced for the respective element. The signal processor 140 assigns the second type of upsample operation for upsampling the respective elements in which a respective setting of the respective element falls outside the range produced for the respective element. Accordingly, different elements in a given level of quality of a signal can be assigned different upsample operations. (paragraph incorporated from U.S. Pat. No. 9,129,411).

Figure 51:
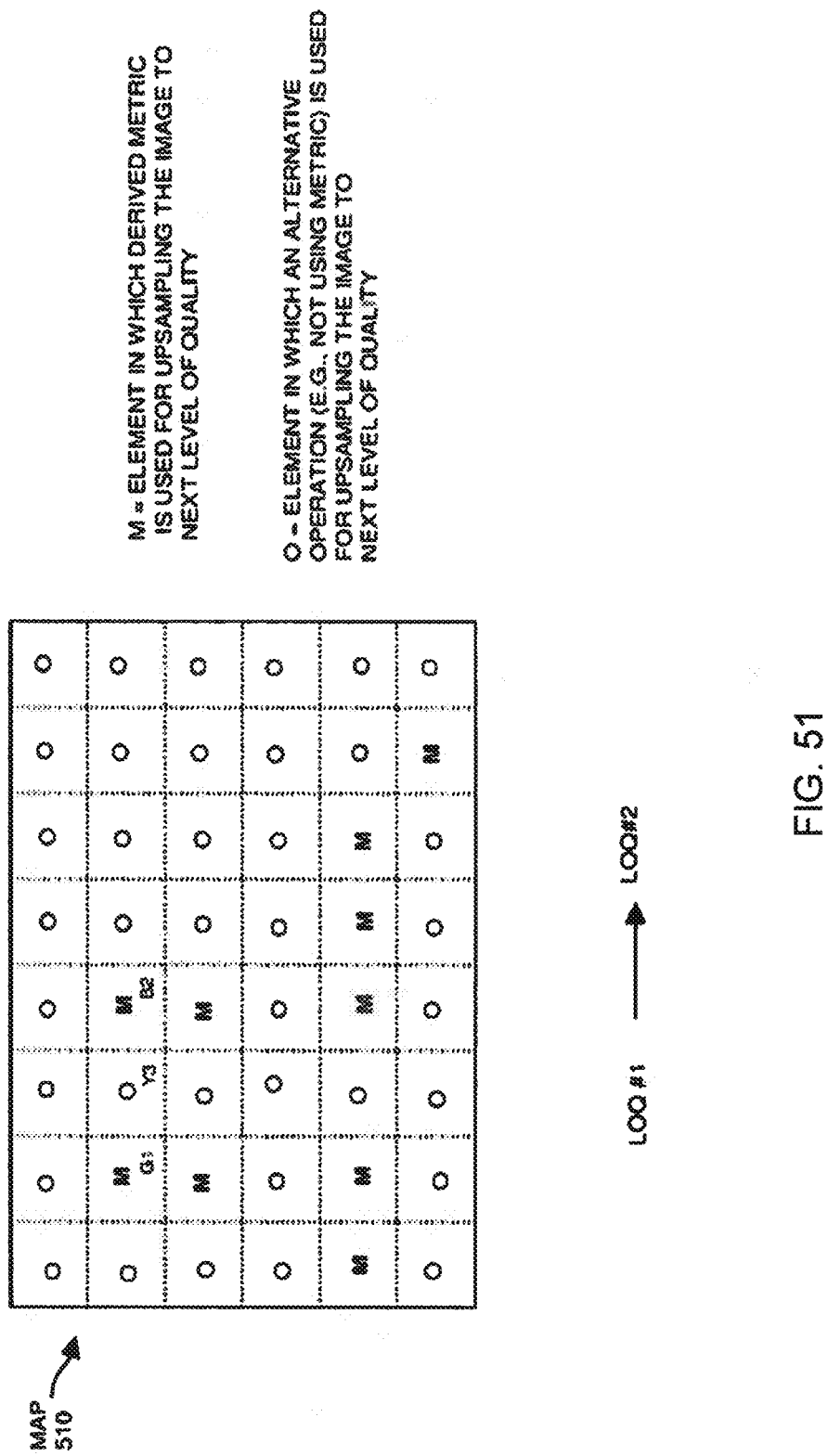
FIG. 51 is an example diagram illustrating assignment and use of different types of upsample operations to upsample a rendition of a signal to a higher level of quality according to embodiments herein (incorporated by reference from U.S. Pat. No. 9,129,411).

FIG. 51 is an example diagram illustrating assignment and use of different types of upsample operations to upsample a rendition of a signal to a higher level of quality according to embodiments herein. Note that elements G1, Y3, and B2 have been labeled in the map 510 to indicate the how the elements in the map 510 correspond to the elements in rendition of signal 115-1. (paragraph incorporated from U.S. Pat. No. 9,129,411).

As previously discussed, the signal processor 140 can be configured to test whether it is beneficial to upsample based on a respective metric 125 for the selected element or use an alternative upsample operation (e.g., use other upsampling and image processing approaches such as a bicubic filter and/or an unsharp masking filter). Based on results of the test, the elements in map 510 indicate whether the corresponding elements in the rendition of signal 115-1 at level of quality #1 will be upsampled from level of quality #1 to level of quality #2 using a generated metric (e.g., labeled with M) or an alternative method (e.g., labeled with an 0). (paragraph incorporated from U.S. Pat. No. 9,129,411).

By way of a non limiting example, the regions in map 510 marked with a letter M can indicate where transitions or edges occur in a respective image. The attributes indicate coarse attributes (e.g., an outline) of a respective image at a lower level of quality. (paragraph incorporated from U.S. Pat. No. 9,129,411).

Figure 52:
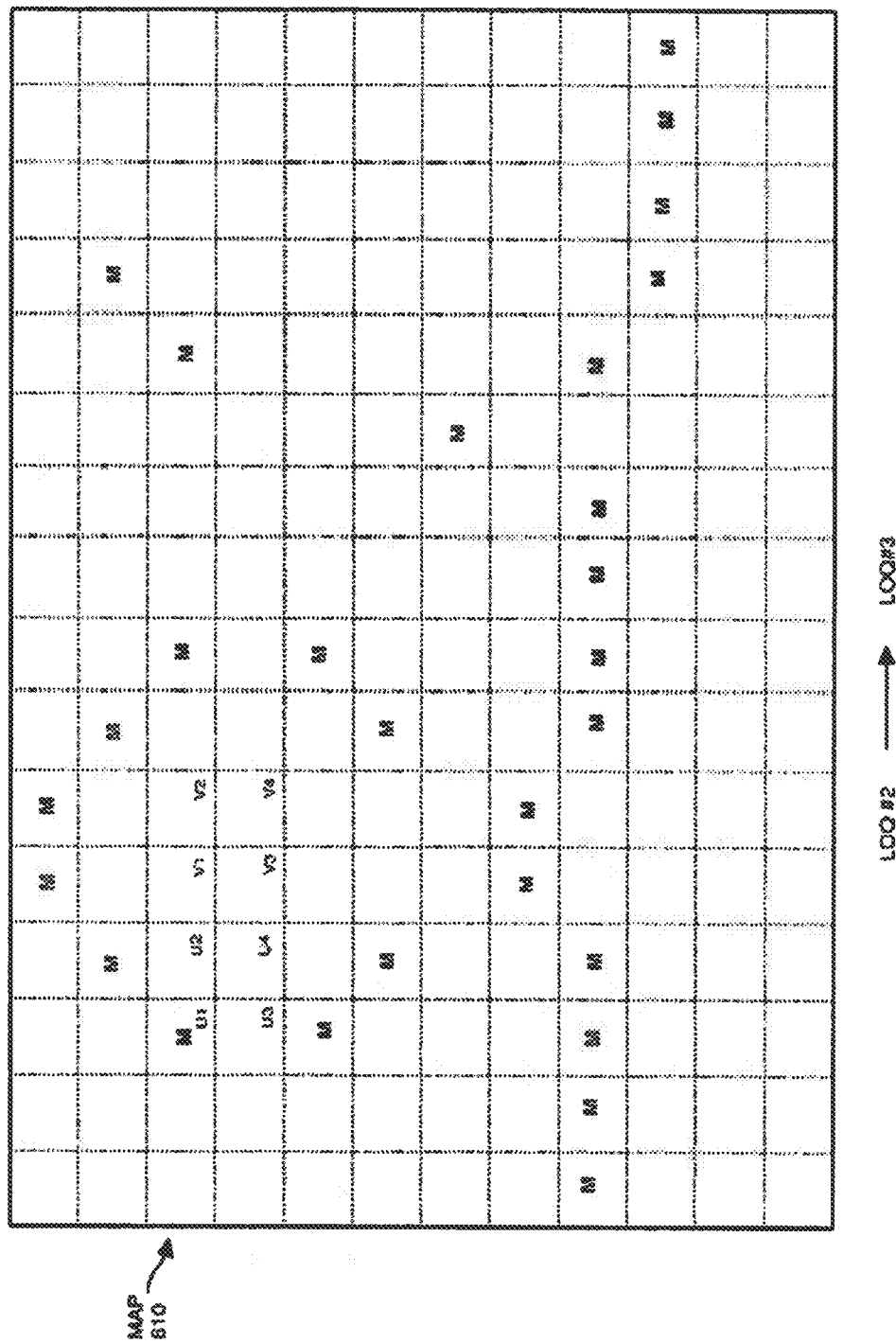
FIG. 52 is an example diagram illustrating assignment and use of different types of upsample operations to upsample a rendition of a signal to a higher level of quality according to embodiments herein (incorporated by reference from U.S. Pat. No. 9,129,411).

FIG. 52 is an example diagram illustrating assignment and use of different types of upsample operations to upsample a rendition of a signal to a higher level of quality according to embodiments herein. Note that elements U1, U2, U3, U4, V1, V2, V3, and V4 have been labeled in the map 510 to indicate how the elements in the map 610 correspond to elements in a rendition of the signal at the second level of quality. (paragraph incorporated from U.S. Pat. No. 9,129,411).

As previously discussed, the signal processor 140 can be configured to test whether it is appropriate to upsample based on a respective metric for the selected element or use an alternative upsample operation (e.g., use other upsampling and image processing approaches such as a bicubic filter and/or an unsharp masking filter). Based on results of the test, the elements in map 610 indicate whether the corresponding element will be upsampled from level of quality #2 to level of quality #3 using a generated metric (e.g., labeled with M) or an alternative method (e.g., not labeled). (paragraph incorporated from U.S. Pat. No. 9,129,411).

By way of a non-limiting example, the regions in map 610 marked with a letter M can indicate where transitions occur in a respective image. The transitions indicate coarse attributes (e.g., an outline) of a respective image at a lower level of quality. In this example, the rendition of signal 115-1 represents a more detailed image including at least one vertical object. Certain transitions (labeled M) have been detected in new regions of the image. The new transitions can indicate presence of additional objects that are now detectable in the higher resolution image. (paragraph incorporated from U.S. Pat. No. 9,129,411).

Edge Reconstruction Filter (e.g., Deblending Upsample Filter) (caption incorporated from U.S. Pat. No. 9,129,411).

Figure 53:
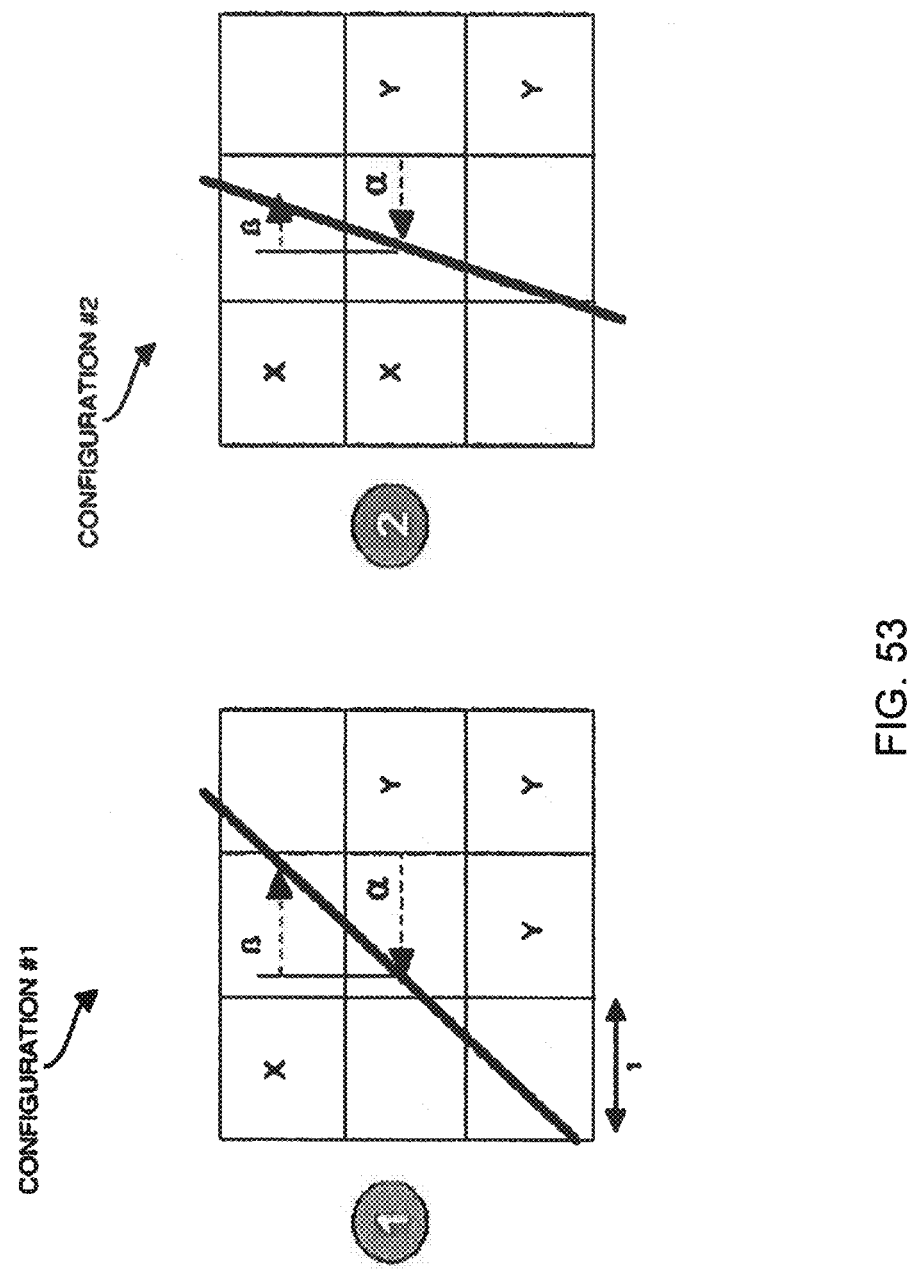
FIG. 53 is an example diagram illustrating different configurations for generating metrics according to embodiments herein (incorporated by reference from U.S. Pat. No. 9,129,411).

FIG. 53 is an example diagram illustrating two different configurations for creating metrics according to embodiments herein. Note that these two configurations are shown by way of a non-limiting example and that any number of configurations can be used to as a model for upsampling a particular element from one level of quality to the next. (paragraph incorporated from U.S. Pat. No. 9,129,411).

As discussed above, when a decoder upsamples back to higher levels of quality, it is often desirable to leverage "intelligent" filters to reconstruct an original signal in order to reduce an entropy of residual data that the encoder must create in order to upsample the signal from one level of quality to another. (paragraph incorporated from U.S. Pat. No. 9,129,411).

Consider that a large portion of images in video data (e.g., moving pictures with frames) include either very sharp borders/transitions or very gradual/blurred transitions. In order to avoid a jagged or blurred reconstruction when upsampling a straight edge or sharp borders/transitions in a lower resolution signal, embodiments herein can include use of at least two types of image processing and upsample operations, including unsharp masking (which does not generate a metric and does not upsample) and a deblending filter (which does generate a metric to upsample). (paragraph incorporated from U.S. Pat. No. 9,129,411).

Unsharp Masking Filter (caption incorporated from U.S. Pat. No. 9,129,411).

Unsharp masking is a popular filtering technique that enhances transitions. It does not have the ability to recreate a sharp transition after upsampling. However, when applied, it makes transitions steeper. This may introduce artifacts into the rendition of the signal, especially if the transition was not sharp to begin with. Thus, the Unsharp Masking filter is typically used only above a threshold. For example, for very gradual transitions, below a threshold, the filter is not used. (paragraph incorporated from U.S. Pat. No. 9,129,411).

According to one embodiment herein, the threshold of whether to use the Unsharp Masking filter can be decided by the encoder for each level of quality. The decision to use the filter can be overridden for selected controlled image zones in order to globally minimize an amount of residual data. (paragraph incorporated from U.S. Pat. No. 9,129,411).

Deblending Filter (caption incorporated from U.S. Pat. No. 9,129,411).

The so-called deblending filter as discussed herein is a custom filter to restore (e.g., upsample) edges at different level of quality in a signal. The deblending filter can include use of a generated metric 125 for each of one or more elements being upsampled as previously discussed. (paragraph incorporated from U.S. Pat. No. 9,129,411).

In one embodiment, the deblending filter is used before upsampling, and is used on relatively small portions (such as a 3 by 3 region of elements, in the non-limiting case of a two-dimensional signal) of the lower level image instance. However, note that this embodiment is shown by way of non-limiting example only and that the concepts as discussed herein can be applied to any sized portion (e.g., 4×4, 5×5, etc.) of a signal. (paragraph incorporated from U.S. Pat. No. 9,129,411).

Also, as previously discussed, one embodiment includes upsampling from level of quality n−1 to level of quality n. Use of the metric is based on the assumption that there are generally only two different values of elements in the selected portion and that the transition/border between them can be approximated with a suitable boundary such as a straight line, curved line, planar surface, etc. (paragraph incorporated from U.S. Pat. No. 9,129,411).

When the algorithm and respective metric cannot be applied to a particular element to achieve upsampling, embodiments herein include using for the higher resolution rendition of the signal element the multiple elements obtained by upsampling with other default upsampling operations/filters (e.g., a bicubic filter operation plus an unsharp masking filter). (paragraph incorporated from U.S. Pat. No. 9,129,411).

Note that the algorithm (and generation of a metric as discussed herein) to upsample from one level of quality to the next is typically used on a fairly low percentage (e.g., 10%) of elements in a signal being upsampled. As mentioned, signal elements in lower levels of quality of a signal typically contain "coarse" image information. The elements in which a metric can be used to upsample to a next level of quality are typically very important elements since artifacts on sharp borders in a signal tend to be very undesirable. They are also regions in which, when reconstructing a higher level of quality, a large amount of residual data would be needed in order to correct the upsampled rendition of the lower level of quality, if upsampled according to conventional methods and filters. As mentioned, upsampling using metric 125 reduces an amount of residual data as the operation intelligently upsamples a rendition of signal from one level of quality to the next. (paragraph incorporated from U.S. Pat. No. 9,129,411).

One embodiment herein recognizes that—based on the angle of the ideal boundary that represents an edge—there are at least two main model cases in which the metric can be advantageously used to determine whether the region under test includes a transition or edge. The region under test can be rotated or flipped to produce a total of eight different model cases (two for each orientation) for checking whether a selected element and corresponding neighboring elements define a transition or edge in which the metric can be used to upsample from one level of quality of the next. Testing different combinations of elements in a vicinity of a selected element under test ensures that a transition can be identified if one happens to exist. (paragraph incorporated from U.S. Pat. No. 9,129,411).

As shown in FIG. 53, if the two possible settings for elements marked as X and Y in the portions under test are identified to be within a given range/threshold (e.g., there are a group elements X that are set to nearly the same first value and there are a group of elements Y that are set to nearly the same second value) for the given level of quality, embodiments herein include generating and utilizing the metric 125 as discussed above to upsample element. Otherwise, the alternative upsample operation is used. These two cases are described below. (paragraph incorporated from U.S. Pat. No. 9,129,411).

Figure 54:
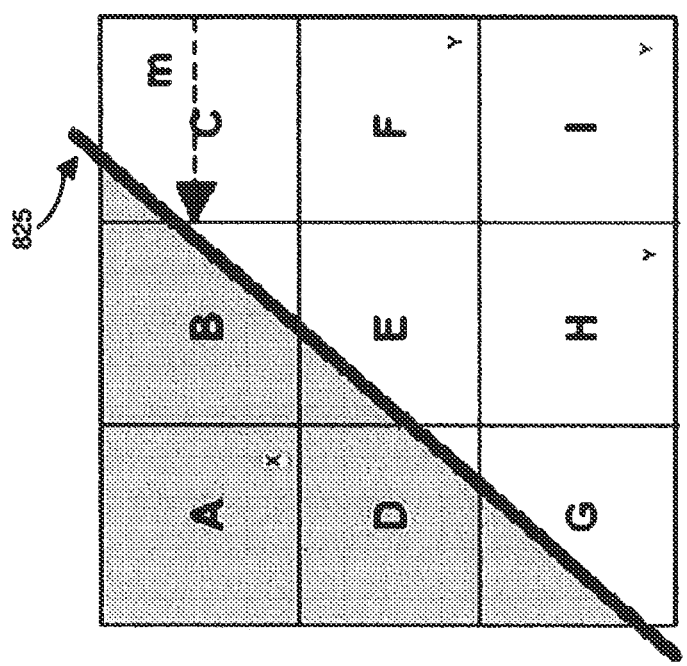
FIG. 54 is an example diagram illustrating generating a metric for a first configuration according to embodiments herein (incorporated by reference from U.S. Pat. No. 9,129,411).

FIG. 54 is an example diagram illustrating generating a metric for a first configuration according to embodiments herein (the specific condition to check being that one of the two range extremes, e.g., Y, appears at least three times on one of the corners, e.g., the bottom-right corner, and the other extreme appears at least once on the opposite corner). (paragraph incorporated from U.S. Pat. No. 9,129,411).

As mentioned, the values for elements marked with an X and Y are tested to ensure that they fall within a threshold range. The other elements will likely contain values that are a blend of X and Y since they likely come from a down-sample filtering of a sharp border that separates an area full of elements with value X from an area full of elements with value Y. As discussed above, according to one embodiment, the specific value of each element can depend on how much of their area is on the left or on the right of the ideal straight line that we want to identify. In particular, the way in which we can identify the straight line is by calculating two parameters: a and β. (paragraph incorporated from U.S. Pat. No. 9,129,411).

In this configuration, we can assume that $\alpha \geq 1/2$ and that $0 \leq \beta \leq 1$ (having normalized the dimensions of each element to 1×1 units). If this is not the case, we can just flip or rotate the 3×3 block of elements under test. (paragraph incorporated from U.S. Pat. No. 9,129,411).

As we can see from the elements under test in FIG. 54, the angle of the line that we want to reconstruct influences the values that we will find in (B+C), in (D+E) and in (G+H). In any case, their values will be somewhere in between 2X and 2Y, but depending on where the line is and on its slope, they can be closer to 2X or closer to 2Y. Assuming that the values of the elements in the 3×3 block come from down-sampling with some kind of linear filtering, we can leverage an operation known as "Linear interpolation" (or "LERP"). The operation is very efficient and works as follows:

$$B + C = LERP\left(2X, 2Y, \frac{1+\alpha+\beta}{2}\right)$$

$$D + E = LERP\left(2X, 2Y, \frac{\alpha}{2}\right)$$

$$G + H = LERP\left(2X, 2Y, \frac{\alpha+\beta}{2}\right)$$

(paragraph incorporated from U.S. Pat. No. 9,129,411).

In practice, the operation could be used to obtain the value of (B+C) as if we were in an upsampled level (much higher resolution): we would linearly interpolate the value of 2X (both elements in grey, if we assume that X is the shade of grey depicted in the image above) with the value of 2Y (both elements white), using the height of the trapezoid as parameter m. In the case of (B+C), since pels have a side of 1, it is easy to see that m is equal to (1+α−β1). (paragraph incorporated from U.S. Pat. No. 9,129,411).

As a consequence, we have two linear equations that we can solve for the two variables α and β (please note that element values A, B, C, D, E, F, G, H, I and range extremes X, Y are all known quantities):

$$LERP(X, Y, m) = X + m \cdot (Y - X) = (1 - m) \cdot X + m \cdot Y \quad m \in (0, 1)$$

(paragraph incorporated from U.S. Pat. No. 9,129,411).

Thus, embodiments herein include calculating/estimating the values of α and 13, by solving the equations above. Via the values, the ideal straight line which we will replicate in the upsampled level, can be used to avoid generation of unpleasant blurred staircase effects when upsampling form one level of quality to the next. To improve the estimate and especially when f3 is large, embodiments herein can include an additional equation for (D+G) if desired. (paragraph incorporated from U.S. Pat. No. 9,129,411).

Figure 55:
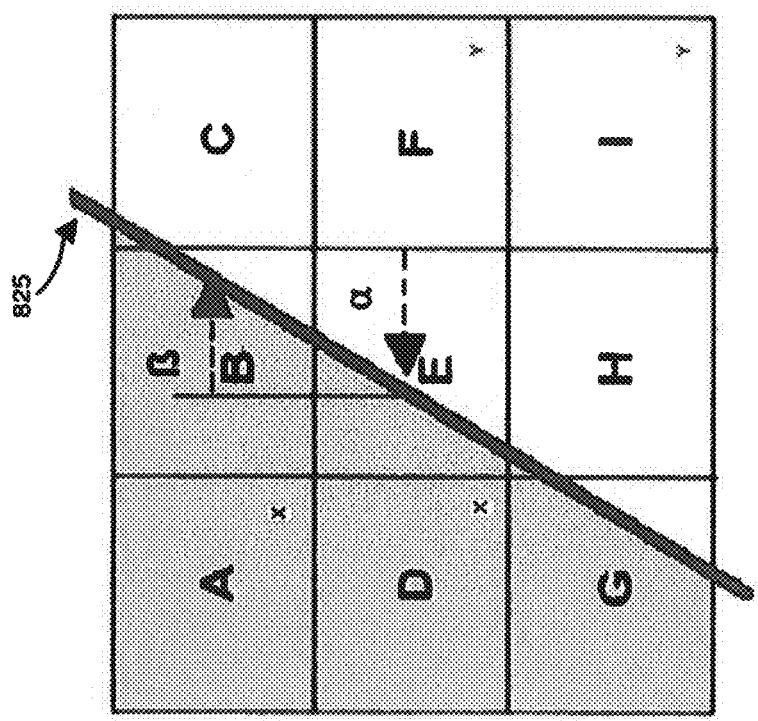
FIG. 55 is an example diagram illustrating generating a metric for a second configuration according to embodiments herein (incorporated by reference from U.S. Pat. No. 9,129,411).

FIG. 55 is an example diagram illustrating generating a metric for a second configuration according to embodiments herein (the specific condition to check being that one of the two range extremes, e.g., Y, appears at least twice on one side including one corner, e.g., the right-hand side including the bottom-right corner, and the other extreme appears at least twice on the opposite side including the opposite corner). (paragraph incorporated from U.S. Pat. No. 9,129, 411).

In accordance with this configuration, it is assumed that $\alpha \geq 1/2$ and that $0 \leq \beta \leq 1$ (again, if that is not the case, the 3×3 block can be flipped or rotated). Again we have three equations that can help us estimate the values of α and β, hence reconstructing the straight line:

$$B + C = LERP\left(2X, 2Y, \frac{1+\alpha+\beta}{2}\right)$$

$$E = LERP(2X, 2Y, \alpha)$$

$$G + H = LERP\left(2X, 2Y, \frac{\alpha+\beta}{2}\right)$$

(paragraph incorporated from U.S. Pat. No. 9,129,411).

Again, also here we have three equations with two unknowns, which can help us to further refine the estimates of α and β. (paragraph incorporated from U.S. Pat. No. 9,129,411).

As previously discussed, the deblending filter upsample algorithm can be expanded for use on signals having more than 2 dimensions (e.g., 3D images, holographic images, etc.). (paragraph incorporated from U.S. Pat. No. 9,129, 411).

Figure 56:
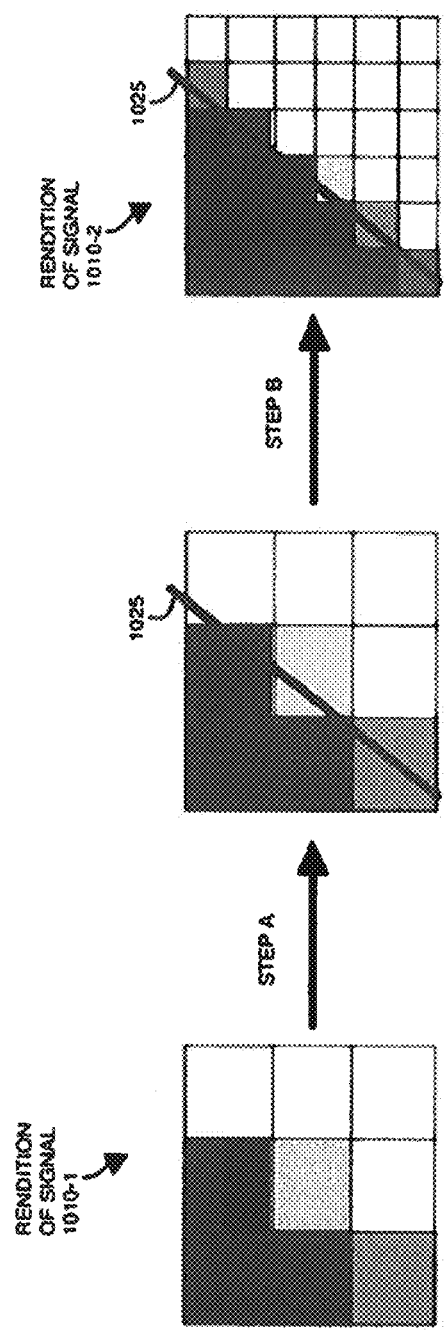
FIG. 56 is an example diagram illustrating results of using a generated metric to upsample elements of a signal according to embodiments herein (incorporated by reference from U.S. Pat. No. 9,129,411).

FIG. 56 is an example diagram illustrating results of utilizing a metric 1025 to upsample elements of a signal to a higher level of quality according to embodiments herein. As shown, the signal processor 140 utilizes the algorithm in step A to produce metric 1025 in a manner as previously discussed. Based on metric 1025, the signal processor 140 upsamples the rendition of signal 1010-1 into rendition of signal 1010-2. notice how use of the metric 1025 preserves an integrity of the boundary defined metric 1025 during the upsampling. (paragraph incorporated from U.S. Pat. No. 9,129,411).

FIG. 14 is an example block diagram of a computer system 800 that provides computer processing according to embodiments herein. (paragraph incorporated from U.S. Pat. No. 9,129,411).

Computer system 800 can be or include a computerized device such as a personal computer, processing circuitry, television, playback device, encoding device, workstation, portable computing device, console, network terminal, processing device, network device, operating as a switch, router, server, client, etc. (paragraph incorporated from U.S. Pat. No. 9,129,411).

Note that the following discussion provides a basic embodiment indicating how to carry out functionality associated with signal processor 140 as previously discussed. However, it should be noted that the actual configuration for carrying out the operations as described herein can vary depending on a respective application. (paragraph incorporated from U.S. Pat. No. 9,129,411).

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include a processor 813, I/O interface 814, and a communications interface 817. (paragraph incorporated from U.S. Pat. No. 9,129,411).

I/O interface 814 provides connectivity to repository 180, and if present, display screen, peripheral devices 816 such as a keyboard, a computer mouse, etc. (paragraph incorporated from U.S. Pat. No. 9,129,411).

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with signal processor 140. The instructions are executed by a respective resource such as signal processor 140 to perform any of the operations as discussed herein. (paragraph incorporated from U.S. Pat. No. 9,129,411).

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180. (paragraph incorporated from U.S. Pat. No. 9,129,411).

As shown, computer readable storage media 812 can be encoded with signal processor application 140-1 executed by processor 813 as signal processor process 140-2. (paragraph incorporated from U.S. Pat. No. 9,129,411).

Note that the computer system 800 or encoder 140 also can be embodied to include a computer readable storage medium 812 (e.g., a hardware storage media, non-transitory storage media, etc.) for storing data and/or logic instructions. (paragraph incorporated from U.S. Pat. No. 9,129,411).

Computer system 800 can include a processor 813 to execute such instructions and carry out operations as discussed herein. Accordingly, when executed, the code associated with signal processor application 140-1 can support processing functionality as discussed herein. As mentioned, signal processor 140 can be configured to support encoding and/or decoding. (paragraph incorporated from U.S. Pat. No. 9,129,411).

During operation of one embodiment, processor 813 accesses computer readable storage media 812 via the use of interconnect 811 in order to launch, run, execute, interpret or otherwise perform the instructions of signal processor application 140-1 stored in computer readable storage medium 812. Execution of the signal processor application 140-1 produces processing functionality in processor 813. In other words, the encoder process 140-2 associated with processor 813 represents one or more aspects of executing signal processor application 140-1 within or upon the processor 813 in the computer system 800. (paragraph incorporated from U.S. Pat. No. 9,129,411).

Those skilled in the art will understand that the computer system 800 can include other processes and/or software and hardware components, such as an operating system that controls allocation and use of hardware processing resources to execute signal processor application 140-1. (paragraph incorporated from U.S. Pat. No. 9,129,411).

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device. (paragraph incorporated from U.S. Pat. No. 9,129,411).

Figure 57:
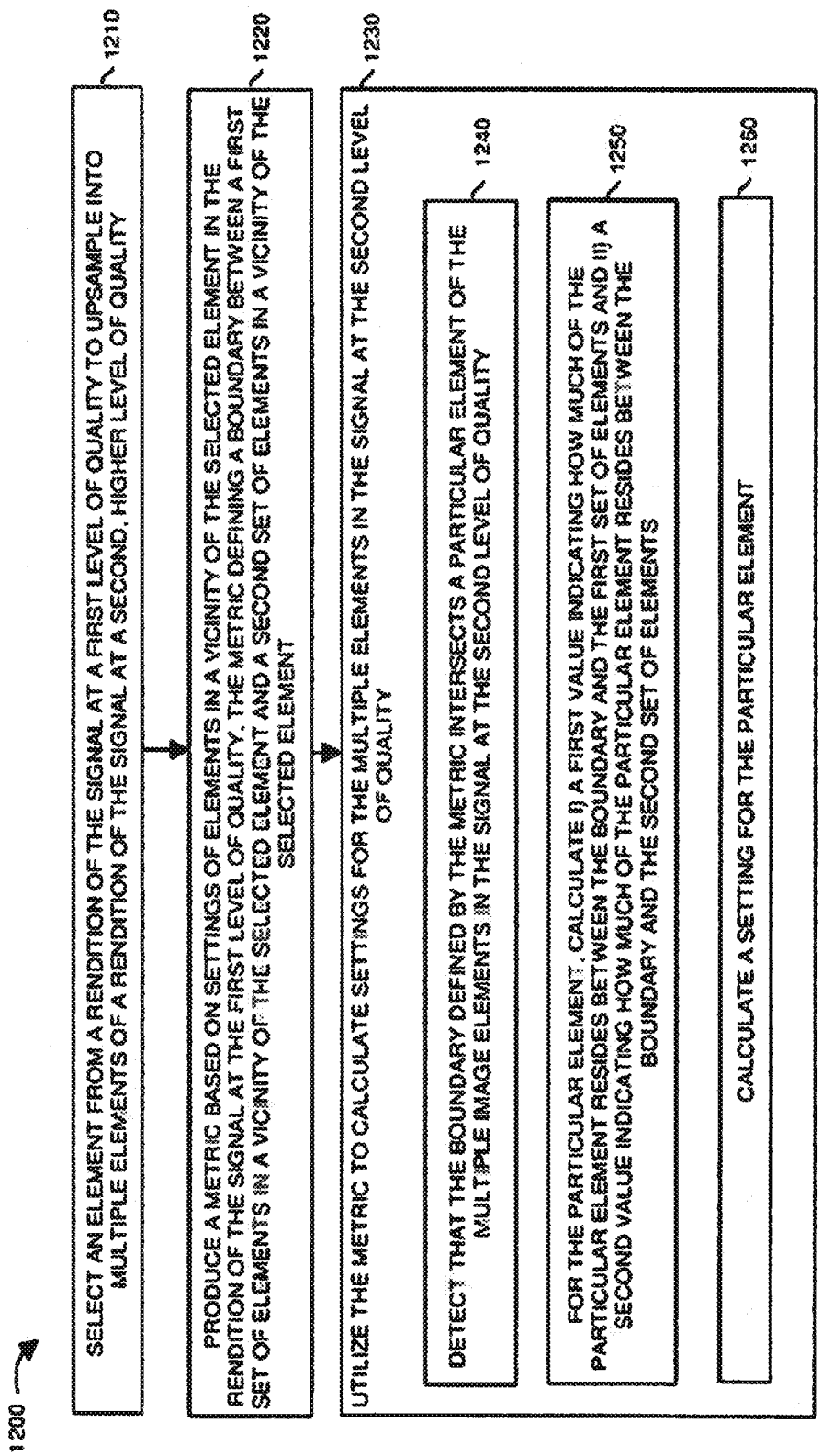
FIG. 57 is an example flowchart illustrating a method of generating and utilizing a metric upsample according to embodiments herein (incorporated by reference from U.S. Pat. No. 9,129,411).

FIG. 57 is an example flowchart 1200 illustrating a method of generating and utilizing a metric upsample according to embodiments herein. (paragraph incorporated from U.S. Pat. No. 9,129,411).

In step 1210, the signal processor 140 selects an element from a rendition of the signal 115-1 at a first level of quality to upsample into multiple elements of a rendition of the signal 115-1 at a second, higher level of quality. (paragraph incorporated from U.S. Pat. No. 9,129,411).

In step 1220, the signal processor 140 produces a metric 125 based on settings of elements in a vicinity of the selected element in the rendition of the signal at the first level of quality. The metric 125 defines a boundary between a first set of elements in a vicinity of the selected element and a second set of elements in a vicinity of the selected element. (paragraph incorporated from U.S. Pat. No. 9,129,411).

In step 1230, the signal processor 140 utilizes the metric 125 to calculate settings for the multiple elements in the signal at the second level of quality. (paragraph incorporated from U.S. Pat. No. 9,129,411).

In sub-step 1240, the signal processor 140 detects that the boundary defined by the metric intersects a particular element of the multiple image elements in the signal at the second level of quality. (paragraph incorporated from U.S. Pat. No. 9,129,411).

In sub-step 1250, for the particular element, the signal processor 140 calculates i) a first value indicating how much of the particular element resides between the boundary and the first set of elements and ii) a second value indicating how much of the particular element resides between the boundary and the second set of elements. (paragraph incorporated from U.S. Pat. No. 9,129,411).

In sub-step 1260, the signal processor 140 calculates a setting for the particular element based on the first value and the second value. (paragraph incorporated from U.S. Pat. No. 9,129,411).

Note again that techniques herein are well suited for use in processing and reconstructing signals. However, it should be noted that embodiments herein are not limited to use in such applications and that the techniques discussed herein are well suited for other applications as well. (paragraph incorporated from U.S. Pat. No. 9,129,411).

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform. (paragraph incorporated from U.S. Pat. No. 9,129,411).

FIG. 1 is an example diagram illustrating processing of reconstruction data according to embodiments herein. (paragraph incorporated from U.S. Pat. No. 8,531,321).

As shown, a signal processor 100-1 downsamples a signal 115 into different renditions at lower levels of quality. In general, downsampling the signal 115 can include producing a rendition of the signal at each of different levels of quality and generating reconstruction data specifying how to convert a given rendition of the signal at a first level of quality into a rendition of the signal at a next higher level of quality in the hierarchy. (paragraph incorporated from U.S. Pat. No. 8,531,321).

Note that values associated with the rendition of signal 115 and corresponding rendition of signal at lower levels of quality can represent any suitable type of data information. By way of non-limiting examples, the signal 115 can be image data, a frame or field of a video, a volumetric medical image, a motion map, etc., indicating settings (e.g., color components, motion vectors expressed in rectangular or polar coordinates, temperatures, radioactivity amounts, density values, etc.) of each of multiple signal elements (e.g., pels/plane elements, pixels/picture elements, voxels/volumetric picture elements, etc.) in a respective image. (paragraph incorporated from U.S. Pat. No. 8,531,321).

Each element in the signal 115 can be attributed several settings such as one or more color components. In accordance with such an embodiment, color components of an element in the signal data are encoded in accordance with a suitable color space standard such as YUV, RGB, HSV, etc. (paragraph incorporated from U.S. Pat. No. 8,531,321).

By way of non-limiting examples, the image represented by signal 115 can be two dimensional (e.g., pictures, video frames, 2D motion maps, etc.), three-dimensional (e.g., 3D/volumetric images, holographic images, CAT-scans, medical/scientific images, 3D motion maps, etc.), or even feature more than three dimensions. The settings of the signal elements or components indicate how to represent/display the signal for playback or reproduction on a device. (paragraph incorporated from U.S. Pat. No. 8,531,321).

In accordance with further embodiments, signal 115 represents an original signal or high-resolution signal including multiple elements. In such an embodiment, each of the renditions of signal (e.g., rendition of signal 115-3, rendition of signal 115-2, rendition of signal 115-1, . . . ) can be akin to a thumbnail representation of an original signal that has been downsampled from signal 115 to a lower level of quality. (paragraph incorporated from U.S. Pat. No. 8,531,321).

The renditions of signal 115 at the lower levels of quality capture coarser attributes of the original signal, but not the more detailed finer attributes of the original signal. The detailed, finer attributes appear in the rendition of the signal at higher levels of quality. (paragraph incorporated from U.S. Pat. No. 8,531,321).

By way of a non-limiting example, the signal processor 100-1 downsamples original signal 115 into rendition of signal 115-3; signal processor 100-1 downsamples rendition of signal 115-3 into rendition of signal 115-2; signal processor 100-1 downsamples rendition of signal 115-2 into rendition of signal 115-1; and so on to a lowest level of quality. The signal 115 can be downsampled into any number of suitable levels. (paragraph incorporated from U.S. Pat. No. 8,531,321).

When downsampling the signal 115 to each lower level of quality, the signal processor 110-1 can generate respective reconstruction data 150. Reconstruction data indicates how to reconstruct, based on a rendition of the signal at a lower level of quality and/or a known reference signal (e.g., by way of a non-limiting example, previous frames in a video), a rendition of signal at a next higher level of quality. For example, reconstruction data 150-3 indicates how to convert the rendition of signal 115-2 into the rendition of signal 115-3; reconstruction data 150-2 indicates how to convert the rendition of signal 115-1 into the rendition of signal 115-2; reconstruction data 150-1 indicates how to convert the rendition of signal 115-0 into the rendition of signal 115-1; and so on. (paragraph incorporated from U.S. Pat. No. 8,531,321).

Reconstruction data 150 can be any of multiple different types of data used to reconstruct the signal at higher levels of quality. For example, reconstruction data include any of one or more sets of different types of reconstruction data such as parameters of upsampling operations, quantization threshold information, residual data, motion zones, adjustments to motion vectors, spectral information on noise, meta-data, etc. (paragraph incorporated from U.S. Pat. No. 8,531,321).

Additional example details of downsampling a respective signal and producing reconstruction data is described in related application United States Patent Application entitled "SIGNAL PROCESSING AND TIERED SIGNAL ENCODING,", filed on the same day as the present application, the entire teachings of which are incorporated herein by this reference. In such embodiments, the signal processor 100-1 can be configured to test and create different sets of reconstruction data to upsample from one level of quality to another. (paragraph incorporated from U.S. Pat. No. 8,531,321).

Reconstruction data 150 can include any suitable data for signal processing. For example, each set of reconstruction data 150 can include metadata, residual data, etc. Metadata can include data such as a set of one or more upsampling operations with which to convert the rendition of the signal from one level of quality to the next the residual data can indicate information such as adjustments to be made to signal elements at the different levels of quality (e.g., after upsampling a rendition of the signal at a lower level of quality, or after motion-compensating a known reference signal at the same level of quality, etc.), and so on. (paragraph incorporated from U.S. Pat. No. 8,531,321).

The signal processor 100-1 can include an entropy encoder 140. In one example embodiment, the entropy encoder 140 processes the reconstruction data at each of multiple different levels of quality into a respective set of range value information 180 and probability distribution information 190. (paragraph incorporated from U.S. Pat. No. 8,531,321).

Range value information 180 can include a respective range value (i.e., bit string representing encoded symbols) generated for a corresponding set of reconstruction data. The probability distribution information 190 can indicate a distribution of one or more symbols in the respective set of reconstruction data 150 being encoded. In one example embodiment, indication of probability distribution information 190 for one or more sets of reconstruction data can be avoided, meaning that for the respective set(s) of reconstruction data the decoder should use the probability distribution information inherited from previous (lower) levels of quality and/or from known reference signals. (paragraph incorporated from U.S. Pat. No. 8,531,321).

In one embodiment, entropy encoder 140 and decoder 440 can be based on the technique known in the art as range encoding, which has good performance and efficiency; however, this is shown by way of non-limiting example only, and any suitable method of entropy encoding or data compression can be used to encode and decode the reconstruction data 150. Regardless of the type of entropy encoding used, methods herein deviate with respect to conventional systems and methods. (paragraph incorporated from U.S. Pat. No. 8,531,321).

The entropy encoder 140 can be configured to produce respective range value information and probability distribution information for each of the different types of reconstruction data. (paragraph incorporatedfrom US8,531,321).

As a more specific example, the signal processor 100-1 utilizes an entropy encoder 140 to encode the reconstruction data 150-1 into range value information 180-1 and probability distribution information 190-1. For example, the entropy encoder 140 analyzes the sets of reconstruction data 150-1 for level of quality #1 to produce the sets of probability distribution information 190-1. Each set of probability distribution information 190-1 indicates a probability distribution of one or more symbols in the corresponding set of reconstruction data 150-1. (paragraph incorporated from U.S. Pat. No. 8,531,321).

The entropy encoder 140 produces probability distribution information 190-2 for reconstruction data 150-2. The sets of probability distribution information 190-2 indicate a probability distribution of one or more symbols in the sets of reconstruction data 150-2. In one example embodiment, for one or more sets of reconstruction data in one or more levels of quality, the encoder may choose not to produce probability distribution information, meaning that for the corresponding set(s) or reconstruction data the encoder and the decoder should use the probability distribution information automatically inherited from lower levels of quality and/or from a known reference signal. (paragraph incorporated from U.S. Pat. No. 8,531,321).

The signal processor 100-1 utilizes entropy encoder 140 to encode each set of reconstruction data for each level of quality based on the corresponding probability distribution information. For example, the entropy encoder 140 utilizes the probability distribution information 190-1 as a basis to produce range value information 180-1 (i.e., an encoded bit string) representative of reconstruction data 150-1; the entropy encoder 140 utilizes the probability distribution information 190-2 as a basis to produce range value information 190-2 representative of reconstruction data 150-2; the entropy encoder 140 utilizes the probability distribution information 190-3 as a basis to produce range value information 190-3 representative of reconstruction data 150-3; and so on. (paragraph incorporated from U.S. Pat. No. 8,531,321).

The signal processor 100-1 stores the range value information 180 and the probability distribution information 190 for subsequent distribution to one or more target resources. In one embodiment, the encoded information (i.e., the collection of bit strings referred to herein as range value information 180 and/or the probability distribution information 190) can be transmitted over a communication link from a source to a consumer that includes a decoder to reproduce or playback the signal 115. As further discussed below, reproduction of the signal 115 can include decoding of the range value information 180 and probability distribution information 190 at each of one or more levels of quality into respective sets of reconstruction data to reconstruct the signal 115 for playback. The produced rendition of the signal may be of a same or different resolution and identical or nearly identical to the original encoded signal. In other words, for the latter case, the encoding/decoding as discussed herein can be lossless or lossy. (paragraph incorporated from U.S. Pat. No. 8,531,321).

In one embodiment, the signal processor 100-2 receives the range value information 180 (i.e., a collection of bit strings representing the encoded symbols) and the probability distribution information 190 for respective reconstruction data. The signal processor 100-2 implements an entropy decoder 440. The entropy decoder 440 utilizes the probability distribution information 190 to decode the range value information 180 into the reconstruction data. (paragraph incorporated from U.S. Pat. No. 8,531,321).

As mentioned above, subsequent to decoding, the signal processor 100-2 utilizes the reconstruction data 150-1 produced by the decoder 440 to convert the rendition of the signal 115-0 at a first level of quality into the rendition of the signal 115-1 at a next higher level of quality; the signal processor 100-2 utilizes the reconstruction data 150-2 produced by the decoder 440 to convert the rendition of the signal 115-1 into the rendition of the signal 115-2; the signal processor 100-2 utilizes the reconstruction data 150-3 produced by the decoder 440 to convert the rendition of the signal 115-2 into rendition of signal 115-3; and so on. (paragraph incorporated from U.S. Pat. No. 8,531,321).

Note that the signal processor 100-2 need not continue the process of upward conversion and rendition up to the highest level of quality originally present in the signal and encoded by the signal processor 100-1; in fact, the tiered entropy encoding described herein deviates with respect to conventional systems and methods by allowing low-end reproduction devices to decode and reproduce only the portions of the bitstream that they are equipped to deal with. The same advantage applies if the transmission link becomes inadequate, temporarily or definitively, to carry the amount of information associated with the whole bitstream 180; the portions that are able to reach the decoder, e.g., 180-1, 180-2 and so on up to a certain level of quality, can be processed and decoded independently by the signal processor 100-2, thus ensuring reproduction of the signal 115, albeit at a reduced quality, even when the transmission link degrades. (paragraph incorporated from U.S. Pat. No. 8,531,321).

Note again that the sets of reconstruction data can include residual data indicating adjustments to be made after upsampling the rendition of signal at a first level of quality into the rendition of signal at a next higher level of quality, or adjustments to be made to specific signal elements after motion-compensating a known reference signal into a rendition of the signal at a next higher level of quality, or adjustments to be made to the motion map used to motion-compensate a known reference signal into a rendition of the signal at a next higher level of quality, etc. Additional details of a decoder system and of utilizing residual data and upsample operations to upsample for use herein are described in related application United States Patent Application entitled "TIERED SIGNAL DECODING AND SIGNAL RECONSTRUCTION," filed on the same day as the present application, the entire teachings of which are incorporated herein by this reference. Also, additional details of a method to reduce the amount of reconstruction data to be encoded/decoded by means of inheritance for use herein are described in related application United States Patent Application entitled "INHERITANCE IN A TIERED SIGNAL QUALITY HIERARCHY," filed on the same day as the present application, the entire teachings of which are incorporated herein by this reference. (paragraph incorporated from U.S. Pat. No. 8,531,321).

One embodiment herein includes reducing an amount of data needed to encode the probability distribution information 190 for each set of reconstruction data. To reduce data that needs to be transmitted to the decoder 440, the entropy encoder 140 can be configured to analyze the probability distribution information in order to include one or more decoding parameters to be used by a respective decoder to extrapolate a probability distribution for multiple symbols in the residual data. (paragraph incorporated from U.S. Pat. No. 8,531,321).

More specifically, in one example embodiment, the encoder 140 analyzes the probability distribution information 190 in order to include multiple decoding parameters including a first parameter and additional parameters. The first parameter specifies a percentage of elements in the reconstruction data (e.g., residual data) that are assigned a first symbol. Each of the additional decoding parameters can indicate a probability of a next symbol present in the reconstruction data (e.g., residual data). (paragraph incorporated from U.S. Pat. No. 8,531,321).

In accordance with another embodiment, the encoder 140 as discussed herein analyzes the probability distribution information for respective reconstruction data in order to produce a first decoding parameter and a second decoding parameter. The first decoding parameter specifies a percentage of elements in the residual data that are assigned a first symbol; the second decoding parameter specifies how to extrapolate probability distribution values for each of multiple other (additional) symbols in the reconstruction data (e.g., residual data). For instance, in one example embodiment, let us say that there are N different symbols in the alphabet used to encode the residual data, and let us call the first decoding parameter d1 and the second decoding parameter d2; the decoder will be able to calculate all the symbol probabilities p(0) to p(N−1) by solving the following system of equations, subject to the constraint that the sum of all probabilities p(0) to p(N−1) must be 1:

p(0)=d1 p(k)=p(k−1)*d2, for k in the range 2 to N−1. (paragraph incorporated from U.S. Pat. No. 8,531,321).

In accordance with yet another embodiment, the encoder 140 produces the probability distribution information for each set of reconstruction data to include only a single decoding parameter indicating a probability for a first symbol in the residual data. The decoder 440 extrapolates probability distributions for the other symbols based on a predetermined set of standard parameters known to the decoder; the extrapolation may be done by calculations or based on table lookups. (paragraph incorporated from U.S. Pat. No. 8,531,321).

In further embodiments, as discussed below, to reduce an amount of data that needs to be transmitted to the decoder for every level of quality, the entropy encoder 140 does not generate any probability distribution information for respective reconstruction data. In such an instance, the decoder 440 uses ("inherits") probability distribution information from a lower level of quality for each of one or more higher levels of quality to convert the range value information into the reconstruction data. (paragraph incorporated from U.S. Pat. No. 8,531,321).

FIG. 2A is an example diagram illustrating processing of a signal according to embodiments herein. (paragraph incorporated from U.S. Pat. No. 8,531,321).

As previously discussed, in one embodiment, the signal 115 may represent image information. Assume in this non-limiting example that the signal 115 and corresponding reconstruction data indicate how to convert or expand a lower resolution image into a higher resolution image, with a given scale factor (e.g., in this non-limiting example a scale factor of 2). (paragraph incorporated from U.S. Pat. No. 8,531,321).

Further, assume that the sets of entropy encoded reconstruction data 150, when decoded, indicate how to control settings of image elements at each level of quality. For example, image 210-1 at level of quality J includes a field of image elements W; image 210-2 at level of quality J+1 includes field of image elements X; image 210-3 includes field of image elements Y; etc. (paragraph incorporated from U.S. Pat. No. 8,531,321).

The reconstruction data for level of quality J indicates how to control settings of image elements W in image 210-1 (e.g., rendition of signal 115-0); the reconstruction data for level of quality J+1 indicates how to convert each image element W in image 210-1 into four X elements in image 210-2; the reconstruction data for level of quality J+2 indicates how to convert each image element Y in image 210-2 into four Y elements in image 210-3; and so on. Conversion can include upsampling and filtering (also by means of non-linear operations) followed by making adjustments to elements. (paragraph incorporated from U.S. Pat. No. 8,531,321).

FIG. 1 is an example diagram illustrating different examples of processing reconstruction data according to embodiments herein. (paragraph incorporated from U.S. Pat. No. 8,531,321).

As shown, reconstruction data 150-3 can include metadata 160-3, residual data 170-3, etc. Reconstruction data 150-2 can include metadata 160-2, residual data 170-2, etc. Reconstruction data 150-1 can include metadata 160-1, residual data 170-1, etc. (paragraph incorporated from U.S. Pat. No. 8,531,321).

Entropy encoder 140 analyzes metadata 160-1 to produce probability distribution information 390-1, which indicates a distribution of symbols in the metadata 160-1. Entropy encoder 140 further analyzes residual data 170-1 to produce probability distribution information 391-1, which indicates a distribution of symbols in the residual data 170-1. (paragraph incorporated from U.S. Pat. No. 8,531,321).

Entropy encoder 140 analyzes metadata 160-2 to produce probability distribution information 390-2, which indicates a distribution of symbols in the metadata 160-2. Entropy encoder 140 further analyzes residual data 170-2 to produce probability distribution information 391-2, which indicates a distribution of symbols in the residual data 170-2. (paragraph incorporated from U.S. Pat. No. 8,531,321).

Entropy encoder 140 analyzes metadata 160-3 to produce probability distribution information 390-3, which indicates a distribution of symbols in the metadata 160-3. Entropy encoder 140 further analyzes residual data 170-3 to produce probability distribution information 391-3, which indicates a distribution of symbols in the residual data 170-3; and so on. (paragraph incorporated from U.S. Pat. No. 8,531,321).

At times, entropy encoder 140 may decide not to produce probability distribution information **39\*–\***, in which cases for the corresponding set of reconstruction data the probability distribution information used to encode the corresponding range value will be automatically inherited from lower levels of quality and/or from a known reference signal. (paragraph incorporated from U.S. Pat. No. 8,531,321).

Via some suitable method of entropy encoding (e.g., range encoding, Huffman encoding, table-based VLC/Variable Length Coding, run-length encoding or other similar techniques), the entropy encoder 140 produces range value information 380-1 for metadata 160-1, range value information 381-1 for residual data 170-1, range value information 380-2 for metadata 160-2, range value information 381-2 for residual data 170-2, range value information 380-3 for metadata 160-3, range value information 381-3 for residual data 170-3, and so on. (paragraph incorporated from U.S. Pat. No. 8,531,321).

Entropy decoder 440 utilizes probability distribution information 390-1 to decode range value information 380-1 into metadata 160-1; entropy decoder 440 utilizes probability distribution information 391-1 to decode range value information 381-1 into residual data 170-1. (paragraph incorporated from U.S. Pat. No. 8,531,321).

Entropy decoder 440 further utilizes probability distribution information 390-2 to decode range value information 380-2 into metadata 160-2; entropy decoder 440 utilizes probability distribution information 391-2 to decode range value information 381-2 into residual data 170-2. (paragraph incorporated from U.S. Pat. No. 8,531,321).

Entropy decoder 440 further utilizes probability distribution information 390-3 to decode range value information 380-3 into metadata 160-3; entropy decoder 440 utilizes probability distribution information 391-3 to decode range value information 381-3 into residual data 170-3; and so on. (paragraph incorporated from U.S. Pat. No. 8,531,321).

At times, entropy decoder 440 may not receive probability distribution information **39\*–\***, in which cases the probability distribution information needed to decode the corresponding range value will be automatically inherited from lower levels of quality and/or from a known reference signal. (paragraph incorporated from U.S. Pat. No. 8,531,321).

Figure 58:
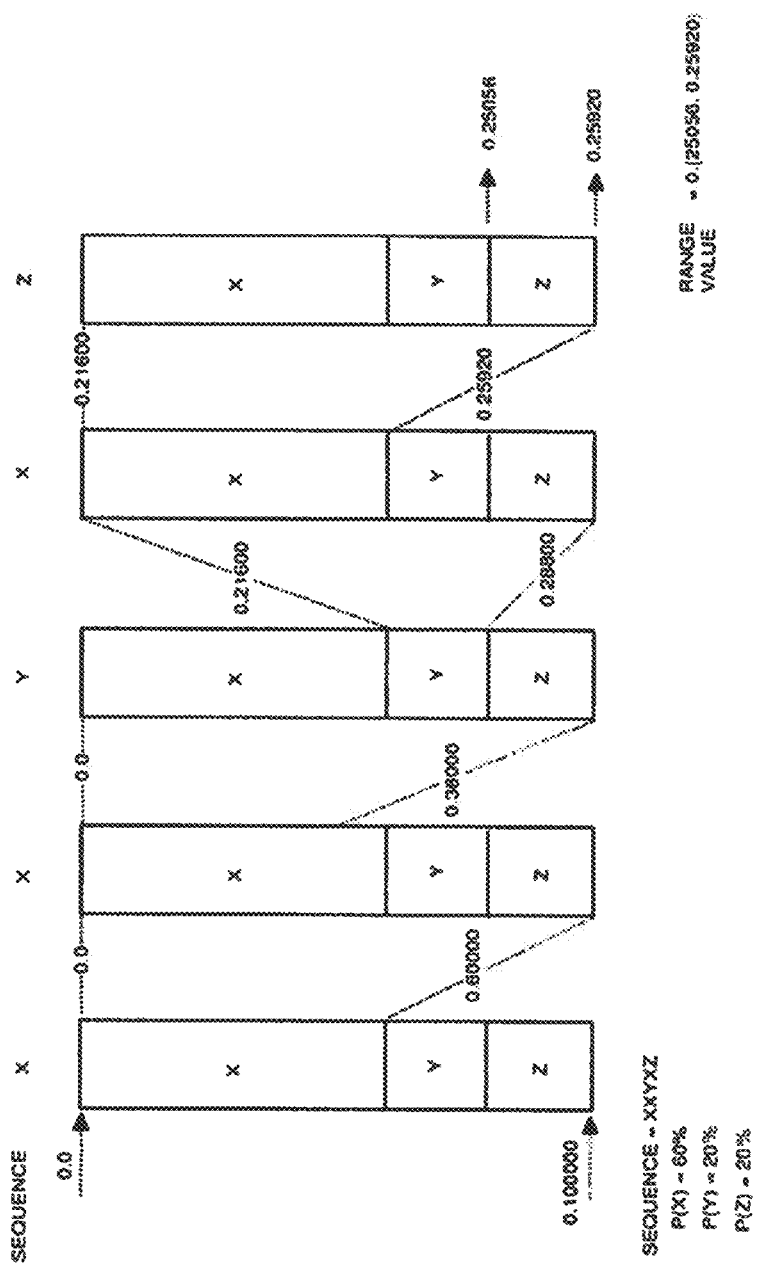
FIG. 58 is an example diagram illustrating an example standard entropy encoding method to encode reconstruction data (incorporated by reference from U.S. Pat. No. 8,531,321).

FIG. 58 is an example diagram illustrating an example entropy encoding method to encode reconstruction data, i.e. the industry standard method known as range encoding. (paragraph incorporated from U.S. Pat. No. 8,531,321).

As shown, initially, the entropy encoder 140 selects a range such as 0 to 1 to subdivide according to the symbol probabilities. For a given sequence (e.g., XXYXZ) of symbols of reconstruction data with known length and known alphabet of symbols X, Y, and Z, the entropy encoder 140 produces probability distribution information. In this instance, the probability distribution information indicates that the probability of symbol X in the sequence is 60%, the probability of symbol Y in the sequence is 20%, and the probability of symbol Z is 20%. Based on the probability distribution information and the sequence of symbols, the entropy encoder 140 produces as range value any number included in the range (0.25056, 0.25920). In particular, the encoder will likely choose one of the numbers in the range that require the least amount of bits (e.g., 0.2578125 which can be exactly represented in binary as 0.0100001, with 7 bits after the radix point). (paragraph incorporated from U.S. Pat. No. 8,531,321).

Using the probability distribution information for the sequence, the decoder is able to decode the range value (e.g., binary value 0.0100001, or bit string "0100001") back into the sequence XXYXZ. (paragraph incorporated from U.S. Pat. No. 8,531,321).

This type of range encoding can be used to encode each set of reconstruction data into a respective range value. However, note that the use of 5 symbols is shown by way of non-limiting example only and that each set of reconstruction data may of course include much more than a sequence of 5 symbols (e.g., sequences of tens of thousands of symbols taken from alphabets of hundreds of symbols, or even much more). (paragraph incorporated from U.S. Pat. No. 8,531,321).

FIG. 1 is an example diagram illustrating use of encoded information at multiple levels of quality in a hierarchy according to embodiments herein. (paragraph incorporated from U.S. Pat. No. 8,531,321).

In this example, the signal processor 100-1 utilizes entropy encoder 140 to encode the reconstruction data into range value information and probability distribution information. (paragraph incorporated from U.S. Pat. No. 8,531,321).

For example, the entropy encoder 140 analyzes the reconstruction data 150-1 (e.g., any of the one or more different types of reconstruction data as discussed herein) for level of quality #1 to produce probability distribution information 490-1. The probability distribution information 490-1 indicates a probability distribution of one or more symbols in the reconstruction data 150-1. Based on the probability distribution information 490-1 and the sequence of symbols in the reconstruction data 150-1, the entropy encoder produces range value information 480-1 in a manner as discussed herein. (paragraph incorporated from U.S. Pat. No. 8,531,321).

Entropy decoder 440 uses probability distribution information 490-1 as a basis to convert the range value information 480-1 into reconstruction data 150-1. (paragraph incorporated from U.S. Pat. No. 8,531,321).

At a next level of quality, the entropy encoder 140 analyzes the reconstruction data 150-2 for level of quality #2 to produce a set of probability distribution information. In this example, based on the analysis, the entropy encoder 140 recognizes that the probability distribution information for reconstruction data 150-2 is substantially similar or equal to the probability distribution information for reconstruction data 150-1. In such an instance, the probability distribution information 490-1 can be reused ("inherited") at level of quality #2, without requiring to store and/or transmit the information that would be needed to specify a new probability distribution. (paragraph incorporated from U.S. Pat. No. 8,531,321).

Reusing the probability distribution information 490-1 at previous level of quality #1 for elements at a higher level of quality (e.g., from rendition of signal 115-1 into rendition of signal 115-2), the entropy encoder 140 generates range value information 480-2. The entropy encoder 140 stores and transmits the range value information 480-2 for level of quality #2 without a corresponding probability distribution information. In other words, the entropy encoder 140 does not send a set of probability distribution information to decoder 440 for the range value information 480-2. (paragraph incorporated from U.S. Pat. No. 8,531,321).

In such an embodiment, the entropy decoder 440 is configured to receive the range value information 480-2. In response to detecting that the entropy encoder 140 did not generate and send a probability distribution information for range value information 480-2, the entropy decoder 440 utilizes the probability distribution information 490-1 (e.g., indicating a probability distribution of one or more symbols in reconstruction data 150-1) to decode the range value information 480-2 into the reconstruction data 150-2. This technique reduces an amount of data that needs to be transmitted to the entropy decoder 440 to reconstruct the signal 115. A single set of probability distribution information for a given level of quality can be reused at multiple higher levels of quality. The encoder can also specify that a given set of probability distribution information will be inherited with no need of further specifications (i.e., there will not be any overrides) from the current level of quality all the way up to the topmost (highest) level of quality. This supports yet further reduction in data that needs to be encoded, stored or transmitted. (paragraph incorporated from U.S. Pat. No. 8,531,321).

Accordingly, embodiments herein can include receiving a range value for given reconstruction data; identifying a probability distribution for symbols in reconstruction data at a previous (e.g., lower) level of quality; and utilizing the identified probability distribution for the lower level of quality to decode the range value information into the given reconstruction data. As mentioned, reuse ("inheritance") of the probability distribution information at one or more different higher levels in the hierarchy reduces an amount of encoded data that needs to be sent to the entropy decoder to reconstruct a signal. (paragraph incorporated from U.S. Pat. No. 8,531,321).

The entropy encoder 140 may analyze the reconstruction data 150-3 and learn that the probability distribution information for symbols in the reconstruction data 150-3 is substantially different (e.g., above a threshold value) from the distribution of symbols in reconstruction data 150-1 and/or reconstruction data 150-2. In such an instance, the entropy encoder 140 produces probability distribution information 490-3. Based on probability distribution information 490-3 and the sequence of symbols in reconstruction data 150-3, the entropy encoder 140 produces range value information 480-3. (paragraph incorporated from U.S. Pat. No. 8,531,321).

The entropy decoder 440 is configured to receive the range value information 480-3 and probability distribution information 490-3. Entropy decoder 440 uses probability distribution information 490-3 as a basis to convert the range value information 480-3 into reconstruction data 150-3. (paragraph incorporated from U.S. Pat. No. 8,531,321).

In accordance with an alternative embodiment, note that the entropy decoder 440 can be configured to receive the range value information for a given level of quality. In response to detecting that the entropy encoder 140 did not specify a probability distribution value for given reconstruction data, instead of using the inherited probability distribution (e.g., by way of non-limiting example, the same probability distribution information of a previous lower level of quality), the entropy decoder utilizes a default probability distribution value for one or more symbols in order to decode the range value into respective reconstruction data. (paragraph incorporated from U.S. Pat. No. 8,531, 321).

Once again, note that the choice of range encoding as an entropy encoding method is shown herein only by way of a non-limiting example, as a particular embodiment and to make the description clearer: any suitable method of entropy encoding or data compression, like the ones already cited herein or others that might be discovered or developed in the future and that make use directly or indirectly of the symbol probabilities, can be used with the same approach. (paragraph incorporated from U.S. Pat. No. 8,531,321).

Precise Indication of Residual Distribution for Each Tile of Each Frame/LoQ (caption incorporated from U.S. Pat. No. 8,531,321).

Suppose it is necessary to encode residual data for level of quality N. Assume that the decoder already has information about a previous level N−1 and has attempted to reconstruct a rendition of the signal at level N by leveraging a set of upscaling operations/filters. In order to fully reconstruct level N, the decoder now needs to receive the residual data for level N. (paragraph incorporated from U.S. Pat. No. 8,531,321).

The encoder may have knowledge about the original level N and about the internal workings of the decoder (i.e., it can predict the "first draft" of level N that the decoder will compute), so the encoder 140 can calculate the distribution of residuals that are needed to reconstruct the whole image (e.g., all elements at the level of quality N) with a desired proximity/similarity with respect to the original image. (paragraph incorporated from U.S. Pat. No. 8,531,321).

To increase efficiency, one embodiment herein includes just sending to the decoder the probability of the zero symbol, i.e., the symbol that occurs most often in the residual data (e.g., when the adjustment value required for an element is zero or near zero, up to a suitable threshold). This may be the most useful parameter to discriminate amongst the different possible distribution for the symbol alphabet. Accordingly, for each tile (as discussed further below) of each level of quality of each frame, the decoder 440 can be configured to have a suitable probability distribution of residuals, allowing the entropy encoding implemented by encoder 140 to compress the reconstruction data with remarkable effectiveness. (paragraph incorporated from U.S. Pat. No. 8,531,321).

In accordance with one embodiment, as mentioned above, the specific distribution for different symbols in residual data may be sent only when it is needed at a given level of quality. For subsequent levels of quality, and possibly subsequent frames, the decoder uses by default the probability distribution information that was used for the previous level of quality, unless the encoder 140 overrides a last value by sending a new one. (paragraph incorporated from U.S. Pat. No. 8,531,321).

Figure 59:
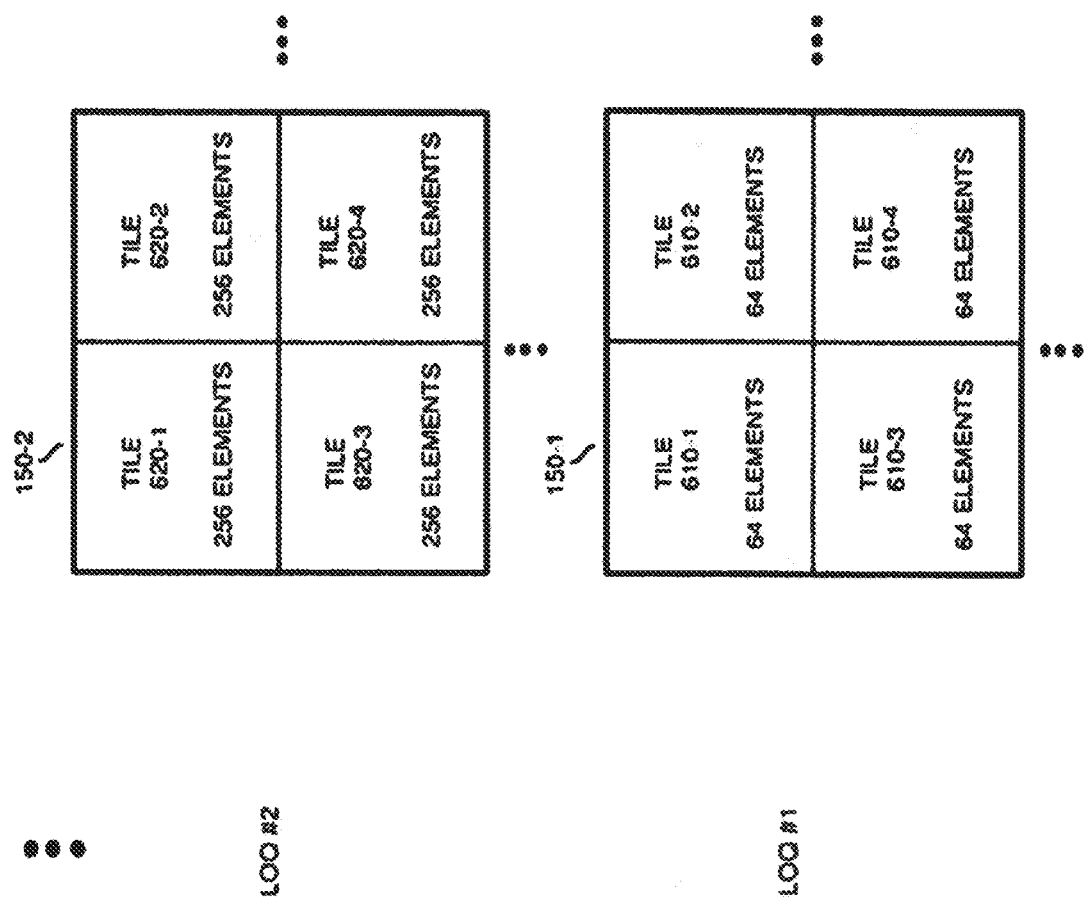
FIG. 59 is an example diagram illustrating processing of tiles of reconstruction data using one or more parallel processors according to embodiments herein (incorporated by reference from U.S. Pat. No. 8,531,321).

FIG. 59 is an example diagram illustrating processing of tiles of reconstruction data using one or more parallel processors according to embodiments herein. (paragraph incorporated from U.S. Pat. No. 8,531,321).

As shown, the entropy encoder 140 can be configured to parse each set of reconstruction data into multiple groupings of reconstruction data. For example, the entropy encoder 140 can be configured to parse reconstruction data 150-1 into tile 610-1, tile 610-2, tile 610-3, tile 610-4, and so on. Each of tiles 610 at level of quality #1 can include reconstruction data relative to a predetermined number (e.g., 64) of contiguous elements in the signal. (paragraph incorporated from U.S. Pat. No. 8,531,321).

The entropy encoder 140 can be configured to parse reconstruction data 150-2 into tile 620-1, tile 620-2, tile 620-3, tile 620-4, and so on. Each of tiles 620 can include reconstruction data relative to a predetermined number (e.g., 256) of contiguous elements in the signal. (paragraph incorporated from U.S. Pat. No. 8,531,321).

Note that reconstruction data is not block-based, or tile-based, in that it may be obtained by processing the whole signal, and only after being produced it is sliced into separate tiles, in order to allow for parallel entropy encoding/decoding. (paragraph incorporated from U.S. Pat. No. 8,531,321).

Figure 60:
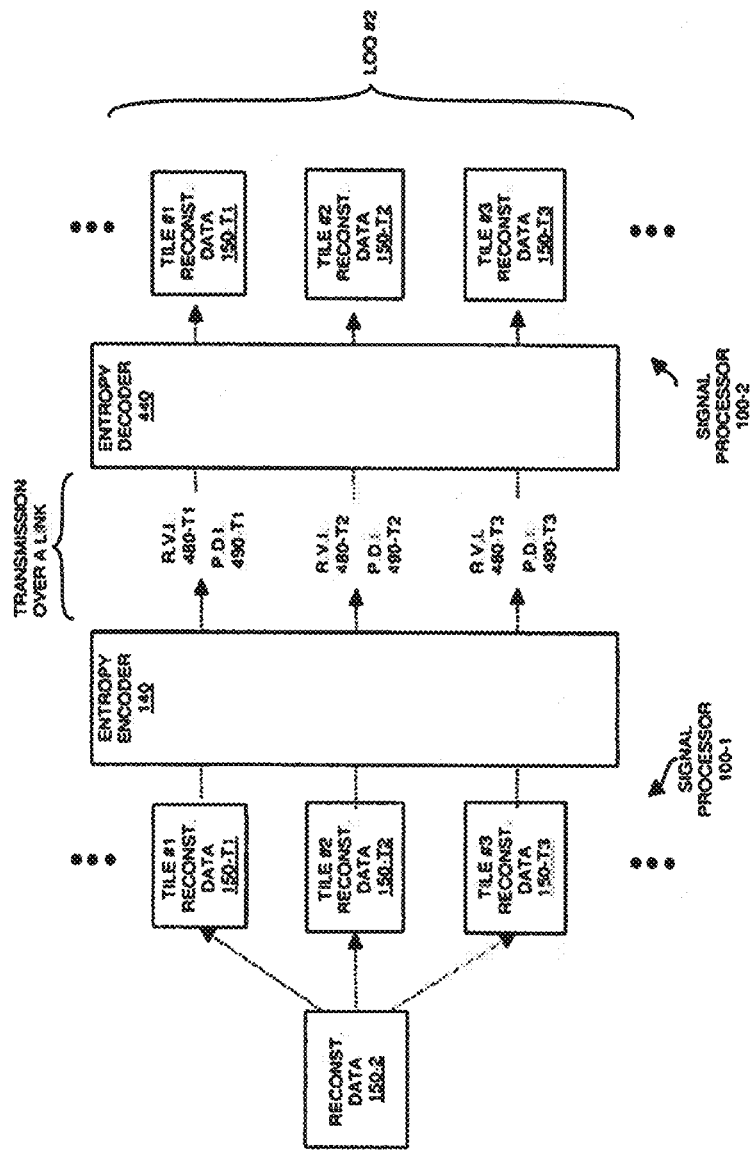
FIG. 60 is an example diagram illustrating processing of multiple tiles at a given level of quality according to embodiments herein (incorporated by reference from U.S. Pat. No. 8,531,321).

FIG. 60 is an example diagram illustrating encoding of multiple tiles of a given set of reconstruction data (e.g., residual data, or adjustments to the motion map for motion compensation, etc.) at a given level of quality according to embodiments herein. (paragraph incorporated from U.S. Pat. No. 8,531,321).

As previously discussed, the entropy encoder 140 can be configured to parse the reconstruction data for a given level of quality into multiple tiles. In this example, the reconstruction data 150-2 is parsed into tile reconstruction data 150-T1, tile reconstruction data 150-T2, tile reconstruction data 150-T3, and so on. (paragraph incorporated from U.S. Pat. No. 8,531,321).

In accordance with such an embodiment, the entropy encoder 140 produces probability distribution information (e.g., a respective probability distribution value) for one or more symbols in each of the multiple groupings. For example, the entropy encoder 140 encodes each of the multiple groupings of tiled reconstruction data into range values based on the respective probability distribution values for the tile groupings. (paragraph incorporated from U.S. Pat. No. 8,531,321).

More specifically, entropy encoder 140 produces probability distribution information 490-T1 indicating a distribution of one or more symbols in tile reconstruction data 150-T1, entropy encoder 140 produces probability distribution information 490-T2 indicating a distribution of one or more symbols in tile reconstruction data 150-T2, entropy encoder 140 produces probability distribution information 490-T3 indicating a distribution of one or more symbols in tile reconstruction data 150-T3, and so on. (paragraph incorporated from U.S. Pat. No. 8,531,321).

Based on the probability distribution information 490-T1 and a sequence of symbols in reconstruction data 150-T1, the entropy encoder 140 produces range value information 480-T1, based on the probability distribution information 490-T2 and a sequence of symbols in reconstruction data 150-T2, the entropy encoder 140 produces range value information 480-T2; based on the probability distribution information 490-T3 and a sequence of symbols in reconstruction data 150-T3, the entropy encoder 140 produces range value information 480-T3; and so on. (paragraph incorporated from U.S. Pat. No. 8,531,321).

In one example embodiment, each of the multiple groupings of reconstruction data contains residual data relative to signal elements included in a tile. Each of the residual data elements indicates an adjustment to be made to a corresponding portion of the signal during conversion of the signal from the first level of quality to the second level of quality. (paragraph incorporated from U.S. Pat. No. 8,531,321).

Reducing the reconstruction data into different sets of tiles as discussed herein enables the signal processor 100-2 to initiate parallel execution of multiple entropy decoders to reproduce the multiple groupings of reconstruction data (e.g., tile reconstruction data 150-T1, tile reconstruction data 150-T2, tile reconstruction data 150-T3, . . . ) using the range values 480-T and the probability distribution values 490-T. (paragraph incorporated from U.S. Pat. No. 8,531,321).

Calculating the distribution/histogram of residuals for the global signal/image can also be done via a parallel algorithm, by simply merging the distributions/histograms calculated on tiles. (paragraph incorporated from U.S. Pat. No. 8,531,321).

Figure 61:
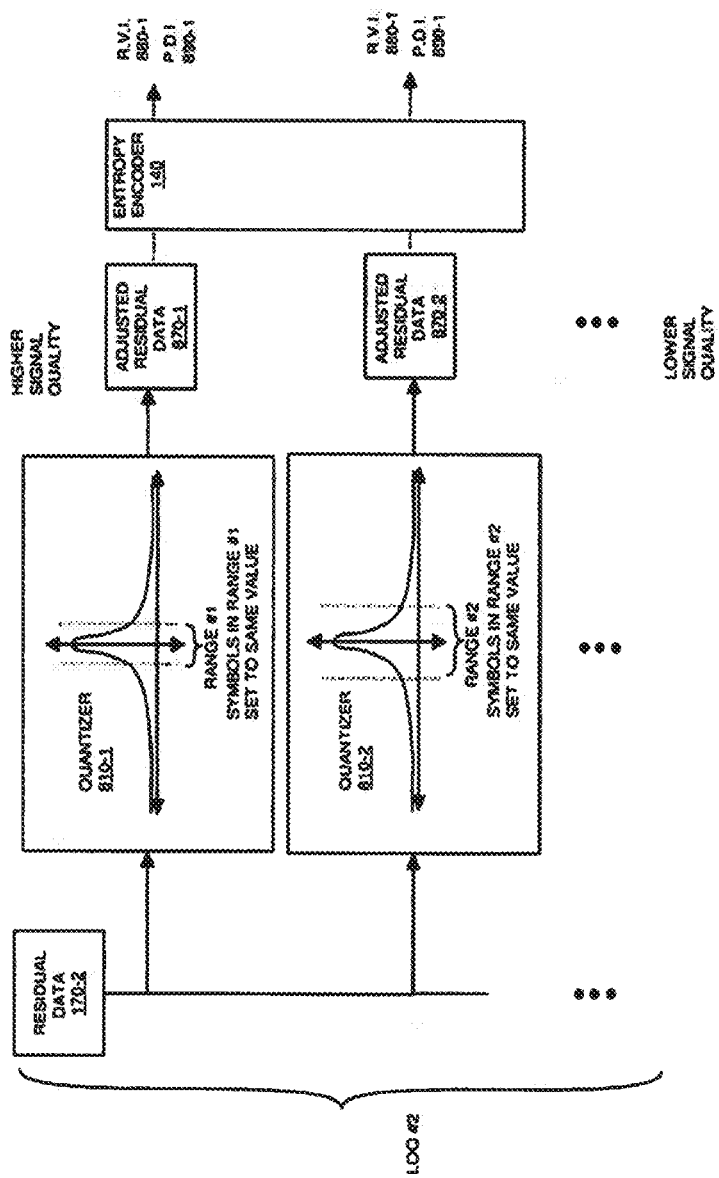
FIG. 61 is an example diagram illustrating quantizing of reconstruction data at a given level of quality using multiple quantizers according to embodiments herein (incorporated by reference from U.S. Pat. No. 8,531,321).

FIG. 61 is an example diagram illustrating quantization of reconstruction data at a given level of quality using one or more dead-zone quantizers according to embodiments herein. Adjusting and applying different dead zones to the reconstruction data (e.g., residual data) enables each of multiple levels of quality of reconstruction data to be further encoded according to multiple different sub-levels of quality. (paragraph incorporated from U.S. Pat. No. 8,531,321).

For example, the encoder generates reconstruction data such as residual data 170-2. Note that any type of reconstruction data at any level of quality in the hierarchy can be encoded into different sub-levels of quality using dead-zone quantizing as described herein. (paragraph incorporated from U.S. Pat. No. 8,531,321).

Via application of the different dead zone settings (e.g., with quantizer 810-1, quantizer 810-2, . . . ), the encoder parses the residual data 170-2 (i.e., reconstruction data) into multiple groupings including adjusted residual data 870-1, adjusted residual data 870-2, and so on. For example, in one embodiment, the encoder applies quantizer 810-1 to the residual data 170-2 to produce adjusted residual data 870-1; the encoder applies quantizer 810-2 to the residual data 170-2 to produce adjusted residual data 870-2; and so on. Quantizer 810-1 has the effect of setting any symbols in range #1 to a common symbol such as zero (thus the common name "dead zone" for the range); quantizer 810-2 has the effect of setting any symbols in range #2 to a common symbol such as zero; and so on. Each quantizer provides a different level of dead-zoning (and potentially even different quantization steps), resulting in different sub-levels of quality. (paragraph incorporated from U.S. Pat. No. 8,531,321).

The entropy encoder 140 individually encodes each of the different groupings of reconstruction data at the different sub-levels of quality. (paragraph incorporated from U.S. Pat. No. 8,531,321).

For example, for the first grouping of adjusted residual data 870-1, the entropy encoder 140 analyzes the adjusted residual data 870-1 to produce a first probability distribution value (e.g., probability distribution information 890-1) for one or more symbols in the adjusted residual data 870-1. The entropy encoder 140 produces range value information 880-1 based on the probability distribution information 890-1 and the element settings of adjusted residual data 870-1 in a manner as previously discussed for other reconstruction data. (paragraph incorporated from U.S. Pat. No. 8,531,321).

For the second grouping of adjusted residual data 870-2, the entropy encoder 140 analyzes the adjusted residual data 870-2 to produce a probability distribution value (e.g., probability distribution information 890-2) for one or more symbols in the adjusted residual data 870-2. The entropy encoder 140 produces range value information 880-2 based on the probability distribution information 890-2 and the element settings of adjusted residual data 870-2. (paragraph incorporated from U.S. Pat. No. 8,531,321).

Encoding of each of one or more levels of quality in the hierarchy using different quantizers as discussed above is useful during network congestion such as conditions preventing transmission of reconstruction data to a decoder. For example, in response to detection and/or occurrence of an impediment preventing timely transmission or decoding of the range value information 880-1 and the probability distribution information 890-1 (e.g., the range value information 880-1 and the probability distribution information 890-1 include a larger amount of data compared to range value information 880-2 and probability distribution information 890-2), embodiments herein include transmitting range value information 880-2 and probability distribution information 890-2 to the decoder. The decoder 440 decodes the range value information 880-2 and probability distribution information 890-2 to produce the adjusted residual data 870-2. (paragraph incorporated from U.S. Pat. No. 8,531,321).

In accordance with further embodiments, quantization at each of one or more levels of quality can be adjusted depending on a parameter such as an available bandwidth to transmit the range value information and probability distribution information. That is, the larger amounts of data (e.g., a higher sub-level of quality of reconstruction data) can be transmitted during times when higher bandwidth is available; the smaller amounts of data (e.g., a lower sub-level of quality of reconstruction data) can be transmitted during times when bandwidth is limited. (paragraph incorporated from U.S. Pat. No. 8,531,321).

Thus, one embodiment herein includes generating adjusted residual data to reconstruct the signal at a given level of quality in the hierarchy. The entropy encoder 140 applies different quantization to the residual data 170-2 to reduce an entropy of the adjusted residual data at the given level of quality prior to the entropy encoding. Application of the quantizer or quantizers to the residual data 170-1 facilitates transmission of the encoded residual data in accordance with a desired bit rate (e.g., Constant Bit Rate, CBR) because enlarging the dead zone (e.g., from range #1 to range #2) for a given alphabet of symbols reduces an entropy of the adjusted residual data. That is, the lower sub-level of quality range value information 880-2 and probability distribution information 890-2 require fewer bits and require less time to transmit than range value information 880-1 and probability distribution information 890-1. (paragraph incorporated from U.S. Pat. No. 8,531,321).

In accordance with yet further embodiments, the signal processor 100-1 and/or entropy encoder 140 can be configured to calculate a probability distribution of symbols in residual data used to make adjustments to the signal at multiple levels of quality in the hierarchy. For example, in one embodiment, the signal processor 100-1 utilizes the calculated probability distribution for reconstruction data to estimate a bit rate of entropy encoding the residual data at one or more levels of quality based on a first quantization setting. In response to detecting that the estimated bit rate for transmitting reconstruction data such as residual data is above a desired threshold value, the signal processor 100-1 can apply additional/different quantization to the residual data (e.g., by enlarging the dead zone that gets quantized into the most probable symbol) to reduce an entropy associated with the residual data and to reduce an amount of data (e.g., range value information and probability distribution information at each level of quality) that must be transmitted to the decoder to reconstruct the signal 115. Accordingly, the signal processor 100-1 can adjust an entropy of the residual data at each of multiple levels of quality to ensure that the encoded data can be transmitted to a destination within the limits imposed by a desired bit rate. (paragraph incorporated from U.S. Pat. No. 8,531,321).

Figure 62:
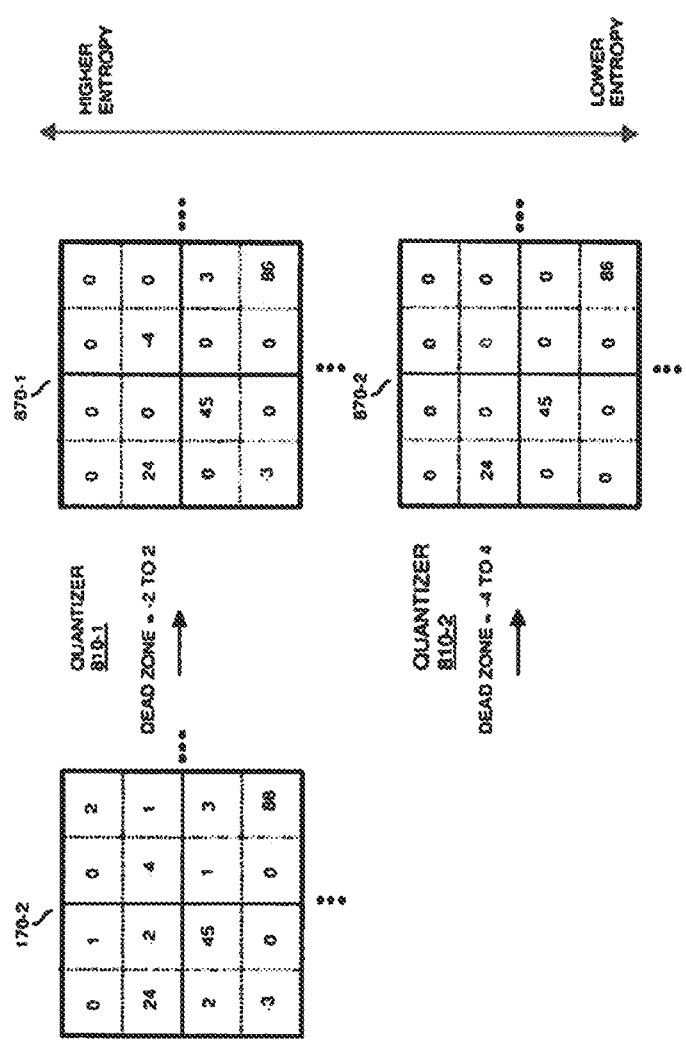
FIG. 62 is an example diagram illustrating quantizing of reconstruction data using different quantizer settings according to embodiments herein (incorporated by reference from U.S. Pat. No. 8,531,321).

FIG. 62 is an example diagram illustrating quantization of reconstruction data using different dead zone settings according to embodiments herein. (paragraph incorporated from U.S. Pat. No. 8,531,321).

As shown, application of the quantizer 810-1 converts any symbols in residual data 170-2 falling in range #1 between −2 and 2 into a symbol value of zero when producing adjusted residual data 870-1. In other words, the quantizer 810-1 sets the elements in residual data 170-2 having values 1, 2, −2, 1, 2, and 1 to a common symbol value of 0 to produce adjusted residual data 870-1. In this particular example, other values in reconstruction data 170-2 carry over from the residual data 170-2 to the adjusted residual data 870-1; this is just intended to make the example easier to follow, and it should be understood that in practical embodiments of the invention the other values might be quantized as well, with a quantization step equal to or different from the width of the dead zone #1. (paragraph incorporated from U.S. Pat. No. 8,531,321).

As shown, application of the quantizer 810-2 converts any symbols in residual data 170-2 falling in range #2 between −4 and 4 into a symbol value of zero when producing adjusted residual data 870-2. In other words, the quantizer 810-2 sets the elements in residual data 170-2 having values 1, 2, −2, −4, 1, 2, 1, 3, and −3 to a common symbol value of 0 to produce adjusted residual data 870-2. In this particular example, other values in reconstruction data 170-2 carry over from the residual data 170-2 to the adjusted residual data 870-2; again, this is just intended to make the example easier to follow, and it should be understood that in practical embodiments of the invention the other values might be quantized as well, with a quantization step equal to or different than the width of the dead zone #2. (paragraph incorporated from U.S. Pat. No. 8,531,321).

The encoder can be configured to repeat this process for each of multiple sub-levels of quality. (paragraph incorporated from U.S. Pat. No. 8,531,321).

As a result of applying different dead-zone quantizers, the adjusted residual data 870-1 has a higher entropy than adjusted residual data 870-2. Accordingly, the encoded set of data for the adjusted residual data 870-2 is smaller than the encoded set of data for adjusted residual data 870-1. As mentioned above, during network congestion, it may be advantageous to transmit and decode adjusted residual data 870-2 in lieu of transmitting and decoding adjusted residual data 870-1. (paragraph incorporated from U.S. Pat. No. 8,531,321).

Figure 63:
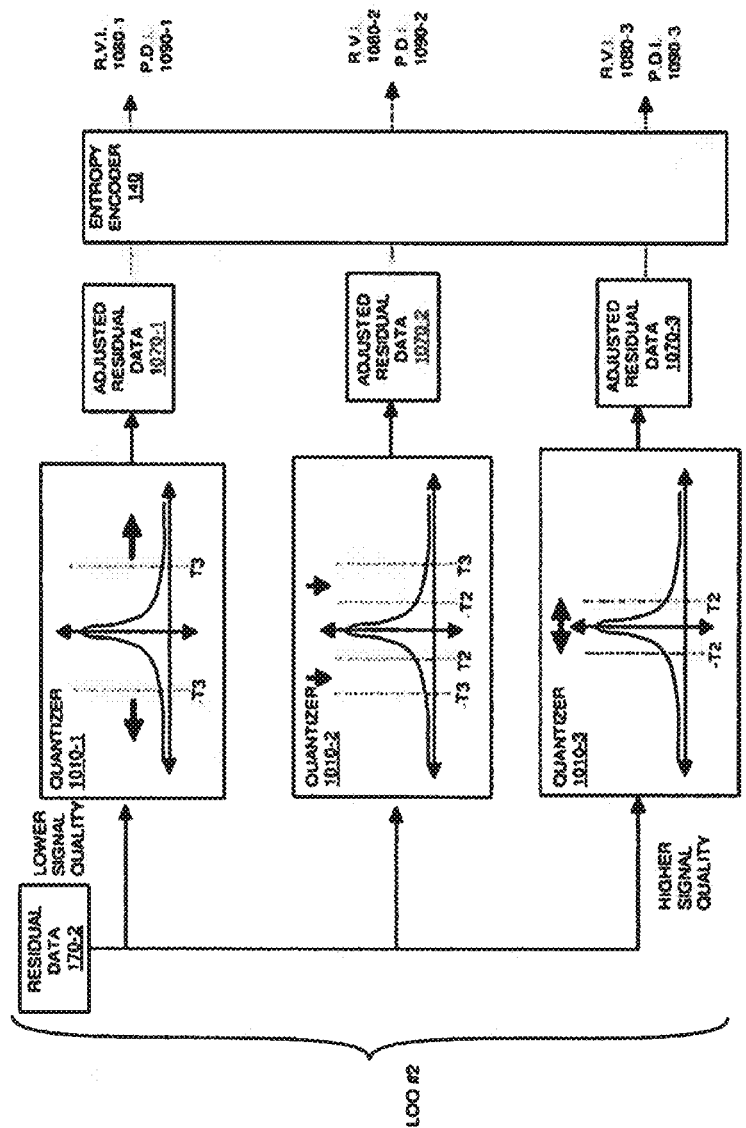
FIG. 63 is an example diagram illustrating parsing a set of reconstruction data representing residual data into different groupings of residual data according to embodiments herein (incorporated by reference from U.S. Pat. No. 8,531,321).

FIG. 63 is an example diagram illustrating parsing the reconstruction data into different groupings of residual data according to magnitude according to embodiments herein. (paragraph incorporated from U.S. Pat. No. 8,531,321).

In this example embodiment, the encoder parses the reconstruction data such as residual data 170-2 into multiple groupings (e.g., adjusted residual data 1070-1, adjusted residual data 1070-2, adjusted residual data 1070-3, etc.). Via quantizer 1010-1, the signal processor 100-1 produces adjusted residual data 1070-1. In one embodiment, the signal processor 100-1 populates the adjusted residual data 1070-1 (e.g., first group of reconstruction data) to include elements of the residual data 170-2 having a value that falls outside of a first range, such as values less than −T3 and values greater than +T3. Other values (i.e., in the "dead zone" between −T3 and +T3) are set to a common symbol such as zero, which will become increasingly probable and as such will require fewer bits to be represented with entropy encoding. (paragraph incorporated from U.S. Pat. No. 8,531,321).

Via quantizer 1010-2, the signal processor 100-1 produces adjusted residual data 1070-2. In one embodiment, the signal processor 100-1 populates the adjusted residual data 1070-2 (e.g., a second group of reconstruction data) to include elements of the residual data 170-2 having a value that falls outside of the first range and within a second range (e.g., values falling between −T3 and +T2, and between +T2 and +T3). Value falling in the dead zone between −T2 and +T2 are set to a common symbol such as zero; other values (i.e., less than −T3 and greater than +T3) are not encoded. (paragraph incorporated from U.S. Pat. No. 8,531,321).

Via quantizer 1010-3, the signal processor 100-1 further produces adjusted residual data 1070-3. In one embodiment, the signal processor 100-1 populates the adjusted residual data 1070-3 (e.g., a third group of reconstruction data) to include elements of the residual data 170-2 having a value that falls within a third range (e.g., values falling between −T2 and T2). Other values are not encoded. (paragraph incorporated from U.S. Pat. No. 8,531,321).

The entropy encoder 140 individually encodes the adjusted residual data 1070. (paragraph incorporated from U.S. Pat. No. 8,531,321).

For example, the entropy encoder 140 analyzes adjusted residual data 1070-1 to produce probability distribution information 1090-1. Based on probability distribution information 1090-1 and the sequence of elements in adjusted residual data 1070-1, the entropy encoder 140 produces range value information 1080-1. (paragraph incorporated from U.S. Pat. No. 8,531,321).

Thus, the entropy encoder 140 can be configured to individually encode the different groupings of adjusted residual data 1070 into corresponding range value information and probability distribution information. For example, the entropy encoder 140 encodes the adjusted residual data 1070-1 into probability distribution information 1090-1 and range value information 1080-1; the entropy encoder 140 encodes the adjusted residual data 1070-2 into probability distribution information 1090-2 and range value information 1080-2; the entropy encoder 140 encodes the adjusted residual data 1070-3 into probability distribution information 1090-3 and range value information 1080-3; and so on. (paragraph incorporated from U.S. Pat. No. 8,531,321).

Parsing and encoding the reconstruction data in complementary groupings as discussed above can be useful in cases such as variable/non-predictable computing power of decoders or provision of different quality to different decoders (e.g., pay-per-view services), or during congestion of the transmission channel between encoder and decoder. For example, in one embodiment, in response to occurrence of an impediment preventing timely decoding of all groupings of reconstruction data (e.g., adjusted residual data 1070-1, adjusted residual data 1070-2, adjusted residual data 1070-3, and so on) to produce a higher accuracy replica of an original signal, the signal processor 100-2 can initiate decoding of a subset of the encoded residual data such as only range value information 1080-1 into adjusted residual data 1070-1 based on probability distribution information 1090-1. In this instance, the signal processor 100-2 utilizes the decoded first grouping of reconstruction data to convert the rendition of the signal at the first level of quality to the second level of quality. (paragraph incorporated from U.S. Pat. No. 8,531,321).

Figure 64:
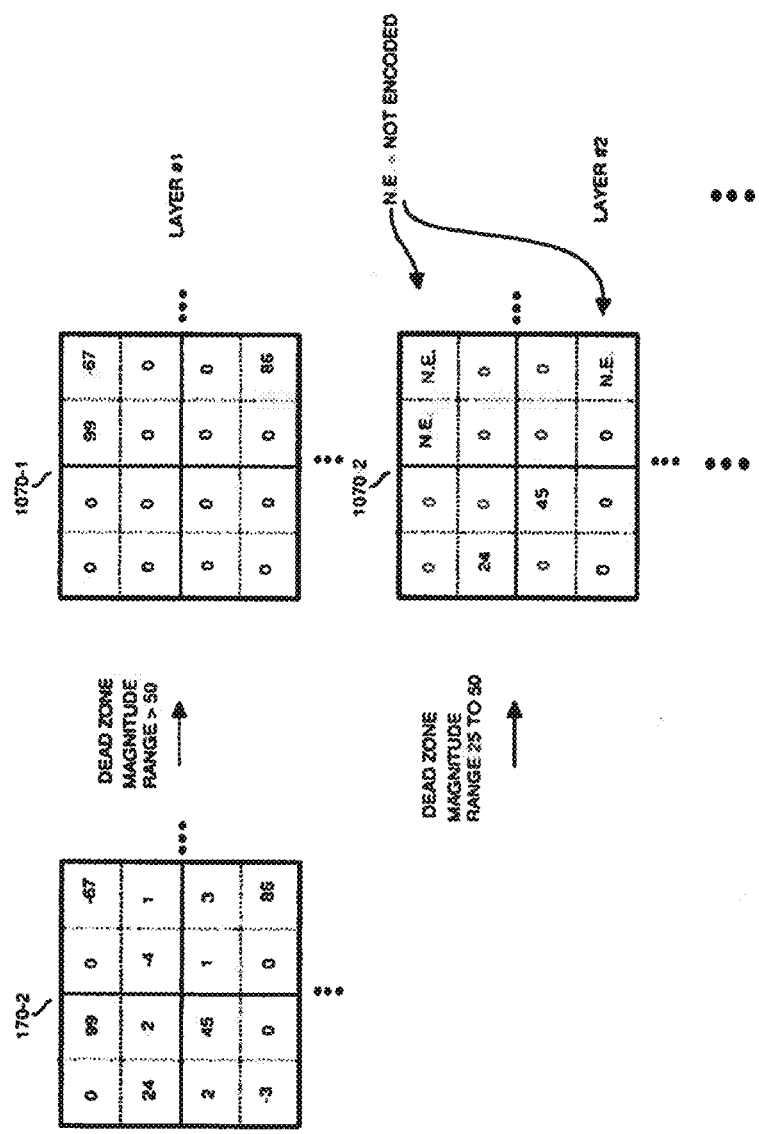
FIG. 64 is an example diagram illustrating creation of different reconstruction data groupings according to embodiments herein (incorporated by reference from U.S. Pat. No. 8,531,321).

FIG. 64 is an example diagram illustrating quantization of reconstruction data using different quantizer settings according to embodiments herein. As shown, the encoder 140 parses the adjusted residual data 170-2 into adjusted residual data 1070-1, adjusted residual data 1070-2, etc. (paragraph incorporated from U.S. Pat. No. 8,531,321).

The encoder 140 populates the adjusted residual data 1070-1 to include elements of the residual data 170-2 having values that fall outside of a first range, e.g., greater than 50 in magnitude. All other values are set to zero. (paragraph incorporated from U.S. Pat. No. 8,531,321).

The encoder 140 populates the adjusted residual data 1070-2 to include elements of the generated reconstruction data having values that fall within a magnitude range between 25 and 50. Values already encoded with a non-zero symbol in the adjusted residual data 1070-1 no longer need to be encoded in the adjusted residual data 1070-2. All other values are set to zero. (paragraph incorporated from U.S. Pat. No. 8,531,321).

The signal processor 100-1 repeats this process for each range. (paragraph incorporated from U.S. Pat. No. 8,531,321).

As discussed above, the entropy encoder 140 individually encodes the sets of adjusted residual data 1070. (paragraph incorporated from U.S. Pat. No. 8,531,321).

Example of Precise Control of Bit Rate or Constant Bit Rate Encoding (caption incorporated from U.S. Pat. No. 8,531,321).

MPEG-family codecs and other industry standard codecs cannot encode according to a constant bit rate in which an encoded bitstream stays within a predefined range of bits per second. This is largely due to the nature of the algorithms. That is, such codecs can determine the precise number of bits needed for encoding an image only after having completed the full encoding process. When the bit quota is not met, such encoders must re-encode the original signal multiple times with different parameters, until the generated size is within a desired threshold from the target. In general, in situations of constant bit rate, the encoder frequently starts encoding with high-compression parameters since the beginning (thus often achieving a lower quality than what would be theoretically possible with the available bit rate) in order to minimize the risk of having to re-encode the signal multiple times. (paragraph incorporated from U.S. Pat. No. 8,531,321).

In contrast to conventional codecs, and according to embodiments herein, it is possible to know in advance how many bits will be needed to encode reconstruction data because the number of bits only depends on the probability distribution of the reconstruction data, which can be calculated before starting the entropy encoding process. Suitable proxies of the probability distribution can also be used, such as the probability of the zero symbol in the residual data. (paragraph incorporated from U.S. Pat. No. 8,531,321).

Since embodiments herein operate on the whole signal (not on small blocks, e.g. 8×8 pixel blocks, as in MPEG-family codecs or other frequency-domain codecs), it is possible to easily calculate how many bits will be needed to encode respective different reconstruction data. If it is not possible to transmit or decode a higher resolution reconstruction data, the reconstruction data can be adaptively quantized as discussed herein to reduce the entropy of residuals (and thus the necessary bit rate). (paragraph incorporated from U.S. Pat. No. 8,531,321).

One embodiment herein includes setting values that fall within a range to around zero to increase a probability of the zero symbol, or increasing the quantization steps to reduce the alphabet of symbols. Reducing the entropy in these manners enables the encoded signal to be transmitted to the decoder in fewer bits. Integrity of the reconstructed signal may suffer somewhat due to the quantization of residual data (which is used to produce detailed aspects of the signal 115 on playback). However, there will be no pauses on playback caused by congestion. When more bandwidth is available, the higher quality reconstruction data can be transmitted to the decoder for reconstruction and playback of a signal. (paragraph incorporated from U.S. Pat. No. 8,531,321).

FIG. 14 is an example block diagram of a computer system 800 that provides computer processing according to embodiments herein. (paragraph incorporated from U.S. Pat. No. 8,531,321).

Computer system 800 can be or include a computerized device such as a personal computer, processing circuitry, television, playback device, encoding device, workstation, portable computing device, console, network terminal, processing device, network device, operating as a switch, router, server, client, etc. (paragraph incorporated from U.S. Pat. No. 8,531,321).

Note that the following discussion provides a basic embodiment indicating how to carry out functionality associated with signal processor 140 as previously discussed. However, it should be noted that the actual configuration for carrying out the operations as described herein can vary depending on a respective application. Other resources such as decoder 440 can be implemented via a respective computer system including one or more processors and storage hardware to carry out decoding as discussed herein. (paragraph incorporated from U.S. Pat. No. 8,531,321).

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include one or more processors 813, I/O interface 814, and a communications interface 817. (paragraph incorporated from U.S. Pat. No. 8,531,321).

I/O interface 814 provides connectivity to repository 180, and if present, display screen, peripheral devices 816 such as a keyboard, a computer mouse, etc. (paragraph incorporated from U.S. Pat. No. 8,531,321).

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with signal processor 140. The instructions are executed by a respective resource such as signal processor 140 to perform any of the operations as discussed herein. (paragraph incorporated from U.S. Pat. No. 8,531,321).

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180. (paragraph incorporated from U.S. Pat. No. 8,531,321).

As shown, computer readable storage media 812 can be encoded with signal processor application 140-1 executed by processor(s) 813 as signal processor process 140-2. (paragraph incorporated from U.S. Pat. No. 8,531,321).

Note that the computer system 800 or encoder 140 also can be embodied to include a computer readable storage medium 812 (e.g., a hardware storage media, non-transitory storage media, etc.) for storing data and/or logic instructions. (paragraph incorporated from U.S. Pat. No. 8,531,321).

Computer system 800 can include one or more processors 813 to execute such instructions and carry out operations as discussed herein. Accordingly, when executed, the code associated with signal processor application 140-1 can support processing functionality as discussed herein. As mentioned, signal processor 140 can be configured to support encoding and/or decoding. (paragraph incorporated from U.S. Pat. No. 8,531,321).

During operation of one embodiment, processor(s) 813 accesses computer readable storage media 812 via the use of interconnect 811 in order to launch, run, execute, interpret or otherwise perform the instructions of signal processor application 140-1 stored in computer readable storage medium 812. Execution of the signal processor application 140-1 produces processing functionality in processor(s) 813. In other words, the encoder process 140-2 associated with processor(s) 813 represents one or more aspects of executing signal processor application 140-1 within or upon the processor(s) 813 in the computer system 800. (paragraph incorporated from U.S. Pat. No. 8,531,321).

Those skilled in the art will understand that the computer system 800 can include other processes and/or software and hardware components, such as an operating system that controls allocation and use of hardware processing resources to execute signal processor application 140-1. (paragraph incorporated from U.S. Pat. No. 8,531,321).

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device. (paragraph incorporated from U.S. Pat. No. 8,531,321).

Figure 65:
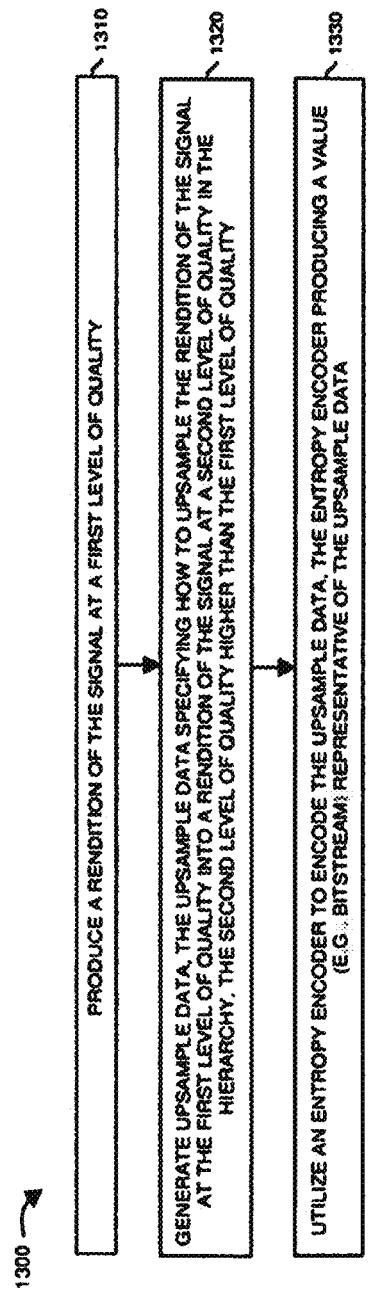
FIG. 65 is an example flowchart illustrating a method of processing reconstruction data according to embodiments herein (incorporated by reference from U.S. Pat. No. 8,531,321).

FIG. 65 is an example flowchart 1300 illustrating a method of generating and utilizing entropy encoding according to embodiments herein. (paragraph incorporated from U.S. Pat. No. 8,531,321).

In step 1310, the signal processor 100-1 produces a rendition of the signal at a first level of quality. (paragraph incorporated from U.S. Pat. No. 8,531,321).

In step 1320, the signal processor 100-1 generates reconstruction data, the reconstruction data specifies how to convert the rendition of the signal at the first level of quality into a rendition of the signal at a second level of quality in a hierarchy, the second level of quality being higher than the first level of quality. (paragraph incorporated from U.S. Pat. No. 8,531,321).

In step 1330, the signal processor 100-1 utilizes an entropy encoder to encode the reconstruction data. The entropy encoder 140 produces a bitstream (e.g., range value information) representative of the reconstruction data. (paragraph incorporated from U.S. Pat. No. 8,531,321).

Note again that techniques herein are well suited for use in processing and reconstructing signals. However, it should be noted that embodiments herein are not limited to use in such applications and that the techniques discussed herein are well suited for other applications as well. (paragraph incorporated from U.S. Pat. No. 8,531,321).

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform. (paragraph incorporated from U.S. Pat. No. 8,531,321).

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via computer processor hardware, performing operations of:
retrieving image reconstruction data and metadata from a repository, the retrieved image reconstruction data and metadata being a subset of available data selected from the repository for distribution to a decoder from a streaming server performing the distribution, the retrieved image reconstruction data encoded in accordance with a tiered hierarchy including multiple available levels of image signal quality in which portions of an image signal are encoded,
wherein the retrieved image reconstruction data comprises at least a first set of image reconstruction data and a second set of image reconstruction data associated with the image signal and further comprises a plurality of frames, including intra-frames and predicted-frames, and
wherein the metadata, which includes information provided to assist the streaming server in selecting which portions of the image reconstruction data are to be distributed to the decoder, includes distance information indicating a determined distance as between (i) at least one frame included among the plurality of frames, which are included in the image reconstruction data, and (ii) a next subsequent intra-frame included in the image reconstruction data, whereby the distance information is also provided to assist the streaming server in its selecting;
transmitting the retrieved image reconstruction data to the decoder, the decoder configured to reconstruct one or more renditions of the image signal based on the transmitted image reconstruction data; and
during the transmission, and responsive to a detected condition identified during the transmission, varying a level of quality of the image reconstruction data retrieved from the tiered hierarchy in the repository and transmitted to the decoder by transmitting the first set of image reconstruction data during a first portion of the transmission, the first set of image reconstruction data having a first level of quality configured to provide a first rendition of a first portion of the image signal at the first level of quality, and transmitting the second set of image reconstruction data during a second portion of the transmission, the second set of image reconstruction data having a second level of quality, that is a greater quality than the first level of quality, and that is configured to provide a second rendition of a second portion of the image signal at the second level of quality.

2. The method as in claim 1, wherein the second set of image reconstruction data is transmitted at the second level of quality instead of the first level of quality in response to detecting the condition of reduced bandwidth currently available in a transmission channel.

3. The method as in claim 1, wherein the second set of image reconstruction data is transmitted at the second level of quality in response to receiving a request to transmit the second set of image reconstruction data at the second level of quality instead of the first level of quality.

4. The method as in claim 1, wherein the second set of image reconstruction data is transmitted at the second level of quality in response to detecting the condition of a characteristic of the decoder.

5. The method as in claim 1, wherein each of multiple levels of quality of the image reconstruction data for an image frame of the image signal indicates how to reconstruct a rendition of the image signal in accordance with a different level of quality.

6. The method as in claim 1, wherein varying the level of quality includes:
for the first portion of the image signal, producing a first set of image reconstruction data to include a sequence of image reconstruction data from a lowest level of quality in the hierarchy up to the first level of quality;
transmitting the first set of image reconstruction data to the decoder for playback of the first portion of the image signal in accordance with the first level of quality;
for the second portion of the image signal, producing a second set of image reconstruction data to include a sequence of image reconstruction data from the lowest level of quality in the hierarchy up to the second level of quality, the second level of quality being different than the first level of quality; and transmitting the second set of image reconstruction data to the decoder for playback of the second portion of the image signal in accordance with the second level of quality.

7. The method as in claim 1, wherein varying the level of quality of the image reconstruction data transmitted to the decoder includes:

producing the first set of image reconstruction data to include image reconstruction data to reconstruct portions of the image signal in accordance with a first level of quality in the hierarchy;

transmitting the first set of image reconstruction data to the decoder to enable playback and navigation amongst the image signal in accordance with the first level of quality;

producing the second set of image reconstruction data to include image reconstruction data to reconstruct the image signal in accordance with a second level of quality in the hierarchy; and subsequent to transmitting the first set of image reconstruction data, transmitting the second set of image reconstruction data to the decoder for playback of the image signal in accordance with the second level of quality.

8. The method as in claim 7, wherein the second set of image reconstruction data is supplemental image reconstruction data with respect to the first set of image reconstruction data, the second set of image reconstruction data providing modification data necessary to modify a rendition of the image signal generated based on the first set of image reconstruction data to reconstruct the image signal according to the second level of resolution quality.

9. The method as in claim 1, wherein varying the level of quality of the image reconstruction data transmitted to the decoder includes:

producing a first set of image reconstruction data to reconstruct the image signal in accordance with the first level of quality in the hierarchy;

transmitting the first set of image reconstruction data to the decoder to enable navigation amongst the image signal played back at the first level of resolution quality;

receiving a pointer value indicating a location in the image signal at the first level of resolution quality as generated based on the first set of image reconstruction data;

producing a second set of image reconstruction data to include image reconstruction data to reconstruct the image signal starting at the location as specified by the pointer value, the second set of image reconstruction data encoded in accordance with a second level of resolution quality in the hierarchy; and transmitting the second set of image reconstruction data to the decoder to enable playback, at the second level of resolution quality, of portions of the image signal following the location as specified by the pointer value.

10. The method as in claim 9, wherein the second set of image reconstruction data is supplemental image reconstruction data with respect to the first set of image reconstruction data, the second set of image reconstruction data providing modification data necessary to modify a rendition of the image signal generated based on the first set of image reconstruction data to reconstruct the image signal starting at the location as specified by the pointer value according to the second level of resolution quality.

11. The method as in claim 1 further comprising:

varying the level of quality of the image reconstruction data to facilitate playback of the image signal in substantially real-time by the decoder.

12. The method as in claim 1 further comprising:

implementing a fee schedule in which users are charged different fees depending on a level of quality of the image reconstruction data transmitted to the decoder.

13. The method as in claim 1 wherein the second set of image reconstruction data is supplemental image reconstruction data indicating adjustments to make to the image signal at the first level of quality as generated based on the first set of image reconstruction data in order to reconstruct the image signal according to the second level of quality; and implementing digital rights management with respect to only the first set of image reconstruction data to prevent unauthorized decoding of the first set of image reconstruction data.

14. The method as in claim 1 further comprising:

wherein the second set of image reconstruction data is supplemental image reconstruction data indicating adjustments to make to the image signal at the first level of quality as generated based on the first set of image reconstruction data in order to reconstruct the image signal according to the second level of quality;

generating the first set of image reconstruction data to include redundant encoding to enable playback of the first set of image reconstruction data in the event of errors with respect to the first set of image reconstruction data; and generating the second set of image reconstruction data to only include non- redundant encoding.

15. The method as in claim 1, wherein the image reconstruction data is organized into groupings of image reconstruction data, each of the groupings of image reconstruction data representing a time-based portion of the image signal, each of the groupings of image reconstruction data including space-based segments of tiered image reconstruction data; and wherein each of the space-based segments of tiered image reconstruction data indicates image reconstruction data at a given level of quality for a respective tile of contiguous elements associated with the image signal.

16. The method as in claim 15, wherein transmitting the retrieved image reconstruction data to the decoder includes:

transmitting each of the multiple space-based segments in sequential order, one complete segment after another, in a bitstream to the decoder; and providing marker information in the bitstream to indicate a respective beginning and end of each complete space-based segment.

17. The method as in claim 15, wherein transmitting the retrieved image reconstruction data to the decoder includes:

transmitting the space-based segments of tiered image reconstruction data in a bitstream starting from image reconstruction data for the multiple segments for the lower levels of quality to image reconstruction data for the multiple segments for the higher level of quality;

providing information in the bitstream to indicate a respective beginning and end of tiered image reconstruction data for each level of quality and for each segment.

18. The method as in claim 1, wherein transmitting the retrieved image reconstruction data to a decoder further comprises:

varying a highest level of quality of image reconstruction data transmitted to the decoder for each portion of the image signal in order to transmit a substantially constant bit rate of tiered image reconstruction data to the decoder for each portion of multiple successive portions of the image signal.

19. The method as in claim 1 further comprising:
partitioning a data stream into multiple segments including at least a first segment and a second segment, the first segment including image reconstruction data to play back a first portion of the image signal, wherein the first portion of the image signal is an image/frame, the second segment including image reconstruction data to play back a second portion of the image signal, wherein the second portion of the image signal includes a set of at least one subsequent images/frames;
populating the first segment of the data stream to include multiple levels of quality of image reconstruction data to reconstruct the first portion of the image signal; and
populating the second segment of the data stream to include: i) multiple levels of quality of image reconstruction data to reconstruct the second portion of the image signal, and ii) at least one level of quality of additional image reconstruction data to reconstruct the first portion of the image signal.

20. The method as in claim 19, wherein the decoder is configured to buffer the data stream and reconstruct the first portion of the image signal based on the multiple levels of quality of image reconstruction data in the first segment and the at least one level of quality of additional image reconstruction data in the second segment.

21. Computer-readable storage hardware having instructions stored thereon, the instructions, when carried out by a processing device, causing the processing device to:
retrieve image reconstruction data and metadata from a repository, the retrieved image reconstruction data and metadata being a subset of available data selected from the repository for distribution to a decoder from a streaming server performing the distribution, the retrieved image construction data encoded in accordance with a tiered hierarchy including multiple available levels of image signal quality in which portions of an image signal are encoded,
   wherein the retrieved image reconstruction data comprises at least a first set of image reconstruction data and a second set of image reconstruction data associated with the image signal and further comprises a plurality of frames, including intra-frames and predicted-frames, and
   wherein the metadata, which includes information provided to assist the streaming server in selecting which portions of the image reconstruction data are to be distributed to the decoder, includes distance information indicating a determined distance as between (i) at least one frame included among the plurality of frames, which are included in the image reconstruction data, and (ii) a next subsequent intra-frame included in the image reconstruction data, whereby the distance information is also provided to assist the streaming server in its selecting,
transmit the retrieved image reconstruction data to the decoder, the decoder configured to reconstruct one or more renditions of the image signal based on the transmitted image reconstruction data; and
during the transmission, and responsive to a detected condition identified during the transmission, varying a level of resolution quality of the image reconstruction data retrieved from the tiered hierarchy and transmitted to the decoder by transmitting the first set of image reconstruction data during a first portion of the transmission, the first set of image reconstruction data being of a first level of quality configured to provide a first rendition of a first portion of the image signal at the first level of quality, and transmitting the second set of image reconstruction data during a second portion of the transmission, the second set of image reconstruction data being of a second level of quality, that is a greater quality than the first level of quality, and that is configured to provide a second rendition of a second portion of the image signal at the second level of quality.

22. A computer system comprising:
a processor including processing hardware;
a hardware storage unit that stores instructions associated with an application executed by the processor; and
an interconnect coupling the processor and the hardware storage unit, causing the processing hardware to:
   retrieve image reconstruction data and metadata from a repository, the retrieved image reconstruction data and metadata being a subset of available data selected from the repository for distribution to a decoder from a streaming server performing the distribution, the retrieved image construction data encoded in accordance with a tiered hierarchy including multiple available levels of image signal quality in which portions of the image signal are encoded,
      wherein the retrieved image reconstruction data comprises at least a first set of image reconstruction data and a second set of image reconstruction data associated with the image signal, and further comprises a plurality of frames, including intra-frames and predicted-frames, and
      wherein the metadata, which includes information provided to assist the streaming server in selecting which portions of the image reconstruction data are to be distributed to the decoder, includes distance information indicating a determined distance as between (i) at least one frame included among the plurality of frames, which are included in the image reconstruction data, and (ii) a next subsequent intra-frame included in the image reconstruction data, whereby the distance information is also provided to assist the streaming server in its selecting;
   transmit the retrieved image reconstruction data to the decoder, the decoder configured to reconstruct one or more renditions of the image signal based on the transmitted image reconstruction data; and
   during the transmission, and responsive to a detected condition identified during the transmission. vary a level of quality of the image reconstruction data retrieved from the tiered hierarchy and transmitted to the decoder by transmitting the first set of image reconstruction data during a first portion of the transmission, the first set of image reconstruction data having a first level of quality configured to provide a first rendition of a first portion of the image signal at the first level of quality, and transmitting the second set of image reconstruction data during a second portion of the transmission, the second set of image reconstruction data having a second level of quality, that is a greater quality than the first level of quality, and that is configured to provide a second rendition of a second portion of the image signal at the second level of quality.

23. The method as in claim 6 further comprising:
producing the first set of image reconstruction data to specify a manner in which to upsample a rendition of the first portion of the image signal at the lowest level of quality to a rendition of the first portion of the image signal at the first level of quality; and
producing the second set of image reconstruction data to specify a manner in which to upsample a rendition of the second portion of the image signal at the lowest level of quality to a rendition of the second portion of the image signal at the second level of quality.

24. The method as in claim 23, wherein producing the first set of image reconstruction data and the second set of image reconstruction data includes:
iteratively downsampling a rendition of the first portion of the image signal from a highest level of quality to produce the first set of image reconstruction data; and
iteratively downsampling a rendition of the second portion of the image signal from the highest level of quality to produce the second set of image reconstruction data.

25. The method as in claim 1, wherein varying the level of quality includes:
for the first portion of the image signal, producing the first set of image reconstruction data to include a first sequence of image reconstruction data specifying how to upsample a lowest resolution of the first portion of the image signal to a first resolution in the tiered hierarchy;
transmitting the first set of image reconstruction data to the decoder for playback of the first portion of the image signal in accordance with the first resolution;
for the second portion of the image signal, producing the second set of image reconstruction data to include a second sequence of image reconstruction data specifying how to upsample a lowest resolution of the second portion of the image signal to a second resolution in the tiered hierarchy; and
transmitting the second set of image reconstruction data to the decoder for playback of the second portion of the image signal in accordance with the second resolution.

26. The method as in claim 1 further comprising:
iteratively downsampling a rendition of the first portion of the image signal at a highest resolution in the tiered hierarchy to successively lower resolutions in the tiered hierarchy to produce a first sequence of image reconstruction data, the first sequence of image reconstruction data encoded to specify how to upsample a rendition of the first portion of the image signal from a lowest resolution in the tiered hierarchy; and
iteratively downsampling a rendition of the second portion of the image signal at the highest resolution in the tiered hierarchy to successively lower resolutions in the tiered hierarchy to produce a second sequence of image reconstruction data, the second sequence of image reconstruction data encoded to specify how to upsample a rendition of the second portion of the image signal from the lowest resolution in the tiered hierarchy.

27. The method as in claim 26, wherein the tiered hierarchy includes a first resolution level and a second resolution level that reside between the lowest resolution and the highest resolution in the tiered hierarchy; and
wherein varying the level of quality of the image reconstruction data transmitted to the decoder includes: i) transmitting fewer-than-all portions of the first sequence of image reconstruction data to the decoder to upsample a rendition of the first portion of the image signal up to the first resolution level; and ii) transmitting fewer-than-all portions of the second sequence of image reconstruction data to the decoder to upsample a rendition of the second portion of the image signal up to the second resolution level.

28. The method as in claim 1, wherein varying the level of quality includes:
transmitting the first set of image reconstruction data to the decoder for reproducing a first image frame of the image signal, the first set of image reconstruction data specifying upsample operations indicating how to upsample and reconstruct a rendition of the first image frame of the image signal up to a first level of quality in the tiered hierarchy; and
transmitting the second set of image reconstruction data to the decoder for reproducing a second image frame of the image signal, the second set of image reconstruction data specifying upsample operations indicating how to upsample and reconstruct a rendition of the second image frame of the image signal up to a second level of quality in the tiered hierarchy, the second level of quality being of different resolution quality than the first level of quality.

29. The method as in claim 1, wherein the first set of image reconstruction data specifies upsample operations indicating how to upsample and reconstruct a rendition of the first portion of the image signal up to the first level of quality in the tiered hierarchy; and
wherein the second set of image reconstruction data specifies upsample operations indicating how to upsample and reconstruct a rendition of the second portion of the image signal up to a second level of quality in the tiered hierarchy, the second level of quality being of a different resolution than a resolution of the first level of quality.

30. The method as in claim 29, wherein the first set of image reconstruction data includes first reconstruction data and second reconstruction data, the first reconstruction data specifying upsample operations indicating how to upsample and reconstruct a rendition of the first portion of the image signal up to the first level of quality in the tiered hierarchy, the second reconstruction data specifying upsample operations indicating how to upsample the rendition of the first portion at the first level of quality to a rendition of the first portion at the second level of quality in the tiered hierarchy; and
wherein the second set of image reconstruction data includes third reconstruction data and fourth reconstruction data, the third reconstruction data specifying upsample operations indicating how to upsample and reconstruct a rendition of the second portion of the image signal up to the first level of quality in the tiered hierarchy, the fourth reconstruction data specifying upsample operations indicating how to upsample the rendition of the second portion at the first level of quality to a rendition of the second portion at the second level of quality in the tiered hierarchy.

31. The method as in claim 1, wherein a first image portion is a first image frame of the image signal, the first set of reconstruction data indicating display settings of multiple image elements in the first image frame; and
wherein a second image portion is a second image frame of the image signal, the second set of reconstruction data indicating display settings of multiple image elements in the second image frame.

32. The method as in claim 1,
wherein the first set of image reconstruction data specifies upsample operations indicating how to upsample and reconstruct a rendition of the first portion of the image signal up to the first level of quality in the tiered hierarchy; and wherein the second set of image reconstruction data specifies upsample operations indicating how to upsample and reconstruct a rendition of the second portion of the image signal up to the second level of quality in the tiered hierarchy, the second set of image reconstruction data including first reconstruction data and second reconstruction data, the first reconstruction data specifying upsample operations indicating how to upsample and reconstruct a rendition of the second portion of the image signal up to the first level of quality in the tiered hierarchy, the second reconstruction data specifying upsample operations indicating how to upsample the rendition of the second portion of the image signal at the first level of quality to a rendition of the second portion of the image signal at the second level of quality in the tiered hierarchy.

33. The method as in claim 1,
wherein varying the level of quality includes: i) transmitting the first set of image reconstruction data to the decoder for playback of the first portion of the image signal at the first resolution, and ii) transmitting the second set of image reconstruction data to the decoder for playback of the second portion of the image signal at the second resolution.

34. The method as in claim 1, wherein each level of quality in the tiered hierarchy corresponds to a different image resolution.

35. The method as in claim 1, wherein the first set of image reconstruction data specifies first upsample operations to apply at multiple resolutions of the first portion of the image signal to reproduce the rendition of the first portion of the image signal at the first resolution; and wherein the second set of image reconstruction data specifies second upsample operations to apply at multiple resolutions of the second portion of the image signal to reproduce the rendition of the second portion of the image signal at the second resolution.

36. The method as in claim 1, wherein the first set of image reconstruction data specifies first upsample operations to apply starting at a base image signal of the first portion of the image signal at a lowest resolution in the tiered hierarchy to reproduce the rendition of the first portion of the image signal at the first resolution; and wherein the second set of image reconstruction data specifies second upsample operations to apply starting at a base image signal of the second portion of the image signal at the lowest resolution in the tiered hierarchy to reproduce the rendition of the second portion of the image signal at the second resolution.

37. The method of claim 1, wherein the metadata further indicates that certain portions of the image reconstruction data are required to be transmitted at a beginning of a data stream, which is transmitted during said distribution by the streaming server, to provide an initial preview of the image reconstruction data.

* * * * *